United States Patent
Saito et al.

(10) Patent No.: US 8,835,338 B2
(45) Date of Patent: Sep. 16, 2014

(54) BINDER FOR MONOLITHIC REFRACTORIES, MONOLITHIC REFRACTORY, AND CONSTRUCTION METHOD OF MONOLITHIC REFRACTORIES

(75) Inventors: Yoshitoshi Saito, Tokyo (JP); Atsunori Koyama, Omuta (JP)

(73) Assignee: Nippon Steel & Sumitomo Metal Corporation, Tokyo (JP)

( * ) Notice: Subject to any disclaimer, the term of this patent is extended or adjusted under 35 U.S.C. 154(b) by 96 days.

(21) Appl. No.: 13/643,591

(22) PCT Filed: Apr. 28, 2011

(86) PCT No.: PCT/JP2011/060452
§ 371 (c)(1),
(2), (4) Date: Nov. 30, 2012

(87) PCT Pub. No.: WO2011/136365
PCT Pub. Date: Nov. 3, 2011

(65) Prior Publication Data
US 2013/0090229 A1    Apr. 11, 2013

(30) Foreign Application Priority Data
Apr. 28, 2010 (JP) .................................. 2010-104559

(51) Int. Cl.
C04B 35/44    (2006.01)
C04B 7/32     (2006.01)

(52) U.S. Cl.
USPC ........................... 501/124; 501/125; 106/692

(58) Field of Classification Search
USPC ........... 501/124, 125; 106/692, 693, 694, 695
See application file for complete search history.

(56) References Cited

U.S. PATENT DOCUMENTS

| | | | | |
|---|---|---|---|---|
| 4,915,740 | A * | 4/1990 | Sakai et al. ................... | 106/692 |
| 8,309,483 | B2 * | 11/2012 | Saito et al. .................... | 501/124 |
| 8,673,797 | B2 * | 3/2014 | Saito et al. .................... | 501/125 |
| 2008/0261799 | A1 | 10/2008 | Liever et al. | |
| 2011/0039683 | A1 | 2/2011 | Saito et al. | |
| 2011/0251045 | A1 * | 10/2011 | Saito et al. .................... | 501/125 |

FOREIGN PATENT DOCUMENTS

| | | |
|---|---|---|
| CN | 1468202 | 1/2004 |
| EP | 2 351 721 | 8/2011 |
| JP | 52-148524 | 12/1977 |
| JP | 56-104783 | 8/1981 |
| JP | 58-026079 | 2/1983 |

(Continued)

OTHER PUBLICATIONS

Chatterjee et al., Re-examining the prospects of aluminous cements based on alkali-earth and rare-earth oxides, Cement and Concrete Research, Pergamon Press, Elmsford, NY, vol. 39, No. 11, Nov. 1, 2009, pp. 981-988.

(Continued)

Primary Examiner — Karl Group
(74) Attorney, Agent, or Firm — Kenyon & Kenyon LLP

(57) ABSTRACT

This binder for monolithic refractories includes a solid solution obtained by dissolving Ca components in $\alpha$-$SrAl_2O_4$ or $\beta$-$SrAl_2O_4$, wherein when the Ca components are dissolved in the $\alpha$-$SrAl_2O_4$, a crystallite diameter of the solid solution is from 40 nm to 75 nm, and when the Ca components are dissolved in the $\beta$-$SrAl_2O_4$, a crystallite diameter of the solid solution is from 35 nm to 70 nm.

17 Claims, 2 Drawing Sheets

(56) References Cited

FOREIGN PATENT DOCUMENTS

| JP | 2008-290934 | 12/2008 |
|---|---|---|
| WO | 2004/065327 | 8/2004 |
| WO | 2009/130811 | 10/2009 |

OTHER PUBLICATIONS

Extended European Search Report dated Oct. 1, 2013 issued in corresponding EP Application No. 11 775 146.1.

Office Action dated Oct. 17, 2013 issued in corresponding Chinese Application No. 201180021388.8 [With English Translation of Search Report].

International Search Report dated Aug. 16, 2011, issued in corresponding PCT Application No. PCT/JP2011/060452.

Ito, Mizuno, Kawano, Suzuki: "Sr Chikan CaAl2O4-gata Koyotai no Suiwa Kokatai Kyodo" Journal of the Ceramic Society of Japan, 89, 10, p. 572-577, 1981.

Prodjosantoso, A.K. and B.J. Kennedy, "Synthesis and Evolution of the Crystalline Phases in Ca1-xSrxAl2O4" Journal of Solid State Chemistry, 2002, vol. 168, No. 1, pp. 229-236.

* cited by examiner

US 8,835,338 B2

BINDER FOR MONOLITHIC REFRACTORIES, MONOLITHIC REFRACTORY, AND CONSTRUCTION METHOD OF MONOLITHIC REFRACTORIES

FIELD OF THE INVENTION

The present invention relates to a binder for monolithic refractories, which is used for the lining or repair of furnaces, a monolithic refractory, and a construction method of monolithic refractories.

This application is a national stage application of International Application No. PCT/JP2011/060452, filed Apr. 28, 2011, which claims priority to Japanese Patent Application No. 2010-104559, filed Apr. 28, 2010, the content of which is incorporated herein by reference.

RELATED ART

As a binder for the lining refractories of furnaces used for a variety of high temperature processes, best exemplified by steel processes, a number of organic and inorganic compounds, such as sodium phosphate, sodium silicate, a furan resin, a phenol resin, pitch, aluminum lactate, sodium aluminate, silica sol, alumina sol, polyvinyl alcohol, methylcellulose, carboxymethylcellulose, ethylsilicate, alumina cement, hydraulic alumina, or the like, are used.

In recent years, refractories have become unshaped for improvement in constructability, ease of repair, or the like, and monolithic refractories have become widely used even in parts that come into contact with molten iron or high temperature slag, for which shaped bricks were used in the past.

The manufacture of monolithic refractories does not include a high pressure press, which is performed in the manufacture of shaped refractories. Therefore, the characteristics of raw materials or binders for a filling property, firmness, and development of strength are particularly important. Among them, alumina cement (major chemical compounds: $CaO \cdot Al_2O_3$, $CaO \cdot 2Al_2O_3$, $12CaO \cdot 7Al_2O_3$) is used for a wide range of uses as a binder for refractories of degassing and secondary refining facilities such as a blast furnace runner, a molten steel ladle, or RH; a tundish; a heating furnace; heat treatment furnace; and the like.

Furthermore, investigations are also ongoing with alumina-based binders including chemical components other than $CaO$—$Al_2O_3$.

For examples, Patent Documents 1 and 2 disclose mixtures of raw materials for the manufacture of refractory alumina cement including barium or strontium and alumina as the main chemical components. Specifically, the mixtures of raw materials for the manufacture of cement are obtained by appropriately performing a thermal treatment on mixtures of carbonates and chlorides.

Non-Patent Document 1 discloses a material produced by adding a commercial high-purity reagent to $CaO$—$SrO$—$Al_2O_3$-based cement and then blending and firing the mixture, which shows a property of being hardened with an addition of water.

In addition, Patent Document 3 discloses a binder for monolithic refractories using mixtures of raw materials for the manufacture of cement having $CaO$—$SrO$—$Al_2O_3$ composition, which shows improved high-temperature slag resistance, compared to binders with $CaO$—$Al_2O_3$ composition.

REFERENCE DOCUMENTS

Patent Documents

[Patent Document 1] Japanese Unexamined Patent Application, First Publication No. S52-148524
[Patent Document 2] Japanese Unexamined Patent Application, First Publication No. S58-26079
[Patent Document 3] Japanese Unexamined Patent Application, First Publication No. 2008-290934

Non-Patent Documents

[Non-Patent Document 1] Ito, Mizuno, Kawano, Suzuki: Journal of the Ceramic Society of Japan, 89, 10, P. 572-577, 1981
[Non-Patent Document 2] Prodjosantoso, A. K. and B. J. Kennedy, Journal of Solid State Chemistry, 2002, Vol. 168, No. 1, pp. 229-236

DISCLOSURE OF THE INVENTION

Problems to be Solved by the Invention

However, the demand for improvement in steel quality tends to make conditions, such as operation temperature, or the like, more severe and thus high temperature corrosion resistance, or the like is continuously becoming insufficient in conventional binders. Compared to chemical components in refractory aggregates for monolithic refractories, binders including alumina cement, which are generally used, have problems in that they are liable to form low melting point materials due to ferric oxides in molten iron or slag, and wear or infiltration proceeds from binder portions in refractories, which makes it impossible to sufficiently develop the intrinsic tolerance of chemical components in the refractory aggregates.

That is, Patent Document 1 supplies the mixtures of raw materials for the manufacture of refractory alumina cement including barium or strontium and alumina as the main chemical components, and studies the strength, or the like of clinker binders using the mixtures of raw materials. However, the compressive strength is not sufficiently developed 3 days and 7 days after the manufacture and eventually reaches the maximum on the 28 days after the manufacture.

Generally, monolithic refractories are subjected to drying and heating 1 day after the manufacture and are often placed under the operating environment. From such a viewpoint, development of the maximum strength within 24 hours is strongly required. As a result, binders whose maximum strength is eventually developed on the 28 days after manufacture cannot be adopted for monolithic refractories.

In addition, Patent Document 1 discloses nothing about high temperature characteristics of higher than 1000° C. and furthermore is not clear about corrosion resistance with respect to high temperature molten iron or slag and discloses nothing about methods for the application to monolithic refractories with excellent high temperature corrosion resistance.

In addition, Patent Document 2 supplies heat-insulating castable mixtures using strontium aluminate as a binder, with which heat-insulating materials with high temperature strength can be obtained. However, the document is about heat-insulating uses for which the mixtures are lined on the rear surface of furnaces, and therefore is not clear about corrosion resistance with respect to high temperature molten iron or slag, which is an essential characteristic for the wear lining of furnaces. In addition, when strontium aluminate is used as a binder, strontium ions are liable to be eluted during mixing, which easily leads to agglomeration. Accordingly, it becomes clear that there are cases where the construction of the heat-insulating castable mixtures using strontium aluminate as a binder is difficult.

In addition, Non-Patent Document 1 shows that CaO—SrO—$Al_2O_3$-based cement is produced and the strength of hardened bodies becomes extremely great at an amount of Sr-substitution of from 0.3 mol to 0.4 mol. However, the document discloses nothing about high temperature characteristics of higher than 1000° C., and also shows nothing about methods for the application to monolithic refractories with excellent high temperature corrosion resistance.

Due to the above limitations, as binders for monolithic refractories in actual industrial uses, alumina cement including $CaO.Al_2O_3$, as the major chemical component, $\alpha$-$Al_2O_3$ or $CaO.2Al_2O_3$, $12CaO.7Al_2O_3$ and a variety of additives are used.

In addition, Non-Patent Document 2 shows that a crystal structure of a $CaAl_2O_4$—$SrAl_2O_4$ solid solution varies depending on the amount of Ca or Sr solidified. The Introduction thereof shows that $CaAl_2O_4$ is the major chemical component of high alumina cement used for a heat-resistant castable in the steel industry. However, the document discloses or suggests nothing relating to performance, for example, the strength or corrosion resistance of monolithic refractories when the $CaAl_2O_4$—$SrAl_2O_4$ solid solution is used as a binder for monolithic refractories.

That is, as of now, examples of alumina cement used as binders for monolithic refractories include "high alumina cement ES", "high alumina cement VS-2", "high alumina cement super 90", "high alumina cement super G", "high alumina cement super 2", "high alumina cement super", or the like (all product names, manufactured by Denki Kagaku Kogyo Kabushiki Kaisha); "SECAR 71", "SECAR 80", or the like (all product names, manufactured by Kerneos Inc.); or the like. Any of the above includes $CaO.Al_2O_3$, as the major chemical component, $\alpha$-$Al_2O_3$ or $CaO.2Al_2O_3$, $12CaO.7Al_2O_3$, and a small amount of additives depending on required characteristics.

As a result, there has been a strong demand for the development of binders for monolithic refractories with excellent corrosion resistance with respect to high temperature molten iron or slag because conditions such as operation temperature continuously become more severe.

On the other hand, Patent Document 3 discloses $Ca_xSr_{1-x}Al_2O_4$ as binders having excellent corrosion resistance with respect to slag or molten iron, compared to alumina cement in the conventional technology. However, in order for $Ca_xSr_{1-x}Al_2O_4$ to be widely used as binders of monolithic refractories of furnaces having various thicknesses and shapes and the like, further improvement of hardened strength is required.

An object of the present invention is to provide a binder for monolithic refractories having excellent corrosion resistance with respect to slag or molten iron and excellent characteristics in the early development of hardened strength and the stability thereof, compared to binders such as alumina cement in the conventional technology; a monolithic refractory using the binder; and a construction method of the monolithic refractory.

Methods for Solving the Problem

The inventors paid attention to substituting Ca in a binder for monolithic refractories with a metal atom from the viewpoint of improving the refractoriness of a monolithic refractory, and newly found that, by dissolving SrO in $CaO.Al_2O_3$ which is a component of alumina cement in the conventional technology (in other words, by dissolving Ca components in $SrAl_2O_4$ to obtain a solid solution), a composition has a high melting point, corrosion resistance with respect to slag or molten iron is excellent, and constructability and high temperature stability can be improved (refer to Patent Document 3). In addition, the inventors also found that due to the solidification of SrO, a time taken to develop strength of a monolithic refractory can be shortened and thus high strength can be realized (refer to Patent Document 3).

The inventors newly paid attention to a crystallite diameter of the above-described solid solution and vigorously studied and discussed; and as a result, found that, when the crystallite diameter is set to be a predetermined size or less smaller than that in the conventional technology, corrosion resistance and a strength developing property can be further improved and completed the present invention.

Here, the solidification represents two or more kinds of elements (which may be metal or non-metal) dissolving each other such that the entire mixture is uniformly solid. In addition, the solid solution represents a phase of a crystalline material which is formed by two or more kinds of elements becoming uniformly solid.

The summary of the present invention is as follows.

(1) A binder for monolithic refractories including a solid solution obtained by dissolving Ca components in $\alpha$-$SrAl_2O_4$ or $\beta$-$SrAl_2O_4$, wherein when the Ca components are dissolved in the $\alpha$-$SrAl_2O_4$, a crystallite diameter of the solid solution is from 40 nm to 75 nm, and when the Ca components are dissolved in the $\beta$-$SrAl_2O_4$, a crystallite diameter of the solid solution is from 35 nm to 70 nm.

(2) The binder for monolithic refractories according to (1) above, wherein an amount of the solid solution obtained by dissolving Ca components in the $\alpha$-$SrAl_2O_4$ or the $\beta$-$SrAl_2O_4$ is from 10 mass % to 60 mass %, and 40 mass % to 90 mass % of $Al_2O_3$ is blended thereinto.

(3) The binder for monolithic refractories according to (1) above, further including, as a mixture, a solid solution obtained by dissolving Sr components in $CaAl_2O_4$, wherein a crystallite diameter of the solid solution is from 25 nm to 60 nm.

(4) The binder for monolithic refractories according to (3) above, wherein an amount of the solid solution obtained by dissolving Ca components in the $\alpha$-$SrAl_2O_4$ or the $\beta$-$SrAl_2O_4$ and the solid solution obtained by dissolving Sr components in the $CaAl_2O_4$ is from 10 mass % to 60 mass %, and 40 mass % to 90 mass % of $Al_2O_3$ is blended thereinto.

(5) The binder for monolithic refractories according to (1) above, wherein both of a solid solution obtained by dissolving Ca components in the $\alpha$-$SrAl_2O_4$ and a solid solution obtained by dissolving Ca components in the $\beta$-$SrAl_2O_4$ are included as a mixture.

(6) The binder for monolithic refractories according to (5) above, wherein a total amount of both of the solid solution obtained by dissolving Ca components in the $\alpha$-$SrAl_2O_4$ and the solid solution obtained by dissolving Ca components in the $\beta$-$SrAl_2O_4$ is from 10 mass % to 60 mass %, and 40 mass % to 90 mass % of $Al_2O_3$ is blended thereinto.

(7) The binder for monolithic refractories according to (5) above, further including, as a mixture the solid solution obtained by dissolving Sr components in the $CaAl_2O_4$.

(8) The binder for monolithic refractories according to (7) above, wherein a total amount of the solid solution obtained by dissolving Ca components in the $\alpha$-$SrAl_2O_4$, the solid solution obtained by dissolving Ca components in the $\beta$-$SrAl_2O_4$, and the solid solution obtained by dissolving Sr components in the $CaAl_2O_4$ is from 10 mass % to 60 mass %, and 40 mass % to 90 mass % of $Al_2O_3$ is blended thereinto.

(9) The binder for monolithic refractories according to (1) above, wherein one kind or two or more kinds selected from a group consisting of $SiO_2$, $TiO_2$, $Fe_2O_3$, MgO, and BaO are included in the binder for monolithic refractories and an amount thereof is 12 mass % or less.

(10) The binder for monolithic refractories according to (1) above, wherein at least one of a dispersant and a hardening retardant is blended into the binder for monolithic refractories.

(11) A monolithic refractory obtained by blending the binder for monolithic refractories according to any one of (1) to (10) above into a refractory aggregate.

(12) The monolithic refractory according to (11) above, wherein the refractory aggregate includes an ultrafine alumina powder with a particle diameter of from 0.8 nm to 1 µm.

(13) The monolithic refractory according to (11) above, wherein an amount of the binder for monolithic refractories is from 0.3 mass % to 20 mass % with respect to 100 mass % of a total amount of the binder for monolithic refractories and the refractory aggregate.

(14) The monolithic refractory according to (13) above, wherein the amount of the binder for monolithic refractories is from 0.5 mass % to 12 mass % with respect to 100 mass % of the total amount of the binder for monolithic refractories and the refractory aggregate.

(15) The monolithic refractory according to (11) above, wherein further at least one of a dispersant, a hardening retardant, and a hardening accelerator is added.

(16) The monolithic refractory according to (15) above, wherein the dispersant is one kind or two or more kinds selected from a group consisting of a polycarbonate-based dispersant, a phosphate-based dispersant, an oxycarboxylic acid, a melamine-based dispersant, a naphthalene-based dispersant, and a lignin sulfonic acid-based dispersant, the hardening accelerator is at least one of an alkali metal salt and aluminate, and the hardening retardant is at least one of boric acid group and silicofluoride.

(17) A construction method of monolithic refractories including: blending and mixing the binder for monolithic refractories according to any one of (1) to (10) above and a refractory aggregate including an ultrafine alumina powder with a particle diameter of 1 µm or less to obtain a monolithic refractory; and constructing the monolithic refractory.

Effects of the Invention

According to a binder for monolithic refractories of the present invention, since a favorable strength developing property is developed within a shorter period of time compared to that of the conventional technology, a time taken to remove a frame can be reduced and construction efficiency can be improved. In addition, it is possible to develop the effects of excellent corrosion resistance with respect to slag or molten iron, and of expansion of the service life of monolithic refractories lined in furnaces used at a high temperature.

EMBODIMENTS OF THE INVENTION

Figure 1:
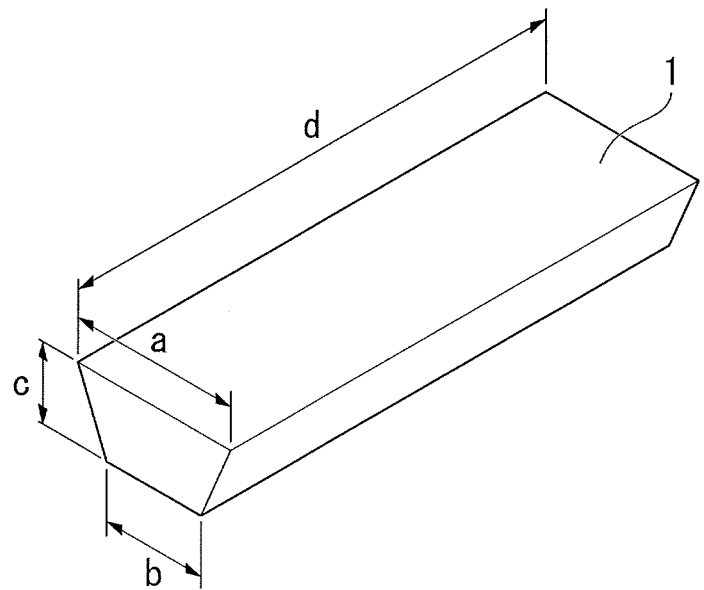
FIG. 1 is a perspective view showing a shape of an evaluation specimen.

Hereinafter, some embodiments of the present invention will be described.

According to a first embodiment of the present invention, a binder includes a solid solution obtained by dissolving Ca components in $SrAl_2O_4$ therein. At this time, when $SrAl_2O_4$ is α-$SrAl_2O_4$, a crystallite diameter of the solid solution is from 40 nm to 75 nm; or when $SrAl_2O_4$ is β-$SrAl_2O_4$, a crystallite diameter of the solid solution is from 35 nm to 70 nm.

A binder, which includes a solid solution having a crystallite diameter in the above-described predetermined range, has a higher melting point than that of alumina cement (major chemical component: $CaO.Al_2O_3$) in the conventional technology, and has excellent high temperature stability when it reacts with water so as to form the hardened body. In addition, in particular, when the crystallite diameter is in the above-described predetermined range, by using the present binder, an appropriate operation time can be secured when manufacturing monolithic refractories. Furthermore, since hardening rate is improved compared to that in the conventional technology, corrosion resistance and strength can be improved. As a result, the present binder can be used for a wide range of uses as a binder.

However, in order to facilitate the effects, it is preferable that an amount of the solid solution be 10 mass % or higher in the binder. In addition, the upper limit of the amount may be 100 mass %. The composition of a balance in the binder is typically $Al_2O_3$, and also includes examples of $SiO_2$, $TiO_2$, $Fe_2O_3$, MgO, BaO, or the like. With regard to how they can intrude into the binders of the present invention, in the case of $Al_2O_3$, it may be intentionally added in order to impart a high level of fireproofness thereto. In the case of other components, a case in which they have already been included in raw materials to be used or a case in which the binders are contaminated from a crushing apparatus, a transportation apparatus, a firing apparatus, or the like of binder raw materials or products during the manufacturing process can be considered. In addition, a solid solution according to the following embodiment can be included in the binder as a mixture.

In a binder for monolithic refractories according to a second embodiment of the present invention, a solid solution, obtained by dissolving SrO as Sr components in $CaO.Al_2O_3$, is blended into a binder including the solid solution according to the first embodiment obtained by dissolving Ca components in α-$SrAl_2O_4$ in which a crystallite diameter of the solid solution is from 40 nm to 75 nm, or into a binder including the solid solution according to the first embodiment obtained by dissolving Ca components in β-$SrAl_2O_4$ in which a crystallite diameter of the solid solution is from 35 nm to 70 nm. In this case, a crystallite diameter of the solid solution obtained by dissolving SrO in $CaO.Al_2O_3$ is from 25 nm to 60 nm.

With regard to the existence form of these solid solutions in the binder, they are not present as a single solid solution obtained by being solidified with each other but are present as independent solid solutions. The binder is present in the form of a mixture.

A content ratio of the solid solution obtained by dissolving SrO in $CaO.Al_2O_3$ included in the binder is not limited. However, in order to facilitate the effects thereof, it is preferable that an amount of a mixture of the solid solution in the binder be 10 mass % or higher. In addition, the upper limit of the amount may be 100 mass %. If there is a balance in the binder, the composition of the balance is typically $Al_2O_3$, and also includes examples of $SiO_2$, $TiO_2$, $Fe_2O_3$, MgO, BaO, or the like. With regard to how they can intrude into the binders of the present invention, as in the case of the first embodiment, $Al_2O_3$ may be intentionally added in order to impart a high level of fireproofness thereto. In the case of other components, a case in which they have already been included in raw materials to be used or a case in which the binders are contaminated from a crushing apparatus, a transportation apparatus, a firing apparatus, or the like of binder raw materials or products during the manufacturing process can be considered.

The solid solution obtained by dissolving SrO in $CaO.Al_2O_3$ is hydraulic, has a higher melting point than that of $CaO.Al_2O_3$ of alumina cement in the conventional technology, and has excellent high temperature stability when it reacts with water so as to form the hardened body. Therefore, it is possible to obtain a greater effect than that with a binder in the conventional technology. In addition, the solid solution obtained by dissolving SrO in $CaO.Al_2O_3$ is more preferable because a crystallite diameter of the solid solution is from 25 nm to 60 nm and thus an appropriate operation time and hardening rate can be obtained.

According to a third embodiment of the present invention, both of the solid solution according to the first embodiment obtained by dissolving Ca components in $\alpha$-$SrAl_2O_4$ which has a crystallite diameter in the predetermined range and the solid solution according to the first embodiment obtained by dissolving Ca components in $\beta$-$SrAl_2O_4$ which has a crystallite diameter in the predetermined range, are included in a binder. The third embodiment is different from the first embodiment in that both of the solutions are included, not either of them. This binder may further include the solid solution according to the second embodiment obtained by dissolving Sr components in $CaO.Al_2O_3$. With regard to the existence form of these solid solutions in the binder, they are not present as a single solid solution obtained by being solidified with each other but are present as independent solid solutions. The binder is present in the form of a mixture. In addition, according to the third embodiment, as in the cases of the first embodiment and the second embodiment, it is possible to obtain a greater effect than that with a binder in the conventional technology.

A ratio of two or three kinds of solid solutions as a mixture in the binder is not particularly limited. However, in order to facilitate the effects thereof, it is preferable that a total amount of a mixture of these solid solutions in the binder be 10 mass % or higher. In addition, the upper limit of the amount may be 100 mass %. The composition of a balance in the binder is typically $Al_2O_3$, and also includes examples of $SiO_2$, $TiO_2$, $Fe_2O_3$, MgO, BaO, or the like. With regard to how they can intrude into the binders of the present invention, as in the cases of the first and second embodiments, $Al_2O_3$ may be intentionally added in order to impart a high level of fireproofness thereto. In the case of other components, a case in which they have already been included in raw materials to be used or a case in which the binders are contaminated from a crushing apparatus, a transportation apparatus, a firing apparatus, or the like of binder raw materials or products during the manufacturing process can be considered.

By performing the maintenance and optimization of the selection and manufacturing processes of industrially used raw materials, an amount of $SiO_2$, $TiO_2$, $Fe_2O_3$, MgO, BaO, and the like, which are impurities in the binders of the first to third embodiment, can be reduced to a level with no influence on the effects of the present invention. The amount is preferably 12 mass % or less and more preferably 5 mass % or less with respect to the total mass of the binders of the present invention in the total amount of chemical components, which is the converted amount of the oxides of the respective chemical components. If the amount is more than 12 mass %, there are cases in which performance degradation, such as degradation of the strength developing property and corrosion resistance of monolithic refractories using the binders, occurs.

In addition, when the amount of $SiO_2$, $TiO_2$, $Fe_2O_3$, MgO, and BaO is 12 mass % or less, the cured strength of monolithic refractories may increase. The reason is considered that minerals containing these components generate amorphous materials and ions are liable to be eluted when it reacts with water. Strength increases greatly when the amount is 5 mass % or less and the increase continues until 12 mass %. However, when the amount exceeds 12 mass %, conversely, there are cases in which strength is reduced maybe because the minerals containing the components generate crystalline materials having a low solubility in water. In addition, there are cases where high temperature corrosion resistance is degraded maybe because a melting point of impurities is lowered.

Furthermore, the present inventors also reviewed a case where no Ca components are included in a solid solution of $SrAl_2O_4$ in comparison, but found that there were differences in the functions of a binder, from the case where Ca components are included as in the present invention. Therefore, in order to study the functions of the binders, an ion elution test was conducted to compare reaction processes with water of both of the cases to each other. As a result, in a case where the composition of a solid solution is represented by $Ca_xSr_{1-x}Al_2O_4$, it was found that the initial amount of ions eluted of a solid solution in which X=0 and no Ca components were included was extremely greater than that of a solid solution in which Ca components was included (for example, X=0.15). Therefore, in the case where no Ca components were included, the elution speed of ions was extremely fast. After a saturated solubility was reached, hydration products were precipitated in a supersaturated solution. A cross-linked structure was generated between particles so as to contribute to binding and strength development for hardening.

In detail, the rate of Sr ions eluted from the $SrAl_2O_4$ composition, in which no Ca components were included, into mixing water and the rate of Sr and Ca ions eluted from the above-described various solid solutions according to the present invention were compared. For the comparison, 200 g of a specimen was fed into 400 g of distilled water and stirred for a predetermined period of time using a magnetic stirrer, and then the solution was extracted and analyzed with inductively-coupled plasma (ICP) optical emission spectrometry, thereby measuring the amount of elements in the solution. The elements in the solution were presumed to be present in a variety of ion states. As a result of comparing the amounts for the same stirring time, it was quantitatively found that the rate of Sr ions eluted from $SrAl_2O_4$, in which no Ca components were included, into mixing water was greater than the rate of Sr and Ca ions eluted from the above-described various solid solutions according to the present invention.

Therefore, when the solid solution in which X=0 is used for the binder for monolithic refractories, agglomeration of materials occurs easily due to a large amount of ions eluted. As a result, the necessary time for hardening is shortened and an amount of monolithic refractories to be constructed is large. For example, when an hour or longer is necessary for construction, there is a possibility of problems such as the hardening of a material during mixing and during pouring. To suppress this, it is necessary that a large amount of additives which have an effect of sequestering initially eluted ions, that is, a large amount of boric acid, borax, sodium gluconate, silicofluorides, or the like be added as a hardening retardant compared to the case where Ca components are included (for example, X=0.15). Still, when the function of the hardening retardant which suppresses ion elution does not work, hardening proceeds immediately.

Therefore, when a long period of time is necessary for construction, for example, in furnace facilities where there is a large amount to be constructed, it was found that the case where Ca components are included is preferable from the viewpoint of more stable construction.

Since a binder is usually used in the powder state, it is preferable that the above-described solid solutions according to the present invention be present in the powder state in the binders.

In addition, crystallite diameters of all the solid solutions can be calculated by the Scherrer method after obtaining the full-width at half maximum from the diffraction peak obtained by powder X-ray diffractometry. The solid solutions according to the present invention have a characteristic that a diffraction line thereof changes depending on the blending ratio of Ca and Sr. The respective crystallite diameters can be calculated by obtaining the full-width at half maximum: from the diffraction peak of (−2 1 1) plane with 2θ of about 28.4° in the case of the solid solution obtained by dissolving Ca components in $\alpha$-$SrAl_2O_4$; from the diffraction peak of (1 0 2) plane with 2θ of about 29.5° in the case of the solid solution obtained by dissolving Ca components in $\beta$-$SrAl_2O_4$; and from the diffraction peak of (1 2 3) plane with 2θ of about 30.0° in the case of the solid solution obtained by dissolving Sr components in $CaAl_2O_4$.

In detail, in the various solid solutions, for which a variety of raw materials are prepared and synthesized by a firing method, when a batch furnace is used, samples are taken from various places, such as the surface, interior, or the like of a fired body; and when a continuous furnace such as a rotary kiln is used, samples are taken on a predetermined time interval basis (for example, on a minute basis) to obtain average evaluation samples. Then, the samples (for example, n=10) are sampled, divided, and then crushed by a crusher so that the 50% average diameter becomes 10 μm or less. The samples are measured using a powder X-ray diffractometer (for example, JDX-3500, trade name, manufactured by JEOL Ltd.), and it is possible to calculate the crystallite diameter using JADE 6, a powder X-ray diffraction pattern analyzing software.

The measurement of crystallite diameters using an X-ray diffractometer may be performed under the conditions of an X-ray source of CuKα, a tube voltage of 40 kV, a tube current of 300 mA, a step angle of 0.02°, and a spectroscopy with a measurement condition of monochromator of 2θ from 15° to 40°. With regard to the X-ray diffractometer-derived full-width at half maximum used for the analysis of crystallite diameter, it is possible to use values obtained by measuring silicon powder specimens with the same diffractometer under the same conditions and then obtaining the full-width at half maximum curves.

Next, a manufacturing method of the binders according to the present invention will be described.

In the manufacture of the solid solution obtained by dissolving Ca components in $\alpha$-$SrAl_2O_4$, the solid solution obtained by dissolving Ca components in $\beta$-$SrAl_2O_4$, and the solid solution obtained by dissolving Sr components in $CaAl_2O_4$, these can be respectively manufactured according to the firing temperature by changing the blending ratio of starting materials so as to be a predetermined molar ratio.

As the starting materials, any raw materials can be used as long as CaO, SrO, and $Al_2O_3$ are used as the major chemical components. However, since there is a possibility that CaO and SrO may be hydrated in the atmosphere, $CaCO_3$, $SrCO_3$, and $Al_2O_3$ are preferably used. The kind of raw materials will be described in detail.

The blending ratio of CaO:SrO:$Al_2O_3$ is set by weighing and blending the raw materials so that $Ca_xSr_{1-x}Al_2O_4$ has a predetermined X in terms of molar ratio.

As the crystal phase obtained after firing the mixture at, for example 1450° C., when X is equal to 1.0, $CaAl_2O_4$ is obtained; when X is from about 0.8 to 0.9, the solid solution obtained by dissolving Sr components in $CaAl_2O_4$ is obtained; when X is from about 0.5 to 0.7, a mixture of the solid solution obtained by dissolving Sr components in $CaAl_2O_4$ and the solid solution obtained by dissolving Ca components in $\beta$-$SrAl_2O_4$ is obtained; when X is from about 0.3 to 0.4, the solid solution obtained by dissolving Ca components in $\beta$-$SrAl_2O_4$ is obtained; when X is from about 0.1 to 0.2, a mixture of the solid solution obtained by dissolving Ca components in $\beta$-$SrAl_2O_4$ and the solid solution obtained by dissolving Ca components in $\alpha$-$SrAl_2O_4$ is obtained; and when X is more than 0 and equal to or less than 0.1, the solid solution obtained by dissolving Ca components in $\alpha$-$SrAl_2O_4$ is obtained.

At this time, along with the increase in the molar ratio of Sr, the lattice constants of a-axis, b-axis, and c-axis increase. This is because of, for example, the ionic radii of Ca and Sr. Referring to the ionic radii during pouring, the ionic radius of Ca is 0.099 nm and the ionic radius of Sr is 0.113 nm and Sr has a larger ionic radius. It is presumed that, due to the substitution with Sr having a larger ionic radius, the lattice expands and the lattice spacing expands.

Therefore, these crystal phases can be identified using the powder X-ray diffractometry (XRD) and can be respectively obtained while checking a desired solid solution and a mixture thereof. As the device, for example, a RAD-B system equipped with a curved crystal monochromator (manufactured by Rigaku Corporation) can be used. The XRD measurement is performed under the conditions of an anticathode of Cu (CuKα), 2θ from 15° to 70°, a tube voltage of 40 kV, a tube current of 20 mA, a scan step of 0.010 deg, a scan speed of 4°/min, a divergence slit of ½ deg, a receiving slit of 0.15 nm, and a scattering slit of ½ deg. However, the conditions for the XRD measurement are not limited thereto. When the crystal phases are precisely measured, it is preferable that silicon, aluminum, and magnesium be used as primary standards and an internal standard method be used.

In addition, the solid solutions and the mixtures of the solid solutions may be further blended to obtain a desired mixture of the solid solutions.

In addition, as a method of making a crystallite diameter a predetermined size, in cases where the crystallite diameter of the solid solution obtained by dissolving Ca components in $\alpha$-$SrAl_2O_4$ is made to be from 40 nm to 75 nm; where the crystallite diameter of the solid solution obtained by dissolving Ca components in $\beta$-$SrAl_2O_4$ is made to be from 35 nm to 70 nm; and where the crystallite diameter of the solid solution obtained by dissolving Sr components in $CaAl_2O_4$ is made to be from 25 nm to 60 nm, firing is performed at a temperature of preferably from 1300° C. to 1600° C. and more preferably from 1400° C. to 1500° C. using a firing apparatus, such as an electric furnace, a reverberating furnace, an open-hearth furnace, a shaft furnace, a shuttle kiln, or a rotary kiln.

When the firing temperature is lower than 1300° C., unreacted raw materials are liable to remain and there are cases in which the amount of a target solid solution generated is reduced. In addition, when the firing temperature is higher than 1600° C., there are cases in which the crystal of a solid solution is excessively grown, the crystallite diameter thereof becomes large beyond the predetermined range, and therefore the strength developing property deteriorates. At a temperature of from 1400° C. to 1500° C., it is possible to shorten the firing time to obtain a predetermined crystallite diameter and it becomes difficult for the crystallite diameter to be excessively increased due to excessive firing. Therefore, this temperature range is preferable.

The time period of firing may be adjusted so that a target crystallite diameter is obtained at each temperature, and, for example, is from about 1 hour to 24 hours at 1400° C. and from about 0.5 hours to 12 hours at 1500° C. When firing is performed for longer than 24 hours at 1400° C. and for longer than 12 hours at 1500° C., the crystallite diameter of a solid solution becomes too large beyond the predetermined range of crystallite diameter. Therefore, the hardened strength after a short-term curing time deteriorates, which is not preferable. It is more preferable that the firing temperature and the firing time be 1400 to 1500° C. and 1 to 5 hours.

The above-described appropriate temperature and firing time varies to some extent depending on the specification of a furnace, such as the volume or heating capacity. Therefore, it is preferable to check phases generated in specimens after firing through X-ray diffraction measurement and check whether or not a solid solution having a target crystallite diameter range has been generated for the manufacture, from the viewpoint of reliably obtaining a desired solid solution.

In all of the first to third embodiments, it is preferable that $Al_2O_3$ be blended thereinto in a case in which there is a demand for a further increase in the strength or refractoriness of hardened bodies when the solid solutions react with water so as to form the hardened body. The preferable amount of the solid solutions in the binder is from 10 mass % to 60 mass %, and the preferable amount of $Al_2O_3$ blended thereinto is from 40 mass % to 90 mass %.

With the amount of the solid solutions of less than 10 mass %, depending on the chemical components or particle size distribution of the aggregates in monolithic refractories, there are cases in which it becomes difficult to develop a sufficient hardened strength.

On the other hand, with the amount of the solid solutions of higher than 60 mass %, depending on the chemical components or particle size distribution of the aggregates in monolithic refractories, there are cases in which the hardening rate is too fast and it becomes difficult to secure a sufficient usable life for construction.

In addition, if the amount of $Al_2O_3$ in the binder is 40 mass % or higher, the strength or refractoriness of hardened bodies increases sufficiently, which is preferable. However, if the amount of $Al_2O_3$ to be blended thereinto is more than 90 mass %, the amount of the solid solutions becomes relatively small, and thus it may become difficult to be uniformly hardened. Therefore, the amount of $Al_2O_3$ to be blended thereinto is preferably 90 mass % or less.

Next, a monolithic refractory used for the binder for monolithic refractories according to the present invention will be described. In the present invention, the blending ratio of the binder and refractory aggregates in a monolithic refractory is not particularly specified, and it has been confirmed that, even with an arbitrary blending ratio, the effects of the present invention can be obtained.

However, in a case in which the binder for monolithic refractories of the present invention is used to manufacture actual monolithic refractories, with regard to the blending ratio of the binder and refractory aggregates, it is suggested that the amount of the binder is preferably from 0.3 mass % to 20 mass %, and further preferably from 0.5 mass % to 12 mass % with respect to 100 mass % of the total amount of the binder and refractory aggregates.

This is because, with an amount of less than 0.3 mass %, there are cases in which binding is not sufficient and therefore the strength is not sufficient even after the binder has been hardened. In addition, it is because, with an amount of more than 20 mass %, there are cases in which volume change, or the like generated during the hydration or dehydration process of the binder adversely affects the entire monolithic refractories, and therefore cracking, or the like occurs.

As the refractory aggregates of monolithic refractories, fused alumina, fused bauxite, sintered alumina, calcined alumina, fused mullite, synthesized mullite, melted silica, fused zirconia, fused zirconia mullite, zircon, magnesia clinker, fused magnesia, fused magnesite-chrome, sintered spinel, fused spinel, silicon nitride, silicon carbide, squamation graphite, earthy graphite, sillimanite, kyanite, andalusite, agalmatolite, shale, dolomite clinker, silica rock, clay, chamotte, lime, chrome, melted quartz, calcium aluminate, calcium silicate, or silica flower can be used. They may be used alone or in combination of two or more kinds thereof.

In a case in which the binder of the present invention is used as a binder for monolithic refractories, the amount of water or water-containing solvent used for construction is not particularly specified. However, the amount is dependent on the particle size distribution of aggregates or the type and amount of dispersants, and therefore it is preferable that the amount is roughly from about 2 mass % to 10 mass % with respect to the refractory aggregates in outer percentage.

This is because, if the amount is less than 2 mass %, it becomes difficult to harden the binder. In addition, it is because, if the amount is more than 10 mass %, the amount relating to the formation of hardened structures becomes relatively large, and volume change, or the like during hardening reactions becomes liable to adversely affect the quality of refractories.

In addition, if the binder of the present invention is used as a binder for monolithic refractories, in order to appropriately control the rate of the hydration and hardening reactions according to the atmospheric temperature or humidity, it is preferable to add a dispersant or a hardening adjuster.

As the dispersant, carbonates, such as sodium carbonate, sodium hydrogen carbonate, or the like; oxycarboxylic acids, such as citric acid, sodium citrate, tartaric acid, sodium tartrate acid, or the like; polyacrylic acid or methacrylic acid and salts thereof; condensed phosphates, such as sodium tripolyphosphate or sodium hexametaphosphate, or the like, and/or alkali metals thereof; alkaline-earth metal salts, or the like are mainly used.

As the hardening adjuster, a hardening retardant or a hardening accelerator can be used. As the hardening retardant, it is possible to use boric acid, borax, sodium gluconate, silicofluorides, or the like. On the other hand, as the hardening accelerator, it is possible to use lithium salts, such as lithium carbonate or the like; slaked lime or the like; and aluminates or the like.

In addition, a method also can be used that increases the ventilation rate of materials by adding an explosion preventer, such as an organic fiber, such as vinylon, or the like, metallic aluminum powder, aluminum lactate, or the like.

Furthermore, it is also possible to add ultrafine powder in order to achieve improvement in the flow property, a filling property or sinterability. Examples of the ultrafine powder include inorganic fine powder with a particle diameter of from about 0.01 μm to 100 μm, such as silica fume, colloidal silica, well-sinterable alumina, amorphous silica, zirconia, silicon carbide, silicon nitride, chrome oxide, titanium oxide, or the like.

In a case in which a basic aggregate, such as magnesia, or the like, is blended thereinto, there is a possibility of the generation of cracking caused by hydration swelling of magnesia. In order to suppress such a phenomenon, it is preferable to add a highly surface-active additive, such as fumed silica.

Furthermore, since the monolithic refractories of the present invention are used to manufacture dense hardened bodies, during mixing with water, it is possible to use chemical admixtures, such as a water reducing agent, such as a polycarbonate-based water reducing agent, a lignin-based water reducing agent, or the like, a high performance water reducing agent, a high performance AE water reducing agent, or the like. The type and amount added of the above chemical admixtures can be properly selected according to the type or amount of refractory aggregates to be blended thereinto and conditions, such as the construction temperature, or the like.

As raw materials used for manufacturing the solid solution obtained by dissolving Ca components in $\alpha$-$SrAl_2O_4$, the solid solution obtained by dissolving Ca components in $\beta$-$SrAl_2O_4$, and the solid solution obtained by dissolving Sr components in $CaAl_2O_4$, which are the binders for monolithic refractories according to the present invention, lime stone (mainly $CaCO_3$), calcined lime (mainly CaO), purified alumina ($\alpha$-$Al_2O_3$, $Al(OH)_3$) or bauxite (a raw material of $Al_2O_3$), strontianite ($SrCO_3$) or celestite ($SrSO_4$) are preferably used. Before firing, it is preferable to crush the raw material with a crusher so as to have a 50% average diameter (median diameter) of from about 0.5 µm to 15 µm. This is because, if the raw material includes particles coarser than the above, there are cases in which a large number of unreacted parts remain or a composition other than the solid solutions according to the present invention is partially generated, and therefore there are cases in which the intrinsic effects of the present invention become difficult to develop.

As the composition other than the solid solutions according to the present invention, there are cases in which, if alumina components are rich in the raw material, a solid solution such as $Ca_xSr_{1-x}Al_4O_7$ is generated, and if CaO components and SrO components are rich in the raw material, a solid solution such as $(Ca_xSr_{1-x})_{12}Al_{14}O_{33}$ or $(Ca_xSr_{1-x})_3Al_2O_6$ is generated. However, if the raw materials are prepared, crushed, and blended as described above so as to obtain the target solid solution according to the present invention, the amount of the above generation is small and has less effect on the binder characteristics.

Furthermore, the raw material to be used is preferably a high purity material with 98 mass % or more of a total amount of CaO, $Al_2O_3$ and SrO in the raw material. Impurities included in bauxite, strontianite or celestite, such as $SiO_2$, $TiO_2$, MgO, $Fe_2O_3$, or the like, have a possibility of degrading high temperature properties, and it is preferable to suppress these to an extremely small amount.

Since the particle size of solid solution powder in the binders affects hydration reaction or hardening rate, it is preferable to control particles to be from about 1 µm to 20 µm by a crusher after firing for manufacturing a solid solution. The particle size is a measurement result by a particle size analyzer used for a laser diffractometry, a laser scattering method, a sedimentation balance method, or the like and indicates the 50% average diameter. The raw material can be uniformly blended using a mixer, such as an Eirich mixer, a rotary drum, a cone blender, a V-shape blender, an omni mixer, a nauta mixer, a pan-type mixer, or the like.

As the crusher, it is possible to use an industrial crusher, such as an oscillating mill, a tube mill, a ball mill, a roller mill, a jet mill or the like.

The binders, in which from 10 mass % to 60 mass % of the solid solutions according to the first to third embodiment are included and from 40 mass % to 90 mass % of $Al_2O_3$ is blended, can be manufactured by blending $\alpha$-alumina powder into the various solid solutions obtained by the above-described method.

$\alpha$-alumina powder refers to high purity alumina including 90 mass % or more of $Al_2O_3$, and generally alumina is manufactured by the Bayer process. In this method, firstly, bauxite is washed in a hot solution of sodium hydroxide (NaOH) at 250° C. In this process, alumina is transformed to aluminum hydroxide ($Al(OH)_3$) and dissolved by a reaction shown in the following formula (1).

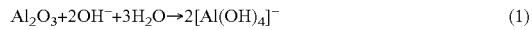

$$Al_2O_3 + 2OH^- + 3H_2O \rightarrow 2[Al(OH)_4]^- \quad (1)$$

At this time, other chemical components in the bauxite are not dissolved and can be removed through filtering as solid impurities. Subsequently, if the solution is cooled, the dissolved aluminum hydroxide is precipitated as a white fluffy solid. If the solid is subjected to a firing treatment at 1050° C. or higher using a rotary kiln, or the like, dehydration shown in the following formula (2) occurs and therefore alumina is generated.

$$2Al(OH)_3 \rightarrow Al_2O_3 + 3H_2O \quad (2)$$

Since binders are highly dependent on the specific surface area of $\alpha$-$Al_2O_3$ blended into the binders in terms of the flow property, the BET specific surface area of $\alpha$-$Al_2O_3$ is preferably from about 0.1 m²/g to 20 m²/g.

$\alpha$-$Al_2O_3$ can be blended thereinto in a state of being made into fine particles or by blending and crushing it with the various solid solutions.

When $\alpha$-$Al_2O_3$ to be blended into the binder is crushed and then blended, it is preferable that refinement be performed so that the 50% average diameter be from about 0.3 µm to 10 µm. In addition, fine alumina powder with the above-described particle diameter can be blended. In addition, when the components of the solid solutions and $\alpha$-$Al_2O_3$ are crushed and blended, it is preferable to set crushing conditions so that the 50% average diameter of $\alpha$-$Al_2O_3$ be in the same range.

When the 50% average diameter of $\alpha$-$Al_2O_3$ is in the above-described range, sinterability with respect to aggregates to be blended into binders or monolithic refractories is improved and a dense structure having excellent corrosion resistance can be obtained.

In addition, the higher the purity of $Al_2O_3$, the superior the refractoriness. Therefore, the purity of $\alpha$-$Al_2O_3$ is preferably 95 mass % or higher and more preferably 99 mass % or higher.

This $\alpha$-$Al_2O_3$ is uniformly blended with hydraulic components by blending it in the binder in advance. When the resultant is blended into a monolithic refractory, the hydraulic components can be more uniformly blended and it is possible to obtain a structure of refractory having excellent strength developing property and corrosion resistance of hardened bodies.

In the present invention, the manner in which $\alpha$-$Al_2O_3$ is blended with the binder and crushed is preferable since $\alpha$-$Al_2O_3$ is uniformly blended into the binder composition and therefore the microstructure of the hardened bodies is liable to become uniform when used for monolithic refractories, and this manner has a tendency of improving performance, such as corrosion resistance, or the like.

In addition, in the monolithic refractory according to the present invention, a construction method of refractories used for the lining or repair of furnaces may be the same as a general construction method of monolithic refractories. However, particularly when an aggregate including an ultrafine alumina powder with a particle diameter of from 0.8 nm to 1 μm and the binders according to the present invention are blended and mixed for construction, binding is further improved due to the synergistic effect with the binders according to the present invention. As a result, a favorable strength developing property is developed within a short period of time, construction efficiency is improved, corrosion resistance with respect to slag and molten iron is further improved, and the effect of service life expansion of furnaces can be more strongly exhibited. Therefore, the above-described manner is preferable.

It is preferable that the blending ratio of the ultrafine alumina powder with a particle diameter of 1 μm or less in the monolithic refractory (other than moisture) be from 2 mass % to 70 mass %

EXAMPLES

Hereinafter, the present invention will be described in detail with examples, but the present invention is not limited to the examples.

In the following examples, as the raw materials, $CaCO_3$ with a purity of 99 mass % (manufactured by Ube Material Co., Ltd.), $SrCO_3$ with a purity of 98 mass % (manufactured by Sakai Chemical Industry Co., Ltd.), and high purity α-alumina with a purity of 99 mass % (manufactured by Nippon Light Metal Co., Ltd.) were used.

Each of the raw materials was weighed with scales so as to have the chemical compositions in the following tables, and then blended and crushed with a mortar. 15 mass % of water was added to the blended and crushed raw materials in outer percentage, was granulated into spherical pellets, were fed into an alumina container, and then subjected to a heating treatment at the maximum temperature in the air atmosphere using an electric furnace (with a furnace volume of 130 L) while changing the holding time thereof. After that, the resultant were cooled to room temperature and placed in the air, and then crushed with a batch type ball mill so as to obtain various solid solutions and binders shown in the examples.

Furthermore, with regard to examples in which α-$Al_2O_3$ is blended, high purity α-alumina (manufactured by Nippon Light Metal Co., Ltd.) was added to the obtained solid solutions and binders so as to obtain a predetermined chemical component.

In addition, in order to study the effects of impurities, barium oxide was used which was obtained by heating at 1400° C. a variety of reagents with a purity of 99 mass %, such as silicon oxide, titanium oxide, magnesium oxide and ferric oxide and a barium carbonate reagent with a purity of 99%. The raw materials were blended according to the contents of the respective following tables to prepare the binders in the same manner described above.

8 mass % of the binder, 92 mass % of refractory aggregates (50 mass % of sintered alumina with a particle size by sieving of 1 μm or lower, 43 mass % of fused alumina with a particle size of from 75 μm to 5 mm, 6 mass % of magnesia, 0.8 mass % of silica flower, and 0.15 mass % of vinylon fiber), and 0.05 mass % of boric acid powder were blended for 1 minute with an omni mixer, and, furthermore, 6.8 mass % of water was added to 100 mass % of the mixture thereof in a constant temperature room of 20° C. and then blended and mixed with a mortar mixer for 3 minutes, thereby obtaining monolithic refractory specimens.

In order to evaluate the operability of the prepared monolithic refractory specimens, the flow test was carried out according to JIS R2521, "Physical testing methods of aluminous cement for refractories" to measure spreading diameters of samples immediately after mixing and 2 hours after the start of blending, in which the samples were subjected to falling motion 15 times.

The flexural strength after curing was measured according to JIS 82553, "Testing method for crushing strength and modulus of rupture of castable refractories" after the monolithic refractory specimens were poured into a 40×40×160 mm mold form and then cured in a constant temperature room at 20° C. for a predetermined time. In addition, the curing time was set to 6, 12, and 24 hours after the start of blending of monolithic refractories.

In addition, the monolithic refractory specimens were cured in a constant temperature room at 20° C. for a predetermined time to manufacture hardened bodies of the refractories and provide specimens for a test for the evaluation of corrosion resistance with respect to slag at a high temperature.

Figure 2:
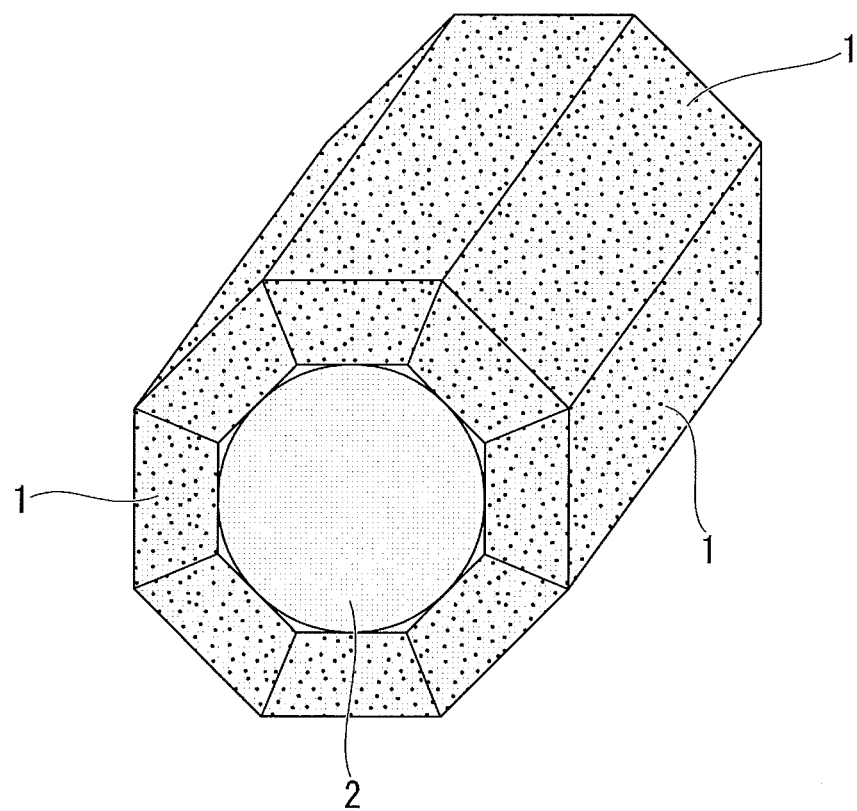
FIG. 2 is a perspective view showing an external appearance of a rotary corrosion furnace.

The rotary corrosion method was used for the evaluation of corrosion resistance with respect to slag at a high temperature. Specimens (refractory 1) cut out into the shape as in FIG. 1 were manufactured, and, as shown in FIG. 2, 8 pieces of the refractory 1 were lined and embedded in a rotary furnace. The size thereof was a=67 mm, b=41 mm, c=48 mm, and d=114 mm. In addition, a cylindrical protection plate 2 (with a diameter of about 150 mmφ) was embedded on the inner side on which 8 pieces of the refractory 1 were lined.

Figure 3:
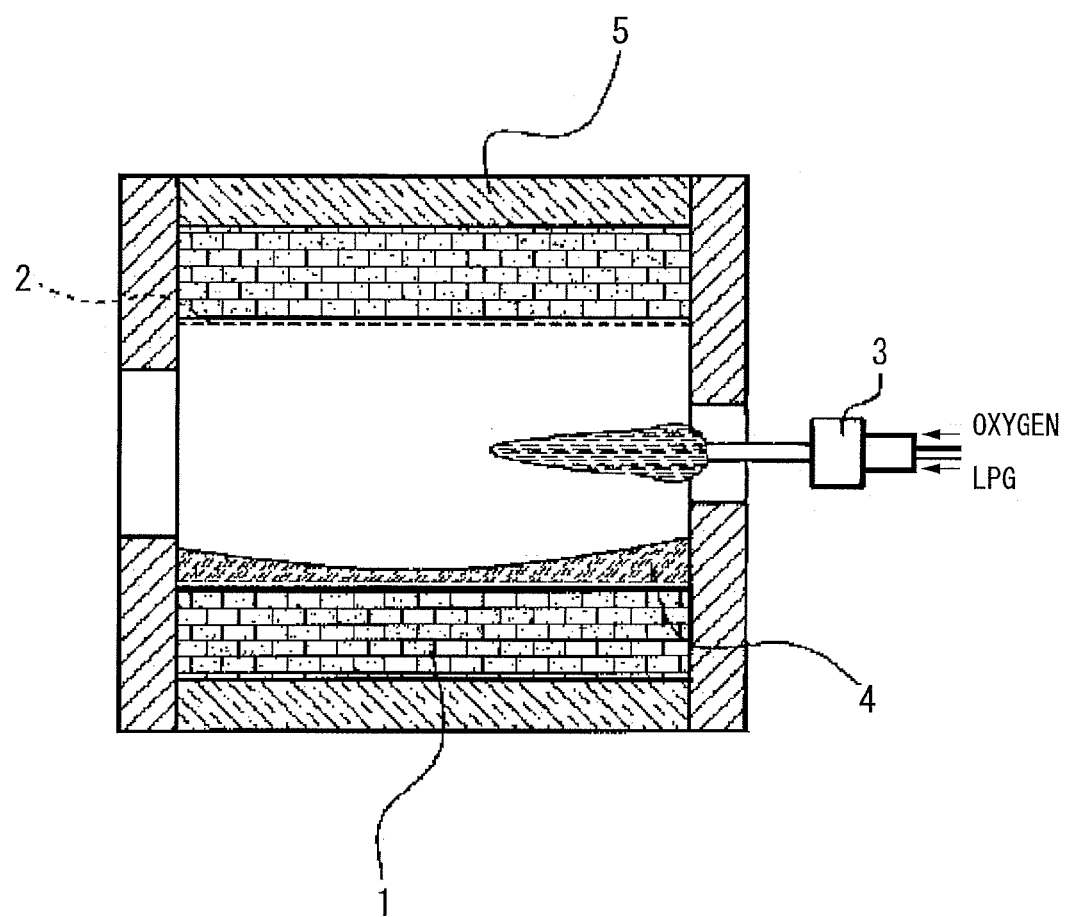
FIG. 3 is a cross-sectional view of the rotary corrosion furnace.

As shown in FIG. 3, the embedded refractory 1 was installed in the rotary furnace, and the temperature was increased by the burning of a burner 3 from the inside of the rotary furnace while rotating the refractory 1. As the burning gas, a gas with a volume ratio of 1 LPG to 5 oxygen was used. Further, the reference number 4 indicates slag, and the reference number 5 indicates a filling material.

The wear amount of each specimen was obtained from the average value obtained by measuring the remaining dimensions (which are the thicknesses of a non-oxidation layer in the case of the thicknesses of a decarburized layer) at 5 points every 20 mm and calculating the difference from the initial thickness (48 mm). The composition of the slag 4 includes 50.5 mass % of CaO, 16.8 mass % of $SiO_2$, 7 mass % of MgO, 2 mass % of $Al_2O_3$, 3.5 mass % of MnO, and 20.2 mass % of FeO, and, with the test temperature of 1600° C. and 1 charge of 25 minutes, 500 g of the slag 4 was subjected to 1 charge of the test for a replacement, and the test was performed for a total of 6 charges for 2 hours 30 minutes. The old charge of the slag 4 was replaced with a new charge of the slag 4 by tilting a horizontal type drum.

[1] Example relating to a binder for monolithic refractories including a solid solution obtained by dissolving Ca components in α-$SrAl_2O_4$ in which a crystallite diameter of the solid solution is from 40 nm to 75 nm or a solid solution obtained by dissolving Ca components in β-$SrAl_2O_4$ in which a crystallite diameter of the solid solution is from 35 nm to 70 nm Measurement of the flow value and the flexural strength after curing and rotary corrosion tests using slag were performed using monolithic refractories manufactured with binders including a solid solution for which all the components of a binder had been controlled so as to solidify Ca components in α-$SrAl_2O_4$ and firing conditions had been set so that a crystallite diameter thereof was a value in the tables in Examples 1 to 8 and Reference Examples 1 to 6; monolithic refractories manufactured with binders including a solid solution for which all the components of a binder had been controlled so as to solidify Ca components in β-SrAl$_2$O$_4$ and firing conditions had been set so that a crystallite diameter thereof was a value in the tables in Examples 9 to 16 and Reference Examples 7 to 12; monolithic refractories manufactured with binders including no Sr components in Comparative Examples 1 to 3; and monolithic refractories manufactured with binders including no Ca components in Reference Examples 13 to 16. Tables 1 to 3 show the composition of the raw materials of the binder, the crystallite diameter of the solid solution, the firing conditions, and the measurement results of flow value and flexural strength after curing and results of the rotary corrosion test of the monolithic refractory in each of the examples.

In addition, when the monolithic refractory manufactured with the binder including no Ca components was used in Reference Example 15, the test results were obtained after 0.3 mass % of boric acid powder to be blended into the monolithic refractory was added with respect to the mass of castable in outer percentage so as to obtain a predetermined flow property 2 hours after the start of mixing.

TABLE 1

|  |  | Reference Example 1 | Example 1 | Example 2 | Example 3 | Example 4 | Reference Example 2 | Reference Example 3 |
|---|---|---|---|---|---|---|---|---|
| Raw materials of solid solution obtained by dissolving Ca components in α- or β-SrAl$_2$O$_4$ (mass %) | CaCO$_3$ | 2 | 2 | 2 | 2 | 2 | 2 | 2 |
|  | SrCO$_3$ | 57 | 57 | 57 | 57 | 57 | 57 | 57 |
|  | α-Al$_2$O$_4$ | 41 | 41 | 41 | 41 | 41 | 41 | 41 |
| X value of Ca$_x$Sr$_{1-x}$Al$_2$O$_4$ |  | 0.05 | 0.05 | 0.05 | 0.05 | 0.05 | 0.05 | 0.05 |
| Crystallite diameter of solid solution obtained by dissolving Ca components in SrAl$_2$O$_4$ (nm) |  | 30 | 38 | 47 | 59 | 76 | 81 | 86 |
| Firing conditions (maximum temperature-holding time) |  | 1200° C.-2 hr | 1300° C.-2 hr | 1400° C.-2 hr | 1500° C.-2 hr | 1600° C.-1 hr | 1400° C.-48 hr | 1500° C.-48 hr |
| 15 tap-flow value (mm) | After mixing | 187 | 181 | 176 | 179 | 173 | 162 | 165 |
|  | After 2 hours | 102 | 118 | 129 | 131 | 134 | 135 | 131 |
| Bending strength after curing of 6 hours (MPa) |  | 1.8 | 1.6 | 1.5 | 1.3 | 1.1 | 0.7 | 0.6 |
| Bending strength after curing of 12 hours (MPa) |  | 1.9 | 1.8 | 1.8 | 1.7 | 1.6 | 1 | 0.9 |
| Bending strength after curing of 24 hours (MPa) |  | 2.2 | 2.2 | 2.1 | 2.1 | 2.1 | 1.5 | 1.3 |
| Wear amount in rotary corrosion test (mm) |  | 6.4 | 6.5 | 6.6 | 6.4 | 6.6 | 6.9 | 6.9 |

|  |  | Reference Example 4 | Example 5 | Example 6 | Example 7 | Example 8 |
|---|---|---|---|---|---|---|
| Raw materials of solid solution obtained by dissolving Ca components in α- or β-SrAl$_2$O$_4$ (mass %) | CaCO$_3$ | 6.2 | 6.2 | 6.2 | 6.2 | 6.2 |
|  | SrCO$_3$ | 52.2 | 52.2 | 52.2 | 52.2 | 52.2 |
|  | α-Al$_2$O$_4$ | 41.6 | 41.6 | 41.6 | 41.6 | 41.6 |
| X value of Ca$_x$Sr$_{1-x}$Al$_2$O$_4$ |  | 0.15 | 0.15 | 0.15 | 0.15 | 0.15 |
| Crystallite diameter of solid solution obtained by dissolving Ca components in SrAl$_2$O$_4$ (nm) |  | 28 | 36 | 44 | 56 | 73 |
| Firing conditions (maximum temperature-holding time) |  | 1200° C.-2 hr | 1300° C.-2 hr | 1400° C.-2 hr | 1500° C.-2 hr | 1600° C.-1 hr |
| 15 tap-flow value (mm) | After mixing | 182 | 179 | 179 | 175 | 171 |
|  | After 2 hours | 105 | 122 | 126 | 135 | 136 |
| Bending strength after curing of 6 hours (MPa) |  | 1.5 | 1.6 | 1.5 | 1.3 | 1.2 |
| Bending strength after curing of 12 hours (MPa) |  | 2 | 2 | 1.9 | 1.7 | 1.5 |
| Bending strength after curing of 24 hours (MPa) |  | 2.5 | 2.4 | 2.4 | 2.3 | 2 |
| Wear amount in rotary corrosion test (mm) |  | 6.6 | 6.4 | 6.5 | 6.4 | 6.5 |

TABLE 2

|  |  | Reference Example 5 | Reference Example 6 | Reference Example 7 | Example 9 | Example 10 | Example 11 | Example 12 |
|---|---|---|---|---|---|---|---|---|
| Raw materials of solid solution obtained by dissolving Ca components in α- or β-SrAl$_2$O$_4$ (mass %) | CaCO$_3$ | 6.2 | 6.2 | 12.7 | 12.7 | 12.7 | 12.7 | 12.7 |
|  | SrCO$_3$ | 52.2 | 52.2 | 44.2 | 44.2 | 44.2 | 44.2 | 44.2 |
|  | α-Al$_2$O$_3$ | 41.6 | 41.6 | 43.1 | 43.1 | 43.1 | 43.1 | 43.1 |

TABLE 2-continued

|  |  |  |  |  |  |  |  |  |
|---|---|---|---|---|---|---|---|---|
| X value of $Ca_xSr_{1-x}Al_2O_4$ |  |  | 0.15 | 0.15 | 0.3 | 0.3 | 0.3 | 0.3 | 0.3 |
| Crystallite diameter of solid solution obtained by dissolving Ca components in $SrAl_2O_4$ (nm) |  |  | 77 | 81 | 31 | 35 | 47 | 54 | 70 |
| Firing conditions (maximum temperature-holding time) |  |  | 1400° C.-48 hr | 1500° C.-48 hr | 1200° C.-2 hr | 1300° C.-2 hr | 1400° C.-2 hr | 1500° C.-2 hr | 1600° C.-1 hr |
| 15 tap-flow value (mm) | After mixing | 171 | 165 | 176 | 172 | 172 | 169 | 164 |
| | After 2 hours | 142 | 135 | 107 | 123 | 125 | 123 | 129 |
| Bending strength after curing of 6 hours (MPa) |  |  | 0.6 | 0.5 | 1.5 | 1.5 | 1.3 | 1.2 | 1 |
| Bending strength after curing of 12 hours (MPa) |  |  | 1 | 0.8 | 1.9 | 2 | 1.9 | 1.7 | 1.5 |
| Bending strength after curing of 24 hours (MPa) |  |  | 1.4 | 1.3 | 2.1 | 2.2 | 2.3 | 2.4 | 2.3 |
| Wear amount in rotary corrosion test (mm) |  |  | 6.6 | 6.9 | 6.6 | 6.4 | 6.5 | 6.4 | 6.5 |

|  |  |  | Reference Example 8 | Reference Example 9 | Reference Example 10 | Example 13 | Example 14 |
|---|---|---|---|---|---|---|---|
| Raw materials of solid solution obtained by dissolving Ca components in α- or β-$SrAl_2O_4$ (mass %) | $CaCO_3$ | 12.7 | 12.7 | 24.6 | 24.6 | 24.6 |
| | $SrCO_3$ | 44.2 | 44.2 | 30.1 | 30.1 | 30.1 |
| | α-$Al_2O_3$ | 43.1 | 43.1 | 45.2 | 45.2 | 45.2 |
| X value of $Ca_xSr_{1-x}Al_2O_4$ |  | 0.3 | 0.3 | 0.55 | 0.55 | 0.55 |
| Crystallite diameter of solid solution obtained by dissolving Ca components in $SrAl_2O_4$ (nm) |  | 74 | 79 | 24 | 36 | 45 |
| Firing conditions (maximum temperature-holding time) |  | 1400° C.-48 hr | 1500° C.-48 hr | 1200° C.-2 hr | 1300° C.-2 hr | 1400° C.-2 hr |
| 15 tap-flow value (mm) | After mixing | 165 | 160 | 186 | 175 | 174 |
| | After 2 hours | 134 | 131 | 109 | 124 | 127 |
| Bending strength after curing of 6 hours (MPa) |  | 0.6 | 0.5 | 1.4 | 1.3 | 1.3 |
| Bending strength after curing of 12 hours (MPa) |  | 0.9 | 0.8 | 1.8 | 1.8 | 1.7 |
| Bending strength after curing of 24 hours (MPa) |  | 1.7 | 1.7 | 2 | 2.4 | 2.4 |
| Wear amount in rotary corrosion test (mm) |  | 6.6 | 6.5 | 6.6 | 6.6 | 6.4 |

TABLE 3

|  |  | Example 15 | Example 16 | Reference Example 11 | Reference Example 12 | Reference Example 13 | Reference Example 14 |
|---|---|---|---|---|---|---|---|
| Raw materials of solid solution obtained by dissolving Ca components in α- or β-$SrAl_2O_4$ (mass %) | $CaCO_3$ | 24.6 | 24.6 | 24.6 | 24.6 | 0 | 0 |
| | $SrCO_3$ | 30.1 | 30.1 | 30.1 | 30.1 | 59.4 | 59.4 |
| | α-$Al_2O_3$ | 45.2 | 45.2 | 45.2 | 45.2 | 40.6 | 40.6 |
| X value of $Ca_xSr_{1-x}Al_2O_4$ |  | 0.55 | 0.55 | 0.55 | 0.55 | 0 | 0 |
| Crystallite diameter of solid solution obtained by dissolving Ca components in $SrAl_2O_4$ (nm) |  | 53 | 65 | 72 | 76 | 41 | 64 |
| Firing conditions (maximum temperature-holding time) |  | 1500° C.-2 hr | 1600° C.-1 hr | 1400° C.-48 hr | 1500° C.-48 hr | 1300° C.-2 hr | 1500° C.-2 hr |
| 15 tap-flow value (mm) | After mixing | 171 | 168 | 163 | 159 | 188 | 183 |
| | After 2 hours | 126 | 133 | 131 | 134 | Solidified | Solidified |
| Bending strength after curing of 6 hours (MPa) |  | 1.2 | 1.1 | 0.5 | 0.5 | — | — |
| Bending strength after curing of 12 hours (MPa) |  | 1.6 | 1.5 | 0.9 | 0.8 | — | — |
| Bending strength after curing of 24 hours (MPa) |  | 2.3 | 2.4 | 1.8 | 1.5 | — | — |
| Wear amount in rotary corrosion test (mm) |  | 6.5 | 6.5 | 6.6 | 6.8 | — | — |

|  |  | Reference Example 15 | Reference Example 16 | Comparative Example 1 | Comparative Example 2 | Comparative Example 3 |
|---|---|---|---|---|---|---|
| Raw materials of solid solution obtained by dissolving Ca components in α- or β-$SrAl_2O_4$ (mass %) | $CaCO_3$ | 0 | 0 | 49.5 | 49.5 | 49.5 |
| | $SrCO_3$ | 59.4 | 59.4 | 0 | 0 | 0 |
| | α-$Al_2O_3$ | 40.6 | 40.6 | 50.5 | 50.5 | 50.5 |
| X value of $Ca_xSr_{1-x}Al_2O_4$ |  | 0 | 0 | 1 | 1 | 1 |

TABLE 3-continued

|  |  |  |  |  |  |  |
|---|---|---|---|---|---|---|
| Crystallite diameter of solid solution obtained by dissolving Ca components in SrAl$_2$O$_4$ (nm) | | 64 | 76 | 38 | 48 | 49 |
| Firing conditions (maximum temperature-holding time) | | 1500° C.-2 hr | 1600° C.-2 hr | 1300° C.-2 hr | 1500° C.-2 hr | 1600° C.-2 hr |
| 15 tap-flow value (mm) | After mixing | 172 | 177 | 181 | 172 | 173 |
|  | After 2 hours | 121 | Solidified | 122 | 148 | 153 |
| Bending strength after curing of 6 hours (MPa) | | 1.4 | — | 0.6 | 0.6 | 0.5 |
| Bending strength after curing of 12 hours (MPa) | | 1.8 | — | 1.1 | 1.1 | 1 |
| Bending strength after curing of 24 hours (MPa) | | 2.3 | — | 1.7 | 1.6 | 1.7 |
| Wear amount in rotary corrosion test (mm) | | 6.3 | — | 8.4 | 8.2 | 8.4 |

The evaluation results are as shown in Tables 1 to 3. In Examples 1 to 16, the flow values suitable for pouring were obtained 2 hours after the start of mixing. Therefore, it has been confirmed that Examples 1 to 16 can be applied to furnaces with a large volume or the like. Furthermore, Examples 1 to 16 show larger values than Comparative Examples 1 to 3 in the flexural strength after curing of 6, 12, and 24 hours, and therefore it has been clarified that Examples 1 to 16 are excellent in terms of cured strength developing property. In particular, the flexural strength after curing of 6 hours is remarkably greater compared to those of the Comparative Examples, and therefore it has been confirmed that Examples 1 to 16 are excellent in terms of early strength developing property. Furthermore, it has been clarified that, compared to Comparative Examples, Examples 1 to 16 clearly show small wear amounts in the rotary corrosion test using slag and are excellent in terms of slag resistance at a high temperature.

In Reference Examples 1, 4, 7, and 10 in which the crystallite diameters of the solid solution obtained by dissolving Ca components in α-SrAl$_2$O$_4$ and the solid solution obtained by dissolving Ca components in β-SrAl$_2$O$_4$ are less than the range of the present invention and in Reference Examples 13, 14, and 16 in which the binder including no Ca components was used, a large amount of deterioration in the flow property after 2 hours or the hardening of the monolithic refractories occurred, and therefore it has been confirmed that it is difficult for Reference Examples 1, 4, 7, and 10 and Reference Examples 13, 14, and 16 be applied to furnaces with a large volume or the like. As described in Reference Example 15, by increasing the amount of boric acid powder as the hardening retardant added, the flow property after 2 hours can be secured. However, it is necessary that the amount of the hardening retardant added be increased to a large degree, which leads to a rise in manufacturing costs. In addition, in Reference Examples 2, 3, 5, 6, 8, 9, 11, and 12 in which the crystallite diameters are more than the range of the present invention, it has been confirmed that, compared to the case where the crystallite diameter is in the range of the present invention, the strength after curing deteriorates, it is difficult for a frame to be removed early, and the risk of explosion increases due to insufficient strength when the monolithic refractories are dried.

From these test results, it has been clarified that, by using the binder including a solid solution obtained by dissolving Ca components in α-SrAl$_2$O$_4$ in which a crystallite diameter of the solid solution is from 40 nm to 75 nm or a solid solution obtained by dissolving Ca components in β-SrAl$_2$O$_4$ in which a crystallite diameter of the solid solution is from 35 nm to 70 nm, a monolithic refractory in which a favorable operability is secured even after a long period of time has elapsed after pouring and blending water thereinto, a favorable strength developing property is obtained early, and slag resistance at a high temperature is superior compared to the conventional technique can be obtained.

[2] Examples relating to a binder for monolithic refractories including a solid solution obtained by dissolving Ca components in α-SrAl$_2$O$_4$ in which a crystallite diameter of the solid solution is from 40 nm to 75 nm or a solid solution obtained by dissolving Ca components in β-SrAl$_2$O$_4$ in which a crystallite diameter of the solid solution is from 35 nm to 70 nm, into which Al$_2$O$_3$ is blended Measurement of the flow value and the flexural strength after curing and rotary corrosion tests using slag were performed using monolithic refractories manufactured with binders including a solid solution obtained by dissolving Ca components in α-SrAl$_2$O$_4$ in which a X value of Ca$_x$Sr$_{1-x}$Al$_2$O$_4$ is 0.05, into which α-Al$_2$O$_3$ was blended with a predetermined ratio, in Examples 17 to 21; monolithic refractories manufactured with binders including a solid solution obtained by dissolving Ca components in β-SrAl$_2$O$_4$ in which a X value of Ca$_x$Sr$_{1-x}$Al$_2$O$_4$ is 0.30, into which α-Al$_2$O$_3$ was blended with a predetermined ratio, in Examples 22 to 26; and monolithic refractories manufactured with binders obtained by blending raw materials so that the composition of a binder is CaAl$_2$O$_4$ and blending the resultant and α-Al$_2$O$_3$ with a predetermined ratio in Comparative Examples 4 to 6. Tables 4 and 5 show the compositions of the solid solutions, the crystallite diameters of the solid solutions, the blending ratio of the solid solutions, CaAl$_2$O$_4$, and α-Al$_2$O$_3$, and the measurement results of flow value and flexural strength after curing and results of the rotary corrosion test of the monolithic refractory in each of the Examples. All of the solid solutions and the binders were subjected to firing for 2 hours at the maximum temperature of 1500° C. for manufacture.

TABLE 4

|  | Example 3 | Example 17 | Example 18 | Example 19 | Example 20 | Example 21 | Example 11 | Example 22 |
|---|---|---|---|---|---|---|---|---|
| X value of Ca$_x$Sr$_{1-x}$Al$_2$O$_4$ | 0.05 | 0.05 | 0.05 | 0.05 | 0.05 | 0.05 | 0.3 | 0.3 |
| Crystallite diameter of solid solution obtained by dissolving Ca components in SrAl$_2$O$_4$ (nm) | 59 | 59 | 59 | 59 | 59 | 59 | 54 | 54 |

TABLE 4-continued

|  | Example 3 | Example 17 | Example 18 | Example 19 | Example 20 | Example 21 | Example 11 | Example 22 |
|---|---|---|---|---|---|---|---|---|
| Blending ratio of solid solution obtained by dissolving Ca components in $SrAl_2O_4$ (mass %) | 100 | 62 | 60 | 40 | 10 | 8 | 100 | 62 |
| Blending ratio of $CaAl_2O_4$ (mass %) | 0 | 0 | 0 | 0 | 0 | 0 | 0 | 0 |
| Blending ratio of α-$Al_2O_3$ (mass %)*1 | 0 | 38 | 40 | 60 | 90 | 92 | 0 | 38 |
| 15 tap-flow value (mm) After mixing | 179 | 180 | 175 | 169 | 163 | 158 | 169 | 172 |
| 15 tap-flow value (mm) After 2 hours | 131 | 133 | 135 | 134 | 132 | 138 | 123 | 128 |
| Bending strength after curing of 6 hours (MPa) | 1.3 | 1.2 | 1.2 | 1.1 | 1 | 0.9 | 1.2 | 1.1 |
| Bending strength after curing of 12 hours (MPa) | 1.7 | 1.6 | 1.6 | 1.4 | 1.2 | 1.2 | 1.7 | 1.5 |
| Bending strength after curing of 24 hours (MPa) | 2.1 | 2.2 | 2.1 | 1.9 | 1.7 | 1.6 | 2.4 | 2.2 |
| Wear amount in rotary corrosion test (mm) | 6.4 | 6.1 | 6 | 5.7 | 5.3 | 5.3 | 6.4 | 6.2 |

Note)
*1 $Al_2O_3$ other than solid solution and $CaAl_2O_4$

TABLE 5

|  | Example 23 | Example 24 | Example 25 | Example 26 | Comparative Example 2 | Comparative Example 4 | Comparative Example 5 | Comparative Example 6 |
|---|---|---|---|---|---|---|---|---|
| X value of $Ca_xSr_{1-x}Al_2O_4$ | 0.3 | 0.3 | 0.3 | 0.3 | 1 | 1 | 1 | 1 |
| Crystallite diameter of solid solution obtained by dissolving Ca components in $SrAl_2O_4$ (nm) | 54 | 54 | 54 | 54 | — | — | — | — |
| Blending ratio of solid solution obtained by dissolving Ca components in $SrAl_2O_4$ (mass %) | 60 | 40 | 10 | 8 | — | — | — | — |
| Blending ratio of $CaAl_2O_4$ (mass %) | 0 | 0 | 0 | 0 | 100 | 60 | 40 | 10 |
| Blending ratio of α-$Al_2O_3$ (mass %)*1 | 40 | 60 | 90 | 92 | 0 | 40 | 60 | 90 |
| 15 tap-flow value (mm) After mixing | 172 | 168 | 163 | 161 | 172 | 170 | 167 | 159 |
| 15 tap-flow value (mm) After 2 hours | 131 | 130 | 132 | 135 | 148 | 133 | 135 | 141 |
| Bending strength after curing of 6 hours (MPa) | 1.1 | 1 | 0.8 | 0.8 | 0.6 | 0.5 | 0.5 | 0.3 |
| Bending strength after curing of 12 hours (MPa) | 1.5 | 1.4 | 1.2 | 1.2 | 1.1 | 1.1 | 0.9 | 0.6 |
| Bending strength after curing of 24 hours (MPa) | 2.2 | 1.9 | 1.6 | 1.5 | 1.6 | 1.6 | 1.5 | 1.1 |
| Wear amount in rotary corrosion test (mm) | 6.1 | 5.7 | 5.3 | 5.2 | 8.2 | 8 | 7.9 | 7.6 |

Note)
*1 $Al_2O_3$ other than solid solution and $CaAl_2O_4$

The evaluation results are as shown in Tables 4 and 5. In Examples 17 to 26, the flow values of the monolithic refractories suitable for pouring were obtained 2 hours after the start of mixing. Therefore, it has been confirmed that Examples 17 to 26 can be applied to furnaces with a large volume or the like. Furthermore, Examples 17 to 26 show larger values than Comparative Examples 1 to 6 in the flexural strength after curing of 6, 12, and 24 hours, and therefore it has been clarified that Examples 17 to 26 are excellent in terms of cured strength developing property. In particular, the flexural strength after curing of 6 hours is remarkably greater compared to those of the Comparative Examples, and therefore it has been confirmed that Examples 17 to 26 are excellent in terms of early strength developing property. Furthermore, it has been clarified that, compared to Comparative Examples, Examples 17 to 26 clearly show small wear amounts in the rotary corrosion test using slag and are excellent in terms of slag resistance at a high temperature.

In addition, in Examples 17 to 26, it is possible to further decrease the wear amount in the rotary corrosion test using slag, compared to Examples 3 and 11 including no $Al_2O_3$, since Examples 17 to 26 include $Al_2O_3$, which clarifies that Examples 17 to 26 are superior in terms of slag resistance at a high temperature.

From these test results, it has been clarified that, by using the binder for monolithic refractories including a solid solution obtained by dissolving Ca components in α-$SrAl_2O_4$ in which a crystallite diameter of the solid solution is from 40 nm to 75 nm or a solid solution obtained by dissolving Ca components in β-$SrAl_2O_4$ in which a crystallite diameter of the solid solution is from 35 nm to 70 nm, into which $Al_2O_3$ is blended, a monolithic refractory in which a favorable operability is secured even after a long period of time has elapsed after pouring and blending water thereinto, a favorable strength developing property is obtained early, and slag resistance at a high temperature is superior compared to the conventional technique can be obtained.

[3] Examples relating to a binder for monolithic refractories including a mixture of a solid solution obtained by dissolving Ca components in α-$SrAl_2O_4$ or a solid solution obtained by dissolving Ca components in β-$SrAl_2O_4$; and a solid solution obtained by dissolving Sr components in $CaAl_2O_4$ in which a crystallite diameter of the solid solution is from 25 nm to 60 nm.

Measurement of the flow value and the flexural strength after curing and rotary corrosion tests using slag were performed using monolithic refractories manufactured with binders including a mixture of a solid solution for which all the components of a binder had been controlled so as to solidify Ca components in α-$SrAl_2O_4$ and a solid solution for which all the components of a binder had been controlled so as to solidify Sr components in $CaAl_2O_4$, in which firing conditions had been set so that a crystallite diameter thereof was a value in the tables in Examples 27 to 37 and Reference Examples 17 to 19; and monolithic refractories manufactured with binders including a mixture of a solid solution for which all the components of a binder had been controlled so as to solidify Ca components in β-$SrAl_2O_4$ and a solid solution for which all the components of a binder had been controlled so as to solidify Sr components in $CaAl_2O_4$, in which firing conditions had been set so that a crystallite diameter thereof was a value in the tables in Examples 38 to 48 and Reference Examples 20 to 22. The solid solution obtained by dissolving Ca components in α-SrAl$_2$O$_4$ and the solid solution obtained by dissolving Ca components in β-SrAl$_2$O$_4$ were subjected to firing for 2 hours at the maximum temperature of 1500° C. for manufacture. Tables 6 to 8 show the composition of the raw materials, the firing conditions, the crystallite diameters of the solid solutions, and the measurement results of flow value and flexural strength after curing and results of the rotary corrosion test of the monolithic refractory in each of the Examples.

TABLE 6

|  |  | Reference Example 17 | Example 27 | Example 28 | Example 29 | Example 30 |
|---|---|---|---|---|---|---|
| Raw materials of solid solution obtained by dissolving Ca components in α- or β-SrAl$_2$O$_4$ (mass %) | CaCO$_3$ | 2 | 2 | 2 | 2 | 2 |
|  | SrCO$_3$ | 57 | 57 | 57 | 57 | 57 |
|  | α-Al$_2$O$_3$ | 41 | 41 | 41 | 41 | 41 |
| X value of Ca$_x$Sr$_{1-x}$Al$_2$O$_4$ |  | 0.05 | 0.05 | 0.05 | 0.05 | 0.05 |
| Crystallite diameter of solid solution obtained by dissolving Ca components in SrAl$_2$O$_4$ (nm) |  | 59 | 59 | 59 | 59 | 59 |
| Blending ratio of solid solution obtained by dissolving Ca components in SrAl$_2$O$_4$ (mass %) |  | 50 | 50 | 50 | 50 | 50 |
| Raw materials of solid solution obtained by dissolving Sr components in CaAl$_2$O$_4$ (mass %) | CaCO$_3$ | 32.3 | 32.3 | 32.3 | 32.3 | 32.3 |
|  | SrCO$_3$ | 20.6 | 20.6 | 20.6 | 20.6 | 20.6 |
|  | α-Al$_2$O$_3$ | 47 | 47 | 47 | 47 | 47 |
| X value of Ca$_x$Sr$_{1-x}$Al$_2$O$_4$ |  | 0.7 | 0.7 | 0.7 | 0.7 | 0.7 |
| Crystallite diameter of solid solution obtained by dissolving Sr components in CaAl$_2$O$_4$ (nm) |  | 24 | 29 | 42 | 51 | 59 |
| Firing conditions (maximum temperature-holding time) |  | 1200° C.-2 hr | 1300° C.-2 hr | 1400° C.-2 hr | 1500° C.-2 hr | 1600° C.-1 hr |
| Blending ratio of solid solution obtained by dissolving Sr components in CaAl$_2$O$_4$ (mass %) |  | 50 | 50 | 50 | 50 | 50 |
| 15 tap-flow value (mm) | After mixing | 184 | 182 | 183 | 176 | 174 |
|  | After 2 hours | 102 | 119 | 124 | 136 | 132 |
| Bending strength after curing of 6 hours (MPa) |  | 1.6 | 1.5 | 1.3 | 1.3 | 1.2 |
| Bending strength after curing of 12 hours (MPa) |  | 1.9 | 1.8 | 1.7 | 1.6 | 1.6 |
| Bending strength after curing of 24 hours (MPa) |  | 2.1 | 2.2 | 2.3 | 2.3 | 2.3 |
| Wear amount in rotary corrosion test (mm) |  | 6.5 | 6.6 | 6.8 | 6.6 | 6.7 |

|  |  | Example 31 | Reference Example 18 | Reference Example 19 | Example 32 | Example 33 |
|---|---|---|---|---|---|---|
| Raw materials of solid solution obtained by dissolving Ca components in α- or β-SrAl$_2$O$_4$ (mass %) | CaCO$_3$ | 2 | 2 | 2 | 2 | 2 |
|  | SrCO$_3$ | 57 | 57 | 57 | 57 | 57 |
|  | α-Al$_2$O$_3$ | 41 | 41 | 41 | 41 | 41 |
| X value of Ca$_x$Sr$_{1-x}$Al$_2$O$_4$ |  | 0.05 | 0.05 | 0.05 | 0.05 | 0.05 |
| Crystallite diameter of solid solution obtained by dissolving Ca components in SrAl$_2$O$_4$ (nm) |  | 59 | 59 | 59 | 59 | 59 |
| Blending ratio of solid solution obtained by dissolving Ca components in SrAl$_2$O$_4$ (mass %) |  | 50 | 50 | 50 | 50 | 50 |
| Raw materials of solid solution obtained by dissolving Sr components in CaAl$_2$O$_4$ (mass %) | CaCO$_3$ | 32.3 | 32.3 | 46.5 | 46.5 | 46.5 |
|  | SrCO$_3$ | 20.6 | 20.6 | 3.7 | 3.7 | 3.7 |
|  | α-Al$_2$O$_3$ | 47 | 47 | 49.9 | 49.9 | 49.9 |
| X value of Ca$_x$Sr$_{1-x}$Al$_2$O$_4$ |  | 0.7 | 0.7 | 0.95 | 0.95 | 0.95 |
| Crystallite diameter of solid solution obtained by dissolving Sr components in CaAl$_2$O$_4$ (nm) |  | 63 | 68 | 21 | 25 | 39 |
| Firing conditions (maximum temperature-holding time) |  | 1400° C.-48 hr | 1500° C.-48 hr | 1200° C.-2 hr | 1300° C.-2 hr | 1400° C.-2 hr |
| Blending ratio of solid solution obtained by dissolving Sr components in CaAl$_2$O$_4$ (mass %) |  | 50 | 50 | 50 | 50 | 50 |
| 15 tap-flow value (mm) | After mixing | 171 | 172 | 181 | 180 | 179 |
|  | After 2 hours | 124 | 131 | 104 | 121 | 134 |
| Bending strength after curing of 6 hours (MPa) |  | 1 | 0.6 | 1.6 | 1.6 | 1.4 |
| Bending strength after curing of 12 hours (MPa) |  | 1.5 | 1.1 | 2 | 1.9 | 1.9 |
| Bending strength after curing of 24 hours (MPa) |  | 2.4 | 2.1 | 2.2 | 2.3 | 2.1 |
| Wear amount in rotary corrosion test (mm) |  | 6.6 | 6.7 | 6.7 | 6.6 | 6.5 |

TABLE 7

|  |  | Example 34 | Example 35 | Example 36 | Example 37 | Reference Example 20 | Example 38 | Example 39 | Example 40 | Example 41 |
|---|---|---|---|---|---|---|---|---|---|---|
| Raw materials of solid solution obtained by dissolving Ca components in α- or β-SrAl$_2$O$_4$ (mass %) | CaCO$_3$ | 2 | 2 | 2 | 2 | 2 | 12.7 | 12.7 | 12.7 | 12.7 |
|  | SrCO$_3$ | 57 | 57 | 57 | 57 | 57 | 44.2 | 44.2 | 44.2 | 44.2 |
|  | α-Al$_2$O$_3$ | 41 | 41 | 41 | 41 | 41 | 43.1 | 43.1 | 43.1 | 43.1 |
| X value of Ca$_x$Sr$_{1-x}$Al$_2$O$_4$ |  | 0.05 | 0.05 | 0.05 | 0.05 | 0.3 | 0.3 | 0.3 | 0.3 | 0.3 |

TABLE 7-continued

|  |  | Example 34 | Example 35 | Example 36 | Example 37 | Reference Example 20 | Example 38 | Example 39 | Example 40 | Example 41 |
|---|---|---|---|---|---|---|---|---|---|---|
| Crystallite diameter of solid solution obtained by dissolving Ca components in $SrAl_2O_4$ (nm) | | 59 | 59 | 59 | 59 | 54 | 54 | 54 | 54 | 54 |
| Blending ratio of solid solution obtained by dissolving Ca components in $SrAl_2O_4$ (mass %) | | 50 | 50 | 50 | 50 | 50 | 50 | 50 | 50 | 50 |
| Raw materials of solid solution obtained by dissolving Sr components in $CaAl_2O_4$ (mass %) | $CaCO_3$ | 46.5 | 46.5 | 46.5 | 46.5 | 32.3 | 32.3 | 32.3 | 32.3 | 32.3 |
|  | $SrCO_3$ | 3.7 | 3.7 | 3.7 | 3.7 | 20.6 | 20.6 | 20.6 | 20.6 | 20.6 |
|  | $\alpha\text{-}Al_2O_3$ | 49.9 | 49.9 | 49.9 | 49.9 | 47 | 47 | 47 | 47 | 47 |
| X value of $Ca_xSr_{1-x}Al_2O_4$ | | 0.95 | 0.95 | 0.95 | 0.95 | 0.7 | 0.7 | 0.7 | 0.7 | 0.7 |
| Crystallite diameter of solid solution obtained by dissolving Sr components in $CaAl_2O_4$ (nm) | | 50 | 55 | 59 | 65 | 24 | 29 | 42 | 51 | 59 |
| Firing conditions (maximum temperature-holding time) | | 1500° C.-2 hr | 1600° C.-1 hr | 1400° C.-48 hr | 1500° C.-48 hr | 1200° C.-2 hr | 1300° C.-2 hr | 1400° C.-2 hr | 1500° C.-2 hr | 1600° C.-1 hr |
| Blending ratio of solid solution obtained by dissolving Sr components in $CaAl_2O_4$ (mass %) | | 50 | 50 | 50 | 50 | 50 | 50 | 50 | 50 | 50 |
| 15 tap-flow value (mm) | After mixing | 181 | 176 | 172 | 167 | 178 | 180 | 176 | 172 | 167 |
|  | After 2 hours | 135 | 137 | 134 | 134 | 103 | 117 | 122 | 132 | 132 |
| Bending strength after curing of 6 hours (MPa) | | 1.3 | 1.2 | 1.1 | 1.1 | 1.5 | 1.4 | 1.3 | 1.2 | 1.1 |
| Bending strength after curing of 12 hours (MPa) | | 1.6 | 1.6 | 1.5 | 1.4 | 1.8 | 1.7 | 1.7 | 1.6 | 1.6 |
| Bending strength after curing of 24 hours (MPa) | | 2.4 | 2.5 | 2.5 | 2.4 | 2.4 | 2.3 | 2.4 | 2.3 | 2.4 |
| Wear amount in rotary corrosion test (mm) | | 6.7 | 6.7 | 6.8 | 6.9 | 6.6 | 6.6 | 6.7 | 6.6 | 6.7 |

TABLE 8

|  |  | Example 42 | Reference Example 21 | Reference Example 22 | Example 43 | Example 44 | Example 45 | Example 46 | Example 47 | Example 48 |
|---|---|---|---|---|---|---|---|---|---|---|
| Raw materials of solid solution obtained by dissolving Ca components in α- or β-$SrAl_2O_4$ (mass %) | $CaCO_3$ | 12.7 | 12.7 | 12.7 | 12.7 | 12.7 | 12.7 | 12.7 | 12.7 | 12.7 |
|  | $SrCO_3$ | 44.2 | 44.2 | 44.2 | 44.2 | 44.2 | 44.2 | 44.2 | 44.2 | 44.2 |
|  | $\alpha\text{-}Al_2O_3$ | 43.1 | 43.1 | 43.1 | 43.1 | 43.1 | 43.1 | 43.1 | 43.1 | 43.1 |
| X value of $Ca_xSr_{1-x}Al_2O_4$ | | 0.3 | 0.3 | 0.3 | 0.3 | 0.3 | 0.3 | 0.3 | 0.3 | 0.3 |
| Crystallite diameter of solid solution obtained by dissolving Ca components in $SrAl_2O_4$ (nm) | | 54 | 54 | 54 | 54 | 54 | 54 | 54 | 54 | 54 |
| Blending ratio of solid solution obtained by dissolving Ca components in $SrAl_2O_4$ (mass %) | | 50 | 50 | 50 | 50 | 50 | 50 | 50 | 50 | 50 |
| Raw materials of solid solution obtained by dissolving Sr components in $CaAl_2O_4$ (mass %) | $CaCO_3$ | 32.3 | 32.3 | 46.5 | 46.5 | 46.5 | 46.5 | 46.5 | 46.5 | 46.5 |
|  | $SrCO_3$ | 20.6 | 20.6 | 3.7 | 3.7 | 3.7 | 3.7 | 3.7 | 3.7 | 3.7 |
|  | $\alpha\text{-}Al_2O_3$ | 47 | 47 | 49.9 | 49.9 | 49.9 | 49.9 | 49.9 | 49.9 | 49.9 |
| X value of $Ca_xSr_{1-x}Al_2O_4$ | | 0.7 | 0.7 | 0.95 | 0.95 | 0.95 | 0.95 | 0.95 | 0.95 | 0.95 |
| Crystallite diameter of solid solution obtained by dissolving Sr components in $CaAl_2O_4$ (nm) | | 63 | 68 | 21 | 25 | 39 | 50 | 55 | 59 | 65 |
| Firing conditions (maximum temperature-holding time) | | 1400° C.-48 hr | 1500° C.-48 hr | 1200° C.-2 hr | 1300° C.-2 hr | 1400° C.-2 hr | 1500° C.-2 hr | 1600° C.-1 hr | 1400° C.-48 hr | 1500° C.-48 hr |
| Blending ratio of solid solution obtained by dissolving Sr components in $CaAl_2O_4$ (mass %) | | 50 | 50 | 50 | 50 | 50 | 50 | 50 | 50 | 50 |
| 15 tap-flow value (mm) | After mixing | 162 | 163 | 185 | 176 | 172 | 172 | 173 | 169 | 167 |
|  | After 2 hours | 135 | 131 | 103 | 118 | 124 | 128 | 131 | 134 | 134 |
| Bending strength after curing of 6 hours (MPa) | | 0.8 | 0.6 | 1.6 | 1.4 | 1.3 | 1.1 | 1.1 | 1 | 1 |
| Bending strength after curing of 12 hours (MPa) | | 1.4 | 1 | 1.9 | 1.8 | 1.8 | 1.6 | 1.4 | 1.5 | 1.4 |
| Bending strength after curing of 24 hours (MPa) | | 2 | 1.8 | 2.1 | 2.4 | 2.4 | 2.5 | 2.5 | 2.5 | 2.4 |
| Wear amount in rotary corrosion test (mm) | | 6.7 | 6.9 | 6.8 | 6.7 | 6.6 | 6.7 | 6.6 | 6.9 | 6.9 |

The evaluation results are as shown in Tables 6 to 8. In Examples 27 to 48, the flow values of the monolithic refractories suitable for pouring were obtained 2 hours after the start of mixing. Therefore, it has been confirmed that Examples 27 to 48 can be applied to furnaces with a large volume or the like. Furthermore, Examples 27 to 48 show larger values than Comparative Examples 1 to 3 in the flexural strength after curing of 6, 12, and 24 hours, and therefore it has been clarified that Examples 27 to 48 are excellent in terms of cured strength developing property. In particular, the flexural strength after curing of 6 hours is remarkably greater compared to those of Comparative Examples 1 to 3, and therefore it has been confirmed that Examples 27 to 48 are excellent in terms of early strength developing property. Furthermore, it has been clarified that, compared to Comparative Examples 1 to 3, Examples 27 to 48 clearly show small wear amounts in the rotary corrosion test using slag and are excellent in terms of slag resistance at a high temperature.

In Reference Examples 17, 19, 20, and 22 in which the crystallite diameter of the solid solution obtained by dissolving Sr components in $CaAl_2O_4$ is less than the range of the present invention, a large amount of deterioration in the flow property after 2 hours occurred, and therefore it has been confirmed that it is difficult for Reference Examples 17, 19, 20, and 22 to be applied to furnaces with a large volume or the like. In addition, in Reference Examples 18 and 21 in which the crystallite diameters are more than the range of the present invention, it has been confirmed that, compared to the case where the crystallite diameter is in the range of the present invention, the flexural strength after curing deteriorates, it is difficult for a frame to be removed early, and the risk of explosion increases due to insufficient strength when the monolithic refractories are dried.

From these test results, it has been clarified that, by using the binder including a mixture of a solid solution obtained by dissolving Ca components in $\alpha\text{-}SrAl_2O_4$ in which a crystallite diameter of the solid solution is from 40 nm to 75 nm or a solid solution obtained by dissolving Ca components in $\beta\text{-}SrAl_2O_4$ in which a crystallite diameter of the solid solution is from 35 nm to 70 nm; and a solid solution obtained by dissolving Sr components in $CaAl_2O_4$ in which a crystallite diameter of the solid solution is from 25 nm to 60 nm, a monolithic refractory in which a favorable operability is secured even after a long period of time has elapsed after pouring and blending water thereinto, a favorable strength developing property is obtained early, and slag resistance at a high temperature is superior compared to the conventional technique can be obtained.

[4] Examples relating to a binder for monolithic refractories including a mixture of a solid solution obtained by dissolving Ca components in $\alpha\text{-}SrAl_2O_4$ or $\beta\text{-}SrAl_2O_4$ and a solid solution obtained by dissolving Sr components in $CaAl_2O_4$, into which $Al_2O_3$ is blended Measurement of the flow value and the flexural strength after curing and rotary corrosion tests using slag were performed using monolithic refractories manufactured with binders including a mixture of a solid solution obtained by dissolving Ca components in $\alpha\text{-}SrAl_2O_4$ in which a X value of $Ca_xSr_{1-x}Al_2O_4$ is 0.05 and a solid solution obtained by dissolving Sr components in $CaAl_2O_4$ in which a X value of $Ca_xSr_{1-x}Al_2O_4$ is 0.95, into which $\alpha\text{-}Al_2O_3$ was blended with a predetermined ratio, in Examples 49 to 53; and monolithic refractories manufactured with binders obtained including a mixture of a solid solution obtained by dissolving Ca components in 13-$SrAl_2O_4$ in which a X value of $Ca_xSr_{1-x}Al_2O_4$ is 0.30 and a solid solution obtained by dissolving Sr components in $CaAl_2O_4$ in which a X value of $Ca_xSr_{1-x}Al_2O_4$ is 0.95, into which $\alpha\text{-}Al_2O_3$ was blended with a predetermined ratio, in Examples 54 to 58. Table 9 shows the compositions of the solid solutions, the crystallite diameters, the blending ratio of the solid solutions and $\alpha\text{-}Al_2O_3$, and the measurement results of flow value and flexural strength after curing and results of the rotary corrosion test of the monolithic refractory in each of the Examples. All of the solid solutions were subjected to firing for 2 hours at the maximum temperature of 1500° C. for manufacture.

TABLE 9

|  | Example 34 | Example 49 | Example 50 | Example 51 | Example 52 | Example 53 |
|---|---|---|---|---|---|---|
| X value of $Ca_xSr_{1-x}Al_2O_4$ | 0.05 | 0.05 | 0.05 | 0.05 | 0.05 | 0.05 |
| Crystallite diameter of solid solution obtained by dissolving Ca components in $SrAl_2O_4$ (nm) | 59 | 59 | 59 | 59 | 59 | 59 |
| Blending ratio of solid solution obtained by dissolving Ca components in $SrAl_2O_4$ (mass %) | 50 | 31 | 30 | 20 | 5 | 4 |
| X value of $Ca_xSr_{1-x}Al_2O_4$ | 0.95 | 0.95 | 0.95 | 0.95 | 0.95 | 0.95 |
| Crystallite diameter of solid solution obtained by dissolving Sr components in $CaAl_2O_4$ (nm) | 50 | 50 | 50 | 50 | 50 | 50 |
| Blending ratio of solid solution obtained by dissolving Sr components in $CaAl_2O_4$ (mass %) | 50 | 31 | 30 | 20 | 5 | 4 |
| Blending ratio of $\alpha\text{-}Al_2O_3$ (mass %)*1 | 0 | 38 | 40 | 60 | 90 | 92 |
| 15 tap-flow value (mm) After mixing | 181 | 174 | 173 | 170 | 166 | 165 |
| After 2 hours | 135 | 133 | 131 | 138 | 134 | 131 |
| Bending strength after curing of 6 hours (MPa) | 1.3 | 1.1 | 1.1 | 1.1 | 1 | 0.8 |
| Bending strength after curing of 12 hours (MPa) | 1.6 | 1.5 | 1.5 | 1.4 | 1.2 | 1.2 |
| Bending strength after curing of 24 hours (MPa) | 2.4 | 2.1 | 2.1 | 2 | 1.9 | 1.8 |
| Wear amount in rotary corrosion test (mm) | 6.7 | 6.2 | 6.2 | 5.8 | 5.4 | 5.3 |

|  | Example 45 | Example 54 | Example 55 | Example 56 | Example 57 | Example 58 |
|---|---|---|---|---|---|---|
| X value of $Ca_xSr_{1-x}Al_2O_4$ | 0.3 | 0.3 | 0.3 | 0.3 | 0.3 | 0.3 |
| Crystallite diameter of solid solution obtained by dissolving Ca components in $SrAl_2O_4$ (nm) | 54 | 54 | 54 | 54 | 54 | 54 |
| Blending ratio of solid solution obtained by dissolving Ca components in $SrAl_2O_4$ (mass %) | 50 | 31 | 30 | 20 | 5 | 4 |
| X value of $Ca_xSr_{1-x}Al_2O_4$ | 0.95 | 0.95 | 0.95 | 0.95 | 0.95 | 0.95 |
| Crystallite diameter of solid solution obtained by dissolving Sr components in $CaAl_2O_4$ (nm) | 50 | 50 | 50 | 50 | 50 | 50 |

TABLE 9-continued

| | | | | | | |
|---|---|---|---|---|---|---|
| Blending ratio of solid solution obtained by dissolving Sr components in $CaAl_2O_4$ (mass %) | | 50 | 31 | 30 | 20 | 5 | 4 |
| Blending ratio of $\alpha$-$Al_2O_3$ (mass %)[*1] | | 0 | 38 | 40 | 60 | 90 | 92 |
| 15 tap-flow value (mm) | After mixing | 172 | 170 | 168 | 166 | 166 | 165 |
| | After 2 hours | 128 | 130 | 132 | 135 | 134 | 131 |
| Bending strength after curing of 6 hours (MPa) | | 1.1 | 1 | 1 | 0.9 | 0.8 | 0.8 |
| Bending strength after curing of 12 hours (MPa) | | 1.6 | 1.4 | 1.4 | 1.4 | 1.3 | 1.2 |
| Bending strength after curing of 24 hours (MPa) | | 2.5 | 2.3 | 2.2 | 2 | 1.9 | 1.9 |
| Wear amount in rotary corrosion test (mm) | | 6.7 | 6.3 | 6.3 | 5.7 | 5.5 | 5.4 |

Note)
[*1] $Al_2O_3$ other than solid solution and $CaAl_2O_4$

The evaluation results are as shown in Table 9. In Examples 49 to 58, the flow values of the monolithic refractories suitable for pouring were obtained 2 hours after the start of mixing. Therefore, it has been confirmed that Examples 49 to 58 can be applied to furnaces with a large volume or the like. Furthermore, Examples 49 to 58 show larger values than Comparative Examples 1 to 6 in the flexural strength after curing of 6, 12, and 24 hours, and therefore it has been clarified that Examples 49 to 58 are excellent in terms of cured strength developing property. In particular, the flexural strength after curing of 6 hours is remarkably greater compared to those of the Comparative Examples, and therefore it has been confirmed that Examples 49 to 58 are excellent in terms of early strength developing property. Furthermore, it has been clarified that, compared to Comparative Examples, Examples 49 to 58 clearly show small wear amounts in the rotary corrosion test using slag and are excellent in terms of slag resistance at a high temperature.

In addition, in Examples 49 to 58, it is possible to further decrease the wear amount in the rotary corrosion test using slag, compared to Examples 34 and 45 including no $Al_2O_3$, since Examples 49 to 58 include $Al_2O_3$, which clarifies that Examples 49 to 58 are superior in terms of slag resistance at a high temperature.

From these test results, it has been clarified that, by using the binder for monolithic refractories including a mixture of a solid solution obtained by dissolving Ca components in $\alpha$-$SrAl_2O_4$ in which a crystallite diameter of the solid solution is from 40 nm to 75 nm or a solid solution obtained by dissolving Ca components in $\beta$-$SrAl_2O_4$ in which a crystallite diameter of the solid solution is from 35 nm to 70 nm; and a solid solution obtained by dissolving Sr components in $CaAl_2O_4$ in which a crystallite diameter of the solid solution is from 25 nm to 60 nm, into which $Al_2O_3$ is blended, a monolithic refractory in which a favorable operability is secured even after a long period of time has elapsed after pouring and blending water thereinto, a favorable strength developing property is obtained early, and slag resistance at a high temperature is superior compared to the conventional technique can be obtained.

[5] Examples relating to a binder for monolithic refractories including a mixture of both of a solid solution obtained by dissolving Ca components in $\alpha$-$SrAl_2O_4$ in which a crystallite diameter of the solid solution is from 40 nm to 75 nm and a solid solution obtained by dissolving Ca components in $\beta$-$SrAl_2O_4$ in which a crystallite diameter of the solid solution is from 35 nm to 70 nm Measurement of the flow value and the flexural strength after curing and rotary corrosion tests using slag were performed using monolithic refractories manufactured with binders including a mixture of both of a solid solution obtained by dissolving Ca components in $\alpha$-$SrAl_2O_4$ in which a X value of $Ca_xSr_{1-x}Al_2O_4$ is 0.05 or 0.15 and a crystallite diameter of the solid solution is from 40 nm to 75 nm and a solid solution obtained by dissolving Ca components in $\beta$-$SrAl_2O_4$ in which a X value of $Ca_xSr_{1-x}Al_2O_4$ is 0.30 or 0.55 and a crystallite diameter of the solid solution is from 35 nm to 70 nm in Examples 59 to 94. Tables 10 to 13 show the compositions of the solid solutions, the crystallite diameters of the solid solutions, the firing conditions, the blending ratio of the solid solutions, and the measurement results of flow value and flexural strength after curing and results of the rotary corrosion test of the monolithic refractory in each of the Examples. In each solid solution, firing conditions had been set so that a crystallite diameter thereof was a value in the tables.

TABLE 10

| | Example 59 | Example 60 | Example 61 | Example 62 | Example 63 |
|---|---|---|---|---|---|
| X value of $Ca_xSr_{1-x}Al_2O_4$ | 0.05 | 0.05 | 0.05 | 0.05 | 0.05 |
| Crystallite diameter of solid solution obtained by dissolving Ca components in $\alpha$-$SrAl_2O_4$ (nm) | 38 | 38 | 38 | 38 | 38 |
| Firing conditions (maximum temperature-holding time) | 1300° C.-2 hr | 1300° C.-2 hr | 1300° C.-2 hr | 1300° C.-2 hr | 1300° C.-2 hr |
| Blending ratio of solid solution obtained by dissolving Ca components in $\alpha$-$SrAl_2O_4$ (mass %) | 50 | 50 | 50 | 50 | 50 |
| X value of $Ca_xSr_{1-x}Al_2O_4$ | 0.3 | 0.3 | 0.3 | 0.55 | 0.55 |
| Crystallite diameter of solid solution obtained by dissolving Ca components in $\beta$-$SrAl_2O_4$ (nm) | 35 | 54 | 70 | 36 | 53 |
| Firing conditions (maximum temperature-holding time) | 1300° C.-2 hr | 1500° C.-2 hr | 1600° C.-1 hr | 1300° C.-2 hr | 1500° C.-2 hr |
| Blending ratio of solid solution obtained by dissolving Ca components in $\beta$-$SrAl_2O_4$ (mass %) | 50 | 50 | 50 | 50 | 50 |
| 15 tap-flow value After mixing | 184 | 181 | 182 | 179 | 178 |
| (mm) After 2 hours | 119 | 122 | 121 | 125 | 125 |
| Bending strength after curing of 6 hours (MPa) | 1.5 | 1.5 | 1.4 | 1.4 | 1.4 |
| Bending strength after curing of 12 hours (MPa) | 2 | 1.9 | 1.9 | 1.9 | 1.8 |
| Bending strength after curing of 24 hours (MPa) | 2.4 | 2.3 | 2.4 | 2.3 | 2.3 |
| Wear amount in rotary corrosion test (mm) | 6.4 | 6.4 | 6.5 | 6.5 | 6.4 |

TABLE 10-continued

|  | Example 64 | Example 65 | Example 66 | Example 67 |
| --- | --- | --- | --- | --- |
| X value of $Ca_xSr_{1-x}Al_2O_4$ | 0.05 | 0.05 | 0.05 | 0.05 |
| Crystallite diameter of solid solution obtained by dissolving Ca components in $\alpha$-$SrAl_2O_4$ (nm) | 38 | 59 | 59 | 59 |
| Firing conditions (maximum temperature-holding time) | 1300° C.-2 hr | 1500° C.-2 hr | 1500° C.-2 hr | 1500° C.-2 hr |
| Blending ratio of solid solution obtained by dissolving Ca components in $\alpha$-$SrAl_2O_4$ (mass %) | 50 | 50 | 50 | 50 |
| X value of $Ca_xSr_{1-x}Al_2O_4$ | 0.55 | 0.3 | 0.3 | 0.3 |
| Crystallite diameter of solid solution obtained by dissolving Ca components in $\beta$-$SrAl_2O_4$ (nm) | 65 | 35 | 54 | 70 |
| Firing conditions (maximum temperature-holding time) | 1600° C.-1 hr | 1300° C.-2 hr | 1500° C.-2 hr | 1600° C.-1 hr |
| Blending ratio of solid solution obtained by dissolving Ca components in $\beta$-$SrAl_2O_4$ (mass %) | 50 | 50 | 50 | 50 |
| 15 tap-flow value (mm) After mixing | 176 | 173 | 171 | 170 |
| After 2 hours | 124 | 124 | 127 | 124 |
| Bending strength after curing of 6 hours (MPa) | 1.3 | 1.4 | 1.3 | 1.1 |
| Bending strength after curing of 12 hours (MPa) | 1.7 | 1.8 | 1.7 | 1.6 |
| Bending strength after curing of 24 hours (MPa) | 2.3 | 2.4 | 2.3 | 2.4 |
| Wear amount in rotary corrosion test (mm) | 6.5 | 6.4 | 6.6 | 6.6 |

TABLE 11

|  | Example 68 | Example 69 | Example 70 | Example 71 | Example 72 |
| --- | --- | --- | --- | --- | --- |
| X value of $Ca_xSr_{1-x}Al_2O_4$ | 0.05 | 0.05 | 0.05 | 0.05 | 0.05 |
| Crystallite diameter of solid solution obtained by dissolving Ca components in $\alpha$-$SrAl_2O_4$ (nm) | 59 | 59 | 59 | 76 | 76 |
| Firing conditions (maximum temperature-holding time) | 1500° C.-2 hr | 1500° C.-2 hr | 1500° C.-2 hr | 1600° C.-1 hr | 1600° C.-1 hr |
| Blending ratio of solid solution obtained by dissolving Ca components in $\alpha$-$SrAl_2O_4$ (mass %) | 50 | 50 | 50 | 50 | 50 |
| X value of $Ca_xSr_{1-x}Al_2O_4$ | 0.55 | 0.55 | 0.55 | 0.3 | 0.3 |
| Crystallite diameter of solid solution obtained by dissolving Ca components in $\beta$-$SrAl_2O_4$ (nm) | 36 | 53 | 65 | 35 | 54 |
| Firing conditions (maximum temperature-holding time) | 1300° C.-2 hr | 1500° C.-2 hr | 1600° C.-1 hr | 1300° C.-2 hr | 1500° C.-2 hr |
| Blending ratio of solid solution obtained by dissolving Ca components in $\beta$-$SrAl_2O_4$ (mass %) | 50 | 50 | 50 | 50 | 50 |
| 15 tap-flow value (mm) After mixing | 172 | 171 | 168 | 166 | 165 |
| After 2 hours | 129 | 128 | 131 | 125 | 134 |
| Bending strength after curing of 6 hours (MPa) | 1.2 | 1.2 | 1.1 | 1.3 | 1.1 |
| Bending strength after curing of 12 hours (MPa) | 1.7 | 1.7 | 1.6 | 1.8 | 1.6 |
| Bending strength after curing of 24 hours (MPa) | 2.2 | 2.3 | 2.4 | 2.1 | 2.3 |
| Wear amount in rotary corrosion test (mm) | 6.5 | 6.6 | 6.4 | 6.6 | 6.6 |

|  | Example 73 | Example 74 | Example 75 | Example 76 |
| --- | --- | --- | --- | --- |
| X value of $Ca_xSr_{1-x}Al_2O_4$ | 0.05 | 0.05 | 0.05 | 0.05 |
| Crystallite diameter of solid solution obtained by dissolving Ca components in $\alpha$-$SrAl_2O_4$ (nm) | 76 | 76 | 76 | 76 |
| Firing conditions (maximum temperature-holding time) | 1600° C.-1 hr | 1600° C.-1 hr | 1600° C.-1 hr | 1600° C.-1 hr |
| Blending ratio of solid solution obtained by dissolving Ca components in $\alpha$-$SrAl_2O_4$ (mass %) | 50 | 50 | 50 | 50 |
| X value of $Ca_xSr_{1-x}Al_2O_4$ | 0.3 | 0.55 | 0.55 | 0.55 |
| Crystallite diameter of solid solution obtained by dissolving Ca components in $\beta$-$SrAl_2O_4$ (nm) | 70 | 36 | 53 | 65 |
| Firing conditions (maximum temperature-holding time) | 1600° C.-1 hr | 1300° C.-2 hr | 1500° C.-2 hr | 1600° C.-1 hr |
| Blending ratio of solid solution obtained by dissolving Ca components in $\beta$-$SrAl_2O_4$ (mass %) | 50 | 50 | 50 | 50 |
| 15 tap-flow value (mm) After mixing | 161 | 168 | 165 | 161 |
| After 2 hours | 134 | 127 | 132 | 136 |
| Bending strength after curing of 6 hours (MPa) | 1 | 1.2 | 1.1 | 1 |
| Bending strength after curing of 12 hours (MPa) | 1.5 | 1.6 | 1.5 | 1.5 |
| Bending strength after curing of 24 hours (MPa) | 2.3 | 2.2 | 2.4 | 2.3 |
| Wear amount in rotary corrosion test (mm) | 6.7 | 6.6 | 6.7 | 6.5 |

TABLE 12

|  | Example 77 | Example 78 | Example 79 | Example 80 | Example 81 |
| --- | --- | --- | --- | --- | --- |
| X value of $Ca_xSr_{1-x}Al_2O_4$ | 0.15 | 0.15 | 0.15 | 0.15 | 0.15 |
| Crystallite diameter of solid solution obtained by | 36 | 36 | 36 | 36 | 36 |

TABLE 12-continued

| | | | | | |
|---|---|---|---|---|---|
| dissolving Ca components in α-SrAl$_2$O$_4$ (nm) | | | | | |
| Firing conditions (maximum temperature-holding time) | 1300° C.-2 hr | 1300° C.-2 hr | 1300° C.-2 hr | 1300° C.-2 hr | 1300° C.-2 hr |
| Blending ratio of solid solution obtained by dissolving Ca components in α-SrAl$_2$O$_4$(mass %) | 50 | 50 | 50 | 50 | 50 |
| X value of Ca$_x$Sr$_{1-x}$Al$_2$O$_4$ | 0.3 | 0.3 | 0.3 | 0.55 | 0.55 |
| Crystallite diameter of solid solution obtained by dissolving Ca components in β-SrAl$_2$O$_4$ (nm) | 35 | 54 | 70 | 36 | 53 |
| Firing conditions (maximum temperature-holding time) | 1300° C.-2 hr | 1500° C.-2 hr | 1600° C.-1 hr | 1300° C.-2 hr | 1500° C.-2 hr |
| Blending ratio of solid solution obtained by dissolving Ca components in β-SrAl$_2$O$_4$ (mass %) | 50 | 50 | 50 | 50 | 50 |
| 15 tap-flow value     After mixing | 180 | 181 | 173 | 182 | 175 |
| (mm)                       After 2 hours | 119 | 124 | 127 | 120 | 122 |
| Bending strength after curing of 6 hours (MPa) | 1.4 | 1.4 | 1.2 | 1.3 | 1.2 |
| Bending strength after curing of 12 hours (MPa) | 1.9 | 1.8 | 1.7 | 1.8 | 1.7 |
| Bending strength after curing of 24 hours (MPa) | 2.4 | 2.3 | 2.4 | 2.2 | 2.3 |
| Wear amount in rotary corrosion test (mm) | 6.6 | 6.7 | 6.7 | 6.8 | 6.6 |

| | Example 82 | Example 83 | Example 84 | Example 85 |
|---|---|---|---|---|
| X value of Ca$_x$Sr$_{1-x}$Al$_2$O$_4$ | 0.15 | 0.15 | 0.15 | 0.15 |
| Crystallite diameter of solid solution obtained by dissolving Ca components in α-SrAl$_2$O$_4$ (nm) | 36 | 56 | 56 | 56 |
| Firing conditions (maximum temperature-holding time) | 1300° C.-2 hr | 1500° C.-2 hr | 1500° C.-2 hr | 1500° C.-2 hr |
| Blending ratio of solid solution obtained by dissolving Ca components in α-SrAl$_2$O$_4$(mass %) | 50 | 50 | 50 | 50 |
| X value of Ca$_x$Sr$_{1-x}$Al$_2$O$_4$ | 0.55 | 0.3 | 0.3 | 0.3 |
| Crystallite diameter of solid solution obtained by dissolving Ca components in β-SrAl$_2$O$_4$ (nm) | 65 | 35 | 54 | 70 |
| Firing conditions (maximum temperature-holding time) | 1600° C.-1 hr | 1300° C.-2 hr | 1500° C.-2 hr | 1600° C.-1 hr |
| Blending ratio of solid solution obtained by dissolving Ca components in β-SrAl$_2$O$_4$ (mass %) | 50 | 50 | 50 | 50 |
| 15 tap-flow value     After mixing | 169 | 179 | 169 | 167 |
| (mm)                       After 2 hours | 132 | 123 | 127 | 127 |
| Bending strength after curing of 6 hours (MPa) | 1.1 | 1.3 | 1.3 | 1.1 |
| Bending strength after curing of 12 hours (MPa) | 1.6 | 1.7 | 1.7 | 1.6 |
| Bending strength after curing of 24 hours (MPa) | 2.4 | 2.3 | 2.4 | 2.3 |
| Wear amount in rotary corrosion test (mm) | 6.5 | 6.7 | 6.6 | 6.6 |

TABLE 13

| | Example 86 | Example 87 | Example 88 | Example 89 | Example 90 |
|---|---|---|---|---|---|
| X value of Ca$_x$Sr$_{1-x}$Al$_2$O$_4$ | 0.15 | 0.15 | 0.15 | 0.15 | 0.15 |
| Crystallite diameter of solid solution obtained by dissolving Ca components in α-SrAl$_2$O$_4$ (nm) | 56 | 56 | 56 | 73 | 73 |
| Firing conditions (maximum temperature-holding time) | 1500° C.-2 hr | 1500° C.-2 hr | 1500° C.-2 hr | 1600° C.-1 hr | 1600° C.-1 hr |
| Blending ratio of solid solution obtained by dissolving Ca components in α-SrAl$_2$O$_4$ (mass %) | 50 | 50 | 50 | 50 | 50 |
| X value of Ca$_x$Sr$_{1-x}$Al$_2$O$_4$ | 0.55 | 0.55 | 0.55 | 0.3 | 0.3 |
| Crystallite diameter of solid solution obtained by dissolving Ca components in β-SrAl$_2$O$_4$ (nm) | 36 | 53 | 65 | 35 | 54 |
| Firing conditions (maximum temperature-holding time) | 1300° C.-2 hr | 1500° C.-2 hr | 1600° C.-1 hr | 1300° C.-2 hr | 1500° C.-2 hr |
| Blending ratio of solid solution obtained by dissolving Ca components in β-SrAl$_2$O$_4$ (mass %) | 50 | 50 | 50 | 50 | 50 |
| 15 tap-flow value     After mixing | 177 | 169 | 164 | 179 | 170 |
| (mm)                       After 2 hours | 121 | 126 | 130 | 125 | 131 |
| Bending strength after curing of 6 hours (MPa) | 1.3 | 1.2 | 1.1 | 1.3 | 1.2 |
| Bending strength after curing of 12 hours (MPa) | 1.8 | 1.7 | 1.5 | 1.6 | 1.6 |
| Bending strength after curing of 24 hours (MPa) | 2.2 | 2.4 | 2.3 | 2.1 | 2.3 |
| Wear amount in rotary corrosion test (mm) | 6.8 | 6.5 | 6.9 | 6.8 | 6.6 |

| | Example 91 | Example 92 | Example 93 | Example 94 |
|---|---|---|---|---|
| X value of Ca$_x$Sr$_{1-x}$Al$_2$O$_4$ | 0.15 | 0.15 | 0.15 | 0.15 |
| Crystallite diameter of solid solution obtained by dissolving Ca components in α-SrAl$_2$O$_4$ (nm) | 73 | 73 | 73 | 73 |
| Firing conditions (maximum temperature-holding time) | 1600° C.-1 hr | 1600° C.-1 hr | 1600° C.-1 hr | 1600° C.-1 hr |
| Blending ratio of solid solution obtained by dissolving Ca components in α-SrAl$_2$O$_4$ (mass %) | 50 | 50 | 50 | 50 |
| X value of Ca$_x$Sr$_{1-x}$Al$_2$O$_4$ | 0.3 | 0.55 | 0.55 | 0.55 |
| Crystallite diameter of solid solution obtained by dissolving Ca components in β-SrAl$_2$O$_4$ (nm) | 70 | 36 | 53 | 65 |
| Firing conditions (maximum temperature-holding time) | 1600° C.-1 hr | 1300° C.-2 hr | 1500° C.-2 hr | 1600° C.-1 hr |
| Blending ratio of solid solution obtained by dissolving Ca components in β-SrAl$_2$O$_4$ (mass %) | 50 | 50 | 50 | 50 |
| 15 tap-flow value     After mixing | 169 | 177 | 173 | 169 |

TABLE 13-continued

| (mm) After 2 hours | 134 | 124 | 130 | 136 |
|---|---|---|---|---|
| Bending strength after curing of 6 hours (MPa) | 1.1 | 1.3 | 1.2 | 1.1 |
| Bending strength after curing of 12 hours (MPa) | 1.6 | 1.8 | 1.7 | 1.6 |
| Bending strength after curing of 24 hours (MPa) | 2.5 | 2.3 | 2.4 | 2.3 |
| Wear amount in rotary corrosion test (mm) | 6.7 | 6.5 | 6.8 | 6.6 |

The evaluation results are as shown in Tables 10 to 13. In Examples 59 to 94, the flow values of the monolithic refractories suitable for pouring were obtained 2 hours after the start of mixing. Therefore, it has been confirmed that Examples 59 to 94 can be applied to furnaces with a large volume or the like. Furthermore, Examples 59 to 94 show larger values than Comparative Examples 1 to 3 in the flexural strength after curing of 6, 12, and 24 hours, and therefore it has been clarified that Examples 59 to 94 are excellent in terms of cured strength developing property. In particular, the flexural strength after curing of 6 hours is remarkably greater compared to those of the Comparative Examples, and therefore it has been confirmed that Examples 59 to 94 are excellent in terms of early strength developing property. Furthermore, it has been clarified that, compared to Comparative Examples 1 to 3, Examples 59 to 94 clearly show small wear amounts in the rotary corrosion test using slag and are excellent in terms of slag resistance at a high temperature.

From these test results, it has been clarified that, by using the binder for monolithic refractories including a mixture of both of a solid solution obtained by dissolving Ca components in $\alpha$-$SrAl_2O_4$ in which a crystallite diameter of the solid solution is from 40 nm to 75 nm and a solid solution obtained by dissolving Ca components in $\beta$-$SrAl_2O_4$ in which a crystallite diameter of the solid solution is from 35 nm to 70 nm, a monolithic refractory in which a favorable operability is secured even after a long period of time has elapsed after pouring and blending water thereinto, a favorable strength developing property is obtained early, and slag resistance at a high temperature is superior compared to the conventional technique can be obtained.

[6] Examples relating to a binder for monolithic refractories including a mixture of a solid solution obtained by dissolving Ca components in $\alpha$-$SrAl_2O_4$ and a solid solution obtained by dissolving Ca components in $\beta$-$SrAl_2O_4$, into which $Al_2O_3$ is blended Measurement of the flow value and the flexural strength after curing and rotary corrosion tests using slag were performed using monolithic refractories manufactured with binders including a mixture of a solid solution obtained by dissolving Ca components in $\alpha$-$SrAl_2O_4$ in which a X value of $Ca_xSr_{1-x}Al_2O_4$ is 0.05 and a solid solution obtained by dissolving Ca components in $\beta$-$SrAl_2O_4$ in which a X value of $Ca_xSr_{1-x}Al_2O_4$ is 0.30, into which $\alpha$-$Al_2O_3$ was blended with a predetermined ratio, in Examples 95 to 99. Table 14 shows the compositions of the solid solutions, the crystallite diameters of the solid solutions, the blending ratio of the solid solutions, the binder, and $\alpha$-$Al_2O_3$, and the measurement results of flow value and flexural strength after curing and results of the rotary corrosion test of the monolithic refractory in each of the Examples. All of the solid solutions were subjected to firing for 2 hours at the maximum temperature of 1500° C. for manufacture.

TABLE 14

| | Example 66 | Example 95 | Example 96 | Example 97 | Example 98 | Example 99 |
|---|---|---|---|---|---|---|
| X value of $Ca_xSr_{1-x}Al_2O_4$ | 0.05 | 0.05 | 0.05 | 0.05 | 0.05 | 0.05 |
| Crystallite diameter of solid solution obtained by dissolving Ca components in $\alpha$-$SrAl_2O_4$ (nm) | 59 | 59 | 59 | 59 | 59 | 59 |
| Blending ratio of solid solution obtained by dissolving Ca components in $\alpha$-$SrAl_2O_4$ (mass %) | 50 | 31 | 30 | 20 | 5 | 4 |
| X value of $Ca_xSr_{1-x}Al_2O_4$ | 0.3 | 0.3 | 0.3 | 0.3 | 0.3 | 0.3 |
| Crystallite diameter of solid solution obtained by dissolving Ca components in $\beta$-$SrAl_2O_4$ (nm) | 54 | 54 | 54 | 54 | 54 | 54 |
| Blending ratio of solid solution obtained by dissolving Ca components in $\beta$-$SrAl_2O_4$ (mass %) | 50 | 31 | 30 | 20 | 5 | 4 |
| Blending ratio of $\alpha$-$Al_2O_3$ (mass %)*[1] | 0 | 38 | 40 | 60 | 90 | 92 |
| 15 tap-flow value (mm) After mixing | 171 | 173 | 175 | 175 | 169 | 165 |
| After 2 hours | 127 | 130 | 132 | 135 | 132 | 127 |
| Bending strength after curing of 6 hours (MPa) | 1.3 | 1.2 | 1.2 | 1.1 | 1 | 0.9 |
| Bending strength after curing of 12 hours (MPa) | 1.7 | 1.6 | 1.6 | 1.5 | 1.4 | 1.4 |
| Bending strength after curing of 24 hours (MPa) | 2.3 | 2.4 | 2.2 | 2.3 | 2.1 | 2 |
| Wear amount in rotary corrosion test (mm) | 6.6 | 6.2 | 6.1 | 5.6 | 5.2 | 5.3 |

Note)
*[1]$Al_2O_3$ other than solid solution and $CaAl_2O_4$

The evaluation results are as shown in Table 14. In Examples 95 to 99, the flow values of the monolithic refractories suitable for pouring were obtained 2 hours after the start of mixing. Therefore, it has been confirmed that Examples 95 to 99 can be applied to furnaces with a large volume or the like. Furthermore, Examples 95 to 99 show larger values than Comparative Examples 1 to 6 in the flexural strength after curing of 6, 12, and 24 hours, and therefore it has been clarified that Examples 95 to 99 are excellent in terms of cured strength developing property. In particular, the flexural strength after curing of 6 hours is remarkably greater compared to those of the Comparative Examples, and therefore it has been confirmed that Examples 95 to 99 are excellent in terms of early strength developing property. Furthermore, it has been clarified that, compared to Comparative Examples, Examples 95 to 99 clearly show small wear amounts in the rotary corrosion test using slag and are excellent in terms of slag resistance at a high temperature.

obtained by dissolving Ca components in $\beta$-$SrAl_2O_4$, and a solid solution obtained by dissolving Sr components in $CaAl_2O_4$ Measurement of the flow value and the flexural strength after curing and rotary corrosion tests using slag were performed using monolithic refractories manufactured with binders including a mixture of a solid solution obtained by dissolving Ca components in $\alpha$-$SrAl_2O_4$ in which a X value of $Ca_xSr_{1-x}Al_2O_4Al_2O_4$ is 0.05, a solid solution obtained by dissolving Ca components in $\beta$-$SrAl_2O_4$ in which a X value of $Ca_xSr_{1-x}Al_2O_4$ is 0.30, and a solid solution obtained by dissolving Sr components in $CaAl_2O_4$ in which a X value of $Ca_xSr_{1-x}Al_2O_4$ is 0.95 in Examples 100 to 104. Table 15 shows the compositions of the solid solutions, the crystallite diameters of the solid solutions, the blending ratio of the solid solutions, and the measurement results of flow value and flexural strength after curing and results of the rotary corrosion test of the monolithic refractory in each of the Examples. All of the solid solutions were subjected to firing for 2 hours at the maximum temperature of 1500° C. for manufacture.

TABLE 15

| | | Example 100 | Example 101 | Example 102 | Example 103 | Example 104 |
|---|---|---|---|---|---|---|
| X value of $Ca_xSr_{1-x}Al_2O_4$ | | 0.05 | 0.05 | 0.05 | 0.05 | 0.05 |
| Crystallite diameter of solid solution obtained by dissolving Ca components in $\alpha$-$SrAl_2O_4$ (nm) | | 59 | 59 | 59 | 59 | 59 |
| Blending ratio of solid solution obtained by dissolving Ca components in $\alpha$-$SrAl_2O_4$ (mass %) | | 40 | 35 | 30 | 20 | 10 |
| X value of $Ca_xSr_{1-x}Al_2O_4$ | | 0.3 | 0.3 | 0.3 | 0.3 | 0.3 |
| Crystallite diameter of solid solution obtained by dissolving Ca components in $\beta$-$SrAl_2O_4$ (nm) | | 54 | 54 | 54 | 54 | 54 |
| Blending ratio of solid solution obtained by dissolving Ca components in $\beta$-$SrAl_2O_4$ (mass %) | | 40 | 35 | 30 | 20 | 10 |
| X value of $Ca_xSr_{1-x}Al_2O_4$ | | 0.95 | 0.95 | 0.95 | 0.95 | 0.95 |
| Crystallite diameter of solid solution obtained by dissolving Sr components in $CaAl_2O_4$ (nm) | | 50 | 50 | 50 | 50 | 50 |
| Blending ratio of solid solution obtained by dissolving Sr components in $CaAl_2O_4$ (mass %) | | 20 | 30 | 40 | 60 | 80 |
| 15 tap-flow value (mm) | After mixing | 167 | 165 | 166 | 163 | 163 |
| | After 2 hours | 129 | 133 | 131 | 134 | 137 |
| Bending strength after curing of 6 hours (MPa) | | 1.3 | 1.2 | 1.2 | 1.1 | 0.9 |
| Bending strength after curing of 12 hours (MPa) | | 1.6 | 1.6 | 1.5 | 1.5 | 1.3 |
| Bending strength after curing of 24 hours (MPa) | | 2.4 | 2.5 | 2.5 | 2.5 | 2.5 |
| Wear amount in rotary corrosion test (mm) | | 6.7 | 6.6 | 6.7 | 6.8 | 7 |

Note)
*[1]$Al_2O_3$ other than solid solution and $CaAl_2O_4$

In addition, in Examples 95 to 99, it is possible to further decrease the wear amount in the rotary corrosion test using slag, compared to Example 66 including no $Al_2O_3$, since Examples 95 to 99 include $Al_2O_3$, which clarifies that Examples 95 to 99 are superior in terms of slag resistance at a high temperature.

From these test results, it has been clarified that, by using the binder for monolithic refractories including a mixture of a solid solution obtained by dissolving Ca components in $\alpha$-$SrAl_2O_4$ in which a crystallite diameter of the solid solution is from 40 nm to 75 nm and a solid solution obtained by dissolving Ca components in $\beta$-$SrAl_2O_4$ in which a crystallite diameter of the solid solution is from 35 nm to 70 nm, into which $Al_2O_3$ is blended, a monolithic refractory in which a favorable operability is secured even after a long period of time has elapsed after pouring and blending water thereinto, a favorable strength developing property is obtained early, and slag resistance at a high temperature is superior compared to the conventional technique can be obtained.

[7] Examples relating to a binder for monolithic refractories including a mixture of a solid solution obtained by dissolving Ca components in $\alpha$-$SrAl_2O_4$, a solid solution The evaluation results are as shown in Table 15. In Examples 100 to 104, the flow values of the monolithic refractories suitable for pouring were obtained 2 hours after the start of mixing. Therefore, it has been confirmed that Examples 100 to 104 can be applied to furnaces with a large volume or the like. Furthermore, Examples 100 to 104 show larger values than Comparative Examples 1 to 6 in the flexural strength after curing of 6, 12, and 24 hours, and therefore it has been clarified that Examples 100 to 104 are excellent in terms of cured strength developing property. In particular, the flexural strength after curing of 6 hours is remarkably greater compared to those of the Comparative Examples, and therefore it has been confirmed that Examples 100 to 104 are excellent in terms of early strength developing property. Furthermore, it has been clarified that, compared to Comparative Examples, Examples 100 to 104 clearly show small wear amounts in the rotary corrosion test using slag and are excellent in terms of slag resistance at a high temperature.

From these test results, it has been clarified that, by using the binder for monolithic refractories including a mixture of a solid solution obtained by dissolving Ca components in $\alpha$-$SrAl_2O_4$ in which a crystallite diameter of the solid solution is from 40 nm to 75 nm, a solid solution obtained by dissolving Ca components in β-SrAl$_2$O$_4$ in which a crystallite diameter of the solid solution is from 35 nm to 70 nm, and a solid solution obtained by dissolving Sr components in CaAl$_2$O$_4$ in which a crystallite diameter of the solid solution is from 25 nm to 60 nm, a monolithic refractory in which a favorable operability is secured even after a long period of time has elapsed after pouring and blending water thereinto, a favorable strength developing property is obtained early, and slag resistance at a high temperature is superior compared to the conventional technique can be obtained.

[8] Examples relating to a binder for monolithic refractories including a mixture of a solid solution obtained by dissolving Ca components in α-SrAl$_2$O$_4$, a solid solution obtained by dissolving Ca components in β-SrAl$_2$O$_4$, and a solid solution obtained by dissolving Sr components in CaAl$_2$O$_4$, into which Al$_2$O$_3$ is blended Measurement of the flow value and the flexural strength after curing and rotary corrosion tests using slag were performed using monolithic refractories manufactured with binders including a mixture of a solid solution obtained by dissolving Ca components in α-SrAl$_2$O$_4$ in which an X value of Ca$_x$Sr$_{1-x}$Al$_2$O$_4$ is 0.05, a solid solution obtained by dissolving Ca components in β-SrAl$_2$O$_4$ in which an X value of Ca$_x$Sr$_{1-x}$Al$_2$O$_4$ is 0.30, and a solid solution obtained by dissolving Sr components in CaAl$_2$O$_4$ in which an X value of Ca$_x$Sr$_{1-x}$Al$_2$O$_4$ is 0.95, into which α-Al$_2$O$_3$ is blended, in Examples 105 to 109. Table 16 shows the compositions of the solid solutions, the crystallite diameters of the solid solutions, the blending ratio of the solid solutions and α-Al$_2$O$_3$, and the measurement results of flow value and flexural strength after curing and results of the rotary corrosion test of the monolithic refractory in each of the Examples. All of the solid solutions were subjected to firing for 2 hours at the maximum temperature of 1500° C. for manufacture.

The evaluation results are as shown in Table 16. In Examples 105 to 109, the flow values of the monolithic refractories suitable for pouring were obtained 2 hours after the start of mixing. Therefore, it has been confirmed that Examples 105 to 109 can be applied to furnaces with a large volume or the like. Furthermore, Examples 105 to 109 show larger values than Comparative Examples 1 to 6 in the flexural strength after curing of 6, 12, and 24 hours, and therefore it has been clarified that Examples 105 to 109 are excellent in terms of cured strength developing property. In particular, the flexural strength after curing of 6 hours is remarkably greater compared to those of the Comparative Examples, and therefore it has been confirmed that Examples 105 to 109 are excellent in terms of early strength developing property. Furthermore, it has been clarified that, compared to Comparative Examples, Examples 105 to 109 clearly show small wear amounts in the rotary corrosion test using slag and are excellent in terms of slag resistance at a high temperature.

In addition, in Examples 105 to 109 it is possible to further decrease the wear amount in the rotary corrosion test using slag, compared to Example 101 including no Al$_2$O$_3$, since Examples 105 to 109 include Al$_2$O$_3$, which clarifies that Examples 105 to 109 are superior in terms of slag resistance at a high temperature.

From these test results, it has been clarified that, by using the binder for monolithic refractories including a mixture of a solid solution obtained by dissolving Ca components in α-SrAl$_2$O$_4$ in which a crystallite diameter of the solid solution is from 40 nm to 75 nm, a solid solution obtained by dissolving Ca components in β-SrAl$_2$O$_4$ in which a crystallite diameter of the solid solution is from 35 nm to 70 nm, and a solid solution obtained by dissolving Sr components in CaAl$_2$O$_4$ in which a crystallite diameter of the solid solution is from 25 nm to 60 nm, into which Al$_2$O$_3$ is blended, a monolithic refractory in which a favorable operability is secured even after a long period of time has elapsed after pouring and blending water thereinto, a favorable strength developing property is obtained early, and slag resistance at a high temperature is superior compared to the conventional technique can be obtained.

TABLE 16

|  | Example 101 | Example 105 | Example 106 | Example 107 | Example 108 | Example 109 |
|---|---|---|---|---|---|---|
| X value of Ca$_x$Sr$_{1-x}$Al$_2$O$_4$ | 0.05 | 0.05 | 0.05 | 0.05 | 0.05 | 0.05 |
| Crystallite diameter of solid solution obtained by dissolving Ca components in α-SrAl$_2$O$_4$ (nm) | 59 | 59 | 59 | 59 | 59 | 59 |
| Blending ratio of solid solution obtained by dissolving Ca components in α-SrAl$_2$O$_4$ (mass %) | 35 | 21.7 | 21 | 14 | 3.5 | 2.8 |
| X value of Ca$_x$Sr$_{1-x}$Al$_2$O$_4$ | 0.3 | 0.3 | 0.3 | 0.3 | 0.3 | 0.3 |
| Crystallite diameter of solid solution obtained by dissolving Ca components in β-SrAl$_2$O$_4$ (nm) | 54 | 54 | 54 | 54 | 54 | 54 |
| Blending ratio of solid solution obtained by dissolving Ca components in β-SrAl$_2$O$_4$ (mass %) | 35 | 21.7 | 21 | 14 | 3.5 | 2.8 |
| X value of Ca$_x$Sr$_{1-x}$Al$_2$O$_4$ | 0.95 | 0.95 | 0.95 | 0.95 | 0.95 | 0.95 |
| Crystallite diameter of solid solution obtained by dissolving Sr components in CaAl$_2$O$_4$ (nm) | 50 | 50 | 50 | 50 | 50 | 50 |
| Blending ratio of solid solution obtained by dissolving Sr components in CaAl$_2$O$_4$ (mass %) | 30 | 18.6 | 18 | 12 | 3 | 2.4 |
| Mixing ratio of α-Al$_2$O$_3$ (mass %)[*1] | 0 | 38 | 40 | 60 | 90 | 92 |
| 15 tap-flow value (mm) After mixing | 166 | 169 | 167 | 166 | 162 | 160 |
| After 2 hours | 131 | 134 | 133 | 137 | 133 | 131 |
| Bending strength after curing of 6 hours (MPa) | 1.2 | 1.1 | 1.1 | 1 | 0.7 | 0.7 |
| Bending strength after curing of 12 hours (MPa) | 1.5 | 1.5 | 1.5 | 1.4 | 1.2 | 1.1 |
| Bending strength after curing of 24 hours (MPa) | 2.5 | 2.3 | 2.2 | 2 | 1.9 | 1.8 |
| Wear amount in rotary corrosion test (mm) | 6.7 | 6.3 | 6.3 | 5.9 | 5.4 | 5.3 |

Note)
[*1] Al$_2$O$_3$ other than solid solution and CaAl$_2$O$_4$

[9] Examples relating to a binder for monolithic refractories according to the present invention including one kind or two or more kinds selected from a group consisting of SiO$_2$, TiO$_2$, Fe$_2$O$_3$, MgO, and BaO in which an amount thereof is 12 mass % or less Characteristics were evaluated using monolithic refractories manufactured with binders including a solid solution obtained by blending various combinations of one kind or two or more kinds selected from a group consisting of $SiO_2$, $TiO_2$, $Fe_2O_3$, MgO, and BaO in Examples 110 to 221 in order to verify the effects of the contamination amount of the raw materials to be used and inevitable impurities generated during the manufacturing process. Characteristics were evaluated using monolithic refractories manufactured with binders having amounts of a variety of contamination components, which were out of the range of the invention, blended thereinto in Comparative Examples 7 to 30.

Characteristics were evaluated using monolithic refractories manufactured with binders including a solid solution for which the chemical components of a binder had been controlled to solidify Ca components in $\alpha$-$SrAl_2O_4$ or $\beta$-$SrAl_2O_4$ in Examples 110 to 137 and Comparative Examples 7 to 14; monolithic refractories manufactured with binders including a solid solution for which the chemical components of a binder had been controlled to solidify Ca components in $\alpha$-$SrAl_2O_4$ or $\beta$-$SrAl_2O_4$, into which $Al_2O_3$ was blended, in Examples 138 to 149; monolithic refractories manufactured with binders including a mixture of two or three kinds selected from a group consisting of a solid solution for which the chemical components of a binder had been controlled to solidify Ca components in $\alpha$-$SrAl_2O_4$, a solid solution for which the chemical components of a binder had been controlled to solidify Ca components in $\beta$-$SrAl_2O_4$, and a solid solution for which the chemical components of a binder had been controlled to solidify Sr components in $CaAl_2O_4$ in Examples 150 to 197 and Comparative Examples 15 to 30; and monolithic refractories manufactured with binders including a mixture of two or three kinds selected from a group consisting of a solid solution for which the chemical components of a binder had been controlled to solidify Ca components in $\alpha$-$SrAl_2O_4$, a solid solution for which the chemical components of a binder had been controlled to solidify Ca components in $\beta$-$SrAl_2O_4$, and a solid solution for which the chemical components of a binder had been controlled to solidify Sr components in $CaAl_2O_4$, into which $Al_2O_3$ was blended, in Examples 198 to 221.

Tables 17 to 43 show the chemical composition and chemical components, and the measurement results of flow value and flexural strength after curing and results of the rotary corrosion test of the monolithic refractory in each of Examples and Comparative Examples. All of the solid solutions were subjected to firing for 2 hours at the maximum temperature of 1500° C. for manufacture. In addition, the chemical components of the manufactured binders were measured using X-ray fluorescence analysis ("ZSX-Primus II", a scanning X-ray fluorescence analyzer manufactured by Rigaku Corporation).

TABLE 17

|  |  | Example 110 | Example 111 | Example 112 | Example 113 | Example 114 |
| --- | --- | --- | --- | --- | --- | --- |
| Raw materials of solid solution A obtained by dissolving Ca components in $\alpha$-$SrAl_2O_4$ including various impurity components (mass %) | $CaCO_3$ | 2 | 2 | 1.9 | 1.9 | 1.9 |
| | $SrCO_3$ | 55.6 | 55.6 | 54.5 | 54.5 | 54.5 |
| | $\alpha$-$Al_2O_3$ | 40.4 | 40.4 | 39.6 | 39.6 | 39.6 |
| | $SiO_2$ | 2 | 0 | 4 | 0 | 0 |
| | MgO | 0 | 2 | 0 | 4 | 0 |
| | BaO | 0 | 0 | 0 | 0 | 4 |
| | $TiO_2$ | 0 | 0 | 0 | 0 | 0 |
| | $Fe_2O_3$ | 0 | 0 | 0 | 0 | 0 |
| X value of $Ca_xSr_{1-x}Al_2O_4$ | | 0.05 | 0.05 | 0.05 | 0.05 | 0.05 |
| Crystallite diameter of solid solution A (nm) | | 58 | 59 | 56 | 61 | 56 |
| Blending ratio of solid solution A (mass %) | | 100 | 100 | 100 | 100 | 100 |
| Raw materials of solid solution B obtained by dissolving Ca components in $\beta$-$SrAl_2O_4$ including various impurity components (mass %) | $CaCO_3$ | — | — | — | — | — |
| | $SrCO_3$ | — | — | — | — | — |
| | $\alpha$-$Al_2O_3$ | — | — | — | — | — |
| | $SiO_2$ | — | — | — | — | — |
| | MgO | — | — | — | — | — |
| | BaO | — | — | — | — | — |
| | $TiO_2$ | — | — | — | — | — |
| | $Fe_2O_3$ | — | — | — | — | — |
| X value of $Ca_xSr_{1-x}Al_2O_4$ | | — | — | — | — | — |
| Crystallite diameter of solid solution B (nm) | | — | — | — | — | — |
| Blending ratio of solid solution B (mass %) | | 0 | 0 | 0 | 0 | 0 |
| Raw materials of solid solution C obtained by dissolving Sr components in $CaAl_2O_4$ including various impurity components (mass %) | $CaCO_3$ | — | — | — | — | — |
| | $SrCO_3$ | — | — | — | — | — |
| | $\alpha$-$Al_2O_3$ | — | — | — | — | — |
| | $SiO_2$ | — | — | — | — | — |
| | MgO | — | — | — | — | — |
| | BaO | — | — | — | — | — |
| | TiO | — | — | — | — | — |
| | $Fe_2O_3$ | — | — | — | — | — |
| X value of $Ca_xSr_{1-x}Al_2O_4$ | | — | — | — | — | — |
| Crystallite diameter of solid solution C (nm) | | — | — | — | — | — |
| Blending ratio of solid solution C (mass %) | | 0 | 0 | 0 | 0 | 0 |
| Blending ratio of $\alpha$-$Al_2O_3$ (mass %)[1] | | 0 | 0 | 0 | 0 | 0 |
| Measured value of chemical components of binder (mass %) | CaO | 1.4 | 1.3 | 1.3 | 1.2 | 1.3 |
| | SrO | 47 | 47.1 | 46 | 45.9 | 45.9 |
| | $Al_2O_3$ | 49.1 | 49 | 47.9 | 48 | 47.9 |
| | Total amount of $SiO_2$, MgO, BaO, $TiO_2$, and $Fe_2O_3$ | 2.4 | 2.5 | 4.7 | 4.8 | 4.8 |
| 15 tap-flow value (mm) | After mixing | 181 | 180 | 183 | 182 | 185 |
| | After 2 hours | 133 | 134 | 130 | 129 | 123 |
| Bending strength after curing of 6 hours (MPa) | | 1.5 | 1.5 | 1.5 | 1.4 | 1.4 |
| Bending strength after curing of 12 hours (MPa) | | 1.9 | 2 | 1.9 | 1.8 | 2 |

TABLE 17-continued

|  | Example 110 | Example 111 | Example 112 | Example 113 | Example 114 |
|---|---|---|---|---|---|
| Bending strength after curing of 24 hours (MPa) | 2.2 | 2.2 | 2.3 | 2 | 2.3 |
| Wear amount in rotary corrosion test/mm | 6.3 | 6.2 | 6.5 | 6.2 | 6.2 |

Note)
*[1] Components other than solid solution and $CaAl_2O_4$

TABLE 18

|  |  | Example 115 | Example 116 | Example 117 | Example 118 | Example 119 |
|---|---|---|---|---|---|---|
| Raw materials of solid solution A obtained by dissolving Ca components in $\alpha$-$SrAl_2O_4$ including various impurity components (mass %) | $CaCO_3$ | 1.9 | 1.9 | 1.9 | 1.8 | 1.8 |
|  | $SrCO_3$ | 54.5 | 54.5 | 53.9 | 51.7 | 51.7 |
|  | $\alpha$-$Al_2O_3$ | 39.6 | 39.6 | 39.2 | 37.5 | 37.5 |
|  | $SiO_2$ | 0 | 0 | 1 | 9 | 0 |
|  | MgO | 0 | 0 | 1 | 0 | 9 |
|  | BaO | 0 | 0 | 1 | 0 | 0 |
|  | $TiO_2$ | 4 | 0 | 1 | 0 | 0 |
|  | $Fe_2O_3$ | 0 | 4 | 1 | 0 | 0 |
| X value of $Ca_xSr_{1-x}Al_2O_4$ |  | 0.05 | 0.05 | 0.05 | 0.05 | 0.05 |
| Crystallite diameter of solid solution A (nm) |  | 61 | 56 | 58 | 55 | 63 |
| Blending ratio of solid solution A (mass %) |  | 100 | 100 | 100 | 100 | 100 |
| Raw materials of solid solution B obtained by dissolving Ca components in $\beta$-$SrAl_2O_4$ including various impurity components (mass %) | $CaCO_3$ | — | — | — | — | — |
|  | $SrCO_3$ | — | — | — | — | — |
|  | $\alpha$-$Al_2O_3$ | — | — | — | — | — |
|  | $SiO_2$ | — | — | — | — | — |
|  | MgO | — | — | — | — | — |
|  | BaO | — | — | — | — | — |
|  | $TiO_2$ | — | — | — | — | — |
|  | $Fe_2O_3$ | — | — | — | — | — |
| X value of $Ca_xSr_{1-x}Al_2O_4$ |  | — | — | — | — | — |
| Crystallite diameter of solid solution B (nm) |  | — | — | — | — | — |
| Blending ratio of solid solution B (mass %) |  | 0 | 0 | 0 | 0 | 0 |
| Raw materials of solid solution C obtained by dissolving Sr components in $CaAl_2O_4$ including various impurity components (mass %) | $CaCO_3$ | — | — | — | — | — |
|  | $SrCO_3$ | — | — | — | — | — |
|  | $\alpha$-$Al_2O_3$ | — | — | — | — | — |
|  | $SiO_2$ | — | — | — | — | — |
|  | MgO | — | — | — | — | — |
|  | BaO | — | — | — | — | — |
|  | $TiO_2$ | — | — | — | — | — |
|  | $Fe_2O_3$ | — | — | — | — | — |
| X value of $Ca_xSr_{1-x}Al_2O_4$ |  | — | — | — | — | — |
| Crystallite diameter of solid solution C (nm) |  | — | — | — | — | — |
| Blending ratio of solid solution C (mass %) |  | 0 | 0 | 0 | 0 | 0 |
| Blending ratio of $\alpha$-$Al_2O_3$ (mass %)*[1] |  | 0 | 0 | 0 | 0 | 0 |
| Measured value of chemical components of binder (mass %) | CaO | 1.3 | 1.3 | 1.3 | 1.2 | 1.3 |
|  | SrO | 45.9 | 45.9 | 45.4 | 43.1 | 43.1 |
|  | $Al_2O_3$ | 47.9 | 48 | 47.4 | 44.9 | 45 |
|  | Total amount of $SiO_2$, MgO, BaO, $TiO_2$, and $Fe_2O_3$ | 4.8 | 4.7 | 5.8 | 10.7 | 10.5 |
| 15 tap-flow value (mm) | After mixing | 180 | 183 | 182 | 179 | 180 |
|  | After 2 hours | 133 | 130 | 134 | 136 | 135 |
| Bending strength after curing of 6 hours (MPa) |  | 1.5 | 1.5 | 1.4 | 1.4 | 1.5 |
| Bending strength after curing of 12 hours (MPa) |  | 1.9 | 1.9 | 1.8 | 1.8 | 1.8 |
| Bending strength after curing of 24 hours (MPa) |  | 2.2 | 2.4 | 2.2 | 2 | 2.1 |
| Wear amount in rotary corrosion test/mm |  | 6.4 | 6.6 | 6.5 | 6.7 | 6.1 |

Note)
*[1] Components other than solid solution and $CaAl_2O_4$

TABLE 19

|  |  | Example 120 | Example 121 | Example 122 | Example 123 | Comparative Example 7 |
|---|---|---|---|---|---|---|
| Raw materials of solid solution A obtained by dissolving Ca components in $\alpha$-$SrAl_2O_4$ including various impurity components (mass %) | $CaCO_3$ | 1.8 | 1.8 | 1.8 | 1.8 | 1.8 |
|  | $SrCO_3$ | 51.7 | 51.7 | 51.7 | 51.1 | 49.9 |
|  | $\alpha$-$Al_2O_3$ | 37.5 | 37.5 | 37.5 | 37.1 | 36.3 |
|  | $SiO_2$ | 0 | 0 | 0 | 2 | 12 |
|  | MgO | 0 | 0 | 0 | 2 | 0 |
|  | BaO | 9 | 0 | 0 | 2 | 0 |
|  | $TiO_2$ | 0 | 9 | 0 | 2 | 0 |

TABLE 19-continued

|  |  | Example 120 | Example 121 | Example 122 | Example 123 | Comparative Example 7 |
|---|---|---|---|---|---|---|
|  | Fe$_2$O$_3$ | 0 | 0 | 9 | 2 | 0 |
| X value of Ca$_x$Sr$_{1-x}$Al$_2$O$_4$ |  | 0.05 | 0.05 | 0.05 | 0.05 | 0.05 |
| Crystallite diameter of solid solution A (nm) |  | 60 | 55 | 54 | 57 | 54 |
| Blending ratio of solid solution A (mass %) |  | 100 | 100 | 100 | 100 | 100 |
| Raw materials of solid | CaCO$_3$ | — | — | — | — | — |
| solution B obtained by | SrCO$_3$ | — | — | — | — | — |
| dissolving Ca | α-Al$_2$O$_3$ | — | — | — | — | — |
| components in β-SrAl$_2$O$_4$ | SiO$_2$ | — | — | — | — | — |
| including various impurity | MgO | — | — | — | — | — |
| components (mass %) | BaO | — | — | — | — | — |
|  | TiO$_2$ | — | — | — | — | — |
|  | Fe$_2$O$_3$ | — | — | — | — | — |
| X value of Ca$_x$Sr$_{1-x}$Al$_2$O$_4$ |  | — | — | — | — | — |
| Crystallite diameter of solid solution B (nm) |  | — | — | — | — | — |
| Blending ratio of solid solution B (mass %) |  | 0 | 0 | 0 | 0 | 0 |
| Raw materials of solid | CaCO$_3$ | — | — | — | — | — |
| solution C obtained by | SrCO$_3$ | — | — | — | — | — |
| dissolving Sr | α-Al$_2$O$_3$ | — | — | — | — | — |
| components in CaAl$_2$O$_4$ | SiO$_2$ | — | — | — | — | — |
| including various impurity | MgO | — | — | — | — | — |
| components (mass %) | BaO | — | — | — | — | — |
|  | TiO$_2$ | — | — | — | — | — |
|  | Fe$_2$O$_3$ | — | — | — | — | — |
| X value of Ca$_x$Sr$_{1-x}$Al$_2$O$_4$ |  | — | — | — | — | — |
| Crystallite diameter of solid solution C (nm) |  | — | — | — | — | — |
| Blending ratio of solid solution C (mass %) |  | 0 | 0 | 0 | 0 | 0 |
| Blending ratio of α-Al$_2$O$_3$ (mass %)*[1] |  | 0 | 0 | 0 | 0 | 0 |
| Measured value | CaO | 1.3 | 1.2 | 1.2 | 1.2 | 1.2 |
| of chemical | SrO | 43.1 | 43.1 | 43.2 | 42.3 | 41.3 |
| components of | Al$_2$O$_3$ | 45 | 44.9 | 44.7 | 44.4 | 43.1 |
| binder (mass %) | Total amount of SiO$_2$, MgO, BaO, TiO$_2$, and Fe$_2$O$_3$ | 10.6 | 10.7 | 10.8 | 12 | 14.3 |
| 15 tap-flow | After mixing | 175 | 183 | 186 | 184 | 177 |
| value (mm) | After 2 hours | 121 | 136 | 122 | 126 | 141 |
| Bending strength after curing of 6 hours (MPa) |  | 1.6 | 1.3 | 1.5 | 1.3 | 0.9 |
| Bending strength after curing of 12 hours (MPa) |  | 2 | 1.7 | 1.9 | 1.8 | 1.4 |
| Bending strength after curing of 24 hours (MPa) |  | 2.3 | 2 | 2.1 | 2.1 | 1.9 |
| Wear amount in rotary corrosion test/mm |  | 6.2 | 6.6 | 6.9 | 6.3 | 7.5 |

Note)
*[1]Components other than solid solution and CaAl$_2$O$_4$

TABLE 20

|  |  | Comparative Example 8 | Comparative Example 9 | Comparative Example 10 | Example 124 | Example 125 |
|---|---|---|---|---|---|---|
| Raw materials of solid | CaCO$_3$ | 1.8 | 1.7 | 1.6 | — | — |
| solution A obtained by | SrCO$_3$ | 49.9 | 48.3 | 45.4 | — | — |
| dissolving Ca | α-Al$_2$O$_3$ | 36.3 | 35 | 33 | — | — |
| components in α-SrAl$_2$O$_4$ | SiO$_2$ | 0 | 3 | 4 | — | — |
| including various impurity | MgO | 12 | 3 | 4 | — | — |
| components (mass %) | BaO | 0 | 3 | 4 | — | — |
|  | TiO$_2$ | 0 | 3 | 4 | — | — |
|  | Fe$_2$O$_3$ | 0 | 3 | 4 | — | — |
| X value of Ca$_x$Sr$_{1-x}$Al$_2$O$_4$ |  | 0.05 | 0.05 | 0.05 | — | — |
| Crystallite diameter of solid solution A (nm) |  | 62 | 60 | 52 | — | — |
| Blending ratio of solid solution A (mass %) |  | 100 | 100 | 100 | 0 | 0 |
| Raw materials of solid | CaCO$_3$ | — | — | — | 12.5 | 12.5 |
| solution B obtained by | SrCO$_3$ | — | — | — | 43 | 43 |
| dissolving Ca | α-Al$_2$O$_3$ | — | — | — | 42.5 | 42.5 |
| components in β-SrAl$_2$O$_4$ | SiO$_2$ | — | — | — | 2 | 0 |
| including various impurity | MgO | — | — | — | 0 | 2 |
| components (mass %) | BaO | — | — | — | 0 | 0 |
|  | TiO$_2$ | — | — | — | 0 | 0 |
|  | Fe$_2$O$_3$ | — | — | — | 0 | 0 |
| X value of Ca$_x$Sr$_{1-x}$Al$_2$O$_4$ |  | — | — | — | 0.3 | 0.3 |
| Crystallite diameter of solid solution B (nm) |  | — | — | — | 54 | 55 |
| Blending ratio of solid solution B (mass %) |  | 0 | 0 | 0 | 100 | 100 |
| Raw materials of solid | CaCO$_3$ | — | — | — | — | — |
| solution C obtained by | SrCO$_3$ | — | — | — | — | — |
| dissolving Sr | α-Al$_2$O$_3$ | — | — | — | — | — |
| components in CaAl$_2$O$_4$ | SiO$_2$ | — | — | — | — | — |
| including various impurity | MgO | — | — | — | — | — |

TABLE 20-continued

|  |  | Comparative Example 8 | Comparative Example 9 | Comparative Example 10 | Example 124 | Example 125 |
|---|---|---|---|---|---|---|
| components (mass %) | BaO | — | — | — | — | — |
|  | $TiO_2$ | — | — | — | — | — |
|  | $Fe_2O_3$ | — | — | — | — | — |
| X value of $Ca_xSr_{1-x}Al_2O_4$ |  | — | — | — | — | — |
| Crystallite diameter of solid solution C (nm) |  | — | — | — | — | — |
| Blending ratio of solid solution C (mass %) |  | 0 | 0 | 0 | 0 | 0 |
| Blending ratio of $\alpha$-$Al_2O_3$ (mass %)*1 |  | 0 | 0 | 0 | 0 | 0 |
| Measured value | CaO | 1.3 | 1.1 | 0.9 | 8.5 | 8.6 |
| of chemical | SrO | 41.3 | 39.8 | 37.2 | 36.7 | 36.7 |
| components of | $Al_2O_3$ | 43.2 | 41.5 | 38.7 | 52.2 | 52.2 |
| binder (mass %) | Total amount of $SiO_2$, MgO, BaO, $TiO_2$, and $Fe_2O_3$ | 14.1 | 17.5 | 23.1 | 2.5 | 2.4 |
| 15 tap-flow | After mixing | 177 | 180 | 172 | 175 | 174 |
| value (mm) | After 2 hours | 134 | 125 | 118 | 126 | 128 |
| Bending strength after curing of 6 hours (MPa) |  | 0.6 | 1 | 0.7 | 1.4 | 1.3 |
| Bending strength after curing of 12 hours (MPa) |  | 1 | 1.4 | 1.1 | 1.8 | 1.8 |
| Bending strength after curing of 24 hours (MPa) |  | 1.5 | 1.8 | 1.7 | 2.4 | 2.3 |
| Wear amount in rotary corrosion test/mm |  | 6.6 | 7.6 | 8.2 | 6.4 | 6.3 |

Note)
*1 Components other than solid solution and $CaAl_2O_4$

TABLE 21

|  |  | Example 126 | Example 127 | Example 128 | Example 129 | Example 130 |
|---|---|---|---|---|---|---|
| Raw materials of solid solution A obtained by dissolving Ca components in $\alpha$-$SrAl_2O_4$ including various impurity components (mass %) | $CaCO_3$ | — | — | — | — | — |
|  | $SrCO_3$ | — | — | — | — | — |
|  | $\alpha$-$Al_2O_3$ | — | — | — | — | — |
|  | $SiO_2$ | — | — | — | — | — |
|  | MgO | — | — | — | — | — |
|  | BaO | — | — | — | — | — |
|  | $TiO_2$ | — | — | — | — | — |
|  | $Fe_2O_3$ | — | — | — | — | — |
| X value of $Ca_xSr_{1-x}Al_2O_4$ |  | — | — | — | — | — |
| Crystallite diameter of solid solution A (nm) |  | — | — | — | — | — |
| Blending ratio of solid solution A (mass %) |  | 0 | 0 | 0 | 0 | 0 |
| Raw materials of solid solution B obtained by dissolving Ca components in $\beta$-$SrAl_2O_4$ including various impurity components (mass %) | $CaCO_3$ | 12.3 | 12.3 | 12.3 | 12.3 | 12.3 |
|  | $SrCO_3$ | 42.2 | 42.2 | 42.2 | 42.2 | 42.2 |
|  | $\alpha$-$Al_2O_3$ | 41.5 | 41.5 | 41.5 | 41.5 | 41.5 |
|  | $SiO_2$ | 4 | 0 | 0 | 0 | 0 |
|  | MgO | 0 | 4 | 0 | 0 | 0 |
|  | BaO | 0 | 0 | 4 | 0 | 0 |
|  | $TiO_2$ | 0 | 0 | 0 | 4 | 0 |
|  | $Fe_2O_3$ | 0 | 0 | 0 | 0 | 4 |
| X value of $Ca_xSr_{1-x}Al_2O_4$ |  | 0.3 | 0.3 | 0.3 | 0.3 | 0.3 |
| Crystallite diameter of solid solution B (nm) |  | 54 | 56 | 56 | 53 | 53 |
| Blending ratio of solid solution B (mass %) |  | 100 | 100 | 100 | 100 | 100 |
| Raw materials of solid solution C obtained by dissolving Sr components in $CaAl_2O_4$ including various impurity components (mass %) | $CaCO_3$ | — | — | — | — | — |
|  | $SrCO_3$ | — | — | — | — | — |
|  | $\alpha$-$Al_2O_3$ | — | — | — | — | — |
|  | $SiO_2$ | — | — | — | — | — |
|  | MgO | — | — | — | — | — |
|  | BaO | — | — | — | — | — |
|  | $TiO_2$ | — | — | — | — | — |
|  | $Fe_2O_3$ | — | — | — | — | — |
| X value of $Ca_xSr_{1-x}Al_2O_4$ |  | — | — | — | — | — |
| Crystallite diameter of solid solution C (nm) |  | — | — | — | — | — |
| Blending ratio of solid solution C (mass %) |  | 0 | 0 | 0 | 0 | 0 |
| Blending ratio of $\alpha$-$Al_2O_3$ (mass %)*1 |  | 0 | 0 | 0 | 0 | 0 |
| Measured value | CaO | 8.4 | 8.4 | 8.4 | 8.4 | 8.3 |
| of chemical | SrO | 35.9 | 35.9 | 35.9 | 35.9 | 35.9 |
| components of | $Al_2O_3$ | 50.8 | 50.8 | 50.9 | 50.8 | 50.8 |
| binder (mass %) | Total amount of $SiO_2$, MgO, BaO, $TiO_2$, and $Fe_2O_3$ | 4.9 | 4.9 | 4.7 | 4.9 | 5 |
| 15 tap-flow | After mixing | 177 | 173 | 171 | 170 | 170 |
| value (mm) | After 2 hours | 126 | 129 | 125 | 136 | 131 |
| Bending strength after curing of 6 hours (MPa) |  | 1.4 | 1.4 | 1.4 | 1.3 | 1.5 |
| Bending strength after curing of 12 hours (MPa) |  | 1.9 | 1.9 | 1.9 | 1.8 | 1.9 |
| Bending strength after curing of 24 hours (MPa) |  | 2.3 | 2.4 | 2.3 | 2.3 | 2.4 |
| Wear amount in rotary corrosion test/mm |  | 6.5 | 6.3 | 6.3 | 6.4 | 6.7 |

Note)
*1 Components other than solid solution and $CaAl_2O_4$

TABLE 22

|  |  | Example 131 | Example 132 | Example 133 | Example 134 | Example 135 |
|---|---|---|---|---|---|---|
| Raw materials of solid solution A obtained by dissolving Ca components in α-SrAl₂O₄ including various impurity components (mass %) | CaCO₃ | — | — | — | — | — |
|  | SrCO₃ | — | — | — | — | — |
|  | α-Al₂O₃ | — | — | — | — | — |
|  | SiO₂ | — | — | — | — | — |
|  | MgO | — | — | — | — | — |
|  | BaO | — | — | — | — | — |
|  | TiO₂ | — | — | — | — | — |
|  | Fe₂O₃ | — | — | — | — | — |
| X value of Ca$_x$Sr$_{1-x}$Al₂O₄ |  | — | — | — | — | — |
| Crystallite diameter of solid solution A (nm) |  | — | — | — | — | — |
| Blending ratio of solid solution A (mass %) |  | 0 | 0 | 0 | 0 | 0 |
| Raw materials of solid solution B obtained by dissolving Ca components in β-SrAl₂O₄ including various impurity components (mass %) | CaCO₃ | 12.1 | 11.6 | 11.6 | 11.6 | 11.6 |
|  | SrCO₃ | 41.7 | 40 | 40 | 40 | 40 |
|  | α-Al₂O₃ | 41.2 | 39.4 | 39.4 | 39.4 | 39.4 |
|  | SiO₂ | 1 | 9 | 0 | 0 | 0 |
|  | MgO | 1 | 0 | 9 | 0 | 0 |
|  | BaO | 1 | 0 | 0 | 9 | 0 |
|  | TiO₂ | 1 | 0 | 0 | 0 | 9 |
|  | Fe₂O₃ | 1 | 0 | 0 | 0 | 0 |
| X value of Ca$_x$Sr$_{1-x}$Al₂O₄ |  | 0.3 | 0.3 | 0.3 | 0.3 | 0.3 |
| Crystallite diameter of solid solution B (nm) |  | 54 | 52 | 58 | 58 | 52 |
| Blending ratio of solid solution B (mass %) |  | 100 | 100 | 100 | 100 | 100 |
| Raw materials of solid solution C obtained by dissolving Sr components in CaAl₂O₄ including various impurity components (mass %) | CaCO₃ | — | — | — | — | — |
|  | SrCO₃ | — | — | — | — | — |
|  | α-Al₂O₃ | — | — | — | — | — |
|  | SiO₂ | — | — | — | — | — |
|  | MgO | — | — | — | — | — |
|  | BaO | — | — | — | — | — |
|  | TiO₂ | — | — | — | — | — |
|  | Fe₂O₃ | — | — | — | — | — |
| X value of Ca$_x$Sr$_{1-x}$Al₂O₄ |  | — | — | — | — | — |
| Crystallite diameter of solid solution C (nm) |  | — | — | — | — | — |
| Blending ratio of solid solution C (mass %) |  | 0 | 0 | 0 | 0 | 0 |
| Blending ratio of α-Al₂O₃ (mass %)*¹ |  | 0 | 0 | 0 | 0 | 0 |
| Measured value of chemical components of binder (mass %) | CaO | 8.1 | 7.8 | 8 | 7.8 | 7.9 |
|  | SrO | 35.4 | 33.6 | 33.8 | 33.6 | 33.6 |
|  | Al₂O₃ | 50.2 | 47.6 | 47.5 | 47.6 | 47.8 |
|  | Total amount of SiO₂, MgO, BaO, TiO₂, and Fe₂O₃ | 6.3 | 10.8 | 10.7 | 10.8 | 10.6 |
| 15 tap-flow value (mm) | After mixing | 174 | 174 | 172 | 168 | 173 |
|  | After 2 hours | 134 | 133 | 137 | 122 | 131 |
| Bending strength after curing of 6 hours (MPa) |  | 1.5 | 1.4 | 1.4 | 1.5 | 1.3 |
| Bending strength after curing of 12 hours (MPa) |  | 1.9 | 1.8 | 1.7 | 2 | 1.8 |
| Bending strength after curing of 24 hours (MPa) |  | 2.5 | 2.3 | 2.4 | 2.5 | 2.4 |
| Wear amount in rotary corrosion test/mm |  | 6.5 | 6.6 | 6.2 | 6.2 | 6.3 |

Note)
*¹Components other than solid solution and CaAl₂O₄

TABLE 23

|  |  | Example 136 | Example 137 | Comparative Example 11 | Comparative Example 12 | Comparative Example 13 |
|---|---|---|---|---|---|---|
| Raw materials of solid solution A obtained by dissolving Ca components in α-SrAl₂O₄ including various impurity components (mass %) | CaCO₃ | — | — | — | — | — |
|  | SrCO₃ | — | — | — | — | — |
|  | α-Al₂O₃ | — | — | — | — | — |
|  | SiO₂ | — | — | — | — | — |
|  | MgO | — | — | — | — | — |
|  | BaO | — | — | — | — | — |
|  | TiO₂ | — | — | — | — | — |
|  | Fe₂O₃ | — | — | — | — | — |
| X value of Ca$_x$Sr$_{1-x}$Al₂O₄ |  | — | — | — | — | — |
| Crystallite diameter of solid solution A (nm) |  | — | — | — | — | — |
| Blending ratio of solid solution A (mass %) |  | 0 | 0 | 0 | 0 | 0 |
| Raw materials of solid solution B obtained by dissolving Ca components in β-SrAl₂O₄ including various impurity components (mass %) | CaCO₃ | 11.6 | 11.5 | 11.2 | 11.2 | 10.8 |
|  | SrCO₃ | 40 | 39.5 | 38.7 | 38.7 | 37.4 |
|  | α-Al₂O₃ | 39.4 | 39 | 38.1 | 38.1 | 36.8 |
|  | SiO₂ | 0 | 2 | 12 | 0 | 3 |
|  | MgO | 0 | 2 | 0 | 12 | 3 |
|  | BaO | 0 | 2 | 0 | 0 | 3 |
|  | TiO₂ | 0 | 2 | 0 | 0 | 3 |
|  | Fe₂O₃ | 9 | 2 | 0 | 0 | 3 |
| X value of Ca$_x$Sr$_{1-x}$Al₂O₄ |  | 0.3 | 0.3 | 0.3 | 0.3 | 0.3 |
| Crystallite diameter of solid solution B (nm) |  | 50 | 52 | 54 | 56 | 50 |

TABLE 23-continued

| | | Example 136 | Example 137 | Comparative Example 11 | Comparative Example 12 | Comparative Example 13 |
|---|---|---|---|---|---|---|
| Blending ratio of solid solution B (mass %) | | 100 | 100 | 100 | 100 | 100 |
| Raw materials of solid solution C obtained by dissolving Sr components in CaAl$_2$O$_4$ including various impurity components (mass %) | CaCO$_3$ | — | — | — | — | — |
| | SrCO$_3$ | — | — | — | — | — |
| | α-Al$_2$O$_3$ | — | — | — | — | — |
| | SiO$_2$ | — | — | — | — | — |
| | MgO | — | — | — | — | — |
| | BaO | — | — | — | — | — |
| | TiO$_2$ | — | — | — | — | — |
| | Fe$_2$O$_3$ | — | — | — | — | — |
| X value of Ca$_x$Sr$_{1-x}$Al$_2$O$_4$ | | — | — | — | — | — |
| Crystallite diameter of solid solution C (nm) | | — | — | — | — | — |
| Blending ratio of solid solution C (mass %) | | 0 | 0 | 0 | 0 | 0 |
| Blending ratio of α-Al$_2$O$_3$ (mass %)*[1] | | 0 | 0 | 0 | 0 | 0 |
| Measured value of chemical components of binder (mass %) | CaO | 7.8 | 7.8 | 7.5 | 7.6 | 7.2 |
| | SrO | 33.6 | 33.1 | 32.3 | 32.3 | 31 |
| | Al$_2$O$_3$ | 47.6 | 47.1 | 45.6 | 45.7 | 43.9 |
| | Total amount of SiO$_2$, MgO, BaO, TiO$_2$, and Fe$_2$O$_3$ | 10.8 | 12 | 14.5 | 14.3 | 17.8 |
| 15 tap-flow value (mm) | After mixing | 167 | 173 | 169 | 163 | 170 |
| | After 2 hours | 123 | 131 | 140 | 143 | 129 |
| Bending strength after curing of 6 hours (MPa) | | 1.4 | 1.4 | 0.7 | 0.6 | 0.8 |
| Bending strength after curing of 12 hours (MPa) | | 1.8 | 1.9 | 1.2 | 1.1 | 1.2 |
| Bending strength after curing of 24 hours (MPa) | | 2.5 | 2.4 | 1.7 | 1.7 | 1.6 |
| Wear amount in rotary corrosion test/mm | | 6.9 | 6.5 | 7.6 | 6.7 | 7.7 |

Note)
*[1] Components other than solid solution and CaAl$_2$O$_4$

TABLE 24

| | | Comparative Example 14 | Example 138 | Example 139 | Example 140 | Example 141 |
|---|---|---|---|---|---|---|
| Raw materials of solid solution A obtained by dissolving Ca components in α-SrAl$_2$O$_4$ including various impurity components (mass %) | CaCO$_3$ | — | 1.8 | 1.8 | 1.8 | 1.8 |
| | SrCO$_3$ | — | 51.7 | 51.7 | 51.7 | 51.1 |
| | α-Al$_2$O$_3$ | — | 37.5 | 37.5 | 37.5 | 37.1 |
| | SiO$_2$ | — | 9 | 0 | 0 | 2 |
| | MgO | — | 0 | 9 | 0 | 2 |
| | BaO | — | 0 | 0 | 9 | 2 |
| | TiO$_2$ | — | 0 | 0 | 0 | 2 |
| | Fe$_2$O$_3$ | — | 0 | 0 | 0 | 2 |
| X value of Ca$_x$Sr$_{1-x}$Al$_2$O$_4$ | | — | 0.05 | 0.05 | 0.05 | 0.05 |
| Crystallite diameter of solid solution A (nm) | | — | 55 | 63 | 60 | 57 |
| Blending ratio of solid solution A (mass %) | | 0 | 40 | 40 | 40 | 40 |
| Raw materials of solid solution B obtained by dissolving Ca components in β-SrAl$_2$O$_4$ including various impurity components (mass %) | CaCO$_3$ | 10.2 | — | — | — | — |
| | SrCO$_3$ | 35.1 | — | — | — | — |
| | α-Al$_2$O$_3$ | 34.7 | — | — | — | — |
| | SiO$_2$ | 4 | — | — | — | — |
| | MgO | 4 | — | — | — | — |
| | BaO | 4 | — | — | — | — |
| | TiO$_2$ | 4 | — | — | — | — |
| | Fe$_2$O$_3$ | 4 | — | — | — | — |
| X value of Ca$_x$Sr$_{1-x}$Al$_2$O$_4$ | | 0.3 | — | — | — | — |
| Crystallite diameter of solid solution B (nm) | | 48 | — | — | — | — |
| Blending ratio of solid solution B (mass %) | | 100 | 0 | 0 | 0 | 0 |
| Raw materials of solid solution C obtained by dissolving Sr components in CaAl$_2$O$_4$ including various impurity components (mass %) | CaCO$_3$ | — | — | — | — | — |
| | SrCO$_3$ | — | — | — | — | — |
| | α-Al$_2$O$_3$ | — | — | — | — | — |
| | SiO$_2$ | — | — | — | — | — |
| | MgO | — | — | — | — | — |
| | BaO | — | — | — | — | — |
| | TiO$_2$ | — | — | — | — | — |
| | Fe$_2$O$_3$ | — | — | — | — | — |
| X value of Ca$_x$Sr$_{1-x}$Al$_2$O$_4$ | | — | — | — | — | — |
| Crystallite diameter of solid solution C (nm) | | — | — | — | — | — |
| Blending ratio of solid solution C (mass %) | | 0 | 0 | 0 | 0 | 0 |
| Blending ratio of α-Al$_2$O$_3$ (mass %)*[1] | | 0 | 60 | 60 | 60 | 60 |
| Measured value of chemical components of binder (mass %) | CaO | 6.8 | 0.5 | 0.6 | 0.5 | 0.5 |
| | SrO | 28.8 | 17 | 17.2 | 17.2 | 16.8 |
| | Al$_2$O$_3$ | 41 | 78.1 | 78 | 78 | 77.7 |
| | Total amount of SiO$_2$, MgO, BaO, TiO$_2$, and Fe$_2$O$_3$ | 23.3 | 4.3 | 4.2 | 4.3 | 4.9 |
| 15 tap-flow value (mm) | After mixing | 161 | 172 | 174 | 175 | 177 |
| | After 2 hours | 120 | 132 | 137 | 133 | 135 |

TABLE 24-continued

|  |  | Comparative Example 14 | Example 138 | Example 139 | Example 140 | Example 141 |
|---|---|---|---|---|---|---|
| Bending strength after curing of 6 hours (MPa) | | 0.7 | 1.2 | 1.3 | 1.3 | 1.3 |
| Bending strength after curing of 12 hours (MPa) | | 1 | 1.5 | 1.6 | 1.7 | 1.6 |
| Bending strength after curing of 24 hours (MPa) | | 1.4 | 2 | 2.1 | 1.9 | 2.1 |
| Wear amount in rotary corrosion test/mm | | 8.1 | 5.8 | 5.7 | 5.7 | 5.7 |

Note)
*[1] Components other than solid solution and $CaAl_2O_4$

TABLE 25

|  |  | Example 142 | Example 143 | Example 144 | Example 145 | Example 146 |
|---|---|---|---|---|---|---|
| Raw materials of solid solution A obtained by dissolving Ca components in $\alpha$-$SrAl_2O_4$ including various impurity components (mass %) | $CaCO_3$ | 1.7 | 1.6 | — | — | — |
| | $SrCO_3$ | 48.3 | 45.4 | — | — | — |
| | $\alpha$-$Al_2O_3$ | 35 | 33 | — | — | — |
| | $SiO_2$ | 3 | 4 | — | — | — |
| | $MgO$ | 3 | 4 | — | — | — |
| | $BaO$ | 3 | 4 | — | — | — |
| | $TiO_2$ | 3 | 4 | — | — | — |
| | $Fe_2O_3$ | 3 | 4 | — | — | — |
| X value of $Ca_xSr_{1-x}Al_2O_4$ | | 0.05 | 0.05 | — | — | — |
| Crystallite diameter of solid solution A (nm) | | 60 | 52 | — | — | — |
| Blending ratio of solid solution A (mass %) | | 40 | 40 | 0 | 0 | 0 |
| Raw materials of solid solution B obtained by dissolving Ca components in $\beta$-$SrAl_2O_4$ including various impurity components (mass %) | $CaCO_3$ | — | — | 11.6 | 11.6 | 11.6 |
| | $SrCO_3$ | — | — | 40 | 40 | 40 |
| | $\alpha$-$Al_2O_3$ | — | — | 39.4 | 39.4 | 39.4 |
| | $SiO_2$ | — | — | 9 | 0 | 0 |
| | $MgO$ | — | — | 0 | 9 | 0 |
| | $BaO$ | — | — | 0 | 0 | 9 |
| | $TiO_2$ | — | — | 0 | 0 | 0 |
| | $Fe_2O_3$ | — | — | 0 | 0 | 0 |
| X value of $Ca_xSr_{1-x}Al_2O_4$ | | — | — | 0.3 | 0.3 | 0.3 |
| Crystallite diameter of solid solution B (nm) | | — | — | 52 | 58 | 58 |
| Blending ratio of solid solution B (mass %) | | 0 | 0 | 40 | 40 | 40 |
| Raw materials of solid solution C obtained by dissolving Sr components in $CaAl_2O_4$ including various impurity components (mass %) | $CaCO_3$ | — | — | — | — | — |
| | $SrCO_3$ | — | — | — | — | — |
| | $\alpha$-$Al_2O_3$ | — | — | — | — | — |
| | $SiO_2$ | — | — | — | — | — |
| | $MgO$ | — | — | — | — | — |
| | $BaO$ | — | — | — | — | — |
| | $TiO_2$ | — | — | — | — | — |
| | $Fe_2O_3$ | — | — | — | — | — |
| X value of $Ca_xSr_{1-x}Al_2O_4$ | | — | — | — | — | — |
| Crystallite diameter of solid solution C (nm) | | — | — | — | — | — |
| Blending ratio of solid solution C (mass %) | | 0 | 0 | 0 | 0 | 0 |
| Blending ratio of $\alpha$-$Al_2O_3$ (mass %)*[1] | | 60 | 60 | 60 | 60 | 60 |
| Measured value of chemical components of binder (mass %) | CaO | 0.4 | 0.4 | 3 | 3.1 | 3.1 |
| | SrO | 15.8 | 14.6 | 13.3 | 13.4 | 13.5 |
| | $Al_2O_3$ | 76.5 | 75.4 | 79.2 | 78.9 | 79 |
| | Total amount of $SiO_2$, $MgO$, $BaO$, $TiO_2$, and $Fe_2O_3$ | 7.1 | 9.5 | 4.4 | 4.5 | 4.3 |
| 15 tap-flow value (mm) | After mixing | 173 | 171 | 170 | 169 | 172 |
| | After 2 hours | 130 | 133 | 132 | 130 | 131 |
| Bending strength after curing of 6 hours (MPa) | | 1.3 | 1.2 | 1.2 | 1.2 | 1.3 |
| Bending strength after curing of 12 hours (MPa) | | 1.8 | 1.7 | 1.6 | 1.5 | 1.6 |
| Bending strength after curing of 24 hours (MPa) | | 2 | 2.1 | 2 | 2.1 | 2.1 |
| Wear amount in rotary corrosion test/mm | | 6.1 | 6.7 | 5.7 | 5.7 | 5.9 |

Note)
*[1] Components other than solid solution and $CaAl_2O_4$

TABLE 26

|  |  | Example 147 | Example 148 | Example 149 | Example 150 | Example 151 |
|---|---|---|---|---|---|---|
| Raw materials of solid solution A obtained by dissolving Ca components in $\alpha$-$SrAl_2O_4$ | $CaCO_3$ | — | — | — | 1.9 | 1.9 |
| | $SrCO_3$ | — | — | — | 54.5 | 54.5 |
| | $\alpha$-$Al_2O_3$ | — | — | — | 39.6 | 39.6 |
| | $SiO_2$ | — | — | — | 4 | 0 |

TABLE 26-continued

|  |  | Example 147 | Example 148 | Example 149 | Example 150 | Example 151 |
|---|---|---|---|---|---|---|
| including various impurity | MgO | — | — | — | 0 | 4 |
| components (mass %) | BaO | — | — | — | 0 | 0 |
|  | $TiO_2$ | — | — | — | 0 | 0 |
|  | $Fe_2O_3$ | — | — | — | 0 | 0 |
| X value of $Ca_xSr_{1-x}Al_2O_4$ |  | — | — | — | 0.05 | 0.05 |
| Crystallite diameter of solid solution A (nm) |  | — | — | — | 56 | 61 |
| Blending ratio of solid solution A (mass %) |  | 0 | 0 | 0 | 50 | 50 |
| Raw materials of solid | $CaCO_3$ | 11.5 | 10.8 | 10.2 | — | — |
| solution B obtained by | $SrCO_3$ | 39.5 | 37.4 | 35.1 | — | — |
| dissolving Ca | $\alpha\text{-}Al_2O_3$ | 39 | 36.8 | 34.7 | — | — |
| components in $\beta\text{-}SrAl_2O_4$ | $SiO_2$ | 2 | 3 | 4 | — | — |
| including various impurity | MgO | 2 | 3 | 4 | — | — |
| components (mass %) | BaO | 2 | 3 | 4 | — | — |
|  | $TiO_2$ | 2 | 3 | 4 | — | — |
|  | $Fe_2O_3$ | 2 | 3 | 4 | — | — |
| X value of $Ca_xSr_{1-x}Al_2O_4$ |  | 0.3 | 0.3 | 0.3 | — | — |
| Crystallite diameter of solid solution B (nm) |  | 52 | 50 | 48 | — | — |
| Blending ratio of solid solution B (mass %) |  | 40 | 40 | 40 | 0 | 0 |
| Raw materials of solid | $CaCO_3$ | — | — | — | 44.7 | 44.7 |
| solution C obtained by | $SrCO_3$ | — | — | — | 3.4 | 3.4 |
| dissolving Sr | $\alpha\text{-}Al_2O_3$ | — | — | — | 47.9 | 47.9 |
| components in $CaAl_2O_4$ | $SiO_2$ | — | — | — | 4 | 0 |
| including various impurity | MgO | — | — | — | 0 | 4 |
| components (mass %) | BaO | — | — | — | 0 | 0 |
|  | $TiO_2$ | — | — | — | 0 | 0 |
|  | $Fe_2O_3$ | — | — | — | 0 | 0 |
| X value of $Ca_xSr_{1-x}Al_2O_4$ |  | — | — | — | 0.95 | 0.95 |
| Crystallite diameter of solid solution C (nm) |  | — | — | — | 49 | 52 |
| Blending ratio of solid solution C (mass %) |  | 0 | 0 | 0 | 50 | 50 |
| Blending ratio of $\alpha\text{-}Al_2O_3$ (mass %)*[1] |  | 60 | 60 | 60 | 0 | 0 |
| Measured value | CaO | 3.1 | 2.9 | 2.7 | 16.2 | 16.1 |
| of chemical | SrO | 13.1 | 12.4 | 11.5 | 24.9 | 24.9 |
| components of | $Al_2O_3$ | 78.8 | 77.5 | 76.4 | 54.2 | 54.1 |
| binder (mass %) | Total amount of $SiO_2$, MgO, BaO, $TiO_2$, and $Fe_2O_3$ | 4.9 | 7.3 | 9.4 | 4.7 | 4.9 |
| 15 tap-flow | After mixing | 174 | 171 | 174 | 183 | 181 |
| value (mm) | After 2 hours | 131 | 127 | 127 | 137 | 138 |
| Bending strength after curing of 6 hours (MPa) |  | 1.3 | 1.2 | 1.2 | 1.4 | 1.4 |
| Bending strength after curing of 12 hours (MPa) |  | 1.6 | 1.6 | 1.5 | 1.7 | 1.7 |
| Bending strength after curing of 24 hours (MPa) |  | 2 | 2.1 | 1.9 | 2.6 | 2.5 |
| Wear amount in rotary corrosion test/mm |  | 6.1 | 6.4 | 6.9 | 6.7 | 6.6 |

Note)
*[1]Components other than solid solution and $CaAl_2O_4$

TABLE 27

|  |  | Example 152 | Example 153 | Example 154 | Example 155 | Example 156 |
|---|---|---|---|---|---|---|
| Raw materials of solid | $CaCO_3$ | 1.9 | 1.9 | 1.9 | 1.9 | 1.9 |
| solution A obtained by | $SrCO_3$ | 54.5 | 54.5 | 54.5 | 53.9 | 51.7 |
| dissolving Ca | $\alpha\text{-}Al_2O_3$ | 39.6 | 39.6 | 39.6 | 39.2 | 37.5 |
| components in $\alpha\text{-}SrAl_2O_4$ | $SiO_2$ | 0 | 0 | 0 | 1 | 9 |
| including various impurity | MgO | 0 | 0 | 0 | 1 | 0 |
| components (mass %) | BaO | 4 | 0 | 0 | 1 | 0 |
|  | $TiO_2$ | 0 | 4 | 0 | 1 | 0 |
|  | $Fe_2O_3$ | 0 | 0 | 4 | 1 | 0 |
| X value of $Ca_xSr_{1-x}Al_2O_4$ |  | 0.05 | 0.05 | 0.05 | 0.05 | 0.05 |
| Crystallite diameter of solid solution A (nm) |  | 56 | 61 | 56 | 58 | 55 |
| Blending ratio of solid solution A (mass %) |  | 50 | 50 | 50 | 50 | 50 |
| Raw materials of solid | $CaCO_3$ | — | — | — | — | — |
| solution B obtained by | $SrCO_3$ | — | — | — | — | — |
| dissolving Ca | $\alpha\text{-}Al_2O_3$ | — | — | — | — | — |
| components in $\beta\text{-}SrAl_2O_4$ | $SiO_2$ | — | — | — | — | — |
| including various impurity | MgO | — | — | — | — | — |
| components (mass %) | BaO | — | — | — | — | — |
|  | $TiO_2$ | — | — | — | — | — |
|  | $Fe_2O_3$ | — | — | — | — | — |
| X value of $Ca_xSr_{1-x}Al_2O_4$ |  | — | — | — | — | — |
| Crystallite diameter of solid solution B (nm) |  | — | — | — | — | — |
| Blending ratio of solid solution B (mass %) |  | 0 | 0 | 0 | 0 | 0 |
| Raw materials of solid | $CaCO_3$ | 44.7 | 44.7 | 44.7 | 44.2 | 44.3 |
| solution C obtained by | $SrCO_3$ | 3.4 | 3.4 | 3.4 | 3.4 | 3.3 |
| dissolving Sr | $\alpha\text{-}Al_2O_3$ | 47.9 | 47.9 | 47.9 | 47.9 | 45.4 |
| components in $CaAl_2O_4$ | $SiO_2$ | 0 | 0 | 0 | 1 | 9 |

TABLE 27-continued

|  |  | Example 152 | Example 153 | Example 154 | Example 155 | Example 156 |
|---|---|---|---|---|---|---|
| including various impurity components (mass %) | MgO | 0 | 0 | 0 | 1 | 0 |
|  | BaO | 4 | 0 | 0 | 1 | 0 |
|  | $TiO_2$ | 0 | 4 | 0 | 1 | 0 |
|  | $Fe_2O_3$ | 0 | 0 | 4 | 1 | 0 |
| X value of $Ca_xSr_{1-x}Al_2O_4$ |  | 0.95 | 0.95 | 0.95 | 0.95 | 0.95 |
| Crystallite diameter of solid solution C (nm) |  | 51 | 48 | 46 | 49 | 48 |
| Blending ratio of solid solution C (mass %) |  | 50 | 50 | 50 | 50 | 50 |
| Blending ratio of $\alpha$-$Al_2O_3$ (mass %)*[1] |  | 0 | 0 | 0 | 0 | 0 |
| Measured value of chemical components of binder (mass %) | CaO | 16.1 | 16 | 16.1 | 15.9 | 15 |
|  | SrO | 24.9 | 24.9 | 24.7 | 24.6 | 23.2 |
|  | $Al_2O_3$ | 54.1 | 54.3 | 54.1 | 53.4 | 50.7 |
|  | Total amount of $SiO_2$, MgO, BaO, $TiO_2$, and $Fe_2O_3$ | 4.9 | 4.8 | 5 | 6 | 11 |
| 15 tap-flow value (mm) | After mixing | 179 | 184 | 181 | 183 | 180 |
|  | After 2 hours | 137 | 136 | 135 | 134 | 139 |
| Bending strength after curing of 6 hours (MPa) |  | 1.6 | 1.5 | 1.4 | 1.4 | 1.4 |
| Bending strength after curing of 12 hours (MPa) |  | 2 | 1.9 | 1.9 | 1.8 | 1.8 |
| Bending strength after curing of 24 hours (MPa) |  | 2.4 | 2.3 | 2.5 | 2.4 | 2.3 |
| Wear amount in rotary corrosion test/mm |  | 6.9 | 6.6 | 6.7 | 6.9 | 7.1 |

Note)
*[1]Components other than solid solution and $CaAl_2O_4$

TABLE 28

|  |  | Example 157 | Example 158 | Example 159 | Example 160 | Example 161 |
|---|---|---|---|---|---|---|
| Raw materials of solid solution A obtained by dissolving Ca components in $\alpha$-$SrAl_2O_4$ including various impurity components (mass %) | $CaCO_3$ | 1.8 | 1.8 | 1.8 | 1.8 | 1.8 |
|  | $SrCO_3$ | 51.7 | 51.7 | 51.7 | 51.7 | 51.1 |
|  | $\alpha$-$Al_2O_3$ | 37.5 | 37.5 | 37.5 | 37.5 | 37.1 |
|  | $SiO_2$ | 0 | 0 | 0 | 0 | 2 |
|  | MgO | 9 | 0 | 0 | 0 | 2 |
|  | BaO | 0 | 9 | 0 | 0 | 2 |
|  | $TiO_2$ | 0 | 0 | 9 | 0 | 2 |
|  | $Fe_2O_3$ | 0 | 0 | 0 | 9 | 2 |
| X value of $Ca_xSr_{1-x}Al_2O_4$ |  | 0.05 | 0.05 | 0.05 | 0.05 | 0.05 |
| Crystallite diameter of solid solution A (nm) |  | 63 | 60 | 55 | 54 | 57 |
| Blending ratio of solid solution A (mass %) |  | 50 | 50 | 50 | 50 | 50 |
| Raw materials of solid solution B obtained by dissolving Ca components in $\beta$-$SrAl_2O_4$ including various impurity components (mass %) | $CaCO_3$ | — | — | — | — | — |
|  | $SrCO_3$ | — | — | — | — | — |
|  | $\alpha$-$Al_2O_3$ | — | — | — | — | — |
|  | $SiO_2$ | — | — | — | — | — |
|  | MgO | — | — | — | — | — |
|  | BaO | — | — | — | — | — |
|  | $TiO_2$ | — | — | — | — | — |
|  | $Fe_2O_3$ | — | — | — | — | — |
| X value of $Ca_xSr_{1-x}Al_2O_4$ |  | — | — | — | — | — |
| Crystallite diameter of solid solution B (nm) |  | — | — | — | — | — |
| Blending ratio of solid solution B (mass %) |  | 0 | 0 | 0 | 0 | 0 |
| Raw materials of solid solution C obtained by dissolving Sr components in $CaAl_2O_4$ including various impurity components (mass %) | $CaCO_3$ | 42.3 | 42.3 | 42.3 | 42.3 | 42.3 |
|  | $SrCO_3$ | 3.3 | 3.3 | 3.3 | 3.3 | 3.2 |
|  | $\alpha$-$Al_2O_3$ | 45.4 | 45.4 | 45.4 | 45.4 | 44.9 |
|  | $SiO_2$ | 0 | 0 | 0 | 0 | 2 |
|  | MgO | 9 | 0 | 0 | 0 | 2 |
|  | BaO | 0 | 9 | 0 | 0 | 2 |
|  | $TiO_2$ | 0 | 0 | 9 | 0 | 2 |
|  | $Fe_2O_3$ | 0 | 0 | 0 | 9 | 2 |
| X value of $Ca_xSr_{1-x}Al_2O_4$ |  | 0.95 | 0.95 | 0.95 | 0.95 | 0.95 |
| Crystallite diameter of solid solution C (nm) |  | 53 | 54 | 48 | 44 | 46 |
| Blending ratio of solid solution C (mass %) |  | 50 | 50 | 50 | 50 | 50 |
| Blending ratio of $\alpha$-$Al_2O_3$ (mass %)*[1] |  | 0 | 0 | 0 | 0 | 0 |
| Measured value of chemical components of binder (mass %) | CaO | 15 | 14.9 | 15.2 | 15 | 14.9 |
|  | SrO | 23.3 | 23.4 | 23.3 | 23.3 | 23 |
|  | $Al_2O_3$ | 50.6 | 50.6 | 50.7 | 50.6 | 50.1 |
|  | Total amount of $SiO_2$, MgO, BaO, $TiO_2$, and $Fe_2O_3$ | 10.9 | 11 | 10.7 | 10.9 | 11.9 |
| 15 tap-flow value (mm) | After mixing | 184 | 181 | 178 | 182 | 180 |
|  | After 2 hours | 138 | 125 | 140 | 130 | 134 |
| Bending strength after curing of 6 hours (MPa) |  | 1.4 | 1.5 | 1.3 | 1.4 | 1.4 |
| Bending strength after curing of 12 hours (MPa) |  | 1.7 | 1.9 | 1.7 | 1.7 | 1.8 |
| Bending strength after curing of 24 hours (MPa) |  | 2.4 | 2.5 | 2.4 | 2.4 | 2.5 |
| Wear amount in rotary corrosion test/mm |  | 6.8 | 6.8 | 6.9 | 7.1 | 6.9 |

Note)
*[1]Components other than solid solution and $CaAl_2O_4$

TABLE 29

|  |  | Comparative Example 15 | Comparative Example 16 | Comparative Example 17 | Comparative Example 18 | Example 162 |
|---|---|---|---|---|---|---|
| Raw materials of solid solution A obtained by dissolving Ca components in α-SrAl$_2$O$_4$ including various impurity components (mass %) | CaCO$_3$ | 1.8 | 1.8 | 1.7 | 1.6 | — |
|  | SrCO$_3$ | 49.9 | 49.9 | 48.3 | 45.4 | — |
|  | α-Al$_2$O$_3$ | 36.3 | 36.3 | 35 | 33 | — |
|  | SiO$_2$ | 12 | 0 | 3 | 4 | — |
|  | MgO | 0 | 12 | 3 | 4 | — |
|  | BaO | 0 | 0 | 3 | 4 | — |
|  | TiO$_2$ | 0 | 0 | 3 | 4 | — |
|  | Fe$_2$O$_3$ | 0 | 0 | 3 | 4 | — |
| X value of Ca$_x$Sr$_{1-x}$Al$_2$O$_4$ |  | 0.05 | 0.05 | 0.05 | 0.05 | — |
| Crystallite diameter of solid solution A (nm) |  | 54 | 62 | 60 | 52 | — |
| Blending ratio of solid solution A (mass %) |  | 50 | 50 | 50 | 50 | 0 |
| Raw materials of solid solution B obtained by dissolving Ca components in β-SrAl$_2$O$_4$ including various impurity components (mass %) | CaCO$_3$ | — | — | — | — | 12.3 |
|  | SrCO$_3$ | — | — | — | — | 42.2 |
|  | α-Al$_2$O$_3$ | — | — | — | — | 41.5 |
|  | SiO$_2$ | — | — | — | — | 4 |
|  | MgO | — | — | — | — | 0 |
|  | BaO | — | — | — | — | 0 |
|  | TiO$_2$ | — | — | — | — | 0 |
|  | Fe$_2$O$_3$ | — | — | — | — | 0 |
| X value of Ca$_x$Sr$_{1-x}$Al$_2$O$_4$ |  | — | — | — | — | 0.3 |
| Crystallite diameter of solid solution B (nm) |  | — | — | — | — | 54 |
| Blending ratio of solid solution B (mass %) |  | 0 | 0 | 0 | 0 | 50 |
| Raw materials of solid solution C obtained by dissolving Sr components in CaAl$_2$O$_4$ including various impurity components (mass %) | CaCO$_3$ | 40.9 | 40.9 | 39.6 | 37.3 | 44.7 |
|  | SrCO$_3$ | 3.2 | 3.2 | 3.1 | 2.9 | 3.4 |
|  | α-Al$_2$O$_3$ | 43.9 | 43.9 | 42.3 | 39.8 | 47.9 |
|  | SiO$_2$ | 12 | 0 | 3 | 4 | 4 |
|  | MgO | 0 | 12 | 3 | 4 | 0 |
|  | BaO | 0 | 0 | 3 | 4 | 0 |
|  | TiO$_2$ | 0 | 0 | 3 | 4 | 0 |
|  | Fe$_2$O$_3$ | 0 | 0 | 3 | 4 | 0 |
| X value of Ca$_x$Sr$_{1-x}$Al$_2$O$_4$ |  | 0.95 | 0.95 | 0.95 | 0.95 | 0.95 |
| Crystallite diameter of solid solution C (nm) |  | 46 | 49 | 47 | 45 | 49 |
| Blending ratio of solid solution C (mass %) |  | 50 | 50 | 50 | 50 | 50 |
| Blending ratio of α-Al$_2$O$_3$ (mass %)*[1] |  | 0 | 0 | 0 | 0 | 0 |
| Measured value of chemical components of binder (mass %) | CaO | 14.5 | 14.3 | 14 | 12.9 | 19.8 |
|  | SrO | 22.4 | 22.5 | 21.6 | 19.9 | 19.7 |
|  | Al$_2$O$_3$ | 48.6 | 48.6 | 46.5 | 43.3 | 55.5 |
|  | Total amount of SiO$_2$, MgO, BaO, TiO$_2$, and Fe$_2$O$_3$ | 14.5 | 14.5 | 17.8 | 23.8 | 5 |
| 15 tap-flow value (mm) | After mixing | 176 | 169 | 178 | 166 | 174 |
|  | After 2 hours | 126 | 121 | 129 | 123 | 130 |
| Bending strength after curing of 6 hours (MPa) |  | 0.6 | 0.5 | 0.7 | 0.6 | 1.3 |
| Bending strength after curing of 12 hours (MPa) |  | 0.9 | 0.7 | 1 | 1 | 1.7 |
| Bending strength after curing of 24 hours (MPa) |  | 1.1 | 1 | 1.3 | 1.3 | 2.5 |
| Wear amount in rotary corrosion test/mm |  | 7.5 | 7 | 7.6 | 8 | 6.2 |

Note)
*[1]Components other than solid solution and CaAl$_2$O$_4$

TABLE 30

|  |  | Example 163 | Example 164 | Example 165 | Example 166 | Example 167 |
|---|---|---|---|---|---|---|
| Raw materials of solid solution A obtained by dissolving Ca components in α-SrAl$_2$O$_4$ including various impurity components (mass %) | CaCO$_3$ | — | — | — | — | — |
|  | SrCO$_3$ | — | — | — | — | — |
|  | α-Al$_2$O$_3$ | — | — | — | — | — |
|  | SiO$_2$ | — | — | — | — | — |
|  | MgO | — | — | — | — | — |
|  | BaO | — | — | — | — | — |
|  | TiO$_2$ | — | — | — | — | — |
|  | Fe$_2$O$_3$ | — | — | — | — | — |
| X value of Ca$_x$Sr$_{1-x}$Al$_2$O$_4$ |  | — | — | — | — | — |
| Crystallite diameter of solid solution A (nm) |  | — | — | — | — | — |
| Blending ratio of solid solution A (mass %) |  | 0 | 0 | 0 | 0 | 0 |
| Raw materials of solid solution B obtained by dissolving Ca components in β-SrAl$_2$O$_4$ including various impurity components (mass %) | CaCO$_3$ | 12.3 | 12.3 | 12.3 | 12.3 | 12.1 |
|  | SrCO$_3$ | 42.2 | 42.2 | 42.2 | 42.2 | 41.7 |
|  | α-Al$_2$O$_3$ | 41.5 | 41.5 | 41.5 | 41.5 | 41.2 |
|  | SiO$_2$ | 0 | 0 | 0 | 0 | 1 |
|  | MgO | 4 | 0 | 0 | 0 | 1 |
|  | BaO | 0 | 4 | 0 | 0 | 1 |
|  | TiO$_2$ | 0 | 0 | 4 | 0 | 1 |
|  | Fe$_2$O$_3$ | 0 | 0 | 0 | 4 | 1 |
| X value of Ca$_x$Sr$_{1-x}$Al$_2$O$_4$ |  | 0.3 | 0.3 | 0.3 | 0.3 | 0.3 |
| Crystallite diameter of solid solution B (nm) |  | 56 | 56 | 53 | 53 | 54 |

TABLE 30-continued

|  |  | Example 163 | Example 164 | Example 165 | Example 166 | Example 167 |
|---|---|---|---|---|---|---|
| Blending ratio of solid solution B (mass %) | | 50 | 50 | 50 | 50 | 50 |
| Raw materials of solid solution C obtained by dissolving Sr components in CaAl$_2$O$_4$ including various impurity components (mass %) | CaCO$_3$ | 44.7 | 44.7 | 44.7 | 44.7 | 44.2 |
| | SrCO$_3$ | 3.4 | 3.4 | 3.4 | 3.4 | 3.4 |
| | α-Al$_2$O$_3$ | 47.9 | 47.9 | 47.9 | 47.9 | 47.4 |
| | SiO$_2$ | 0 | 0 | 0 | 0 | 1 |
| | MgO | 4 | 0 | 0 | 0 | 1 |
| | BaO | 0 | 4 | 0 | 0 | 1 |
| | TiO$_2$ | 0 | 0 | 4 | 0 | 1 |
| | Fe$_2$O$_3$ | 0 | 0 | 0 | 4 | 1 |
| X value of Ca$_x$Sr$_{1-x}$Al$_2$O$_4$ | | 0.95 | 0.95 | 0.95 | 0.95 | 0.95 |
| Crystallite diameter of solid solution C (nm) | | 52 | 51 | 48 | 46 | 49 |
| Blending ratio of solid solution C (mass %) | | 50 | 50 | 50 | 50 | 50 |
| Blending ratio of α-Al$_2$O$_3$ (mass %)*[1] | | 0 | 0 | 0 | 0 | 0 |
| Measured value of chemical components of binder (mass %) | CaO | 19.9 | 19.8 | 19.6 | 19.6 | 19.5 |
| | SrO | 19.5 | 19.7 | 19.8 | 19.5 | 19.5 |
| | Al$_2$O$_3$ | 55.6 | 55.7 | 55.5 | 55.8 | 54.8 |
| | Total amount of SiO$_2$, MgO, BaO, TiO$_2$, and Fe$_2$O$_3$ | 4.9 | 4.8 | 5 | 5.1 | 6.1 |
| 15 tap-flow value (mm) | After mixing | 176 | 171 | 175 | 174 | 176 |
| | After 2 hours | 131 | 129 | 134 | 131 | 131 |
| Bending strength after curing of 6 hours (MPa) | | 1.3 | 1.4 | 1.3 | 1.4 | 1.4 |
| Bending strength after curing of 12 hours (MPa) | | 1.7 | 1.8 | 1.7 | 1.8 | 1.9 |
| Bending strength after curing of 24 hours (MPa) | | 2.6 | 2.5 | 2.5 | 2.5 | 2.6 |
| Wear amount in rotary corrosion test/mm | | 6.1 | 6.2 | 6.2 | 6.7 | 6.3 |

Note)
*[1]Components other than solid solution and CaAl$_2$O$_4$

TABLE 31

|  |  | Example 168 | Example 169 | Example 170 | Example 171 | Example 172 |
|---|---|---|---|---|---|---|
| Raw materials of solid solution A obtained by dissolving Ca components in α-SrAl$_2$O$_4$ including various impurity components (mass %) | CaCO$_3$ | — | — | — | — | — |
| | SrCO$_3$ | — | — | — | — | — |
| | α-Al$_2$O$_3$ | — | — | — | — | — |
| | SiO$_2$ | — | — | — | — | — |
| | MgO | — | — | — | — | — |
| | BaO | — | — | — | — | — |
| | TiO$_2$ | — | — | — | — | — |
| | Fe$_2$O$_3$ | — | — | — | — | — |
| X value of Ca$_x$Sr$_{1-x}$Al$_2$O$_4$ | | — | — | — | — | — |
| Crystallite diameter of solid solution A (nm) | | — | — | — | — | — |
| Blending ratio of solid solution A (mass %) | | 0 | 0 | 0 | 0 | 0 |
| Raw materials of solid solution B obtained by dissolving Ca components in β-SrAl$_2$O$_4$ including various impurity components (mass %) | CaCO$_3$ | 11.6 | 11.6 | 11.6 | 11.6 | 11.6 |
| | SrCO$_3$ | 40 | 40 | 40 | 40 | 40 |
| | α-Al$_2$O$_3$ | 39.4 | 39.4 | 39.4 | 39.4 | 39.4 |
| | SiO$_2$ | 9 | 0 | 0 | 0 | 0 |
| | MgO | 0 | 9 | 0 | 0 | 0 |
| | BaO | 0 | 0 | 9 | 0 | 0 |
| | TiO$_2$ | 0 | 0 | 0 | 9 | 0 |
| | Fe$_2$O$_3$ | 0 | 0 | 0 | 0 | 9 |
| X value of Ca$_x$Sr$_{1-x}$Al$_2$O$_4$ | | 0.3 | 0.3 | 0.3 | 0.3 | 0.3 |
| Crystallite diameter of solid solution B (nm) | | 52 | 58 | 58 | 52 | 50 |
| Blending ratio of solid solution B (mass %) | | 50 | 50 | 50 | 50 | 50 |
| Raw materials of solid solution C obtained by dissolving Sr components in CaAl$_2$O$_4$ including various impurity components (mass %) | CaCO$_3$ | 42.3 | 42.3 | 42.3 | 42.3 | 42.3 |
| | SrCO$_3$ | 3.3 | 3.3 | 3.3 | 3.3 | 3.3 |
| | α-Al$_2$O$_3$ | 45.4 | 45.4 | 45.4 | 45.4 | 45.4 |
| | SiO$_2$ | 9 | 0 | 0 | 0 | 0 |
| | MgO | 0 | 9 | 0 | 0 | 0 |
| | BaO | 0 | 0 | 9 | 0 | 0 |
| | TiO$_2$ | 0 | 0 | 0 | 9 | 0 |
| | Fe$_2$O$_3$ | 0 | 0 | 0 | 0 | 9 |
| X value of Ca$_x$Sr$_{1-x}$Al$_2$O$_4$ | | 0.95 | 0.95 | 0.95 | 0.95 | 0.95 |
| Crystallite diameter of solid solution C (nm) | | 48 | 53 | 54 | 48 | 44 |
| Blending ratio of solid solution C (mass %) | | 50 | 50 | 50 | 50 | 50 |
| Blending ratio of α-Al$_2$O$_3$ (mass %)*[1] | | 0 | 0 | 0 | 0 | 0 |
| Measured value of chemical components of binder (mass %) | CaO | 18.5 | 18.5 | 18.4 | 18.5 | 18.4 |
| | SrO | 18.2 | 18.3 | 18.3 | 18.4 | 18.4 |
| | Al$_2$O$_3$ | 52.1 | 52.1 | 52.3 | 52 | 51.9 |
| | Total amount of SiO$_2$, MgO, BaO, TiO$_2$, and Fe$_2$O$_3$ | 11.1 | 11 | 10.9 | 11 | 11.2 |
| 15 tap-flow value (mm) | After mixing | 173 | 177 | 170 | 169 | 173 |
| | After 2 hours | 133 | 134 | 127 | 139 | 133 |
| Bending strength after curing of 6 hours (MPa) | | 1.3 | 1.3 | 1.4 | 1.2 | 1.2 |
| Bending strength after curing of 12 hours (MPa) | | 1.8 | 1.7 | 1.9 | 1.7 | 1.7 |

TABLE 31-continued

|  | Example 168 | Example 169 | Example 170 | Example 171 | Example 172 |
|---|---|---|---|---|---|
| Bending strength after curing of 24 hours (MPa) | 2.6 | 2.5 | 2.5 | 2.4 | 2.4 |
| Wear amount in rotary corrosion test/mm | 6.5 | 6.3 | 6.4 | 6.5 | 7 |

Note)
*[1] Components other than solid solution and $CaAl_2O_4$

TABLE 32

|  |  | Example 173 | Comparative Example 19 | Comparative Example 20 | Comparative Example 21 | Comparative Example 22 |
|---|---|---|---|---|---|---|
| Raw materials of solid solution A obtained by dissolving Ca components in α-$SrAl_2O_4$ including various impurity components (mass %) | $CaCO_3$ | — | — | — | — | — |
|  | $SrCO_3$ | — | — | — | — | — |
|  | α-$Al_2O_3$ | — | — | — | — | — |
|  | $SiO_2$ | — | — | — | — | — |
|  | MgO | — | — | — | — | — |
|  | BaO | — | — | — | — | — |
|  | $TiO_2$ | — | — | — | — | — |
|  | $Fe_2O_3$ | — | — | — | — | — |
| X value of $Ca_xSr_{1-x}Al_2O_4$ |  | — | — | — | — | — |
| Crystallite diameter of solid solution A (nm) |  | — | — | — | — | — |
| Blending ratio of solid solution A (mass %) |  | 0 | 0 | 0 | 0 | 0 |
| Raw materials of solid solution B obtained by dissolving Ca components in β-$SrAl_2O_4$ including various impurity components (mass %) | $CaCO_3$ | 11.5 | 11.2 | 11.2 | 10.8 | 10.2 |
|  | $SrCO_3$ | 39.5 | 38.7 | 38.7 | 37.4 | 35.1 |
|  | α-$Al_2O_3$ | 39 | 38.1 | 38.1 | 36.8 | 34.7 |
|  | $SiO_2$ | 2 | 12 | 0 | 3 | 4 |
|  | MgO | 2 | 0 | 12 | 3 | 4 |
|  | BaO | 2 | 0 | 0 | 3 | 4 |
|  | $TiO_2$ | 2 | 0 | 0 | 3 | 4 |
|  | $Fe_2O_3$ | 2 | 0 | 0 | 3 | 4 |
| X value of $Ca_xSr_{1-x}Al_2O_4$ |  | 0.3 | 0.3 | 0.3 | 0.3 | 0.3 |
| Crystallite diameter of solid solution B (nm) |  | 52 | 54 | 56 | 50 | 48 |
| Blending ratio of solid solution B (mass %) |  | 50 | 50 | 50 | 50 | 50 |
| Raw materials of solid solution C obtained by dissolving Sr components in $CaAl_2O_4$ including various impurity components (mass %) | $CaCO_3$ | 41.9 | 40.9 | 40.9 | 39.6 | 37.3 |
|  | $SrCO_3$ | 3.2 | 3.2 | 3.2 | 3.1 | 2.9 |
|  | α-$Al_2O_3$ | 44.9 | 43.9 | 43.9 | 42.3 | 39.8 |
|  | $SiO_2$ | 2 | 12 | 0 | 3 | 4 |
|  | MgO | 2 | 0 | 12 | 3 | 4 |
|  | BaO | 2 | 0 | 0 | 3 | 4 |
|  | $TiO_2$ | 2 | 0 | 0 | 3 | 4 |
|  | $Fe_2O_3$ | 2 | 0 | 0 | 3 | 4 |
| X value of $Ca_xSr_{1-x}Al_2O_4$ |  | 0.95 | 0.95 | 0.95 | 0.95 | 0.95 |
| Crystallite diameter of solid solution C (nm) |  | 46 | 46 | 49 | 47 | 45 |
| Blending ratio of solid solution C (mass %) |  | 50 | 50 | 50 | 50 | 50 |
| Blending ratio of α-$Al_2O_3$ (mass %)*[1] |  | 0 | 0 | 0 | 0 | 0 |
| Measured value of chemical components of binder (mass %) | CaO | 18.3 | 17.7 | 17.9 | 17 | 15.8 |
|  | SrO | 18.1 | 17.6 | 17.7 | 17.1 | 15.8 |
|  | $Al_2O_3$ | 51.4 | 50 | 49.7 | 47.8 | 44.7 |
|  | Total amount of $SiO_2$, MgO, BaO, $TiO_2$, and $Fe_2O_3$ | 12 | 14.6 | 14.6 | 18 | 23.7 |
| 15 tap-flow value (mm) | After mixing | 172 | 167 | 162 | 170 | 164 |
|  | After 2 hours | 131 | 132 | 127 | 126 | 120 |
| Bending strength after curing of 6 hours (MPa) |  | 1.3 | 0.6 | 0.5 | 0.6 | 0.6 |
| Bending strength after curing of 12 hours (MPa) |  | 1.8 | 0.9 | 0.8 | 0.9 | 0.8 |
| Bending strength after curing of 24 hours (MPa) |  | 2.5 | 1.3 | 1.3 | 1.4 | 1.2 |
| Wear amount in rotary corrosion test/mm |  | 6.8 | 7.5 | 7.1 | 7.7 | 8.1 |

Note)
*[1] Components other than solid solution and $CaAl_2O_4$

TABLE 33

|  |  | Example 174 | Example 175 | Example 176 | Example 177 | Example 178 |
|---|---|---|---|---|---|---|
| Raw materials of solid solution A obtained by dissolving Ca components in α-$SrAl_2O_4$ including various impurity | $CaCO_3$ | 1.9 | 1.9 | 1.9 | 1.9 | 1.9 |
|  | $SrCO_3$ | 54.5 | 54.5 | 54.5 | 54.5 | 54.5 |
|  | α-$Al_2O_3$ | 39.6 | 39.6 | 39.6 | 39.6 | 39.6 |
|  | $SiO_2$ | 4 | 0 | 0 | 0 | 0 |
|  | MgO | 0 | 4 | 0 | 0 | 0 |

TABLE 33-continued

|  |  | Example 174 | Example 175 | Example 176 | Example 177 | Example 178 |
|---|---|---|---|---|---|---|
| components (mass %) | BaO | 0 | 0 | 4 | 0 | 0 |
|  | $TiO_2$ | 0 | 0 | 0 | 4 | 0 |
|  | $Fe_2O_3$ | 0 | 0 | 0 | 0 | 4 |
| X value of $Ca_xSr_{1-x}Al_2O_4$ |  | 0.05 | 0.05 | 0.05 | 0.05 | 0.05 |
| Crystallite diameter of solid solution A (nm) |  | 56 | 61 | 56 | 61 | 56 |
| Blending ratio of solid solution A (mass %) |  | 50 | 50 | 50 | 50 | 50 |
| Raw materials of solid | $CaCO_3$ | 12.3 | 12.3 | 12.3 | 12.3 | 12.3 |
| solution B obtained by | $SrCO_3$ | 42.2 | 42.2 | 42.2 | 42.2 | 42.2 |
| dissolving Ca | $\alpha\text{-}Al_2O_3$ | 41.5 | 41.5 | 41.5 | 41.5 | 41.5 |
| components in $\beta\text{-}SrAl_2O_4$ | $SiO_2$ | 4 | 0 | 0 | 0 | 0 |
| including various impurity | MgO | 0 | 4 | 0 | 0 | 0 |
| components (mass %) | BaO | 0 | 0 | 4 | 0 | 0 |
|  | $TiO_2$ | 0 | 0 | 0 | 4 | 0 |
|  | $Fe_2O_3$ | 0 | 0 | 0 | 0 | 4 |
| X value of $Ca_xSr_{1-x}Al_2O_4$ |  | 0.3 | 0.3 | 0.3 | 0.3 | 0.3 |
| Crystallite diameter of solid solution B (nm) |  | 54 | 56 | 56 | 53 | 53 |
| Blending ratio of solid solution B (mass %) |  | 50 | 50 | 50 | 50 | 50 |
| Raw materials of solid | $CaCO_3$ | — | — | — | — | — |
| solution C obtained by | $SrCO_3$ | — | — | — | — | — |
| dissolving Sr | $\alpha\text{-}Al_2O_3$ | — | — | — | — | — |
| components in $CaAl_2O_4$ | $SiO_2$ | — | — | — | — | — |
| including various impurity | MgO | — | — | — | — | — |
| components (mass %) | BaO | — | — | — | — | — |
|  | $TiO_2$ | — | — | — | — | — |
|  | $Fe_2O_3$ | — | — | — | — | — |
| X value of $Ca_xSr_{1-x}Al_2O_4$ |  | — | — | — | — | — |
| Crystallite diameter of solid solution C (nm) |  | — | — | — | — | — |
| Blending ratio of solid solution C (mass %) |  | 0 | 0 | 0 | 0 | 0 |
| Blending ratio of $\alpha\text{-}Al_2O_3$ (mass %)*[1] |  | 0 | 0 | 0 | 0 | 0 |
| Measured value | CaO | 4.8 | 4.9 | 4.8 | 4.8 | 4.7 |
| of chemical | SrO | 41 | 41 | 40.9 | 40.9 | 41.1 |
| components of | $Al_2O_3$ | 49.4 | 49.4 | 49.4 | 49.6 | 49.4 |
| binder (mass %) | Total amount of $SiO_2$, MgO, BaO, $TiO_2$, and $Fe_2O_3$ | 4.7 | 4.6 | 4.8 | 4.6 | 4.8 |
| 15 tap-flow | After mixing | 173 | 175 | 170 | 173 | 170 |
| value (mm) | After 2 hours | 127 | 130 | 125 | 131 | 134 |
| Bending strength after curing of 6 hours (MPa) |  | 1.4 | 1.5 | 1.4 | 1.3 | 1.5 |
| Bending strength after curing of 12 hours (MPa) |  | 1.9 | 1.9 | 1.9 | 1.8 | 1.8 |
| Bending strength after curing of 24 hours (MPa) |  | 2.3 | 2.4 | 2.3 | 2.4 | 2.3 |
| Wear amount in rotary corrosion test/mm |  | 6.6 | 6.5 | 6.6 | 6.5 | 6.8 |

Note)
*[1]Components other than solid solution and $CaAl_2O_4$

TABLE 34

|  |  | Example 179 | Example 180 | Example 181 | Example 182 | Example 183 |
|---|---|---|---|---|---|---|
| Raw materials of solid | $CaCO_3$ | 1.9 | 1.8 | 1.8 | 1.8 | 591.8 |
| solution A obtained by | $SrCO_3$ | 53.9 | 51.7 | 51.7 | 51.7 | 51.7 |
| dissolving Ca | $\alpha\text{-}Al_2O_3$ | 39.2 | 37.5 | 37.5 | 37.5 | 37.5 |
| components in $\alpha\text{-}SrAl_2O_4$ | $SiO_2$ | 1 | 9 | 0 | 0 | 0 |
| including various impurity | MgO | 1 | 0 | 9 | 0 | 0 |
| components (mass %) | BaO | 1 | 0 | 0 | 9 | 0 |
|  | $TiO_2$ | 1 | 0 | 0 | 0 | 9 |
|  | $Fe_2O_3$ | 1 | 0 | 0 | 0 | 0 |
| X value of $Ca_xSr_{1-x}Al_2O_4$ |  | 0.05 | 0.05 | 0.05 | 0.05 | 0.05 |
| Crystallite diameter of solid solution A (nm) |  | 58 | 55 | 63 | 60 | 55 |
| Blending ratio of solid solution A (mass %) |  | 50 | 50 | 50 | 50 | 50 |
| Raw materials of solid | $CaCO_3$ | 12.1 | 11.6 | 11.6 | 11.6 | 11.6 |
| solution B obtained by | $SrCO_3$ | 41.7 | 40 | 40 | 40 | 40 |
| dissolving Ca | $\alpha\text{-}Al_2O_3$ | 41.2 | 39.4 | 39.4 | 39.4 | 39.4 |
| components in $\beta\text{-}SrAl_2O_4$ | $SiO_2$ | 1 | 9 | 0 | 0 | 0 |
| including various impurity | MgO | 1 | 0 | 9 | 0 | 0 |
| components (mass %) | BaO | 1 | 0 | 0 | 9 | 0 |
|  | $TiO_2$ | 1 | 0 | 0 | 0 | 9 |
|  | $Fe_2O_3$ | 1 | 0 | 0 | 0 | 0 |
| X value of $Ca_xSr_{1-x}Al_2O_4$ |  | 0.3 | 0.3 | 0.3 | 0.3 | 0.3 |
| Crystallite diameter of solid solution B (nm) |  | 54 | 52 | 58 | 58 | 52 |
| Blending ratio of solid solution B (mass %) |  | 50 | 50 | 50 | 50 | 50 |
| Raw materials of solid | $CaCO_3$ | — | — | — | — | — |
| solution C obtained by | $SrCO_3$ | — | — | — | — | — |
| dissolving Sr | $\alpha\text{-}Al_2O_3$ | — | — | — | — | — |
| components in $CaAl_2O_4$ | $SiO_2$ | — | — | — | — | — |
| including various impurity | MgO | — | — | — | — | — |

TABLE 34-continued

|  |  | Example 179 | Example 180 | Example 181 | Example 182 | Example 183 |
|---|---|---|---|---|---|---|
| components (mass %) | BaO | — | — | — | — | — |
|  | $TiO_2$ | — | — | — | — | — |
|  | $Fe_2O_3$ | — | — | — | — | — |
| X value of $Ca_xSr_{1-x}Al_2O_4$ |  | — | — | — | — | — |
| Crystallite diameter of solid solution C (nm) |  | — | — | — | — | — |
| Blending ratio of solid solution C (mass %) |  | 0 | 0 | 0 | 0 | 0 |
| Blending ratio of as $\alpha$-$Al_2O_3$ (mass %)*[1] |  | 0 | 0 | 0 | 0 | 0 |
| Measured value of chemical components of binder (mass %) | CaO | 4.7 | 4.4 | 4.5 | 4.5 | 4.5 |
|  | SrO | 40.3 | 38.4 | 38.4 | 38.4 | 38.4 |
|  | $Al_2O_3$ | 49 | 46.4 | 46.2 | 46.3 | 46.3 |
|  | Total amount of $SiO_2$, MgO, BaO, $TiO_2$, and $Fe_2O_3$ | 5.9 | 10.7 | 10.9 | 10.8 | 10.8 |
| 15 tap-flow value (mm) | After mixing | 175 | 170 | 173 | 169 | 172 |
|  | After 2 hours | 135 | 137 | 135 | 126 | 139 |
| Bending strength after curing of 6 hours (MPa) |  | 1.5 | 1.4 | 1.4 | 1.5 | 1.3 |
| Bending strength after curing of 12 hours (MPa) |  | 1.9 | 1.8 | 1.9 | 1.9 | 1.8 |
| Bending strength after curing of 24 hours (MPa) |  | 2.5 | 2.3 | 2.4 | 2.5 | 2.3 |
| Wear amount in rotary corrosion test/mm |  | 6.7 | 6.9 | 6.7 | 6.7 | 6.7 |

Note)
*[1]Components other than solid solution and $CaAl_2O_4$

TABLE 35

|  |  | Example 184 | Example 185 | Comparative Example 23 | Comparative Example 24 | Comparative Example 25 |
|---|---|---|---|---|---|---|
| Raw materials of solid solution A obtained by dissolving Ca components in $\alpha$-$SrAl_2O_4$ including various impurity components (mass %) | $CaCO_3$ | 1.8 | 1.8 | 1.8 | 1.8 | 1.7 |
|  | $SrCO_3$ | 51.7 | 51.1 | 49.9 | 49.9 | 48.3 |
|  | $\alpha$-$Al_2O_3$ | 37.5 | 37.1 | 36.3 | 36.3 | 35 |
|  | $SiO_2$ | 0 | 2 | 12 | 0 | 3 |
|  | MgO | 0 | 2 | 0 | 12 | 3 |
|  | BaO | 0 | 2 | 0 | 0 | 3 |
|  | $TiO_2$ | 0 | 2 | 0 | 0 | 3 |
|  | $Fe_2O_3$ | 9 | 2 | 0 | 0 | 3 |
| X value of $Ca_xSr_{1-x}Al_2O_4$ |  | 0.05 | 0.05 | 0.05 | 0.05 | 0.05 |
| Crystallite diameter of solid solution A (nm) |  | 54 | 57 | 54 | 62 | 60 |
| Blending ratio of solid solution A (mass %) |  | 50 | 50 | 50 | 50 | 50 |
| Raw materials of solid solution B obtained by dissolving Ca components in $\beta$-$SrAl_2O_4$ including various impurity components (mass %) | $CaCO_3$ | 11.6 | 11.5 | 11.2 | 11.2 | 10.8 |
|  | $SrCO_3$ | 40 | 39.5 | 38.7 | 38.7 | 37.4 |
|  | $\alpha$-$Al_2O_3$ | 39.4 | 39 | 38.1 | 38.1 | 36.8 |
|  | $SiO_2$ | 0 | 2 | 12 | 0 | 3 |
|  | MgO | 0 | 2 | 0 | 12 | 3 |
|  | BaO | 0 | 2 | 0 | 0 | 3 |
|  | $TiO_2$ | 0 | 2 | 0 | 0 | 3 |
|  | $Fe_2O_3$ | 9 | 2 | 0 | 0 | 3 |
| X value of $Ca_xSr_{1-x}Al_2O_4$ |  | 0.3 | 0.3 | 0.3 | 0.3 | 0.3 |
| Crystallite diameter of solid solution B (nm) |  | 50 | 52 | 54 | 56 | 50 |
| Blending ratio of solid solution B (mass %) |  | 50 | 50 | 50 | 50 | 50 |
| Raw materials of solid solution C obtained by dissolving Sr components in $CaAl_2O_4$ including various impurity components (mass %) | $CaCO_3$ | — | — | — | — | — |
|  | $SrCO_3$ | — | — | — | — | — |
|  | $\alpha$-$Al_2O_3$ | — | — | — | — | — |
|  | $SiO_2$ | — | — | — | — | — |
|  | MgO | — | — | — | — | — |
|  | BaO | — | — | — | — | — |
|  | $TiO_2$ | — | — | — | — | — |
|  | $Fe_2O_3$ | — | — | — | — | — |
| X value of $Ca_xSr_{1-x}Al_2O_4$ |  | — | — | — | — | — |
| Crystallite diameter of solid solution C (nm) |  | — | — | — | — | — |
| Blending ratio of solid solution C (mass %) |  | 0 | 0 | 0 | 0 | 0 |
| Blending ratio of $\alpha$-$Al_2O_3$ (mass %)*[1] |  | 0 | 0 | 0 | 0 | 0 |
| Measured value of chemical components of binder (mass %) | CaO | 4.3 | 4.4 | 4.3 | 4.3 | 4.1 |
|  | SrO | 38.5 | 37.9 | 36.9 | 36.8 | 35.3 |
|  | $Al_2O_3$ | 46.1 | 45.7 | 44.3 | 44.6 | 42.6 |
|  | Total amount of $SiO_2$, MgO, BaO, $TiO_2$, and $Fe_2O_3$ | 11 | 11.9 | 14.4 | 14.2 | 17.9 |
| 15 tap-flow value (mm) | After mixing | 167 | 172 | 167 | 164 | 172 |
|  | After 2 hours | 134 | 136 | 130 | 135 | 132 |
| Bending strength after curing of 6 hours (MPa) |  | 1.3 | 1.4 | 0.6 | 0.5 | 0.7 |
| Bending strength after curing of 12 hours (MPa) |  | 1.8 | 1.9 | 0.9 | 0.8 | 1 |
| Bending strength after curing of 24 hours (MPa) |  | 2.4 | 2.3 | 1.3 | 1.3 | 1.4 |
| Wear amount in rotary corrosion test/mm |  | 7.1 | 6.9 | 7.2 | 6.9 | 7.3 |

Note)
*[1]Components other than solid solution and $CaAl_2O_4$

TABLE 36

|  |  | Comparative Example 26 | Example 186 | Example 187 | Example 188 | Example 189 |
|---|---|---|---|---|---|---|
| Raw materials of solid solution A obtained by dissolving Ca components in α-SrAl$_2$O$_4$ including various impurity components (mass %) | CaCO$_3$ | 1.6 | 1.9 | 1.9 | 1.9 | 1.9 |
|  | SrCO$_3$ | 45.4 | 54.5 | 54.5 | 54.5 | 54.5 |
|  | α-Al$_2$O$_3$ | 33 | 39.6 | 39.6 | 39.6 | 39.6 |
|  | SiO$_2$ | 4 | 4 | 0 | 0 | 0 |
|  | MgO | 4 | 0 | 4 | 0 | 0 |
|  | BaO | 4 | 0 | 0 | 4 | 0 |
|  | TiO$_2$ | 4 | 0 | 0 | 0 | 4 |
|  | Fe$_2$O$_3$ | 4 | 0 | 0 | 0 | 0 |
| X value of Ca$_x$Sr$_{1-x}$Al$_2$O$_4$ |  | 0.05 | 0.05 | 0.05 | 0.05 | 0.05 |
| Crystallite diameter of solid solution A (nm) |  | 52 | 56 | 61 | 56 | 61 |
| Blending ratio of solid solution A (mass %) |  | 50 | 35 | 35 | 35 | 35 |
| Raw materials of solid solution B obtained by dissolving Ca components in β-SrAl$_2$O$_4$ including various impurity components (mass %) | CaCO$_3$ | 10.2 | 12.3 | 12.3 | 12.3 | 12.3 |
|  | SrCO$_3$ | 35.1 | 42.2 | 42.2 | 42.2 | 42.2 |
|  | α-Al$_2$O$_3$ | 34.7 | 41.5 | 41.5 | 41.5 | 41.5 |
|  | SiO$_2$ | 4 | 4 | 0 | 0 | 0 |
|  | MgO | 4 | 0 | 4 | 0 | 0 |
|  | BaO | 4 | 0 | 0 | 4 | 0 |
|  | TiO$_2$ | 4 | 0 | 0 | 0 | 4 |
|  | Fe$_2$O$_3$ | 4 | 0 | 0 | 0 | 0 |
| X value of Ca$_x$Sr$_{1-x}$Al$_2$O$_4$ |  | 0.3 | 0.3 | 0.3 | 0.3 | 0.3 |
| Crystallite diameter of solid solution B (nm) |  | 48 | 54 | 56 | 56 | 53 |
| Blending ratio of solid solution B (mass %) |  | 50 | 35 | 35 | 35 | 35 |
| Raw materials of solid solution C obtained by dissolving Sr components in CaAl$_2$O$_4$ including various impurity components (mass %) | CaCO$_3$ | — | 44.7 | 44.7 | 44.7 | 44.7 |
|  | SrCO$_3$ | — | 3.4 | 3.4 | 3.4 | 3.4 |
|  | α-Al$_2$O$_3$ | — | 47.9 | 47.9 | 47.9 | 47.9 |
|  | SiO$_2$ | — | 4 | 0 | 0 | 0 |
|  | MgO | — | 0 | 4 | 0 | 0 |
|  | BaO | — | 0 | 0 | 4 | 0 |
|  | TiO$_2$ | — | 0 | 0 | 0 | 4 |
|  | Fe$_2$O$_3$ | — | 0 | 0 | 0 | 0 |
| X value of Ca$_x$Sr$_{1-x}$Al$_2$O$_4$ |  | — | 0.95 | 0.95 | 0.95 | 0.95 |
| Crystallite diameter of solid solution C (nm) |  | — | 49 | 52 | 51 | 48 |
| Blending ratio of solid solution C (mass %) |  | 0 | 30 | 30 | 30 | 30 |
| Blending ratio of α-Al$_2$O$_3$ (mass %)*[1] |  | 0 | 0 | 0 | 0 | 0 |
| Measured value of chemical components of binder (mass %) | CaO | 3.8 | 12.6 | 12.5 | 12.8 | 12.7 |
|  | SrO | 32.7 | 29.7 | 29.8 | 29.6 | 29.8 |
|  | Al$_2$O$_3$ | 39.9 | 52.6 | 52.7 | 52.7 | 52.6 |
|  | Total amount of SiO$_2$, MgO, BaO, TiO$_2$, and Fe$_2$O$_3$ | 23.5 | 5 | 4.9 | 4.8 | 4.8 |
| 15 tap-flow value (mm) | After mixing | 165 | 166 | 169 | 163 | 170 |
|  | After 2 hours | 122 | 134 | 136 | 128 | 135 |
| Bending strength after curing of 6 hours (MPa) |  | 0.5 | 1.4 | 1.4 | 1.5 | 1.3 |
| Bending strength after curing of 12 hours (MPa) |  | 0.9 | 1.7 | 1.8 | 1.8 | 1.6 |
| Bending strength after curing of 24 hours (MPa) |  | 1.3 | 2.6 | 2.6 | 2.5 | 2.6 |
| Wear amount in rotary corrosion test/mm |  | 7.5 | 6.7 | 6.8 | 6.7 | 6.6 |

Note)
*[1] Components other than solid solution and CaAl$_2$O$_4$

TABLE 37

|  |  | Example 190 | Example 191 | Example 192 | Example 193 | Example 194 |
|---|---|---|---|---|---|---|
| Raw materials of solid solution A obtained by dissolving Ca components in α-SrAl$_2$O$_4$ including various impurity components (mass %) | CaCO$_3$ | 1.9 | 1.9 | 1.8 | 1.8 | 1.8 |
|  | SrCO$_3$ | 54.5 | 53.9 | 51.7 | 51.7 | 51.7 |
|  | α-Al$_2$O$_3$ | 39.6 | 39.2 | 37.5 | 37.5 | 37.5 |
|  | SiO$_2$ | 0 | 1 | 9 | 0 | 0 |
|  | MgO | 0 | 1 | 0 | 9 | 0 |
|  | BaO | 0 | 1 | 0 | 0 | 9 |
|  | TiO$_2$ | 0 | 1 | 0 | 0 | 0 |
|  | Fe$_2$O$_3$ | 4 | 1 | 0 | 0 | 0 |
| X value of Ca$_x$Sr$_{1-x}$Al$_2$O$_4$ |  | 0.05 | 0.05 | 0.05 | 0.05 | 0.05 |
| Crystallite diameter of solid solution A (nm) |  | 56 | 58 | 55 | 63 | 60 |
| Blending ratio of solid solution A (mass %) |  | 35 | 35 | 35 | 35 | 35 |
| Raw materials of solid solution B obtained by dissolving Ca components in β-SrAl$_2$O$_4$ including various impurity components (mass %) | CaCO$_3$ | 12.3 | 12.1 | 11.6 | 11.6 | 11.6 |
|  | SrCO$_3$ | 42.2 | 41.7 | 40 | 40 | 40 |
|  | α-Al$_2$O$_3$ | 41.5 | 41.2 | 39.4 | 39.4 | 39.4 |
|  | SiO$_2$ | 0 | 1 | 9 | 0 | 0 |
|  | MgO | 0 | 1 | 0 | 9 | 0 |
|  | BaO | 0 | 1 | 0 | 0 | 9 |
|  | TiO$_2$ | 0 | 1 | 0 | 0 | 0 |
|  | Fe$_2$O$_3$ | 4 | 1 | 0 | 0 | 0 |
| X value of Ca$_x$Sr$_{1-x}$Al$_2$O$_4$ |  | 0.3 | 0.3 | 0.3 | 0.3 | 0.3 |
| Crystallite diameter of solid solution B (nm) |  | 53 | 54 | 52 | 58 | 58 |

TABLE 37-continued

|  |  | Example 190 | Example 191 | Example 192 | Example 193 | Example 194 |
|---|---|---|---|---|---|---|
| Blending ratio of solid solution B (mass %) | | 35 | 35 | 35 | 35 | 35 |
| Raw materials of solid solution C obtained by dissolving Sr components in $CaAl_2O_4$ including various impurity components (mass %) | $CaCO_3$ | 44.7 | 44.2 | 42.3 | 42.3 | 42.3 |
| | $SrCO_3$ | 3.4 | 3.4 | 3.3 | 3.3 | 3.3 |
| | $\alpha\text{-}Al_2O_3$ | 47.9 | 47.4 | 45.4 | 45.4 | 45.4 |
| | $SiO_2$ | 0 | 1 | 9 | 0 | 0 |
| | MgO | 0 | 1 | 0 | 9 | 0 |
| | BaO | 0 | 1 | 0 | 0 | 9 |
| | $TiO_2$ | 0 | 1 | 0 | 0 | 0 |
| | $Fe_2O_3$ | 4 | 1 | 0 | 0 | 0 |
| X value of $Ca_xSr_{1-x}Al_2O_4$ | | 0.95 | 0.95 | 0.95 | 0.95 | 0.95 |
| Crystallite diameter of solid solution C (nm) | | 46 | 49 | 48 | 53 | 54 |
| Blending ratio of solid solution C (mass %) | | 30 | 30 | 30 | 30 | 30 |
| Blending ratio of $\alpha\text{-}Al_2O_3$ (mass %)*1 | | 0 | 0 | 0 | 0 | 0 |
| Measured value of chemical components of binder (mass %) | CaO | 12.6 | 12.4 | 11.8 | 11.8 | 11.9 |
| | SrO | 29.8 | 29.3 | 27.9 | 27.9 | 27.9 |
| | $Al_2O_3$ | 52.5 | 51.9 | 49.3 | 49.3 | 49.3 |
| | Total amount of $SiO_2$, MgO, BaO, $TiO_2$, and $Fe_2O_3$ | 5 | 6.3 | 10.9 | 10.9 | 10.8 |
| 15 tap-flow value (mm) | After mixing | 168 | 171 | 170 | 172 | 163 |
| | After 2 hours | 134 | 135 | 137 | 136 | 124 |
| Bending strength after curing of 6 hours (MPa) | | 1.4 | 1.4 | 1.3 | 1.3 | 1.5 |
| Bending strength after curing of 12 hours (MPa) | | 1.7 | 1.8 | 1.7 | 1.6 | 1.9 |
| Bending strength after curing of 24 hours (MPa) | | 2.7 | 2.6 | 2.5 | 2.4 | 2.5 |
| Wear amount in rotary corrosion test/mm | | 7 | 6.8 | 7 | 6.5 | 6.8 |

Note)
*1Components other than solid solution and $CaAl_2O_4$

TABLE 38

|  |  | Example 195 | Example 196 | Example 197 | Comparative Example 27 | Comparative Example 28 |
|---|---|---|---|---|---|---|
| Raw materials of solid solution A obtained by dissolving Ca components in $\alpha\text{-}SrAl_2O_4$ including various impurity components (mass %) | $CaCO_3$ | 1.8 | 1.8 | 1.8 | 1.8 | 1.8 |
| | $SrCO_3$ | 51.7 | 51.7 | 51.1 | 49.9 | 49.9 |
| | $\alpha\text{-}Al_2O_3$ | 37.5 | 37.5 | 37.1 | 36.3 | 36.3 |
| | $SiO_2$ | 0 | 0 | 2 | 12 | 0 |
| | MgO | 0 | 0 | 2 | 0 | 12 |
| | BaO | 0 | 0 | 2 | 0 | 0 |
| | $TiO_2$ | 9 | 0 | 2 | 0 | 0 |
| | $Fe_2O_3$ | 0 | 9 | 2 | 0 | 0 |
| X value of $Ca_xSr_{1-x}Al_2O_4$ | | 0.05 | 0.05 | 0.05 | 0.05 | 0.05 |
| Crystallite diameter of solid solution A (nm) | | 55 | 54 | 57 | 54 | 62 |
| Blending ratio of solid solution A (mass %) | | 35 | 35 | 35 | 35 | 35 |
| Raw materials of solid solution B obtained by dissolving Ca components in $\beta\text{-}SrAl_2O_4$ including various impurity components (mass %) | $CaCO_3$ | 11.6 | 11.6 | 11.5 | 11.2 | 11.2 |
| | $SrCO_3$ | 40 | 40 | 39.5 | 38.7 | 38.7 |
| | $\alpha\text{-}Al_2O_3$ | 39.4 | 39.4 | 39 | 38.1 | 38.1 |
| | $SiO_2$ | 0 | 0 | 2 | 12 | 0 |
| | MgO | 0 | 0 | 2 | 0 | 12 |
| | BaO | 0 | 0 | 2 | 0 | 0 |
| | $TiO_2$ | 9 | 0 | 2 | 0 | 0 |
| | $Fe_2O_3$ | 0 | 9 | 2 | 0 | 0 |
| X value of $Ca_xSr_{1-x}Al_2O_4$ | | 0.3 | 0.3 | 0.3 | 0.3 | 0.3 |
| Crystallite diameter of solid solution B (nm) | | 52 | 50 | 52 | 54 | 56 |
| Blending ratio of solid solution B (mass %) | | 35 | 35 | 35 | 35 | 35 |
| Raw materials of solid solution C obtained by dissolving Sr components in $CaAl_2O_4$ including various impurity components (mass %) | $CaCO_3$ | 42.3 | 42.3 | 41.9 | 40.9 | 40.9 |
| | $SrCO_3$ | 3.3 | 3.3 | 3.2 | 3.2 | 3.2 |
| | $\alpha\text{-}Al_2O_3$ | 45.4 | 45.4 | 44.9 | 43.9 | 43.9 |
| | $SiO_2$ | 0 | 0 | 2 | 12 | 0 |
| | MgO | 0 | 0 | 2 | 0 | 12 |
| | BaO | 0 | 0 | 2 | 0 | 0 |
| | $TiO_2$ | 9 | 0 | 2 | 0 | 0 |
| | $Fe_2O_3$ | 0 | 9 | 2 | 0 | 0 |
| X value of $Ca_xSr_{1-x}Al_2O_4$ | | 0.95 | 0.95 | 0.95 | 0.95 | 0.95 |
| Crystallite diameter of solid solution C (nm) | | 48 | 44 | 46 | 46 | 49 |
| Blending ratio of solid solution C (mass %) | | 30 | 30 | 30 | 30 | 30 |
| Blending ratio of $\alpha\text{-}Al_2O_3$ (mass %)*1 | | 0 | 0 | 0 | 0 | 0 |
| Measured value of chemical components of binder (mass %) | CaO | 11.8 | 11.8 | 11.7 | 11.4 | 11.3 |
| | SrO | 27.9 | 27.9 | 27.5 | 26.6 | 26.7 |
| | $Al_2O_3$ | 49.3 | 49.3 | 48.7 | 47.2 | 47.4 |
| | Total amount of $SiO_2$, MgO, BaO, $TiO_2$, and $Fe_2O_3$ | 10.9 | 10.9 | 12 | 14.7 | 14.5 |
| 15 tap-flow value (mm) | After mixing | 170 | 166 | 168 | 166 | 161 |
| | After 2 hours | 140 | 138 | 137 | 141 | 131 |
| Bending strength after curing of 6 hours (MPa) | | 1.3 | 1.3 | 1.4 | 0.6 | 0.5 |

TABLE 38-continued

|  | Example 195 | Example 196 | Example 197 | Comparative Example 27 | Comparative Example 28 |
|---|---|---|---|---|---|
| Bending strength after curing of 12 hours (MPa) | 1.6 | 1.6 | 1.7 | 0.9 | 0.8 |
| Bending strength after curing of 24 hours (MPa) | 2.5 | 2.6 | 2.4 | 1.4 | 1.2 |
| Wear amount in rotary corrosion test/mm | 6.7 | 7.1 | 7 | 7.6 | 7.1 |

Note)
*[1] Components other than solid solution and $CaAl_2O_4$

TABLE 39

|  |  | Comparative Example 29 | Comparative Example 30 | Example 198 | Example 199 | Example 200 |
|---|---|---|---|---|---|---|
| Raw materials of solid solution A obtained by dissolving Ca components in α-$SrAl_2O_4$ including various impurity components (mass %) | $CaCO_3$ | 1.7 | 1.6 | 1.8 | 1.8 | 1.8 |
|  | $SrCO_3$ | 48.3 | 45.4 | 51.7 | 51.7 | 51.7 |
|  | α-$Al_2O_3$ | 35 | 33 | 37.5 | 37.5 | 37.5 |
|  | $SiO_2$ | 3 | 4 | 9 | 0 | 0 |
|  | MgO | 3 | 4 | 0 | 9 | 0 |
|  | BaO | 3 | 4 | 0 | 0 | 9 |
|  | $TiO_2$ | 3 | 4 | 0 | 0 | 0 |
|  | $Fe_2O_3$ | 3 | 4 | 0 | 0 | 0 |
| X value of $Ca_xSr_{1-x}Al_2O_4$ |  | 0.05 | 0.05 | 0.05 | 0.05 | 0.05 |
| Crystallite diameter of solid solution A (nm) |  | 60 | 52 | 55 | 63 | 60 |
| Blending ratio of solid solution A (mass %) |  | 35 | 35 | 20 | 20 | 20 |
| Raw materials of solid solution B obtained by dissolving Ca components in β-$SrAl_2O_4$ including various impurity components (mass %) | $CaCO_3$ | 10.8 | 10.2 | — | — | — |
|  | $SrCO_3$ | 37.4 | 35.1 | — | — | — |
|  | α-$Al_2O_3$ | 36.8 | 34.7 | — | — | — |
|  | $SiO_2$ | 3 | 4 | — | — | — |
|  | MgO | 3 | 4 | — | — | — |
|  | BaO | 3 | 4 | — | — | — |
|  | $TiO_2$ | 3 | 4 | — | — | — |
|  | $Fe_2O_3$ | 3 | 4 | — | — | — |
| X value of $Ca_xSr_{1-x}Al_2O_4$ |  | 0.3 | 0.3 | — | — | — |
| Crystallite diameter of solid solution B (nm) |  | 50 | 48 | — | — | — |
| Blending ratio of solid solution B (mass %) |  | 35 | 35 | 0 | 0 | 0 |
| Raw materials of solid solution C obtained by dissolving Sr components in $CaAl_2O_4$ including various impurity components (mass %) | $CaCO_3$ | 39.6 | 37.3 | 42.3 | 42.3 | 42.3 |
|  | $SrCO_3$ | 3.1 | 2.9 | 3.3 | 3.3 | 3.3 |
|  | α-$Al_2O_3$ | 42.3 | 39.8 | 45.4 | 45.4 | 45.4 |
|  | $SiO_2$ | 3 | 4 | 9 | 0 | 0 |
|  | MgO | 3 | 4 | 0 | 9 | 0 |
|  | BaO | 3 | 4 | 0 | 0 | 9 |
|  | $TiO_2$ | 3 | 4 | 0 | 0 | 0 |
|  | $Fe_2O_3$ | 3 | 4 | 0 | 0 | 0 |
| X value of $Ca_xSr_{1-x}Al_2O_4$ |  | 0.95 | 0.95 | 0.95 | 0.95 | 0.95 |
| Crystallite diameter of solid solution C (nm) |  | 47 | 45 | 48 | 53 | 54 |
| Blending ratio of solid solution C (mass %) |  | 30 | 30 | 20 | 20 | 20 |
| Blending ratio of α-$Al_2O_3$ (mass %)*[1] |  | 0 | 0 | 60 | 60 | 60 |
| Measured value of chemical components of binder (mass %) | CaO | 10.9 | 10.2 | 5.9 | 6 | 6 |
|  | SrO | 25.6 | 23.7 | 9.3 | 9.3 | 9.3 |
|  | $Al_2O_3$ | 45.2 | 42.3 | 80.2 | 80.2 | 80.4 |
|  | Total amount of $SiO_2$, MgO, BaO, $TiO_2$, and $Fe_2O_3$ | 18.2 | 23.7 | 4.5 | 4.4 | 4.3 |
| 15 tap-flow value (mm) | After mixing | 167 | 160 | 172 | 170 | 168 |
|  | After 2 hours | 130 | 123 | 138 | 140 | 133 |
| Bending strength after curing of 6 hours (MPa) |  | 0.6 | 0.5 | 1.3 | 1.4 | 1.2 |
| Bending strength after curing of 12 hours (MPa) |  | 0.9 | 0.8 | 1.6 | 1.7 | 1.6 |
| Bending strength after curing of 24 hours (MPa) |  | 1.3 | 1.1 | 2.2 | 2 | 2.1 |
| Wear amount in rotary corrosion test/mm |  | 7.6 | 8 | 5.8 | 5.7 | 5.7 |

Note)
*[1] Components other than solid solution and $CaAl_2O_4$

TABLE 40

|  |  | Example 201 | Example 202 | Example 203 | Example 204 | Example 205 |
|---|---|---|---|---|---|---|
| Raw materials of solid solution A obtained by dissolving Ca components in α-$SrAl_2O_4$ including various impurity | $CaCO_3$ | 1.8 | 1.7 | 1.6 | — | — |
|  | $SrCO_3$ | 51.1 | 48.3 | 45.4 | — | — |
|  | α-$Al_2O_3$ | 37.1 | 35 | 33 | — | — |
|  | $SiO_2$ | 2 | 3 | 4 | — | — |
|  | MgO | 2 | 3 | 4 | — | — |

TABLE 40-continued

|  |  | Example 201 | Example 202 | Example 203 | Example 204 | Example 205 |
|---|---|---|---|---|---|---|
| components (mass %) | BaO | 2 | 3 | 4 | — | — |
|  | $TiO_2$ | 2 | 3 | 4 | — | — |
|  | $Fe_2O_3$ | 2 | 3 | 4 | — | — |
| X value of $Ca_xSr_{1-x}Al_2O_4$ |  | 0.05 | 0.05 | 0.05 | — | — |
| Crystallite diameter of solid solution A (nm) |  | 57 | 60 | 52 | — | — |
| Blending ratio of solid solution A (mass %) |  | 20 | 20 | 20 | 0 | 0 |
| Raw materials of solid | $CaCO_3$ | — | — | — | 11.6 | 11.6 |
| solution B obtained by | $SrCO_3$ | — | — | — | 40 | 40 |
| dissolving Ca | $\alpha\text{-}Al_2O_3$ | — | — | — | 39.4 | 39.4 |
| components in $\beta\text{-}SrAl_2O_4$ | $SiO_2$ | — | — | — | 9 | 0 |
| including various impurity | MgO | — | — | — | 0 | 9 |
| components (mass %) | BaO | — | — | — | 0 | 0 |
|  | $TiO_2$ | — | — | — | 0 | 0 |
|  | $Fe_2O_3$ | — | — | — | 0 | 0 |
| X value of $Ca_xSr_{1-x}Al_2O_4$ |  | — | — | — | 0.3 | 0.3 |
| Crystallite diameter of solid solution B (nm) |  | — | — | — | 52 | 58 |
| Blending ratio of solid solution B (mass %) |  | 0 | 0 | 0 | 20 | 20 |
| Raw materials of solid | $CaCO_3$ | 41.9 | 39.6 | 37.3 | 42.3 | 42.3 |
| solution C obtained by | $SrCO_3$ | 3.2 | 3.1 | 2.9 | 3.3 | 3.3 |
| dissolving Sr | $\alpha\text{-}Al_2O_3$ | 44.9 | 42.3 | 39.8 | 45.4 | 45.4 |
| components in $CaAl_2O_4$ | $SiO_2$ | 2 | 3 | 4 | 9 | 0 |
| including various impurity | MgO | 2 | 3 | 4 | 0 | 9 |
| components (mass %) | BaO | 2 | 3 | 4 | 0 | 0 |
|  | $TiO_2$ | 2 | 3 | 4 | 0 | 0 |
|  | $Fe_2O_3$ | 2 | 3 | 4 | 0 | 0 |
| X value of $Ca_xSr_{1-x}Al_2O_4$ |  | 0.95 | 0.95 | 0.95 | 0.95 | 0.95 |
| Crystallite diameter of solid solution C (nm) |  | 46 | 47 | 45 | 48 | 53 |
| Blending ratio of solid solution C (mass %) |  | 20 | 20 | 20 | 20 | 20 |
| Blending ratio of $\alpha\text{-}Al_2O_3$ (mass %)[*1] |  | 60 | 60 | 60 | 60 | 60 |
| Measured value | CaO | 5.9 | 5.6 | 5.4 | 7.4 | 7.4 |
| of chemical | SrO | 9.1 | 8.4 | 7.8 | 7.3 | 7.5 |
| components of | $Al_2O_3$ | 80.1 | 78.8 | 77.1 | 80.8 | 80.7 |
| binder (mass %) | Total amount of $SiO_2$, MgO, BaO, $TiO_2$, and $Fe_2O_3$ | 4.8 | 7.1 | 9.6 | 4.4 | 4.3 |
| 15 tap-flow | After mixing | 173 | 167 | 166 | 168 | 170 |
| value (mm) | After 2 hours | 140 | 134 | 130 | 135 | 139 |
| Bending strength after curing of 6 hours (MPa) |  | 1.3 | 1.2 | 1.1 | 1.1 | 1.2 |
| Bending strength after curing of 12 hours (MPa) |  | 1.7 | 1.6 | 1.5 | 1.6 | 1.8 |
| Bending strength after curing of 24 hours (MPa) |  | 2 | 2 | 2.1 | 2.2 | 2 |
| Wear amount in rotary corrosion test/mm |  | 5.9 | 6.2 | 6.6 | 5.9 | 5.7 |

Note)
[*1] Components other than solid solution and $CaAl_2O_4$

TABLE 41

|  |  | Example 206 | Example 207 | Example 208 | Example 209 | Example 210 |
|---|---|---|---|---|---|---|
| Raw materials of solid | $CaCO_3$ | — | — | — | — | 1.8 |
| solution A obtained by | $SrCO_3$ | — | — | — | — | 51.7 |
| dissolving Ca | $\alpha\text{-}Al_2O_3$ | — | — | — | — | 37.5 |
| components in $\alpha\text{-}SrAl_2O_4$ | $SiO_2$ | — | — | — | — | 9 |
| including various impurity | MgO | — | — | — | — | 0 |
| components (mass %) | BaO | — | — | — | — | 0 |
|  | $TiO_2$ | — | — | — | — | 0 |
|  | $Fe_2O_3$ | — | — | — | — | 0 |
| X value of $Ca_xSr_{1-x}Al_2O_4$ |  | — | — | — | — | 0.05 |
| Crystallite diameter of solid solution A (nm) |  | — | — | — | — | 55 |
| Blending ratio of solid solution A (mass %) |  | 0 | 0 | 0 | 0 | 20 |
| Raw materials of solid | $CaCO_3$ | 11.6 | 11.5 | 10.8 | 10.2 | 11.6 |
| solution B obtained by | $SrCO_3$ | 40 | 39.5 | 37.4 | 35.1 | 40 |
| dissolving Ca | $\alpha\text{-}Al_2O_3$ | 39.4 | 39 | 36.8 | 34.7 | 39.4 |
| components in $\beta\text{-}SrAl_2O_4$ | $SiO_2$ | 0 | 2 | 3 | 4 | 9 |
| including various impurity | MgO | 0 | 2 | 3 | 4 | 0 |
| components (mass %) | BaO | 9 | 2 | 3 | 4 | 0 |
|  | $TiO_2$ | 0 | 2 | 3 | 4 | 0 |
|  | $Fe_2O_3$ | 0 | 2 | 3 | 4 | 0 |
| X value of $Ca_xSr_{1-x}Al_2O_4$ |  | 0.3 | 0.3 | 0.3 | 0.3 | 0.3 |
| Crystallite diameter of solid solution B (nm) |  | 58 | 52 | 50 | 48 | 52 |
| Blending ratio of solid solution B (mass %) |  | 20 | 20 | 20 | 20 | 20 |
| Raw materials of solid | $CaCO_3$ | 42.3 | 41.9 | 39.6 | 37.3 | — |
| solution C obtained by | $SrCO_3$ | 3.3 | 3.2 | 3.1 | 2.9 | — |
| dissolving Sr | $\alpha\text{-}Al_2O_3$ | 45.4 | 44.9 | 42.3 | 39.8 | — |
| components in $CaAl_2O_4$ | $SiO_2$ | 0 | 2 | 3 | 4 | — |
| including various impurity | MgO | 0 | 2 | 3 | 4 | — |

TABLE 41-continued

|  |  | Example 206 | Example 207 | Example 208 | Example 209 | Example 210 |
|---|---|---|---|---|---|---|
| components (mass %) | BaO | 9 | 2 | 3 | 4 | — |
|  | $TiO_2$ | 0 | 2 | 3 | 4 | — |
|  | $Fe_2O_3$ | 0 | 2 | 3 | 4 | — |
| X value of $Ca_xSr_{1-x}Al_2O_4$ |  | 0.95 | 0.95 | 0.95 | 0.95 | — |
| Crystallite diameter of solid solution C (nm) |  | 54 | 46 | 47 | 45 | — |
| Blending ratio of solid solution C (mass %) |  | 20 | 20 | 20 | 20 | 0 |
| Blending ratio of $\alpha$-$Al_2O_3$ (mass %)*[1] |  | 60 | 60 | 60 | 60 | 60 |
| Measured value | CaO | 7.7 | 7.4 | 6.9 | 6.3 | 1.9 |
| of chemical | SrO | 7.4 | 7.2 | 6.8 | 6.2 | 15.2 |
| components of | $Al_2O_3$ | 80.4 | 80.3 | 79 | 77.9 | 78.6 |
| binder (mass %) | Total amount of $SiO_2$, MgO, BaO, $TiO_2$, and $Fe_2O_3$ | 4.4 | 5 | 7.3 | 9.5 | 4.2 |
| 15 tap-flow | After mixing | 166 | 171 | 167 | 163 | 177 |
| value (mm) | After 2 hours | 132 | 135 | 130 | 133 | 135 |
| Bending strength after curing of 6 hours (MPa) |  | 1.1 | 1.1 | 1 | 1 | 1.3 |
| Bending strength after curing of 12 hours (MPa) |  | 1.7 | 1.6 | 1.5 | 1.4 | 1.7 |
| Bending strength after curing of 24 hours (MPa) |  | 2 | 2.1 | 2.1 | 2 | 2.4 |
| Wear amount in rotary corrosion test/mm |  | 5.8 | 6 | 6.4 | 6.9 | 5.8 |

Note)
*[1]Components other than solid solution and $CaAl_2O_4$

TABLE 42

|  |  | Example 211 | Example 212 | Example 213 | Example 214 | Example 215 |
|---|---|---|---|---|---|---|
| Raw materials of solid | $CaCO_3$ | 1.8 | 1.8 | 1.8 | 1.7 | 1.6 |
| solution A obtained by | $SrCO_3$ | 51.7 | 51.7 | 51.1 | 48.3 | 45.4 |
| dissolving Ca | $\alpha$-$Al_2O_3$ | 37.5 | 37.5 | 37.1 | 35 | 33 |
| components in $\alpha$-$SrAl_2O_4$ | $SiO_2$ | 0 | 0 | 2 | 3 | 4 |
| including various impurity | MgO | 9 | 0 | 2 | 3 | 4 |
| components (mass %) | BaO | 0 | 9 | 2 | 3 | 4 |
|  | $TiO_2$ | 0 | 0 | 2 | 3 | 4 |
|  | $Fe_2O_3$ | 0 | 0 | 2 | 3 | 4 |
| X value of $Ca_xSr_{1-x}Al_2O_4$ |  | 0.05 | 0.05 | 0.05 | 0.05 | 0.05 |
| Crystallite diameter of solid solution A (nm) |  | 63 | 60 | 57 | 60 | 52 |
| Blending ratio of solid solution A (mass %) |  | 20 | 20 | 20 | 20 | 20 |
| Raw materials of solid | $CaCO_3$ | 11.6 | 11.6 | 11.5 | 10.8 | 10.2 |
| solution B obtained by | $SrCO_3$ | 40 | 40 | 39.5 | 37.4 | 35.1 |
| dissolving Ca | $\alpha$-$Al_2O_3$ | 39.4 | 39.4 | 39 | 36.8 | 34.7 |
| components in $\beta$-$SrAl_2O_4$ | $SiO_2$ | 0 | 0 | 2 | 3 | 4 |
| including various impurity | MgO | 9 | 0 | 2 | 3 | 4 |
| components (mass %) | BaO | 0 | 9 | 2 | 3 | 4 |
|  | $TiO_2$ | 0 | 0 | 2 | 3 | 4 |
|  | $Fe_2O_3$ | 0 | 0 | 2 | 3 | 4 |
| X value of $Ca_xSr_{1-x}Al_2O_4$ |  | 0.3 | 0.3 | 0.3 | 0.3 | 0.3 |
| Crystallite diameter of solid solution B (nm) |  | 58 | 58 | 52 | 50 | 48 |
| Blending ratio of solid solution B (mass %) |  | 20 | 20 | 20 | 20 | 20 |
| Raw materials of solid | $CaCO_3$ | — | — | — | — | — |
| solution C obtained by | $SrCO_3$ | — | — | — | — | — |
| dissolving Sr | $\alpha$-$Al_2O_3$ | — | — | — | — | — |
| components in $CaAl_2O_4$ | $SiO_2$ | — | — | — | — | — |
| including various impurity | MgO | — | — | — | — | — |
| components (mass %) | BaO | — | — | — | — | — |
|  | $TiO_2$ | — | — | — | — | — |
|  | $Fe_2O_3$ | — | — | — | — | — |
| X value of $Ca_xSr_{1-x}Al_2O_4$ |  | — | — | — | — | — |
| Crystallite diameter of solid solution C (nm) |  | — | — | — | — | — |
| Blending ratio of solid solution C (mass %) |  | 0 | 0 | 0 | 0 | 0 |
| Blending ratio of $\alpha$-$Al_2O_3$ (mass %)*[1] |  | 60 | 60 | 60 | 60 | 60 |
| Measured value | CaO | 1.8 | 1.8 | 1.8 | 1.7 | 1.4 |
| of chemical | SrO | 15.2 | 15.3 | 14.9 | 14 | 13 |
| components of | $Al_2O_3$ | 78.5 | 78.3 | 78.3 | 76.9 | 75.9 |
| binder (mass %) | Total amount of $SiO_2$, MgO, BaO, $TiO_2$, and $Fe_2O_3$ | 4.4 | 4.5 | 4.9 | 7.3 | 9.6 |
| 15 tap-flow | After mixing | 179 | 173 | 180 | 176 | 173 |
| value (mm) | After 2 hours | 136 | 129 | 139 | 136 | 127 |
| Bending strength after curing of 6 hours (MPa) |  | 1.3 | 1.4 | 1.3 | 1.2 | 1.1 |
| Bending strength after curing of 12 hours (MPa) |  | 1.8 | 1.8 | 1.7 | 1.7 | 1.6 |
| Bending strength after curing of 24 hours (MPa) |  | 2.3 | 2.3 | 2.4 | 2.3 | 2.3 |
| Wear amount in rotary corrosion test/mm |  | 5.6 | 5.7 | 5.8 | 6.3 | 6.8 |

Note)
*[1]Components other than solid solution and $CaAl_2O_4$

TABLE 43

|  |  | Example 216 | Example 217 | Example 218 | Example 219 | Example 220 | Example 221 |
|---|---|---|---|---|---|---|---|
| Raw materials of solid solution A obtained by dissolving Ca components in α-SrAl$_2$O$_4$ including various impurity components (mass %) | CaCO$_3$ | 1.8 | 1.8 | 1.8 | 1.8 | 1.7 | 1.6 |
| | SrCO$_3$ | 51.7 | 51.7 | 51.7 | 51.1 | 48.3 | 45.4 |
| | α-Al$_2$O$_3$ | 37.5 | 37.5 | 37.5 | 37.1 | 35 | 33 |
| | SiO$_2$ | 9 | 0 | 0 | 2 | 3 | 4 |
| | MgO | 0 | 9 | 0 | 2 | 3 | 4 |
| | BaO | 0 | 0 | 9 | 2 | 3 | 4 |
| | TiO$_2$ | 0 | 0 | 0 | 2 | 3 | 4 |
| | Fe$_2$O$_3$ | 0 | 0 | 0 | 2 | 3 | 4 |
| X value of Ca$_x$Sr$_{1-x}$Al$_2$O$_4$ | | 0.05 | 0.05 | 0.05 | 0.05 | 0.05 | 0.05 |
| Crystallite diameter of solid solution A (nm) | | 55 | 63 | 60 | 57 | 60 | 52 |
| Blending ratio of solid solution A (mass %) | | 14 | 14 | 14 | 14 | 14 | 14 |
| Raw materials of solid solution B obtained by dissolving Ca components in β-SrAl$_2$O$_4$ including various impurity components (mass %) | CaCO$_3$ | 11.6 | 11.6 | 11.6 | 11.5 | 10.8 | 10.2 |
| | SrCO$_3$ | 40 | 40 | 40 | 39.5 | 37.4 | 35.1 |
| | α-Al$_2$O$_3$ | 39.4 | 39.4 | 39.4 | 39 | 36.8 | 34.7 |
| | SiO$_2$ | 9 | 0 | 0 | 2 | 3 | 4 |
| | MgO | 0 | 9 | 0 | 2 | 3 | 4 |
| | BaO | 0 | 0 | 9 | 2 | 3 | 4 |
| | TiO$_2$ | 0 | 0 | 0 | 2 | 3 | 4 |
| | Fe$_2$O$_3$ | 0 | 0 | 0 | 2 | 3 | 4 |
| X value of Ca$_x$Sr$_{1-x}$Al$_2$O$_4$ | | 0.3 | 0.3 | 0.3 | 0.3 | 0.3 | 0.3 |
| Crystallite diameter of solid solution B (nm) | | 52 | 58 | 58 | 52 | 50 | 48 |
| Blending ratio of solid solution B (mass %) | | 14 | 14 | 14 | 14 | 14 | 14 |
| Raw materials of solid solution C obtained by dissolving Sr components in CaAl$_2$O$_4$ including various impurity components (mass %) | CaCO$_3$ | 42.3 | 42.3 | 42.3 | 41.9 | 39.6 | 37.3 |
| | SrCO$_3$ | 3.3 | 3.3 | 3.3 | 3.2 | 3.1 | 2.9 |
| | α-Al$_2$O$_3$ | 45.4 | 45.4 | 45.4 | 44.9 | 42.3 | 39.8 |
| | SiO$_2$ | 9 | 0 | 0 | 2 | 3 | 4 |
| | MgO | 0 | 9 | 0 | 2 | 3 | 4 |
| | BaO | 0 | 0 | 9 | 2 | 3 | 4 |
| | TiO$_2$ | 0 | 0 | 0 | 2 | 3 | 4 |
| | Fe$_2$O$_3$ | 0 | 0 | 0 | 2 | 3 | 4 |
| X value of Ca$_x$Sr$_{1-x}$Al$_2$O$_4$ | | 0.95 | 0.95 | 0.95 | 0.95 | 0.95 | 0.95 |
| Crystallite diameter of solid solution C (nm) | | 48 | 53 | 54 | 46 | 47 | 45 |
| Blending ratio of solid solution C (mass %) | | 12 | 12 | 12 | 12 | 12 | 12 |
| Blending ratio of α-Al$_2$O$_3$ (mass %)*[1] | | 60 | 60 | 60 | 60 | 60 | 60 |
| Measured value of chemical components of binder (mass %) | CaO | 4.7 | 4.7 | 4.8 | 4.7 | 4.4 | 4 |
| | SrO | 11 | 11.1 | 10.9 | 10.8 | 10.3 | 9.3 |
| | Al$_2$O$_3$ | 79.7 | 79.6 | 79.8 | 79.4 | 78.1 | 77 |
| | Total amount of SiO$_2$, MgO, BaO, TiO$_2$, and Fe$_2$O$_3$ | 4.5 | 4.5 | 4.4 | 5 | 7.2 | 9.6 |
| 15 tap-flow value (mm) | After mixing | 165 | 162 | 162 | 167 | 164 | 165 |
| | After 2 hours | 140 | 135 | 130 | 138 | 131 | 128 |
| Bending strength after curing of 6 hours (MPa) | | 1.2 | 1.2 | 1.3 | 1.2 | 1.1 | 1 |
| Bending strength after curing of 12 hours (MPa) | | 1.5 | 1.6 | 1.7 | 1.6 | 1.6 | 1.5 |
| Bending strength after curing of 24 hours (MPa) | | 2.2 | 2.1 | 2 | 2 | 1.9 | 2 |
| Wear amount in rotary corrosion test/mm | | 6.1 | 6 | 6.1 | 6.2 | 6.4 | 6.9 |

Note)
*[1]Components other than solid solution and CaAl$_2$O$_4$

The evaluation results are as shown in Tables 17 to 43. Comparative Examples 7 to 30 show degradation in the cured flexural strength and an increase in the wear amount in the rotary corrosion test using slag since they include from 14.8 mass % to 23.8 mass % of one kind or two or more kinds of components selected from a group consisting of SiO$_2$, TiO$_2$, Fe$_2$O$_3$, MgO, and BaO other than SrO, CaO, and Al$_2$O$_3$ in the binders of the present invention. Examples 110 to 221 show a superior strength developing property compared to a case not including the above-described components and superior high temperature slag resistance compared to CaO—Al$_2$O$_3$-based binders of the conventional technique, which clarifies that favorable characteristics can be obtained by including preferably 12 mass % or less and more preferably 5 mass % or less of one kind or two or more kinds of components selected from a group consisting of SiO$_2$, TiO$_2$, Fe$_2$O$_3$, MgO, and BaO in the binders.

From these test results, it has been clarified that, by using the binder for monolithic refractories according to the present invention including a solid solution including one kind or two or more kinds selected from a group consisting of SiO$_2$, TiO$_2$, Fe$_2$O$_3$, MgO, and BaO in which an amount thereof is 12 mass % or less, a monolithic refractory in which a favorable operability is secured even after a long period of time has elapsed after pouring and blending water thereinto, a favorable strength developing property is obtained early, and slag resistance at a high temperature is superior compared to the conventional technique can be obtained. Therefore, in the binder for monolithic refractories according to the present invention, when low purity raw materials including impurities such as SiO$_2$, TiO$_2$, Fe$_2$O$_3$, MgO, and BaO are used or when various contaminations of impurities are generated during the manufacturing process, by adjusting an amount thereof to be 12 mass % or less in a binder, superior characteristics can be obtained compared to CaO—Al$_2$O$_3$-based binders of the conventional technique.

[10] Examples relating to a monolithic refractory obtained by blending at least either a dispersant or a hardening retardant in the binders according to the present invention Measurement of the flow value and the flexural strength after curing and rotary corrosion tests using slag were performed using monolithic refractories manufactured with binders including various solid solutions for which raw materials had been controlled to obtain an X value of Ca$_x$Sr$_{1-x}$Al$_2$O$_4$ of 0.05, 0.30, or 0.95 and firing had been performed for 2 hours at the maximum temperature of 1500° C. for manufacture, into which α-$Al_2O_3$ was blended with a predetermined ratio and one or two kinds of either a dispersant or a hardening retardant were blended, in Examples 222 to 257. In addition, the same tests were performed using monolithic refractories manufactured with binders including a solid solution for which raw materials had been controlled to obtain a composition of $CaAl_2O_4$ and firing had been performed for 2 hours at the maximum temperature of 1500° C. for manufacture, into which α-$Al_2O_3$ was blended with a predetermined ratio, in Comparative Examples 31 to 36. Monolithic refractories were manufactured with an amount of water added reduced to 6.2 mass % with respect to 100 mass % of a mixture of the binder and refractory aggregates. Tables 44 to 47 show the compositions of the solid solutions, the crystallite diameters of the solid solutions, the blending ratio of the solid solutions, $CaAl_2O_4$, α-$Al_2O_3$, the dispersant, and the hardening retardant, and the measurement results of flow value and flexural strength after curing and results of the rotary corrosion test of the monolithic refractory in each of the Examples. In the tables, the amounts of the dispersant and the hardening retardant blended are represented by the ratio (mass ratio) to the binders.

A commercially available powder polycarboxylic acid-based dispersant was used as the dispersant, and boric acid (primary reagent) was crushed to 200 mesh or lower and used as the hardening retardant.

TABLE 44

|  | Example 222 | Example 223 | Example 224 | Example 225 | Example 226 | Example 227 |
|---|---|---|---|---|---|---|
| X value of $Ca_xSr_{1-x}Al_2O_4$ | 0.05 | 0.05 | 0.05 | 0.05 | 0.05 | 0.05 |
| Crystallite diameter of solid solution obtained by dissolving Ca components in α-$SrAl_2O_4$ (nm) | 59 | 59 | 59 | 59 | 59 | 59 |
| Blending ratio of solid solution obtained by dissolving Ca components in α-$SrAl_2O_4$ (mass %) | 40 | 40 | 40 | 40 | 40 | 40 |
| X value of $Ca_xSr_{1-x}Al_2O_4$ | 0.3 | 0.3 | 0.3 | 0.3 | 0.3 | 0.3 |
| Crystallite diameter of solid solution obtained by dissolving Ca components in β-$SrAl_2O_4$ (nm) | 54 | 54 | 54 | 54 | 54 | 54 |
| Blending ratio of solid solution obtained by dissolving Ca components in β-$SrAl_2O_4$ (mass %) | 0 | 0 | 0 | 0 | 0 | 0 |
| X value of $Ca_xSr_{1-x}Al_2O_4$ | 0.95 | 0.95 | 0.95 | 0.95 | 0.95 | 0.95 |
| Crystallite diameter of solid solution obtained by dissolving Sr components in $CaAl_2O_4$ (nm) | 50 | 50 | 50 | 50 | 50 | 50 |
| Blending ratio of solid solution obtained by dissolving Sr components in $CaAl_2O_4$ (mass %) | 0 | 0 | 0 | 0 | 0 | 0 |
| Blending ratio of $CaAl_2O_4$ (mass %) | — | — | — | — | — | — |
| Blending ratio of α-$Al_2O_3$ (mass %)*[1] | 60 | 60 | 60 | 60 | 60 | 60 |
| Dispersant (part by mass) | 0.5 | 1 | — | — | 0.5 | 1 |
| Hardening retardant (part by mass) | — | — | 0.3 | 0.6 | 0.3 | 0.3 |
| 15 tap-flow value (mm) After mixing | 166 | 184 | 159 | 152 | 171 | 189 |
| 15 tap-flow value (mm) After 2 hours | 121 | 132 | 129 | 133 | 133 | 141 |
| Bending strength after curing of 6 hours (MPa) | 1.6 | 1.7 | 1.4 | 1.2 | 1.5 | 1.3 |
| Bending strength after curing of 12 hours (MPa) | 1.9 | 1.9 | 1.7 | 1.5 | 1.6 | 1.7 |
| Bending strength after curing of 24 hours (MPa) | 2.5 | 2.5 | 2.5 | 2.4 | 2.5 | 2.4 |
| Wear amount in rotary corrosion test (mm) | 5.4 | 5.3 | 5.4 | 5.5 | 5.3 | 5.3 |

|  | Example 228 | Example 229 | Example 230 | Example 231 | Example 232 |
|---|---|---|---|---|---|
| X value of $Ca_xSr_{1-x}Al_2O_4$ | 0.05 | 0.05 | 0.05 | 0.05 | 0.05 |
| Crystallite diameter of solid solution obtained by dissolving Ca components in α-$SrAl_2O_4$ (nm) | 59 | 59 | 59 | 59 | 59 |
| Blending ratio of solid solution obtained by dissolving Ca components in α-$SrAl_2O_4$ (mass %) | 0 | 0 | 0 | 0 | 0 |
| X value of $Ca_xSr_{1-x}Al_2O_4$ | 0.3 | 0.3 | 0.3 | 0.3 | 0.3 |
| Crystallite diameter of solid solution obtained by dissolving Ca components in β-$SrAl_2O_4$ (nm) | 54 | 54 | 54 | 54 | 54 |
| Blending ratio of solid solution obtained by dissolving Ca components in β-$SrAl_2O_4$ (mass %) | 40 | 40 | 40 | 40 | 40 |
| X value of $Ca_xSr_{1-x}Al_2O_4$ | 0.95 | 0.95 | 0.95 | 0.95 | 0.95 |
| Crystallite diameter of solid solution obtained by dissolving Sr components in $CaAl_2O_4$ (nm) | 50 | 50 | 50 | 50 | 50 |
| Blending ratio of solid solution obtained by dissolving Sr components in $CaAl_2O_4$ (mass %) | 0 | 0 | 0 | 0 | 0 |
| Blending ratio of $CaAl_2O_4$ (mass %) | — | — | — | — | — |
| Blending ratio of α-$Al_2O_3$ (mass %)*[1] | 60 | 60 | 60 | 60 | 60 |
| Dispersant (part by mass) | 0.5 | 1 | — | — | 0.5 |
| Hardening retardant (part by mass) | — | — | 0.3 | 0.6 | 0.3 |
| 15 tap-flow value (mm) After mixing | 163 | 177 | 156 | 151 | 164 |
| 15 tap-flow value (mm) After 2 hours | 128 | 131 | 124 | 130 | 131 |
| Bending strength after curing of 6 hours (MPa) | 1.5 | 1.5 | 1.3 | 1.2 | 1.4 |
| Bending strength after curing of 12 hours (MPa) | 1.9 | 1.8 | 1.7 | 1.5 | 1.7 |
| Bending strength after curing of 24 hours (MPa) | 2.6 | 2.7 | 2.7 | 2.6 | 2.7 |
| Wear amount in rotary corrosion test (mm) | 5.5 | 5.5 | 5.4 | 5.6 | 5.2 |

Note)
*[1]$Al_2O_3$ other than solid solution and $CaAl_2O_4$

TABLE 45

|  | Example 233 | Example 234 | Example 235 | Example 236 | Example 237 | Example 238 |
|---|---|---|---|---|---|---|
| X value of $Ca_xSr_{1-x}Al_2O_4$ | 0.05 | 0.05 | 0.05 | 0.05 | 0.05 | 0.05 |
| Crystallite diameter of solid solution obtained by dissolving Ca components in $\alpha$-$SrAl_2O_4$ (nm) | 59 | 59 | 59 | 59 | 59 | 59 |
| Blending ratio of solid solution obtained by dissolving Ca components in $\alpha$-$SrAl_2O_4$ (mass %) | 0 | 20 | 20 | 20 | 20 | 20 |
| X value of $Ca_xSr_{1-x}Al_2O_4$ | 0.3 | 0.3 | 0.3 | 0.3 | 0.3 | 0.3 |
| Crystallite diameter of solid solution obtained by dissolving Ca components in $\beta$-$SrAl_2O_4$ (nm) | 54 | 54 | 54 | 54 | 54 | 54 |
| Blending ratio of solid solution obtained by dissolving Ca components in $\beta$-$SrAl_2O_4$ (mass %) | 40 | 0 | 0 | 0 | 0 | 0 |
| X value of $Ca_xSr_{1-x}Al_2O_4$ | 0.95 | 0.95 | 0.95 | 0.95 | 0.95 | 0.95 |
| Crystallite diameter of solid solution obtained by dissolving Sr components in $CaAl_2O_4$ (nm) | 50 | 50 | 50 | 50 | 50 | 50 |
| Blending ratio of solid solution obtained by dissolving Sr components in $CaAl_2O_4$ (mass %) | 0 | 20 | 20 | 20 | 20 | 20 |
| Blending ratio of $CaAl_2O_4$ (mass %) | — | — | — | — | — | — |
| Blending ratio of $\alpha$-$Al_2O_3$ (mass %)[1] | 60 | 60 | 60 | 60 | 60 | 60 |
| Dispersant (part by mass) | 1 | 0.5 | 1 | — | — | 0.5 |
| Hardening retardant (part by mass) | 0.3 | — | — | 0.3 | 0.6 | 0.3 |
| 15 tap-flow value (mm)   After mixing | 178 | 164 | 181 | 162 | 158 | 171 |
| After 2 hours | 138 | 128 | 133 | 133 | 135 | 132 |
| Bending strength after curing of 6 hours (MPa) | 1.3 | 1.5 | 1.5 | 1.3 | 1.2 | 1.5 |
| Bending strength after curing of 12 hours (MPa) | 1.6 | 1.9 | 1.8 | 1.8 | 1.7 | 1.8 |
| Bending strength after curing of 24 hours (MPa) | 2.6 | 2.6 | 2.6 | 2.5 | 2.6 | 2.5 |
| Wear amount in rotary corrosion test (mm) | 5.3 | 5.5 | 5.4 | 5.6 | 5.5 | 5.4 |

|  | Example 239 | Example 240 | Example 241 | Example 242 | Example 243 |
|---|---|---|---|---|---|
| X value of $Ca_xSr_{1-x}Al_2O_4$ | 0.05 | 0.05 | 0.05 | 0.05 | 0.05 |
| Crystallite diameter of solid solution obtained by dissolving Ca components in $\alpha$-$SrAl_2O_4$ (nm) | 59 | 59 | 59 | 59 | 59 |
| Blending ratio of solid solution obtained by dissolving Ca components in $\alpha$-$SrAl_2O_4$ (mass %) | 20 | 0 | 0 | 0 | 0 |
| X value of $Ca_xSr_{1-x}Al_2O_4$ | 0.3 | 0.3 | 0.3 | 0.3 | 0.3 |
| Crystallite diameter of solid solution obtained by dissolving Ca components in $\beta$-$SrAl_2O_4$ (nm) | 54 | 54 | 54 | 54 | 54 |
| Blending ratio of solid solution obtained by dissolving Ca components in $\beta$-$SrAl_2O_4$ (mass %) | 0 | 20 | 20 | 20 | 20 |
| X value of $Ca_xSr_{1-x}Al_2O_4$ | 0.95 | 0.95 | 0.95 | 0.95 | 0.95 |
| Crystallite diameter of solid solution obtained by dissolving Sr components in $CaAl_2O_4$ (nm) | 50 | 50 | 50 | 50 | 50 |
| Blending ratio of solid solution obtained by dissolving Sr components in $CaAl_2O_4$ (mass %) | 20 | 20 | 20 | 20 | 20 |
| Blending ratio of $CaAl_2O_4$ (mass %) | — | — | — | — | — |
| Blending ratio of $\alpha$-$Al_2O_3$ (mass %)[1] | 60 | 60 | 60 | 60 | 60 |
| Dispersant (part by mass) | 1 | 0.5 | 1 | — | — |
| Hardening retardant (part by mass) | 0.3 | — | — | 0.3 | 0.6 |
| 15 tap-flow value (mm)   After mixing | 185 | 160 | 169 | 152 | 147 |
| After 2 hours | 134 | 124 | 127 | 123 | 126 |
| Bending strength after curing of 6 hours (MPa) | 1.3 | 1.2 | 1.2 | 1.1 | 1.1 |
| Bending strength after curing of 12 hours (MPa) | 1.7 | 1.5 | 1.6 | 1.5 | 1.5 |
| Bending strength after curing of 24 hours (MPa) | 2.4 | 2.7 | 2.6 | 2.6 | 2.5 |
| Wear amount in rotary corrosion test (mm) | 5.5 | 5.5 | 5.6 | 5.7 | 5.7 |

Note)
[1]$Al_2O_3$ other than solid solution and $CaAl_2O_4$

TABLE 46

|  | Example 244 | Example 245 | Example 246 | Example 247 | Example 248 |
|---|---|---|---|---|---|
| X value of $Ca_xSr_{1-x}Al_2O_4$ | 0.05 | 0.05 | 0.05 | 0.05 | 0.05 |
| Crystallite diameter of solid solution obtained by dissolving Ca components in $\alpha$-$SrAl_2O_4$ (nm) | 59 | 59 | 59 | 59 | 59 |
| Blending ratio of solid solution obtained by dissolving Ca components in $\alpha$-$SrAl_2O_4$ (mass %) | 0 | 0 | 20 | 20 | 20 |
| X value of $Ca_xSr_{1-x}Al_2O_4$ | 0.3 | 0.3 | 0.3 | 0.3 | 0.3 |
| Crystallite diameter of solid solution obtained by dissolving Ca components in $\beta$-$SrAl_2O_4$ (nm) | 54 | 54 | 54 | 54 | 54 |
| Blending ratio of solid solution obtained by dissolving Ca components in $\beta$-$SrAl_2O_4$ (mass %) | 20 | 20 | 20 | 20 | 20 |
| X value of $Ca_xSr_{1-x}Al_2O_4$ | 0.95 | 0.95 | 0.95 | 0.95 | 0.95 |
| Crystallite diameter of solid solution obtained | 50 | 50 | 50 | 50 | 50 |

TABLE 46-continued

|  | | | | | |
|---|---|---|---|---|---|
| by dissolving Sr components in CaAl$_2$O$_4$ (nm) | | | | | |
| Blending ratio of solid solution obtained | 20 | 20 | 0 | 0 | 0 |
| by dissolving Sr components in CaAl$_2$O$_4$ (mass %) | | | | | |
| Blending ratio of CaAl$_2$O$_4$ (mass %) | — | — | — | — | — |
| Blending ratio of α-Al$_2$O$_3$ (mass %)*[1] | 60 | 60 | 60 | 60 | 60 |
| Dispersant (part by mass) | 0.5 | 1 | 0.5 | 1 | — |
| Hardening retardant (part by mass) | 0.3 | 0.3 | — | — | 0.3 |
| 15 tap-flow value (mm)  After mixing | 162 | 166 | 168 | 179 | 159 |
|   After 2 hours | 129 | 131 | 127 | 132 | 122 |
| Bending strength after curing of 6 hours (MPa) | 1.2 | 1.2 | 1.6 | 1.5 | 1.4 |
| Bending strength after curing of 12 hours (MPa) | 1.6 | 1.6 | 2 | 1.9 | 1.8 |
| Bending strength after curing of 24 hours (MPa) | 2.7 | 2.5 | 2.7 | 2.6 | 2.6 |
| Wear amount in rotary corrosion test (mm) | 5.6 | 5.5 | 5.4 | 5.5 | 5.5 |

|  | Example 249 | Example 250 | Example 251 | Example 252 | Example 253 |
|---|---|---|---|---|---|
| X value of Ca$_x$Sr$_{1-x}$Al$_2$O$_4$ | 0.05 | 0.05 | 0.05 | 0.05 | 0.05 |
| Crystallite diameter of solid solution obtained | 59 | 59 | 59 | 59 | 59 |
| by dissolving Ca components in α-SrAl$_2$O$_4$ (nm) | | | | | |
| Blending ratio of solid solution obtained by | 20 | 20 | 20 | 15 | 15 |
| dissolving Ca components in α-SrAl$_2$O$_4$ (mass %) | | | | | |
| X value of Ca$_x$Sr$_{1-x}$Al$_2$O$_4$ | 03 | 0.3 | 0.3 | 0.3 | 0.3 |
| Crystallite diameter of solid solution obtained by | 54 | 54 | 54 | 54 | 54 |
| dissolving Ca components in β-SrAl$_2$O$_4$ (nm) | | | | | |
| Blending ratio of solid solution obtained by | 20 | 20 | 20 | 15 | 15 |
| dissolving Ca components in β-SrAl$_2$O$_4$ (mass %) | | | | | |
| X value of Ca$_x$Sr$_{1-x}$Al$_2$O$_4$ | 0.95 | 0.95 | 0.95 | 0.95 | 0.95 |
| Crystallite diameter of solid solution obtained | 50 | 50 | 50 | 50 | 50 |
| by dissolving Sr components in CaAl$_2$O$_4$ (nm) | | | | | |
| Blending ratio of solid solution obtained | 0 | 0 | 0 | 10 | 10 |
| by dissolving Sr components in CaAl$_2$O$_4$ (mass %) | | | | | |
| Blending ratio of CaAl$_2$O$_4$ (mass %) | — | — | — | — | — |
| Blending ratio of α-Al$_2$O$_3$ (mass %)*[1] | 60 | 60 | 60 | 60 | 60 |
| Dispersant (part by mass) | — | 0.5 | 1 | 0.5 | 1 |
| Hardening retardant (part by mass) | 0.6 | 0.3 | 0.3 | — | — |
| 15 tap-flow value (mm)  After mixing | 153 | 167 | 177 | 162 | 174 |
|   After 2 hours | 134 | 128 | 132 | 129 | 135 |
| Bending strength after curing of 6 hours (MPa) | 1.3 | 1.5 | 1.4 | 1.2 | 1.3 |
| Bending strength after curing of 12 hours (MPa) | 1.7 | 1.8 | 1.7 | 1.6 | 1.7 |
| Bending strength after curing of 24 hours (MPa) | 2.5 | 2.5 | 2.5 | 2.7 | 2.6 |
| Wear amount in rotary corrosion test (mm) | 5.7 | 5.3 | 5.4 | 5.4 | 5.5 |

Note)
*[1] Al$_2$O$_3$ other than solid solution and CaAl$_2$O$_4$

TABLE 47

|  | Example 254 | Example 255 | Example 256 | Example 257 | Comparative Example 31 | Comparative Example 32 | Comparative Example 33 | Comparative Example 34 | Comparative Example 35 | Comparative Example 36 |
|---|---|---|---|---|---|---|---|---|---|---|
| X value of Ca$_x$Sr$_{1-x}$Al$_2$O$_4$ | 0.05 | 0.05 | 0.05 | 0.05 | | | | | | |
| Crystallite diameter of solid solution obtained by dissolving Ca components in α-SrAl$_2$O$_4$ (nm) | 59 | 59 | 59 | 59 | | | | | | |
| Blending ratio of solid solution obtained by dissolving Ca components in α-SrAl$_2$O$_4$ (mass %) | 15 | 15 | 15 | 15 | | | | | | |
| X value of Ca$_x$Sr$_{1-x}$Al$_2$O$_4$ | 0.3 | 0.3 | 0.3 | 0.3 | | | | | | |
| Crystallite diameter of solid solution obtained by dissolving Ca components β-SrAl$_2$O$_4$ (nm) | 54 | 54 | 54 | 54 | | | | | | |
| Blending ratio of solid solution obtained by dissolving Ca components in β-SrAl$_2$O$_4$ (mass %) | 15 | 15 | 15 | 15 | | | | | | |
| X value of Ca$_x$Sr$_{1-x}$Al$_2$O$_4$ | 0.95 | 0.95 | 0.95 | 0.95 | | | | | | |
| Crystallite diameter of solid solution obtained by dissolving Sr components in CaAl$_2$O$_4$ (nm) | 50 | 50 | 50 | 50 | | | | | | |
| Blending ratio of solid solution obtained by dissolving Sr components in CaAl$_2$O$_4$ (mass %) | 10 | 10 | 10 | 10 | | | | | | |
| Blending ratio of CaAl$_2$O$_4$ (mass %) | — | | | | 40 | 40 | 40 | 40 | 40 | 40 |
| Blending ratio of α-Al$_2$O$_3$ (mass %) *1 | 60 | 60 | 60 | 60 | 60 | 60 | 60 | 60 | 60 | 60 |
| Dispersant (part by mass) | | 0.5 | 1 | 0.5 | 1 | | | | 0.5 | 1 |

TABLE 47-continued

|  | Example 254 | Example 255 | Example 256 | Example 257 | Comparative Example 31 | Comparative Example 32 | Comparative Example 33 | Comparative Example 34 | Comparative Example 35 | Comparative Example 36 |
|---|---|---|---|---|---|---|---|---|---|---|
| Hardening retardant (part by mass) | 0.3 | 0.6 | 0.3 | 0.3 |  |  | 0.3 | 0.6 | 0.3 | 0.3 |
| 15 tap-flow value (mm) After mixing | 151 | 150 | 160 | 177 | 161 | 168 | 153 | 147 | 163 | 173 |
| After 2 hours | 130 | 137 | 132 | 134 | 122 | 123 | 121 | 125 | 129 | 131 |
| Bending strength after curing of 6 hours (MPa) | 1.2 | 1.1 | 1.2 | 1.2 | 0.3 | 0.3 | 0.4 | 0.2 | 0.3 | 0.2 |
| Bending strength after curing of 12 hours (MPa) | 1.5 | 1.4 | 1.6 | 1.7 | 0.7 | 0.6 | 0.6 | 0.5 | 0.7 | 0.5 |
| Bending strength after curing of 24 hours (MPa) | 2.4 | 2.5 | 2.6 | 2.6 | 1.8 | 1.8 | 1.6 | 1.3 | 1.6 | 1.4 |
| Wear amount in rotary corrosion test (mm) | 5.6 | 5.5 | 5.5 | 5.6 | 7.6 | 7.5 | 7.7 | 7.8 | 7.5 | 7.6 |

Note)
*1 $Al_2O_3$ other than solid solution and $CaAl_2O_4$

The evaluation results are as shown in Tables 44 to 47. In Examples 222 to 257, regardless of the reduced amount of water added to monolithic refractories, the flow values suitable for pouring were obtained 2 hours after the start of mixing. Therefore, it has been confirmed that Examples 222 to 257 can be applied to furnaces with a large volume or the like. Furthermore, Examples 222 to 257 show larger values than Comparative Examples 31 to 36 in the flexural strength after curing of 6, 12, and 24 hours, and therefore it has been clarified that Examples 222 to 257 are excellent in terms of cured strength developing property. In particular, the flexural strength after curing of 6 hours is remarkably greater compared to those of the Comparative Examples, and therefore it has been confirmed that Examples 222 to 257 are excellent in terms of early strength developing property. Furthermore, it has been clarified that, compared to Comparative Examples, Examples 222 to 257 clearly show small wear amounts in the rotary corrosion test using slag and are excellent in terms of slag resistance at a high temperature.

In addition, since monolithic refractories were manufactured with a reduced amount of water added, a decrease in the wear amount in the rotary corrosion test using slag could be obtained compared to a case where monolithic refractories were manufactured with the same composition of binder.

From these test results, it has been clarified that, by using the dispersant and the hardening retardant in the binder for monolithic refractories according to the present invention, a monolithic refractory in which a favorable operability is secured even after a long period of time has elapsed after pouring and blending water thereinto, a favorable strength developing property is obtained early, and slag resistance at a high temperature is superior compared to the conventional technique can be obtained.

[11] Examples relating to a monolithic refractory including a mixture of the binder for monolithic refractories according to the present invention and a refractory aggregate including an ultrafine alumina powder with a particle diameter of 1 μm or less The same tests were performed using monolithic refractories manufactured from aggregates in which amounts of the ultrafine alumina powder with a particle diameter of 1 μm or less in the monolithic refractories were varied in a range of 0 to 80 mass % and the binder according to the present invention in Examples 258 to 293 and Reference Examples 23 to 34. In all tests, a binder including 40 mass % of various solid solutions and their mixture and 60 mass % of $\alpha$-$Al_2O_3$ were used, wherein the solid solutions prepared such that raw materials had been controlled to obtain an X value of $Ca_xSr_{1-x}Al_2O_4$ of 0.05, 0.30, or 0.95 and firing had been performed for 2 hours at the maximum temperature of 1500° C. The amount of fused alumina of from 75 μm to 5 mm was adjusted to cover a changed amount of the ultrafine alumina powder of 1 μm or less so as to manufacture monolithic refractories with the same total mass of alumina refractory aggregates. Further, the blending ratio of the binder, magnesia, silica flower, vinylon fiber and the amount of water added was not varied. Tables 48 to 52 show the compositions of the solid solutions, the crystallite diameters of the solid solutions, the blending ratio of the various solid solutions and $\alpha$-$Al_2O_3$, the amount of sintered alumina of 1 μm or less, the amount of fused alumina of from 75 μm to 5 mm, and the measurement results of flow value and flexural strength after curing and results of the rotary corrosion test of the monolithic refractory in each of the Examples.

TABLE 48

|  | Example 258 | Example 259 | Example 260 | Example 261 | Example 262 | Example 263 |
|---|---|---|---|---|---|---|
| X value of $Ca_xSr_{1-x}Al_2O_4$ | 0.05 | 0.05 | 0.05 | 0.05 | 0.05 | 0.05 |
| Crystallite diameter of solid solution obtained by dissolving Ca components in $\alpha$-$SrAl_2O_4$ (nm) | 40 | 40 | 40 | 40 | 40 | 40 |
| Blending ratio of solid solution obtained by dissolving Ca components in $\alpha$-$SrAl_2O_4$ (mass %) | 59 | 59 | 59 | 59 | 59 | 59 |
| X value of $Ca_xSr_{1-x}Al_2O_4$ | 0.3 | 0.3 | 0.3 | 0.3 | 0.3 | 0.3 |
| Crystallite diameter of solid solution obtained by dissolving Ca components in $\beta$-$SrAl_2O_4$ (nm) | 54 | 54 | 54 | 54 | 54 | 54 |
| Blending ratio of solid solution obtained by dissolving Ca components in $\beta$-$SrAl_2O_4$ (mass %) | 0 | 0 | 0 | 0 | 0 | 0 |
| X value of $Ca_xSr_{1-x}Al_2O_4$ | 0.95 | 0.95 | 0.95 | 0.95 | 0.95 | 0.95 |
| Crystallite diameter of solid solution obtained by dissolving Sr components in $CaAl_2O_4$ (nm) | 50 | 50 | 50 | 50 | 50 | 50 |

TABLE 48-continued

| | | | | | | |
|---|---|---|---|---|---|---|
| Blending ratio of solid solution obtained by dissolving Sr components in CaAl$_2$O$_4$ (mass %) | 0 | 0 | 0 | 0 | 0 | 0 |
| Blending ratio of α-Al$_2$O$_3$ (mass %)*[1] | 60 | 60 | 60 | 60 | 60 | 60 |
| Amount of sintered alumina of 1 μm or less*[2] (mass %) | 2 | 5 | 10 | 30 | 50 | 70 |
| Amount of fused alumina of from 75 μm to 5 mm*[2] (mass %) | 83.56 | 80.56 | 75.56 | 55.56 | 35.56 | 15.56 |
| 15 tap-flow value (mm)    After mixing | 184 | 179 | 176 | 172 | 171 | 162 |
| After 2 hours | 131 | 135 | 135 | 133 | 132 | 122 |
| Bending strength after curing of 6 hours (MPa) | 0.9 | 1 | 1 | 1.1 | 1.1 | 1.3 |
| Bending strength after curing of 12 hours (MPa) | 1.2 | 1.3 | 1.3 | 1.4 | 1.4 | 1.6 |
| Bending strength after curing of 24 hours (MPa) | 1.9 | 1.9 | 2 | 1.9 | 2 | 2 |
| Wear amount in rotary corrosion test (mm) | 6 | 5.9 | 5.8 | 5.8 | 5.7 | 5.7 |

| | Reference Example 23 | Reference Example 24 | Example 264 | Example 265 |
|---|---|---|---|---|
| X value of Ca$_x$Sr$_{1-x}$Al$_2$O$_4$ | 0.05 | 0.05 | 0.05 | 0.05 |
| Crystallite diameter of solid solution obtained by dissolving Ca components in α-SrAl$_2$O$_4$ (nm) | 40 | 40 | 0 | 0 |
| Blending ratio of solid solution obtained by dissolving Ca components in α-SrAl$_2$O$_4$ (mass %) | 59 | 59 | 59 | 59 |
| X value of Ca$_x$Sr$_{1-x}$Al$_2$O$_4$ | 0.3 | 0.3 | 0.3 | 0.3 |
| Crystallite diameter of solid solution obtained by dissolving Ca components in β-SrAl$_2$O$_4$ (nm) | 54 | 54 | 54 | 54 |
| Blending ratio of solid solution obtained by dissolving Ca components in β-SrAl$_2$O$_4$ (mass %) | 0 | 0 | 40 | 40 |
| X value of Ca$_x$Sr$_{1-x}$Al$_2$O$_4$ | 0.95 | 0.95 | 0.95 | 0.95 |
| Crystallite diameter of solid solution obtained by dissolving Sr components in CaAl$_2$O$_4$ (nm) | 50 | 50 | 50 | 50 |
| Blending ratio of solid solution obtained by dissolving Sr components in CaAl$_2$O$_4$ (mass %) | 0 | 0 | 0 | 0 |
| Blending ratio of α-Al$_2$O$_3$ (mass %)*[1] | 60 | 60 | 60 | 60 |
| Amount of sintered alumina of 1 μm or less*[2] (mass %) | 0 | 80 | 2 | 5 |
| Amount of fused alumina of from 75 μm to 5 mm*[2] (mass %) | 85.56 | 5.56 | 83.56 | 80.56 |
| 15 tap-flow value (mm)    After mixing | 181 | 133 | 180 | 177 |
| After 2 hours | 136 | 103 | 133 | 135 |
| Bending strength after curing of 6 hours (MPa) | 0.5 | 1.3 | 0.8 | 0.9 |
| Bending strength after curing of 12 hours (MPa) | 0.8 | 1.6 | 1.1 | 1.2 |
| Bending strength after curing of 24 hours (MPa) | 1.2 | 1.9 | 2 | 2 |
| Wear amount in rotary corrosion test (mm) | 6 | 6.3 | 5.9 | 5.9 |

Note)
*[1]Al$_2$O$_3$ other than solid solution and CaAl$_2$O$_4$
*[2]Mixing ratio with respect to monolithic refractory (total amount of binder and refractory aggregates)

TABLE 49

| | Example 266 | Example 267 | Example 268 | Example 269 | Reference Example 25 | Reference Example 26 | Example 270 | Example 271 | Example 272 | Example 273 |
|---|---|---|---|---|---|---|---|---|---|---|
| X value of Ca$_x$Sr$_{1-x}$Al$_2$O$_4$ | 0.05 | 0.05 | 0.05 | 0.05 | 0.05 | 0.05 | 0.05 | 0.05 | 0.05 | 0.05 |
| Crystallite diameter of solid solution obtained by dissolving Ca components in α-SrAl$_2$O$_4$ (nm) | 0 | 0 | 0 | 0 | 0 | 0 | 20 | 20 | 20 | 20 |
| Blending ratio of solid solution obtained by dissolving Ca components in α-SrAl$_2$O$_4$ (mass %) | 59 | 59 | 59 | 59 | 59 | 59 | 59 | 59 | 59 | 59 |
| X value of Ca$_x$Sr$_{1-x}$Al$_2$O$_4$ | 0.3 | 0.3 | 0.3 | 0.3 | 0.3 | 0.3 | 0.3 | 0.3 | 0.3 | 0.3 |
| Crystallite diameter of solid solution obtained by dissolving Ca components in β-SrAl$_2$O$_4$ (nm) | 54 | 54 | 54 | 54 | 54 | 54 | 54 | 54 | 54 | 54 |
| Blending ratio of solid solution obtained by dissolving Ca components in β-SrAl$_2$O$_4$ (mass %) | 40 | 40 | 40 | 40 | 40 | 40 | 0 | 0 | 0 | 0 |
| X value of Ca$_x$Sr$_{1-x}$Al$_2$O$_4$ | 0.95 | 0.95 | 0.95 | 0.95 | 0.95 | 0.95 | 0.95 | 0.95 | 0.95 | 0.95 |
| Crystallite diameter of solid solution obtained by dissolving Sr components in CaAl$_2$O$_4$ (nm) | 50 | 50 | 50 | 50 | 50 | 50 | 50 | 50 | 50 | 50 |
| Blending ratio of solid solution obtained by dissolving Sr components in CaAl$_2$O$_4$ (mass %) | 0 | 0 | 0 | 0 | 0 | 0 | 20 | 20 | 20 | 20 |
| Blending ratio of α-Al$_2$O$_3$ (mass %)*[1] | 60 | 60 | 60 | 60 | 60 | 60 | 60 | 60 | 60 | 60 |
| Amount of sintered alumina of 1 μm or less*[2] (mass %) | 10 | 30 | 50 | 70 | 0 | 80 | 2 | 5 | 10 | 30 |
| Amount of fused alumina of from 75 μm to 5 mm*[2] (mass %) | 75.56 | 55.56 | 35.56 | 15.56 | 85.56 | 5.56 | 83.56 | 80.56 | 75.56 | 55.56 |
| 15 tap-flow value (mm)    After mixing | 173 | 174 | 167 | 160 | 183 | 141 | 180 | 177 | 175 | 172 |
| After 2 hours | 135 | 131 | 128 | 124 | 138 | 105 | 130 | 135 | 132 | 135 |
| Bending strength after curing of 6 hours (MPa) | 0.9 | 0.9 | 1.1 | 1.2 | 0.4 | 1.3 | 0.9 | 1 | 1 | 1.1 |
| Bending strength after curing of 12 hours (MPa) | 1.3 | 1.4 | 1.5 | 1.6 | 0.8 | 1.7 | 1.2 | 1.3 | 1.3 | 1.3 |

TABLE 49-continued

|  | Example 266 | Example 267 | Example 268 | Example 269 | Reference Example 25 | Reference Example 26 | Example 270 | Example 271 | Example 272 | Example 273 |
|---|---|---|---|---|---|---|---|---|---|---|
| Bending strength after curing of 24 hours (MPa) | 2.1 | 2.2 | 2.2 | 2.2 | 1.8 | 2.3 | 1.8 | 1.9 | 2 | 2.1 |
| Wear amount in rotary corrosion test (mm) | 5.9 | 5.7 | 5.7 | 5.8 | 6.2 | 6.4 | 6.1 | 5.9 | 5.9 | 5.8 |

Note)
[1] $Al_2O_3$ other than solid solution and $CaAl_2O_4$
[2] Mixing ratio with respect to monolithic refractory (total amount of binder and refractory aggregates)

TABLE 50

|  | Example 274 | Example 275 | Reference Example 27 | Reference Example 28 | Example 276 | Example 277 | Example 278 | Example 279 | Example 280 | Example 281 |
|---|---|---|---|---|---|---|---|---|---|---|
| X value of $Ca_xSr_{1-x}Al_2O_4$ | 0.05 | 0.05 | 0.05 | 0.05 | 0.05 | 0.05 | 0.05 | 0.05 | 0.05 | 0.05 |
| Crystallite diameter of solid solution obtained by dissolving Ca components in $\alpha$-$SrAl_2O_4$ (nm) | 20 | 20 | 20 | 20 | 0 | 0 | 0 | 0 | 0 | 0 |
| Blending ratio of solid solution obtained by dissolving Ca components in $\alpha$-$SrAl_2O_4$ (mass %) | 59 | 59 | 59 | 59 | 59 | 59 | 59 | 59 | 59 | 59 |
| X value of $Ca_xSr_{1-x}Al_2O_4$ | 0.3 | 0.3 | 0.3 | 0.3 | 0.3 | 0.3 | 0.3 | 0.3 | 0.3 | 0.3 |
| Crystallite diameter of solid solution obtained by dissolving Ca components in $\beta$-$SrAl_2O_4$ (nm) | 54 | 54 | 54 | 54 | 54 | 54 | 54 | 54 | 54 | 54 |
| Blending ratio of solid solution obtained by dissolving Ca components in $\beta$-$SrAl_2O_4$ (mass %) | 0 | 0 | 0 | 0 | 20 | 20 | 20 | 20 | 20 | 20 |
| X value of $Ca_xSr_{1-x}Al_2O_4$ | 0.95 | 0.95 | 0.95 | 0.95 | 0.95 | 0.95 | 0.95 | 0.95 | 0.95 | 0.95 |
| Crystallite diameter of solid solution obtained by dissolving Sr components in $CaAl_2O_4$ (nm) | 50 | 50 | 50 | 50 | 50 | 50 | 50 | 50 | 50 | 50 |
| Blending ratio of solid solution obtained by dissolving Sr components in $CaAl_2O_4$ (mass %) | 20 | 20 | 20 | 20 | 20 | 20 | 20 | 20 | 20 | 20 |
| Blending ratio of $\alpha$-$Al_2O_3$ (mass %)[1] | 60 | 60 | 60 | 60 | 60 | 60 | 60 | 60 | 60 | 60 |
| Amount of sintered alumina of 1 μm or less[2] (mass %) | 50 | 70 | 0 | 80 | 2 | 5 | 10 | 30 | 50 | 70 |
| Amount of fused alumina of from 75 μm to 5 mm[2] (mass %) | 35.56 | 15.56 | 85.56 | 5.56 | 83.56 | 80.56 | 75.56 | 55.56 | 35.56 | 15.56 |
| 15 tap-flow value (mm) After mixing | 169 | 160 | 183 | 136 | 178 | 177 | 172 | 170 | 167 | 161 |
| After 2 hours | 136 | 129 | 140 | 102 | 146 | 142 | 139 | 139 | 138 | 134 |
| Bending strength after curing of 6 hours (MPa) | 1.1 | 1.2 | 0.5 | 1.2 | 0.8 | 0.8 | 0.9 | 1 | 1 | 1 |
| Bending strength after curing of 12 hours (MPa) | 1.4 | 1.4 | 0.7 | 1.5 | 1 | 1.1 | 1.2 | 1.2 | 1.3 | 1.4 |
| Bending strength after curing of 24 hours (MPa) | 2.1 | 2 | 1.3 | 2 | 2 | 2.2 | 2.2 | 2.1 | 2.2 | 2.2 |
| Wear amount in rotary corrosion test (mm) | 5.8 | 5.7 | 6.2 | 6.1 | 6.3 | 6.2 | 6 | 5.9 | 5.9 | 5.8 |

Note)
[1] $Al_2O_3$ other than solid solution and $CaAl_2O_4$
[2] Mixing ratio with respect to monolithic refractory (total amount of binder and refractory aggregates)

TABLE 51

|  | Reference Example 29 | Reference Example 30 | Example 282 | Example 283 | Example 284 | Example 285 | Example 286 | Example 287 | Reference Example 31 | Reference Example 32 |
|---|---|---|---|---|---|---|---|---|---|---|
| X value of $Ca_xSr_{1-x}Al_2O_4$ | 0.05 | 0.05 | 0.05 | 0.05 | 0.05 | 0.05 | 0.05 | 0.05 | 0.05 | 0.05 |
| Crystallite diameter of solid solution obtained by dissolving Ca components in $\alpha$-$SrAl_2O_4$ (nm) | 0 | 0 | 20 | 20 | 20 | 20 | 20 | 20 | 20 | 20 |
| Blending ratio of solid solution obtained by dissolving Ca components in $\alpha$-$SrAl_2O_4$ (mass %) | 59 | 59 | 59 | 59 | 59 | 59 | 59 | 59 | 59 | 59 |
| X value of $Ca_xSr_{1-x}Al_2O_4$ | 0.3 | 0.3 | 0.3 | 0.3 | 0.3 | 0.3 | 0.3 | 0.3 | 0.3 | 0.3 |
| Crystallite diameter of solid solution obtained by dissolving Ca components in $\beta$-$SrAl_2O_4$ (nm) | 54 | 54 | 54 | 54 | 54 | 54 | 54 | 54 | 54 | 54 |
| Blending ratio of solid solution obtained by dissolving Ca components in $\beta$-$SrAl_2O_4$ (mass %) | 20 | 20 | 20 | 20 | 20 | 20 | 20 | 20 | 20 | 20 |
| X value of $Ca_xSr_{1-x}Al_2O_4$ | 0.95 | 0.95 | 0.95 | 0.95 | 0.95 | 0.95 | 0.95 | 0.95 | 0.95 | 0.95 |

TABLE 51-continued

|  | Reference Example 29 | Reference Example 30 | Example 282 | Example 283 | Example 284 | Example 285 | Example 286 | Example 287 | Reference Example 31 | Reference Example 32 |
|---|---|---|---|---|---|---|---|---|---|---|
| Crystallite diameter of solid solution obtained by dissolving Sr components in $CaAl_2O_4$ (nm) | 50 | 50 | 50 | 50 | 50 | 50 | 50 | 50 | 50 | 50 |
| Blending ratio of solid solution obtained by dissolving Sr components in $CaAl_2O_4$ (mass %) | 20 | 20 | 0 | 0 | 0 | 0 | 0 | 0 | 0 | 0 |
| Blending ratio of $\alpha$-$Al_2O_3$ (mass %)[*1] | 60 | 60 | 60 | 60 | 60 | 60 | 60 | 60 | 60 | 60 |
| Amount of sintered alumina of 1 μm or less[*2] (mass %) | 0 | 80 | 2 | 5 | 10 | 30 | 50 | 70 | 0 | 80 |
| Amount of fused alumina of from 75 μm to 5 mm[*2] (mass %) | 85.56 | 5.56 | 83.56 | 80.56 | 75.56 | 55.56 | 35.56 | 15.56 | 85.56 | 5.56 |
| 15 tap-flow value (mm) After mixing | 176 | 144 | 184 | 176 | 172 | 173 | 171 | 162 | 184 | 136 |
| After 2 hours | 144 | 106 | 131 | 134 | 132 | 135 | 132 | 122 | 139 | 106 |
| Bending strength after curing of 6 hours (MPa) | 0.4 | 1.1 | 0.8 | 0.9 | 0.9 | 0.9 | 1 | 1.2 | 0.4 | 1.3 |
| Bending strength after curing of 12 hours (MPa) | 0.6 | 1.5 | 1.1 | 1.2 | 1.2 | 1.4 | 1.4 | 1.5 | 0.8 | 1.6 |
| Bending strength after curing of 24 hours (MPa) | 1.8 | 2.3 | 1.8 | 1.9 | 2 | 2.1 | 2.2 | 2.2 | 1.5 | 2 |
| Wear amount in rotary corrosion test (mm) | 6.5 | 6.1 | 6.1 | 5.9 | 5.9 | 5.7 | 5.7 | 5.8 | 5.9 | 6.2 |

Note)
[*1] $Al_2O_3$ other than solid solution and $CaAl_2O_4$
[*2] Mixing ratio with respect to monolithic refractory (total amount of binder and refractory aggregates)

TABLE 52

|  | Example 288 | Example 289 | Example 290 | Example 291 | Example 292 | Example 293 | Reference Example 33 | Reference Example 34 |
|---|---|---|---|---|---|---|---|---|
| X value of $Ca_xSr_{1-x}Al_2O_4$ | 0.05 | 0.05 | 0.05 | 0.05 | 0.05 | 0.05 | 0.05 | 0.05 |
| Crystallite diameter of solid solution obtained by dissolving Ca components in $\alpha$-$SrAl_2O_4$ (nm) | 14 | 14 | 14 | 14 | 14 | 14 | 14 | 14 |
| Blending ratio of solid solution obtained by dissolving Ca components in $\alpha$-$SrAl_2O_4$ (mass %) | 59 | 59 | 59 | 59 | 59 | 59 | 59 | 59 |
| X value of $Ca_xSr_{1-x}Al_2O_4$ | 0.3 | 0.3 | 0.3 | 0.3 | 0.3 | 0.3 | 0.3 | 0.3 |
| Crystallite diameter of solid solution obtained by dissolving Ca components in $\beta$-$SrAl_2O_4$ (nm) | 54 | 54 | 54 | 54 | 54 | 54 | 54 | 54 |
| Blending ratio of solid solution obtained by dissolving Ca components in $\beta$-$SrAl_2O_4$ (mass %) | 14 | 14 | 14 | 14 | 14 | 14 | 14 | 14 |
| X value of $Ca_xSr_{1-x}Al_2O_4$ | 0.95 | 0.95 | 0.95 | 0.95 | 0.95 | 0.95 | 0.95 | 0.95 |
| Crystallite diameter of solid solution obtained by dissolving Sr components in $CaAl_2O_4$ (nm) | 50 | 50 | 50 | 50 | 50 | 50 | 50 | 50 |
| Blending ratio of solid solution obtained by dissolving Sr components in $CaAl_2O_4$ (mass %) | 12 | 12 | 12 | 12 | 12 | 12 | 12 | 12 |
| Blending ratio of $\alpha$-$Al_2O_3$ (mass %)[*1] | 60 | 60 | 60 | 60 | 60 | 60 | 60 | 60 |
| Amount of sintered alumina of 1 μm or less[*2] (mass %) | 2 | 5 | 10 | 30 | 50 | 70 | 0 | 80 |
| Amount of fused alumina of from 75 μm to 5 mm[*2] (mass %) | 83.56 | 80.56 | 75.56 | 55.56 | 35.56 | 15.56 | 85.56 | 5.56 |
| 15 tap-flow value (mm) After mixing | 184 | 181 | 177 | 174 | 171 | 163 | 186 | 142 |
| After 2 hours | 142 | 139 | 139 | 136 | 136 | 131 | 142 | 104 |
| Bending strength after curing of 6 hours (MPa) | 0.8 | 0.9 | 0.9 | 1 | 1 | 1.1 | 0.5 | 1.2 |
| Bending strength after curing of 12 hours (MPa) | 1.1 | 1.1 | 1.2 | 1.2 | 1.3 | 1.3 | 0.7 | 1.5 |
| Bending strength after curing of 24 hours (MPa) | 1.9 | 2 | 2.1 | 2.1 | 2.1 | 2.2 | 1.4 | 2.2 |
| Wear amount in rotary corrosion test (mm) | 6.1 | 5.9 | 5.8 | 5.7 | 5.7 | 5.8 | 6.3 | 5.9 |

Note)
[*1] $Al_2O_3$ other than solid solution and $CaAl_2O_4$
[*2] Mixing ratio with respect to monolithic refractory (total amount of binder and refractory aggregates)

The evaluation results are as shown in Tables 48 to 52. In Examples 258 to 293, the flow values suitable for pouring were obtained 2 hours after the start of mixing. Therefore, it has been confirmed that Examples 258 to 293 can be applied to furnaces with a large volume or the like. Furthermore, Examples 258 to 293 show favorable values in the flexural strength after curing of 6, 12, and 24 hours, and therefore it has been clarified that Examples 258 to 293 are excellent in terms of early strength developing property. Furthermore, it has been clarified that, Examples 258 to 293 show small wear amounts in the rotary corrosion test using slag and are excellent in terms of slag resistance at a high temperature.

On the other hand, in Reference Examples 23, 25, 27, 29, 31, and 33 including no ultrafine alumina powder with a particle diameter of 1 μm or less, it has been confirmed that the flexural strength after curing of 6 hours is low, it is difficult for a frame to be removed early, and the risk of explosion increases due to insufficient strength when the monolithic refractories are dried. In Reference Examples 24, 26, 28, 30, 32, and 34 including 80 mass % of ultrafine alumina powder with a particle diameter of 1 μm or less, the flow values deteriorated after 2 hours and a large amount of deterioration in the flow property after 2 hours occurred. Therefore, it has been confirmed that it is difficult for Reference Examples 24, 26, 28, 30, 32, and 34 to be applied to furnaces with a large volume or the like.

From these test results, in the binders for monolithic refractories according to the present invention, it has been confirmed that it is preferable to blend a refractory aggregate including an ultrafine alumina powder with a particle diameter of 1 μm or less in which an amount of the ultrafine alumina powder with a particle diameter of 1 μm or less is from 2 mass % to 70 mass %.

[12] Examples relating to a monolithic refractory using a varied amount of the binder for monolithic refractories according to the present invention In Examples 294 to 337 and Reference Examples 35 to 44, in monolithic refractories manufactured using the binder according to the present invention, the same tests were performed with a varied amount of the binder in a case in which the total of the binder and refractory aggregates was made to be 100 mass %. In all tests, a binder including 40 mass % of various solid solutions and their mixture and 60 mass % of α-$Al_2O_3$ were used, wherein the solid solutions prepared such that raw materials had been controlled to obtain an X value of $Ca_xSr_{1-x}Al_2O_4$ of 0.05, 0.30, or 0.95 and firing had been performed for 2 hours at the maximum temperature of 1500° C. Tables 53 to 58 show the compositions of the solid solutions, the crystallite diameters of the solid solutions, the blending ratio of the various solid solutions and α-$Al_2O_3$, the amount of the binder added, and the measurement results of flow value and flexural strength after curing and results of the rotary corrosion test of the monolithic refractory in each of the Examples.

TABLE 53

| | Example 294 | Example 295 | Example 296 | Example 297 | Example 298 | Example 299 | Example 300 | Example 301 | Reference Example 35 | Reference Example 36 |
|---|---|---|---|---|---|---|---|---|---|---|
| X value of $Ca_xSr_{1-x}Al_2O_4$ | 0.05 | 0.05 | 0.05 | 0.05 | 0.05 | 0.05 | 0.05 | 0.05 | 0.05 | 0.05 |
| Crystallite diameter of solid solution obtained by dissolving Ca components in α-$SrAl_2O_4$ (nm) | 59 | 59 | 59 | 59 | 59 | 59 | 59 | 59 | 59 | 59 |
| Blending ratio of solid solution obtained by dissolving Ca components in α-$SrAl_2O_4$ (mass %) | 40 | 40 | 40 | 40 | 40 | 40 | 40 | 40 | 40 | 0 |
| X value of $Ca_xSr_{1-x}Al_2O_4$ | 0.3 | 0.3 | 0.3 | 0.3 | 0.3 | 0.3 | 0.3 | 0.3 | 0.3 | 0.3 |
| Crystallite diameter of solid solution obtained by dissolving Ca components in β-$SrAl_2O_4$ (nm) | 54 | 54 | 54 | 54 | 54 | 54 | 54 | 54 | 54 | 54 |
| Blending ratio of solid solution obtained by dissolving Ca components in β-$SrAl_2O_4$ (mass %) | 0 | 0 | 0 | 0 | 0 | 0 | 0 | 0 | 0 | 40 |
| X value of $Ca_xSr_{1-x}Al_2O_4$ | 0.95 | 0.95 | 0.95 | 0.95 | 0.95 | 0.95 | 0.95 | 0.95 | 0.95 | 0.95 |
| Crystallite diameter of solid solution obtained by dissolving Sr components in $CaAl_2O_4$ (nm) | 50 | 50 | 50 | 50 | 50 | 50 | 50 | 50 | 50 | 50 |
| Blending ratio of solid solution obtained by dissolving Sr components in $CaAl_2O_4$ (mass %) | 0 | 0 | 0 | 0 | 0 | 0 | 0 | 0 | 0 | 0 |
| Blending ratio of α-$Al_2O_3$ (mass %)[*1] | 60 | 60 | 60 | 60 | 60 | 60 | 60 | 60 | 60 | 60 |
| Amount of binder added (mass %) | 0.2 | 0.3 | 0.5 | 5 | 10 | 12 | 16 | 20 | 25 | 0.2 |
| 15 tap-flow value (mass %) After mixing | 161 | 163 | 171 | 168 | 170 | 174 | 176 | 172 | 163 | 161 |
| After 2 hours | 133 | 136 | 134 | 129 | 131 | 129 | 127 | 123 | 117 | 133 |
| Bending strength after curing of 6 hours (MPa) | 0.7 | 0.8 | 0.9 | 1.1 | 1.2 | 1.2 | 1.3 | 1.4 | 1.5 | 0.6 |
| Bending strength after curing of 12 hours (MPa) | 0.9 | 1.1 | 1.2 | 1.4 | 1.5 | 1.5 | 1.6 | 1.8 | 1.9 | 0.8 |
| Bending strength after curing of 24 hours (MPa) | 1.4 | 1.5 | 1.5 | 1.8 | 2 | 2.1 | 2.1 | 2.2 | 2.2 | 1.5 |
| | 5 | 5 | 5.1 | 5.4 | 5.8 | 5.8 | 6 | 6.4 | 7.1 | 5.2 |

Note)
[*1] $Al_2O_3$ other than solid solution and $CaAl_2O_4$

TABLE 54

| | Example 302 | Example 303 | Example 304 | Example 305 | Example 306 | Example 307 | Example 308 | Reference Example 37 | Reference Example 38 | Example 309 |
|---|---|---|---|---|---|---|---|---|---|---|
| X value of $Ca_xSr_{1-x}Al_2O_4$ | 0.05 | 0.05 | 0.05 | 0.05 | 0.05 | 0.05 | 0.05 | 0.05 | 0.05 | 0.05 |
| Crystallite diameter of solid solution obtained by dissolving Ca components in α-$SrAl_2O_4$ (nm) | 59 | 59 | 59 | 59 | 59 | 59 | 59 | 59 | 59 | 59 |
| Blending ratio of solid solution obtained by dissolving Ca components in α-$SrAl_2O_4$ (mass %) | 0 | 0 | 0 | 0 | 0 | 0 | 0 | 0 | 20 | 20 |
| X value of $Ca_xSr_{1-x}Al_2O_4$ | 0.3 | 0.3 | 0.3 | 0.3 | 0.3 | 0.3 | 0.3 | 0.3 | 0.3 | 0.3 |
| Crystallite diameter of solid solution obtained by dissolving Ca components in β-$SrAl_2O_4$ (nm) | 54 | 54 | 54 | 54 | 54 | 54 | 54 | 54 | 54 | 54 |
| Blending ratio of solid solution obtained by dissolving Ca components in β-$SrAl_2O_4$ (mass %) | 40 | 40 | 40 | 40 | 40 | 40 | 40 | 40 | 0 | 0 |
| X value of $Ca_xSr_{1-x}Al_2O_4$ | 0.95 | 0.95 | 0.95 | 0.95 | 0.95 | 0.95 | 0.95 | 0.95 | 0.95 | 0.95 |
| Crystallite diameter of solid solution obtained by dissolving Sr components in $CaAl_2O_4$ (nm) | 50 | 50 | 50 | 50 | 50 | 50 | 50 | 50 | 50 | 50 |
| Blending ratio of solid solution obtained by dissolving Sr components in $CaAl_2O_4$ (mass %) | 0 | 0 | 0 | 0 | 0 | 0 | 0 | 0 | 20 | 20 |

TABLE 54-continued

|  | Example 302 | Example 303 | Example 304 | Example 305 | Example 306 | Example 307 | Example 308 | Reference Example 37 | Reference Example 38 | Example 309 |
|---|---|---|---|---|---|---|---|---|---|---|
| Blending ratio of α-$Al_2O_3$ (mass %)*[1] | 60 | 60 | 60 | 60 | 60 | 60 | 60 | 60 | 60 | 60 |
| Amount of binder added (mass %) | 0.3 | 0.5 | 5 | 10 | 12 | 16 | 20 | 25 | 0.2 | 0.3 |
| 15 tap-flow value (mass %) After mixing | 162 | 167 | 169 | 172 | 170 | 174 | 168 | 169 | 159 | 162 |
| After 2 hours | 130 | 135 | 132 | 132 | 129 | 125 | 125 | 120 | 136 | 136 |
| Bending strength after curing of 6 hours (MPa) | 0.7 | 0.8 | 1 | 1.1 | 1.1 | 1.2 | 1.3 | 1.3 | 0.6 | 0.7 |
| Bending strength after curing of 12 hours (MPa) | 1 | 1.1 | 1.3 | 1.4 | 1.5 | 1.6 | 1.7 | 1.8 | 0.8 | 0.9 |
| Bending strength after curing of 24 hours (MPa) | 1.7 | 1.7 | 1.9 | 2 | 2.2 | 2.4 | 2.5 | 2.5 | 1.3 | 1.4 |
|  | 5.1 | 5.2 | 5.3 | 5.6 | 5.6 | 6.1 | 6.6 | 7.1 | 5 | 5.1 |

Note)
*[1] $Al_2O_3$ other than solid solution and $CaAl_2O_4$

TABLE 55

|  | Example 310 | Example 311 | Example 312 | Example 313 | Example 314 | Example 315 | Reference Example 39 | Reference Example 40 | Example 316 | Example 317 |
|---|---|---|---|---|---|---|---|---|---|---|
| X value of $Ca_xSr_{1-x}Al_2O_4$ | 0.05 | 0.05 | 0.05 | 0.05 | 0.05 | 0.05 | 0.05 | 0.05 | 0.05 | 0.05 |
| Crystallite diameter of solid solution obtained by dissolving Ca components in α-$SrAl_2O_4$ (nm) | 59 | 59 | 59 | 59 | 59 | 59 | 59 | 59 | 59 | 59 |
| Blending ratio of solid solution obtained by dissolving Ca components in α-$SrAl_2O_4$ (mass %) | 20 | 20 | 20 | 20 | 20 | 20 | 20 | 0 | 0 | 0 |
| X value of $Ca_xSr_{1-x}Al_2O_4$ | 0.3 | 0.3 | 0.3 | 0.3 | 0.3 | 0.3 | 0.3 | 0.3 | 0.3 | 0.3 |
| Crystallite diameter of solid solution obtained by dissolving Ca components in β-$SrAl_2O_4$ (nm) | 54 | 54 | 54 | 54 | 54 | 54 | 54 | 54 | 54 | 54 |
| Blending ratio of solid solution obtained by dissolving Ca components in β-$SrAl_2O_4$ (mass %) | 0 | 0 | 0 | 0 | 0 | 0 | 0 | 20 | 20 | 20 |
| X value of $Ca_xSr_{1-x}Al_2O_4$ | 0.95 | 0.95 | 0.95 | 0.95 | 0.95 | 0.95 | 0.95 | 0.95 | 0.95 | 0.95 |
| Crystallite diameter of solid solution obtained by dissolving Sr components in $CaAl_2O_4$ (nm) | 50 | 50 | 50 | 50 | 50 | 50 | 50 | 50 | 50 | 50 |
| Blending ratio of solid solution obtained by dissolving Sr components in $CaAl_2O_4$ (mass %) | 20 | 20 | 20 | 20 | 20 | 20 | 20 | 20 | 20 | 20 |
| Blending ratio of α-$Al_2O_3$ (mass %)*[1] | 60 | 60 | 60 | 60 | 60 | 60 | 60 | 60 | 60 | 60 |
| Amount of binder added (mass %) | 0.5 | 5 | 10 | 12 | 16 | 20 | 25 | 0.2 | 0.3 | 0.5 |
| 15 tap-flow value (mass %) After mixing | 166 | 170 | 172 | 175 | 173 | 167 | 166 | 160 | 158 | 162 |
| After 2 hours | 139 | 135 | 136 | 133 | 133 | 127 | 125 | 132 | 134 | 132 |
| Bending strength after curing of 6 hours (MPa) | 0.8 | 0.9 | 1.1 | 1.1 | 1.2 | 1.3 | 1.5 | 0.5 | 0.7 | 0.8 |
| Bending strength after curing of 12 hours (MPa) | 0.9 | 1.2 | 1.5 | 1.5 | 1.6 | 1.8 | 1.8 | 0.8 | 0.9 | 0.9 |
| Bending strength after curing of 24 hours (MPa) | 1.4 | 1.8 | 2.2 | 2.3 | 2.3 | 2.3 | 2.4 | 1.2 | 1.4 | 1.5 |
|  | 5.2 | 5.6 | 5.8 | 6 | 6.2 | 6.6 | 7.2 | 5.2 | 5.2 | 5.2 |

Note)
*[1] $Al_2O_3$ other than solid solution and $CaAl_2O_4$

TABLE 56

|  | Example 318 | Example 319 | Example 320 | Example 321 | Example 322 | Reference Example 41 | Example 323 | Example 324 | Example 325 | Example 326 |
|---|---|---|---|---|---|---|---|---|---|---|
| X value of $Ca_xSr_{1-x}Al_2O_4$ | 0.05 | 0.05 | 0.05 | 0.05 | 0.05 | 0.05 | 0.05 | 0.05 | 0.05 | 0.05 |
| Crystallite diameter of solid solution obtained by dissolving Ca components in α-$SrAl_2O_4$ (nm) | 59 | 59 | 59 | 59 | 59 | 59 | 59 | 59 | 59 | 59 |
| Blending ratio of solid solution obtained by dissolving Ca components in α-$SrAl_2O_4$ (mass %) | 0 | 0 | 0 | 0 | 0 | 0 | 20 | 20 | 20 | 20 |
| X value of $Ca_xSr_{1-x}Al_2O_4$ | 0.3 | 0.3 | 0.3 | 0.3 | 0.3 | 0.3 | 03 | 0.3 | 0.3 | 0.3 |
| Crystallite diameter of solid solution obtained by dissolving Ca components in β-$SrAl_2O_4$ (nm) | 54 | 54 | 54 | 54 | 54 | 54 | 54 | 54 | 54 | 54 |
| Blending ratio of solid solution obtained by dissolving Ca components in β-$SrAl_2O_4$ (mass %) | 20 | 20 | 20 | 20 | 20 | 20 | 20 | 20 | 20 | 20 |
| X value of $Ca_xSr_{1-x}Al_2O_4$ | 0.95 | 0.95 | 0.95 | 0.95 | 0.95 | 0.95 | 0.95 | 0.95 | 0.95 | 0.95 |
| Crystallite diameter of solid solution obtained by dissolving Sr components in $CaAl_2O_4$ (nm) | 50 | 50 | 50 | 50 | 50 | 50 | 50 | 50 | 50 | 50 |
| Blending ratio of solid solution obtained by dissolving Sr components in $CaAl_2O_4$ (mass %) | 20 | 20 | 20 | 20 | 20 | 0 | 0 | 0 | 0 | 0 |
| Blending ratio of α-$Al_2O_3$ (mass %)*[1] | 60 | 60 | 60 | 60 | 60 | 60 | 60 | 60 | 60 | 60 |

TABLE 56-continued

|  | Example 318 | Example 319 | Example 320 | Example 321 | Example 322 | Reference Example 41 | Example 323 | Example 324 | Example 325 | Example 326 |
|---|---|---|---|---|---|---|---|---|---|---|
| Amount of binder added (mass %) | 5 | 10 | 12 | 16 | 20 | 25 | 0.2 | 0.3 | 0.5 | 5 |
| 15 tap-flow value (mass %) After mixing | 166 | 169 | 172 | 176 | 171 | 173 | 161 | 163 | 171 | 168 |
| After 2 hours | 130 | 137 | 134 | 131 | 129 | 128 | 133 | 136 | 134 | 129 |
| Bending strength after curing of 6 hours (MPa) | 0.9 | 1 | 1 | 1.1 | 1.2 | 1.2 | 0.7 | 0.7 | 0.8 | 1 |
| Bending strength after curing of 12 hours (MPa) | 1.1 | 1.3 | 1.3 | 1.4 | 1.5 | 1.6 | 0.9 | 1 | 1.1 | 1.2 |
| Bending strength after curing of 24 hours (MPa) | 2.2 | 2.4 | 2.5 | 2.5 | 2.6 | 2.7 | 1.5 | 1.6 | 1.6 | 1.8 |
|  | 5.6 | 5.9 | 6.1 | 6.2 | 6.7 | 7.3 | 5.1 | 5.2 | 5.1 | 5.3 |

Note)
[1]$Al_2O_3$ other than solid solution and $CaAl_2O_4$

TABLE 57

|  | Example 327 | Example 328 | Example 329 | Example 330 | Reference Example 42 | Reference Example 43 | Example 331 | Example 332 | Example 333 | Example 334 |
|---|---|---|---|---|---|---|---|---|---|---|
| X value of $Ca_xSr_{1-x}Al_2O_4$ | 0.05 | 0.05 | 0.05 | 0.05 | 0.05 | 0.05 | 0.05 | 0.05 | 0.05 | 0.05 |
| Crystallite diameter of solid solution obtained by dissolving Ca components in $\alpha$-$SrAl_2O_4$ (nm) | 59 | 59 | 59 | 59 | 59 | 59 | 59 | 59 | 59 | 59 |
| Blending ratio of solid solution obtained by dissolving Ca components in $\alpha$-$SrAl_2O_4$ (mass %) | 20 | 20 | 20 | 20 | 20 | 14 | 14 | 14 | 14 | 14 |
| X value of $Ca_xSr_{1-x}Al_2O_4$ | 0.3 | 0.3 | 0.3 | 0.3 | 0.3 | 0.3 | 0.3 | 0.3 | 0.3 | 0.3 |
| Crystallite diameter of solid solution obtained by dissolving Ca components in $\beta$-$SrAl_2O_4$ (nm) | 54 | 54 | 54 | 54 | 54 | 54 | 54 | 54 | 54 | 54 |
| Blending ratio of solid solution obtained by dissolving Ca components in $\beta$-$SrAl_2O_4$ (mass %) | 20 | 20 | 20 | 20 | 20 | 14 | 14 | 14 | 14 | 14 |
| X value of $Ca_xSr_{1-x}Al_2O_4$ | 0.95 | 0.95 | 0.95 | 0.95 | 0.95 | 0.95 | 0.95 | 0.95 | 0.95 | 0.95 |
| Crystallite diameter of solid solution obtained by dissolving Sr components in $CaAl_2O_4$ (nm) | 50 | 50 | 50 | 50 | 50 | 50 | 50 | 50 | 50 | 50 |
| Blending ratio of solid solution obtained by dissolving Sr components in $CaAl_2O_4$ (mass %) | 0 | 0 | 0 | 0 | 0 | 12 | 12 | 12 | 12 | 12 |
| Blending ratio of $\alpha$-$Al_2O_3$ (mass %)[1] | 60 | 60 | 60 | 60 | 60 | 60 | 60 | 60 | 60 | 60 |
| Amount of binder added (mass %) | 10 | 12 | 16 | 20 | 25 | 0.2 | 0.3 | 0.5 | 5 | 10 |
| 15 tap-flow value (mass %) After mixing | 170 | 174 | 176 | 172 | 163 | 157 | 156 | 160 | 165 | 171 |
| After 2 hours | 131 | 129 | 127 | 123 | 117 | 133 | 135 | 134 | 133 | 135 |
| Bending strength after curing of 6 hours (MPa) | 1.1 | 1.1 | 1.2 | 1.3 | 1.4 | 0.6 | 0.7 | 0.8 | 1 | 1 |
| Bending strength after curing of 12 hours (MPa) | 1.4 | 1.5 | 1.5 | 1.9 | 1.9 | 0.9 | 1 | 1.1 | 1.2 | 1.3 |
| Bending strength after curing of 24 hours (MPa) | 2 | 2.1 | 2.2 | 2.3 | 2.4 | 1.2 | 1.4 | 1.5 | 2 | 2.2 |
|  | 5.7 | 5.7 | 6.1 | 6.5 | 7.1 | 5.1 | 5.1 | 5.1 | 5.5 | 5.9 |

Note)
[1]$Al_2O_3$ other than solid solution and $CaAl_2O_4$

TABLE 58

|  | Example 335 | Example 336 | Example 337 | Reference Example 44 |
|---|---|---|---|---|
| X value of $Ca_xSr_{1-x}Al_2O_4$ | 0.05 | 0.05 | 0.05 | 0.05 |
| Crystallite diameter of solid solution obtained by dissolving Ca components in $\alpha$-$SrAl_2O_4$ (nm) | 59 | 59 | 59 | 59 |
| Blending ratio of solid solution obtained by dissolving Ca components in $\alpha$-$SrAl_2O_4$ (mass %) | 14 | 14 | 14 | 14 |
| X value of $Ca_xSr_{1-x}Al_2O_4$ | 0.3 | 0.3 | 0.3 | 0.3 |
| Crystallite diameter of solid solution obtained by dissolving Ca components in $\beta$-$SrAl_2O_4$ (nm) | 54 | 54 | 54 | 54 |
| Blending ratio of solid solution obtained by dissolving Ca components in $\beta$-$SrAl_2O_4$ (mass %) | 14 | 14 | 14 | 14 |
| X value of $Ca_xSr_{1-x}Al_2O_4$ | 0.95 | 0.95 | 0.95 | 0.95 |
| Crystallite diameter of solid solution obtained by dissolving Sr components in $CaAl_2O_4$ (nm) | 50 | 50 | 50 | 50 |
| Blending ratio of solid solution obtained by dissolving Sr components in $CaAl_2O_4$ (mass %) | 12 | 12 | 12 | 12 |
| Blending ratio of $\alpha$-$Al_2O_3$ (mass %) [1] | 60 | 60 | 60 | 60 |
| Amount of binder added (mass %) | 12 | 16 | 20 | 25 |
| 15 tap-flow value (mass %) After mixing | 173 | 173 | 170 | 169 |
| After 2 hours | 130 | 135 | 129 | 127 |

TABLE 58-continued

|  | Example 335 | Example 336 | Example 337 | Reference Example 44 |
|---|---|---|---|---|
| Bending strength after curing of 6 hours (MPa) | 1.1 | 1.2 | 1.2 | 1.2 |
| Bending strength after curing of 12 hours (MPa) | 1.4 | 1.5 | 1.6 | 1.6 |
| Bending strength after curing of 24 hours (MPa) | 2.3 | 2.4 | 2.4 | 2.5 |
|  | 5.9 | 6.3 | 6.8 | 7.1 |

Note)
*[1] $Al_2O_3$ other than solid solution and $CaAl_2O_4$

The evaluation results are as shown in Tables 53 to 58. In Examples 294 to 337, the flow values suitable for pouring were obtained 2 hours after the start of mixing. Therefore, it has been confirmed that Examples 294 to 337 can be applied to furnaces with a large volume or the like. Furthermore, Examples 294 to 337 show favorable values in the flexural strength after curing of 6, 12, and 24 hours. In particular, Examples 294 to 337 show larger values in the flexural strength after curing of 6 hours, and therefore it has been clarified that Examples 294 to 337 are excellent in terms of early strength developing property. Furthermore, it has been clarified that, Examples 294 to 337 show small wear amounts in the rotary corrosion test using slag and are excellent in terms of slag resistance at a high temperature.

On the other hand, in Reference Examples 36, 38, 40, and 43 in which an amount of the binder added was 0.2 mass %, it has been confirmed that the flexural strength after curing of 6 hours is low, it is difficult for a frame to be removed early, and the risk of explosion increases due to insufficient strength when the monolithic refractories are dried. In Reference Examples 35, 37, 39, 41, 42, and 44 in which an amount of the binder added was 25 mass %, it has been confirmed that, compared to other cases, Reference Examples 35, 37, 39, 41, 42, and 44 show an increase in the wear amount in the rotary corrosion test using slag and degradation in the slag resistance at a high temperature.

In Examples in which an amount of the binder added was from 0.5 mass % to 12 mass %, it has been confirmed that Examples are excellent in terms of both of the cured strength and the wear amount in the rotary corrosion test using slag.

From these test results, it has been confirmed that the amount of the binder for monolithic refractories according to the present invention is preferably from 0.3 mass % to 20 mass %, and further preferably from 0.5 mass % to 12 mass % with respect to 100 mass % of the total amount of the binder for monolithic refractories and the refractory aggregates.

[13] Examples relating to a monolithic refractory into which at least one of a dispersant, a hardening retardant, and a hardening accelerator is added In Examples 338 to 515, monolithic refractories were manufactured by using a binder including 40 mass % of various solid solutions and their mixture and 60 mass % of α-$Al_2O_3$, wherein the solid solutions prepared such that raw materials had been controlled to obtain an X value of $Ca_xSr_{1-x}Al_2O_4$ of 0.05, 0.30, or 0.95 and firing had been performed for 2 hours at the maximum temperature of 1500° C., and blending a predetermined amount of at least one kind of a variety of dispersants, hardening retardants and hardening accelerators in outer percentage, and then the tests were performed. In addition, in Comparative Examples 31 to 47, monolithic refractories were manufactured by using a binder including no Sr components and blending at least one kind of a dispersant, a hardening retardant and a hardening accelerator in the same manner, and then the tests were performed. Further, when blending a dispersant, a hardening retardant, or a dispersant and a hardening retardant, the amount of water added was reduced to 6.2 mass % with respect to 100 mass % of the mixture of the binder and refractory aggregates, and then the test was performed. In addition, when blending only a hardening accelerator, as usual, 6.8 mass % of water was added and the test was performed. A powder dispersant, a hardening retardant, and a hardening accelerator were used after being blended with the binder and refractory aggregate using an omni mixer. For liquid dispersants, the mass of solid components included was considered as the amount added, and adjustment was performed so as to obtain a predetermined amount of water by reducing from the amount of water to be added by the mass portion of the solvent parts. In addition, liquid dispersants were used after being blended with mixing water.

Meanwhile, in the embodiments, a sodium polyacrylate reagent, which is a polycarboxylic acid-based dispersant, was used as the dispersant A; "TIGHTLOCK" (trade name, manufactured by Kao Corporation), which is a polyether-based dispersant, was used as the dispersant B; sodium tripolyphosphate (primary reagent), which is a phosphate-based dispersant, was used as the dispersant C; trisodium citrate dihydrate (primary reagent), which is an oxycarboxylic acid, was used as the dispersant D; "FT-3S" (with a solid content of 33 mass %) (trade name, manufactured by Grace Chemical Co., Ltd.), which is a melamine-based dispersant, was used as the dispersant E; "MIGHTY 150" (with a solid content of 40 mass %) (trade name, manufactured by Kao Corporation), which is a naphthalene-based dispersant, was used as the dispersant F; "VANILLEX HW" (trade name, manufactured by Nippon Paper Chemicals Co., Ltd.), which is a lignin-based dispersant, was used as the dispersant G; boric acid (special grade chemical), which is one of boric acid groups, was used as the hardening retardant a; sodium silicofluoride (special grade chemical), which is a silicofluoride, was used as the hardening retardant b; lithium citrate (primary reagent), which is one of salts of alkaline metals, was used as the hardening accelerator a; and sodium aluminate (primary reagent), which is one of aluminates, was used as the hardening accelerator 13.

Tables 59 to 78 show the compositions of the solid solutions, the crystallite diameters of the solid solutions, the blending ratio of the various solid solutions and $CaAl_2O_4$ and α-$Al_2O_3$ for comparison, the type and amount added of the dispersant, the type and amount added of the hardening retardant, the type and amount added of the hardening accelerator, and the measurement results of flow value and flexural strength after curing and results of the rotary corrosion test of the monolithic refractory in each of the Examples. In the tables, the amounts of the dispersant, the hardening retardant, and the hardening accelerator used are represented by the ratio to the total amount of the binders and the refractory aggregates.

TABLE 59

|  | Example 338 | Example 339 | Example 340 | Example 341 | Example 342 | Example 343 | Example 344 | Example 345 | Example 346 | Example 347 |
|---|---|---|---|---|---|---|---|---|---|---|
| X value of $Ca_xSr_{1-x}Al_2O_4$ | 0.05 | 0.05 | 0.05 | 0.05 | 0.05 | 0.05 | 0.05 | 0.05 | 0.05 | 0.05 |
| Crystallite diameter of solid solution obtained by dissolving Ca components in $\alpha$-$SrAl_2O_4$ (nm) | 59 | 59 | 59 | 59 | 59 | 59 | 59 | 59 | 59 | 59 |
| Blending ratio of solid solution obtained by dissolving Ca components in $\alpha$-$SrAl_2O_4$ (mass %) | 40 | 40 | 40 | 40 | 40 | 40 | 40 | 40 | 40 | 40 |
| X value of $Ca_xSr_{1-x}Al_2O_4$ | 0.3 | 0.3 | 0.3 | 0.3 | 0.3 | 0.3 | 0.3 | 0.3 | 0.3 | 0.3 |
| Crystallite diameter of solid solution obtained by dissolving Ca components in $\beta$-$SrAl_2O_4$ (nm) | 54 | 54 | 54 | 54 | 54 | 54 | 54 | 54 | 54 | 54 |
| Blending ratio of solid solution obtained by dissolving Ca components in $\beta$-$SrAl_2O_4$ (mass %) | 0 | 0 | 0 | 0 | 0 | 0 | 0 | 0 | 0 | 0 |
| X value of $Ca_xSr_{1-x}Al_2O_4$ | 0.95 | 0.95 | 0.95 | 0.95 | 0.95 | 0.95 | 0.95 | 0.95 | 0.95 | 0.95 |
| Crystallite diameter of solid solution obtained by dissolving Sr components in $CaAl_2O_4$ (nm) | 50 | 50 | 50 | 50 | 50 | 50 | 50 | 50 | 50 | 50 |
| Blending ratio of solid solution obtained by dissolving Sr components in $CaAl_2O_4$ (mass %) | 0 | 0 | 0 | 0 | 0 | 0 | 0 | 0 | 0 | 0 |
| Blending ratio of $CaAl_2O_4$ (mass %) | — | — | — | — | — | — | — | — | — | — |
| Blending ratio of $\alpha$-$Al_2O_3$ (mass %)[*1] | 60 | 60 | 60 | 60 | 60 | 60 | 60 | 60 | 60 | 60 |
| Type of dispersant | A | A | A | B | B | B | C | C | C | D |
| Amount of dispersant added (mass %) | 0.05 | 0.1 | 0.3 | 0.05 | 0.1 | 0.3 | 0.05 | 0.1 | 0.3 | 0.05 |
| Type of hardening retardant | — | — | — | — | — | — | — | — | — | — |
| Amount of hardening retardant added (mass %) | — | — | — | — | — | — | — | — | — | — |
| Type of hardening accelerator | — | — | — | — | — | — | — | — | — | — |
| Amount of hardening accelerator added (mass %) | — | — | — | — | — | — | — | — | — | — |
| 15 tap-flow value (mm) After mixing | 160 | 172 | 189 | 171 | 182 | 194 | 146 | 153 | 159 | 143 |
| After 2 hours | 120 | 122 | 126 | 127 | 131 | 143 | 118 | 122 | 120 | 122 |
| Bending strength after curing of 6 hours (MPa) | 1.4 | 1.5 | 1.6 | 1.4 | 1.3 | 1 | 1.4 | 1.5 | 1.5 | 1.3 |
| Bending strength after curing of 12 hours (MPa) | 1.8 | 1.8 | 1.9 | 1.9 | 1.7 | 1.4 | 1.8 | 1.9 | 1.9 | 1.6 |
| Bending strength after curing of 24 hours (MPa) | 2.4 | 2.4 | 2.5 | 22 | 2.1 | 1.9 | 2.4 | 2.3 | 2.4 | 2.1 |
| Wear amount in rotary corrosion test (mm) | 5.3 | 5.2 | 5.2 | 5.3 | 5.3 | 5.5 | 5.4 | 5.3 | 5.3 | 5.6 |

Note)
[*1] $Al_2O_3$ other than solid solution and $CaAl_2O_4$

TABLE 60

|  | Example 348 | Example 349 | Example 350 | Example 351 | Example 352 | Example 353 | Example 354 | Example 355 | Example 356 | Example 357 |
|---|---|---|---|---|---|---|---|---|---|---|
| X value of $Ca_xSr_{1-x}Al_2O_4$ | 0.05 | 0.05 | 0.05 | 0.05 | 0.05 | 0.05 | 0.05 | 0.05 | 0.05 | 0.05 |
| Crystallite diameter of solid solution obtained by dissolving Ca components in $\alpha$-$SrAl_2O_4$ (nm) | 59 | 59 | 59 | 59 | 59 | 59 | 59 | 59 | 59 | 59 |
| Blending ratio of solid solution obtained by dissolving Ca components in $\alpha$-$SrAl_2O_4$ (mass %) | 40 | 40 | 40 | 40 | 40 | 40 | 40 | 40 | 40 | 40 |
| X value of $Ca_xSr_{1-x}Al_2O_4$ | 0.3 | 0.3 | 0.3 | 0.3 | 0.3 | 0.3 | 0.3 | 0.3 | 0.3 | 0.3 |
| Crystallite diameter of solid solution obtained by dissolving Ca components in $\beta$-$SrAl_2O_4$ (nm) | 54 | 54 | 54 | 54 | 54 | 54 | 54 | 54 | 54 | 54 |
| Blending ratio of solid solution obtained by dissolving Ca components in $\beta$-$SrAl_2O_4$ (mass %) | 0 | 0 | 0 | 0 | 0 | 0 | 0 | 0 | 0 | 0 |
| X value of $Ca_xSr_{1-x}Al_2O_4$ | 0.95 | 0.95 | 0.95 | 0.95 | 0.95 | 0.95 | 0.95 | 0.95 | 0.95 | 0.95 |
| Crystallite diameter of solid solution obtained by dissolving Sr components in $CaAl_2O_4$ (nm) | 50 | 50 | 50 | 50 | 50 | 50 | 50 | 50 | 50 | 50 |
| Blending ratio of solid solution obtained by dissolving Sr components in $CaAl_2O_4$ (mass %) | 0 | 0 | 0 | 0 | 0 | 0 | 0 | 0 | 0 | 0 |
| Blending ratio of $CaAl_2O_4$ (mass %) | — | — | — | — | — | — | — | — | — | — |
| Blending ratio of $\alpha$-$Al_2O_3$ (mass %)[*1] | 60 | 60 | 60 | 60 | 60 | 60 | 60 | 60 | 60 | 60 |
| Type of dispersant | D | D | E | E | E | F | F | F | G | G |
| Amount of dispersant added (mass %) | 0.1 | 0.3 | 0.05 | 0.1 | 0.3 | 0.05 | 0.1 | 0.3 | 0.05 | 0.1 |
| Type of hardening retardant | — | — | — | — | — | — | — | — | — | — |
| Amount of hardening retardant added (mass %) | — | — | — | — | — | — | — | — | — | — |
| Type of hardening accelerator | — | — | — | — | — | — | — | — | — | — |
| Amount of hardening accelerator added (mass %) | — | — | — | — | — | — | — | — | — | — |
| 15 tap-flow value (mm) After mixing | 149 | 152 | 144 | 146 | 153 | 142 | 151 | 151 | 151 | 157 |
| After 2 hours | 127 | 130 | 117 | 121 | 123 | 116 | 118 | 123 | 122 | 128 |
| Bending strength after curing of 6 hours (MPa) | 1.5 | 1.5 | 1.4 | 1.5 | 1.4 | 1.2 | 1.3 | 1.3 | 1.4 | 1.4 |
| Bending strength after curing of 12 hours (MPa) | 1.9 | 2 | 1.8 | 1.9 | 1.8 | 1.6 | 1.7 | 1.6 | 1.7 | 1.8 |
| Bending strength after curing of 24 hours (MPa) | 2.5 | 2.5 | 2.2 | 2.4 | 2.4 | 2 | 2.2 | 2.3 | 2.1 | 2.3 |
| Wear amount in rotary corrosion test (mm) | 5.4 | 5.4 | 5.6 | 5.5 | 5.4 | 5.3 | 5.4 | 5.3 | 5.4 | 5.3 |

Note)
[*1] $Al_2O_3$ other than solid solution and $CaAl_2O_4$

TABLE 61

|  | Example 358 | Example 359 | Example 360 | Example 361 | Example 362 | Example 363 | Example 364 | Example 365 | Example 366 | Example 367 |
|---|---|---|---|---|---|---|---|---|---|---|
| X value of $Ca_xSr_{1-x}Al_2O_4$ | 0.05 | 0.05 | 0.05 | 0.05 | 0.05 | 0.05 | 0.05 | 0.05 | 0.05 | 0.05 |
| Crystallite diameter of solid solution obtained by dissolving Ca components in $\alpha$-$SrAl_2O_4$ (nm) | 59 | 59 | 59 | 59 | 59 | 59 | 59 | 59 | 59 | 59 |
| Blending ratio of solid solution obtained by dissolving Ca components in $\alpha$-$SrAl_2O_4$ (mass %) | 40 | 40 | 40 | 40 | 40 | 40 | 40 | 40 | 40 | 40 |
| X value of $Ca_xSr_{1-x}Al_2O_4$ | 0.3 | 0.3 | 0.3 | 0.3 | 0.3 | 0.3 | 0.3 | 0.3 | 0.3 | 0.3 |
| Crystallite diameter of solid solution obtained by dissolving Ca components in $\beta$-$SrAl_2O_4$ (nm) | 54 | 54 | 54 | 54 | 54 | 54 | 54 | 54 | 54 | 54 |
| Blending ratio of solid solution obtained by dissolving Ca components in $\beta$-$SrAl_2O_4$ (mass %) | 0 | 0 | 0 | 0 | 0 | 0 | 0 | 0 | 0 | 0 |
| X value of $Ca_xSr_{1-x}Al_2O_4$ | 0.95 | 0.95 | 0.95 | 0.95 | 0.95 | 0.95 | 0.95 | 0.95 | 0.95 | 0.95 |
| Crystallite diameter of solid solution obtained by dissolving Sr components in $CaAl_2O_4$ (nm) | 50 | 50 | 50 | 50 | 50 | 50 | 50 | 50 | 50 | 50 |
| Blending ratio of solid solution obtained by dissolving Sr components in $CaAl_2O_4$ (mass %) | 0 | 0 | 0 | 0 | 0 | 0 | 0 | 0 | 0 | 0 |
| Blending ratio of $CaAl_2O_4$ (mass %) | — | — | — | — | — | — | — | — | — | — |
| Blending ratio of $\alpha$-$Al_2O_3$ (mass %)*[1] | 60 | 60 | 60 | 60 | 60 | 60 | 60 | 60 | 60 | 60 |
| Type of dispersant | G | — | — | — | — | — | — | — | — | — |
| Amount of dispersant added (mass %) | 0.3 | — | — | — | — | — | — | — | — | — |
| Type of hardening retardant | — | a | a | a | b | b | b | — | — | — |
| Amount of hardening retardant added (mass %) | — | 0.01 | 0.05 | 0.2 | 0.01 | 0.05 | 0.2 | — | — | — |
| Type of hardening accelerator | — | — | — | — | — | — | — | α | α | α |
| Amount of hardening accelerator added (mass %) | — | — | — | — | — | — | — | 0.01 | 0.05 | 0.2 |
| 15 tap-flow value (mm) After mixing | 156 | 151 | 161 | 163 | 145 | 141 | 140 | 169 | 174 | 164 |
| After 2 hours | 124 | 121 | 124 | 128 | 124 | 129 | 130 | 130 | 123 | 117 |
| Bending strength after curing of 6 hours (MPa) | 1.5 | 1.5 | 1.6 | 1.6 | 1.2 | 1.1 | 0.9 | 1.5 | 1.5 | 1.7 |
| Bending strength after curing of 12 hours (MPa) | 1.9 | 1.9 | 1.9 | 2 | 1.6 | 1.5 | 1.2 | 1.7 | 1.8 | 1.9 |
| Bending strength after curing of 24 hours (MPa) | 2.3 | 2.2 | 2.2 | 2.1 | 2.3 | 2.2 | 1.9 | 2 | 2.1 | 2.1 |
| Wear amount in rotary corrosion test (mm) | 5.2 | 5.4 | 5.3 | 5.4 | 5.3 | 5.4 | 5.5 | 5.8 | 5.9 | 5.8 |

Note)
*[1]$Al_2O_3$ other than solid solution and $CaAl_2O_4$

TABLE 62

|  | Example 368 | Example 369 | Example 370 | Example 371 | Example 372 | Example 373 | Example 374 | Example 375 | Example 376 | Example 377 |
|---|---|---|---|---|---|---|---|---|---|---|
| X value of $Ca_xSr_{1-x}Al_2O_4$ | 0.05 | 0.05 | 0.05 | 0.05 | 0.05 | 0.05 | 0.05 | 0.05 | 0.05 | 0.05 |
| Crystallite diameter of solid solution obtained by dissolving Ca components in $\alpha$-$SrAl_2O_4$ (nm) | 59 | 59 | 59 | 59 | 59 | 59 | 59 | 59 | 59 | 59 |
| Blending ratio of solid solution obtained by dissolving Ca components in $\alpha$-$SrAl_2O_4$ (mass %) | 40 | 40 | 40 | 40 | 40 | 40 | 40 | 40 | 40 | 40 |
| X value of $Ca_xSr_{1-x}Al_2O_4$ | 0.3 | 0.3 | 0.3 | 0.3 | 0.3 | 0.3 | 0.3 | 0.3 | 0.3 | 0.3 |
| Crystallite diameter of solid solution obtained by dissolving Ca components in $\beta$-$SrAl_2O_4$ (nm) | 54 | 54 | 54 | 54 | 54 | 54 | 54 | 54 | 54 | 54 |
| Blending ratio of solid solution obtained by dissolving Ca components in $\beta$-$SrAl_2O_4$ (mass %) | 0 | 0 | 0 | 0 | 0 | 0 | 0 | 0 | 0 | 0 |
| X value of $Ca_xSr_{1-x}Al_2O_4$ | 0.95 | 0.95 | 0.95 | 0.95 | 0.95 | 0.95 | 0.95 | 0.95 | 0.95 | 0.95 |
| Crystallite diameter of solid solution obtained by dissolving Sr components in $CaAl_2O_4$ (nm) | 50 | 50 | 50 | 50 | 50 | 50 | 50 | 50 | 50 | 50 |
| Blending ratio of solid solution obtained by dissolving Sr components in $CaAl_2O_4$ (mass %) | 0 | 0 | 0 | 0 | 0 | 0 | 0 | 0 | 0 | 0 |
| Blending ratio of $CaAl_2O_4$ (mass %) | — | — | — | — | — | — | — | — | — | — |
| Blending ratio of $\alpha$-$Al_2O_3$ (mass %)*[1] | 60 | 60 | 60 | 60 | 60 | 60 | 60 | 60 | 60 | 60 |
| Type of dispersant | — | — | — | A | A | A | A | A | A | A |
| Amount of dispersant added (mass %) | — | — | — | 0.1 | 0.1 | 0.1 | 0.1 | 0.1 | 0.1 | 0.1 |
| Type of hardening retardant | — | — | — | a | a | a | b | b | b | — |
| Amount of hardening retardant added (mass %) | — | — | — | 0.01 | 0.05 | 0.2 | 0.01 | 0.05 | 0.2 | — |
| Type of hardening accelerator | β | β | β | — | — | — | — | — | — | α |
| Amount of hardening accelerator added (mass %) | 0.01 | 0.05 | 0.2 | — | — | — | — | — | — | 0.01 |
| 15 tap-flow value (mm) After mixing | 173 | 182 | 180 | 171 | 167 | 166 | 169 | 163 | 162 | 173 |
| After 2 hours | 132 | 129 | 115 | 127 | 128 | 131 | 133 | 132 | 136 | 125 |
| Bending strength after curing of 6 hours (MPa) | 1.4 | 1.6 | 1.7 | 1.4 | 1.3 | 1.3 | 1.3 | 1.2 | 1 | 1.8 |
| Bending strength after curing of 12 hours (MPa) | 1.7 | 1.9 | 2 | 1.9 | 1.7 | 1.6 | 1.6 | 1.6 | 1.5 | 2.1 |
| Bending strength after curing of 24 hours (MPa) | 2 | 2.2 | 2.1 | 2.3 | 2.2 | 2.3 | 2.1 | 2.2 | 2.2 | 2.5 |
| Wear amount in rotary corrosion test (mm) | 5.8 | 5.9 | 6 | 5.2 | 5.4 | 5.4 | 5.3 | 5.4 | 5.2 | 5.2 |

Note)
*[1]$Al_2O_3$ other than solid solution and $CaAl_2O_4$

TABLE 63

|  | Example 378 | Example 379 | Example 380 | Example 381 | Example 382 | Example 383 | Example 384 | Example 385 | Example 386 | Example 387 |
|---|---|---|---|---|---|---|---|---|---|---|
| X value of $Ca_xSr_{1-x}Al_2O_4$ | 0.05 | 0.05 | 0.05 | 0.05 | 0.05 | 0.05 | 0.05 | 0.05 | 0.05 | 0.05 |
| Crystallite diameter of solid solution obtained by dissolving Ca components in $\alpha$-$SrAl_2O_4$ (nm) | 59 | 59 | 59 | 59 | 59 | 59 | 59 | 59 | 59 | 59 |
| Blending ratio of solid solution obtained by dissolving Ca components in $\alpha$-$SrAl_2O_4$ (mass %) | 40 | 40 | 40 | 40 | 40 | 40 | 40 | 40 | 40 | 40 |
| X value of $Ca_xSr_{1-x}Al_2O_4$ | 0.3 | 0.3 | 0.3 | 0.3 | 0.3 | 0.3 | 0.3 | 0.3 | 0.3 | 0.3 |
| Crystallite diameter of solid solution obtained by dissolving Ca components in $\beta$-$SrAl_2O_4$ (nm) | 54 | 54 | 54 | 54 | 54 | 54 | 54 | 54 | 54 | 54 |
| Blending ratio of solid solution obtained by dissolving Ca components in $\beta$-$SrAl_2O_4$ (mass %) | 0 | 0 | 0 | 0 | 0 | 0 | 0 | 0 | 0 | 0 |
| X value of $Ca_xSr_{1-x}Al_2O_4$ | 0.95 | 0.95 | 0.95 | 0.95 | 0.95 | 0.95 | 0.95 | 0.95 | 0.95 | 0.95 |
| Crystallite diameter of solid solution obtained by dissolving Sr components in $CaAl_2O_4$ (nm) | 50 | 50 | 50 | 50 | 50 | 50 | 50 | 50 | 50 | 50 |
| Blending ratio of solid solution obtained by dissolving Sr components in $CaAl_2O_4$ (mass %) | 0 | 0 | 0 | 0 | 0 | 0 | 0 | 0 | 0 | 0 |
| Blending ratio of $CaAl_2O_4$ (mass %) | — | — | — | — | — | — | — | — | — | — |
| Blending ratio of $\alpha$-$Al_2O_3$ (mass %)*[1] | 60 | 60 | 60 | 60 | 60 | 60 | 60 | 60 | 60 | 60 |
| Type of dispersant | A | A | A | A | A | — | — | — | — | — |
| Amount of dispersant added (mass %) | 0.1 | 0.1 | 0.1 | 0.1 | 0.1 | — | — | — | — | — |
| Type of hardening retardant | — | — | — | — | — | a | a | a | a | a |
| Amount of hardening retardant added (mass %) | — | — | — | — | — | 0.05 | 0.05 | 0.05 | 0.05 | 0.05 |
| Type of hardening accelerator | $\alpha$ | $\alpha$ | $\beta$ | $\beta$ | $\beta$ | $\alpha$ | $\alpha$ | $\alpha$ | $\beta$ | $\beta$ |
| Amount of hardening accelerator added (mass %) | 0.05 | 0.2 | 0.01 | 0.05 | 0.2 | 0.01 | 0.05 | 0.2 | 0.01 | 0.05 |
| 15 tap-flow value (mm) After mixing | 175 | 168 | 169 | 171 | 164 | 145 | 142 | 139 | 142 | 144 |
| After 2 hours | 121 | 117 | 124 | 121 | 118 | 134 | 128 | 118 | 131 | 123 |
| Bending strength after curing of 6 hours (MPa) | 1.9 | 1.9 | 1.8 | 1.9 | 2 | 1.5 | 1.6 | 1.8 | 1.7 | 1.8 |
| Bending strength after curing of 12 hours (MPa) | 2.2 | 2.3 | 2.1 | 2.3 | 2.3 | 1.9 | 2 | 2.2 | 2.1 | 2.2 |
| Bending strength after curing of 24 hours (MPa) | 2.5 | 2.4 | 2.6 | 2.7 | 2.7 | 2.4 | 2.3 | 2.4 | 2.5 | 2.5 |
| Wear amount in rotary corrosion test (mm) | 5.2 | 5.3 | 5.2 | 5.3 | 5.2 | 5.4 | 5.3 | 5.3 | 5.4 | 5.4 |

Note)
*[1] $Al_2O_3$ other than solid solution and $CaAl_2O_4$

TABLE 64

|  | Example 388 | Example 389 | Example 390 | Comparative Example 31 | Comparative Example 32 | Comparative Example 33 | Comparative Example 34 | Comparative Example 35 | Comparative Example 36 | Comparative Example 37 |
|---|---|---|---|---|---|---|---|---|---|---|
| X value of $Ca_xSr_{1-x}Al_2O_4$ | 0.05 | 0.05 | 0.05 | — | — | — | — | — | — | — |
| Crystallite diameter of solid solution obtained by dissolving Ca components in $\alpha$-$SrAl_2O_4$ (nm) | 59 | 59 | 59 | — | — | — | — | — | — | — |
| Blending ratio of solid solution obtained by dissolving Ca components in $\alpha$-$SrAl_2O_4$ (mass %) | 40 | 40 | 40 | — | — | — | — | — | — | — |
| X value of $Ca_xSr_{1-x}Al_2O_4$ | 0.3 | 0.3 | 0.3 | — | — | — | — | — | — | — |
| Crystallite diameter of solid solution obtained by dissolving Ca components in $\beta$-$SrAl_2O_4$ (nm) | 54 | 54 | 54 | — | — | — | — | — | — | — |
| Blending ratio of solid solution obtained by dissolving Ca components in $\beta$-$SrAl_2O_4$ (mass %) | 0 | 0 | 0 | — | — | — | — | — | — | — |
| X value of $Ca_xSr_{1-x}Al_2O_4$ | 0.95 | 0.95 | 0.95 | — | — | — | — | — | — | — |
| Crystallite diameter of solid solution obtained by dissolving Sr components in $CaAl_2O_4$ (nm) | 50 | 50 | 50 | — | — | — | — | — | — | — |
| Blending ratio of solid solution obtained by dissolving Sr components in $CaAl_2O_4$ (mass %) | 0 | 0 | 0 | — | — | — | — | — | — | — |
| Blending ratio of $CaAl_2O_4$ (mass %) | — | — | — | 40 | 40 | 40 | 40 | 40 | 40 | 40 |
| Blending ratio of $\alpha$-$Al_2O_3$ (mass %)*[1] | 60 | 60 | 60 | 60 | 60 | 60 | 60 | 60 | 60 | 60 |
| Type of dispersant | — | A | A | A | B | C | D | E | F | G |
| Amount of dispersant added (mass %) | — | 0.1 | 0.1 | 0.1 | 0.1 | 0.1 | 0.1 | 0.1 | 0.1 | 0.1 |
| Type of hardening retardant | a | a | a | — | — | — | — | — | — | — |
| Amount of hardening retardant added (mass %) | 0.05 | 0.05 | 0.05 | — | — | — | — | — | — | — |
| Type of hardening accelerator | $\beta$ | $\alpha$ | $\beta$ | — | — | — | — | — | — | — |
| Amount of hardening accelerator added (mass %) | 0.2 | 0.05 | 0.05 | — | — | — | — | — | — | — |
| 15 tap-flow value (mm) After mixing | 145 | 173 | 176 | 173 | 182 | 170 | 172 | 166 | 164 | 168 |
| After 2 hours | 116 | 137 | 134 | 137 | 142 | 131 | 129 | 131 | 125 | 132 |
| Bending strength after curing of 6 hours (MPa) | 2 | 1.8 | 2 | 0.5 | 0.3 | 0.5 | 0.6 | 0.4 | 0.6 | 0.5 |
| Bending strength after curing of 12 hours (MPa) | 2.2 | 2.2 | 2.2 | 0.8 | 0.6 | 1 | 1.1 | 0.8 | 1 | 0.9 |

TABLE 64-continued

|  | Example 388 | Example 389 | Example 390 | Comparative Example 31 | Comparative Example 32 | Comparative Example 33 | Comparative Example 34 | Comparative Example 35 | Comparative Example 36 | Comparative Example 37 |
|---|---|---|---|---|---|---|---|---|---|---|
| Bending strength after curing of 24 hours (MPa) | 2.6 | 2.6 | 2.6 | 1.4 | 1.2 | 1.7 | 1.6 | 1.3 | 1.5 | 1.6 |
| Wear amount in rotary corrosion test (mm) | 5.3 | 5.1 | 5.2 | 7.4 | 7.7 | 7.4 | 7.5 | 7.6 | 7.5 | 7.6 |

Note)
[*1] $Al_2O_3$ other than solid solution and $CaAl_2O_4$

TABLE 65

|  | Comparative Example 38 | Comparative Example 39 | Comparative Example 40 | Comparative Example 41 | Comparative Example 42 | Comparative Example 43 | Comparative Example 44 | Comparative Example 45 | Comparative Example 46 | Comparative Example 47 |
|---|---|---|---|---|---|---|---|---|---|---|
| X value of $Ca_xSr_{1-x}Al_2O_4$ | — | — | — | — | — | — | — | — | — | — |
| Crystallite diameter of solid solution obtained by dissolving Ca components in $\alpha$-$SrAl_2O_4$ (nm) | — | — | — | — | — | — | — | — | — | — |
| Blending ratio of solid solution obtained by dissolving Ca components in $\alpha$-$SrAl_2O_4$ (mass %) | — | — | — | — | — | — | — | — | — | — |
| X value of $Ca_xSr_{1-x}Al_2O_4$ | — | — | — | — | — | — | — | — | — | — |
| Crystallite diameter of solid solution obtained by dissolving Ca components in $\beta$-$SrAl_2O_4$ (nm) | — | — | — | — | — | — | — | — | — | — |
| Blending ratio of solid solution obtained by dissolving Ca components in $\beta$-$SrAl_2O_4$ (mass %) | — | — | — | — | — | — | — | — | — | — |
| X value of $Ca_xSr_{1-x}Al_2O_4$ | — | — | — | — | — | — | — | — | — | — |
| Crystallite diameter of solid solution obtained by dissolving Sr components in $CaAl_2O_4$ (nm) | — | — | — | — | — | — | — | — | — | — |
| Blending ratio of solid solution obtained by dissolving Sr components in $CaAl_2O_4$ (mass %) | — | — | — | — | — | — | — | — | — | — |
| Blending ratio of $CaAl_2O_4$ (mass %) | 40 | 40 | 40 | 40 | 40 | 40 | 40 | 40 | 40 | 40 |
| Blending ratio of $\alpha$-$Al_2O_3$ (mass %)[*1] | 60 | 60 | 60 | 60 | 60 | 60 | 60 | 60 | 60 | 60 |
| Type of dispersant | — | — | — | — | A | A | A | A | A | A |
| Amount of dispersant added (mass %) | — | — | — | — | 0.1 | 0.1 | 0.1 | 0.1 | 0.1 | 0.1 |
| Type of hardening retardant | a | b | — | — | a | b | — | — | a | b |
| Amount of hardening retardant added (mass %) | 0.05 | 0.05 | — | — | 0.05 | 0.05 | — | — | 0.05 | 0.05 |
| Type of hardening accelerator | — | — | $\alpha$ | $\beta$ | — | — | $\alpha$ | $\beta$ | $\alpha$ | $\beta$ |
| Amount of hardening accelerator added (mass %) | — | — | 0.05 | 0.05 | — | — | 0.05 | 0.05 | 0.05 | 0.05 |
| 15 tap-flow value (mm) After mixing | 151 | 147 | 153 | 150 | 167 | 161 | 164 | 173 | 168 | 173 |
| After 2 hours | 126 | 127 | 121 | 119 | 139 | 147 | 119 | 123 | 126 | 119 |
| Bending strength after curing of 6 hours (MPa) | 0.4 | 0.3 | 0.9 | 0.8 | 0.4 | 0.3 | 1 | 1 | 0.7 | 0.7 |
| Bending strength after curing of 12 hours (MPa) | 0.7 | 0.5 | 1.4 | 1.4 | 0.7 | 0.6 | 1.5 | 1.4 | 1.3 | 1.2 |
| Bending strength after curing of 24 hours (MPa) | 1.1 | 0.9 | 1.6 | 1.5 | 1.2 | 0.9 | 1.7 | 1.6 | 1.7 | 1.6 |
| Wear amount in rotary corrosion test (mm) | 7.8 | 8.1 | 8.3 | 8.2 | 7.5 | 7.9 | 7.5 | 7.6 | 7.4 | 7.6 |

Note)
[*1] $Al_2O_3$ other than solid solution and $CaAl_2O_4$

TABLE 66

|  | Example 391 | Example 392 | Example 393 | Example 394 | Example 395 | Example 396 | Example 397 | Example 398 | Example 399 | Example 400 | Example 401 |
|---|---|---|---|---|---|---|---|---|---|---|---|
| X value of $Ca_xSr_{1-x}Al_2O_4$ | 0.05 | 0.05 | 0.05 | 0.05 | 0.05 | 0.05 | 0.05 | 0.05 | 0.05 | 0.05 | 0.05 |
| Crystallite diameter of solid solution obtained by dissolving Ca components in $\alpha$-$SrAl_2O_4$ (nm) | 59 | 59 | 59 | 59 | 59 | 59 | 59 | 59 | 59 | 59 | 59 |
| Blending ratio of solid solution obtained by dissolving Ca components in $\alpha$-$SrAl_2O_4$ (mass %) | 0 | 0 | 0 | 0 | 0 | 0 | 0 | 0 | 0 | 0 | 0 |
| X value of $Ca_xSr_{1-x}Al_2O_4$ | 0.3 | 0.3 | 0.3 | 0.3 | 0.3 | 0.3 | 0.3 | 0.3 | 0.3 | 0.3 | 0.3 |
| Crystallite diameter of solid solution obtained by dissolving Ca components in $\beta$-$SrAl_2O_4$ (nm) | 54 | 54 | 54 | 54 | 54 | 54 | 54 | 54 | 54 | 54 | 54 |
| Blending ratio of solid solution obtained by dissolving Ca components in $\beta$-$SrAl_2O_4$ (mass %) | 40 | 40 | 40 | 40 | 40 | 40 | 40 | 40 | 40 | 40 | 40 |
| X value of $Ca_xSr_{1-x}Al_2O_4$ | 0.95 | 0.95 | 0.95 | 0.95 | 0.95 | 0.95 | 0.95 | 0.95 | 0.95 | 0.95 | 0.95 |

TABLE 66-continued

|  | Example 391 | Example 392 | Example 393 | Example 394 | Example 395 | Example 396 | Example 397 | Example 398 | Example 399 | Example 400 | Example 401 |
|---|---|---|---|---|---|---|---|---|---|---|---|
| Crystallite diameter of solid solution obtained by dissolving Sr components in $CaAl_2O_4$ (nm) | 50 | 50 | 50 | 50 | 50 | 50 | 50 | 50 | 50 | 50 | 50 |
| Blending ratio of solid solution obtained by dissolving Sr components in $CaAl_2O_4$ (mass %) | 0 | 0 | 0 | 0 | 0 | 0 | 0 | 0 | 0 | 0 | 0 |
| Blending ratio of $CaAl_2O_4$ (mass %) | — | — | — | — | — | — | — | — | — | — | — |
| Blending ratio of $\alpha$-$Al_2O_3$ (mass %)[*1] | 60 | 60 | 60 | 60 | 60 | 60 | 60 | 60 | 60 | 60 | 60 |
| Type of dispersant | A | A | A | B | B | B | C | C | C | D | D |
| Amount of dispersant added (mass %) | 0.05 | 0.1 | 0.3 | 0.05 | 0.1 | 0.3 | 0.05 | 0.1 | 0.3 | 0.05 | 0.1 |
| Type of hardening retardant | — | — | — | — | — | — | — | — | — | — | — |
| Amount of hardening retardant added (mass %) | — | — | — | — | — | — | — | — | — | — | — |
| Type of hardening accelerator | — | — | — | — | — | — | — | — | — | — | — |
| Amount of hardening accelerator added (mass %) | — | — | — | — | — | — | — | — | — | — | — |
| 15 tap-flow value (mm) After mixing | 158 | 170 | 173 | 167 | 180 | 186 | 148 | 151 | 157 | 151 | 153 |
| After 2 hours | 123 | 128 | 133 | 128 | 134 | 143 | 123 | 122 | 124 | 124 | 121 |
| Bending strength after curing of 6 hours (MPa) | 1.3 | 1.4 | 1.4 | 1.3 | 1.3 | 0.9 | 1.2 | 1.2 | 1.1 | 12 | 1.3 |
| Bending strength after curing of 12 hours (MPa) | 1.6 | 1.7 | 1.7 | 1.7 | 1.7 | 1.2 | 1.7 | 1.5 | 1.6 | 1.6 | 1.6 |
| Bending strength after curing of 24 hours (MPa) | 2.7 | 2.6 | 2.6 | 2.5 | 2.4 | 2.5 | 2.5 | 2.3 | 2.3 | 2.4 | 2.5 |
| Wear amount in rotary corrosion test (mm) | 5.3 | 5.4 | 5.4 | 5.5 | 5.3 | 5.3 | 5.5 | 5.5 | 5.4 | 5.3 | 5.5 |

Note)
[*1] $Al_2O_3$ other than solid solution and $CaAl_2O_4$

TABLE 67

|  | Example 402 | Example 403 | Example 404 | Example 405 | Example 406 | Example 407 | Example 408 | Example 409 | Example 410 | Example 411 | Example 412 |
|---|---|---|---|---|---|---|---|---|---|---|---|
| X value of $Ca_xSr_{1-x}Al_2O_4$ | 0.05 | 0.05 | 0.05 | 0.05 | 0.05 | 0.05 | 0.05 | 0.05 | 0.05 | 0.05 | 0.05 |
| Crystallite diameter of solid solution obtained by dissolving Ca components in $\alpha$-$SrAl_2O_4$ (nm) | 59 | 59 | 59 | 59 | 59 | 59 | 59 | 59 | 59 | 59 | 59 |
| Blending ratio of solid solution obtained by dissolving Ca components in $\alpha$-$SrAl_2O_4$ (mass %) | 0 | 0 | 0 | 0 | 0 | 0 | 0 | 0 | 0 | 0 | 0 |
| X value of $Ca_xSr_{1-x}Al_2O_4$ | 0.3 | 0.3 | 0.3 | 0.3 | 0.3 | 0.3 | 0.3 | 0.3 | 0.3 | 0.3 | 0.3 |
| Crystallite diameter of solid solution obtained by dissolving Ca components in $\beta$-$SrAl_2O_4$ (nm) | 54 | 54 | 54 | 54 | 54 | 54 | 54 | 54 | 54 | 54 | 54 |
| Blending ratio of solid solution obtained by dissolving Ca components in $\beta$-$SrAl_2O_4$ (mass %) | 40 | 40 | 40 | 40 | 40 | 40 | 40 | 40 | 40 | 40 | 40 |
| X value of $Ca_xSr_{1-x}Al_2O_4$ | 0.95 | 0.95 | 0.95 | 0.95 | 0.95 | 0.95 | 0.95 | 0.95 | 0.95 | 0.95 | 0.95 |
| Crystallite diameter of solid solution obtained by dissolving Sr components in $CaAl_2O_4$ (nm) | 50 | 50 | 50 | 50 | 50 | 50 | 50 | 50 | 50 | 50 | 50 |
| Blending ratio of solid solution obtained by dissolving Sr components in $CaAl_2O_4$ (mass %) | 0 | 0 | 0 | 0 | 0 | 0 | 0 | 0 | 0 | 0 | 0 |
| Blending ratio of $CaAl_2O_4$ (mass %) | — | — | — | — | — | — | — | — | — | — | — |
| Blending ratio of $\alpha$-$Al_2O_3$ (mass %)[*1] | 60 | 60 | 60 | 60 | 60 | 60 | 60 | 60 | 60 | 60 | 60 |
| Type of dispersant | D | E | E | E | F | F | F | G | G | G | — |
| Amount of dispersant added (mass %) | 0.3 | 0.05 | 0.1 | 0.3 | 0.05 | 0.1 | 0.3 | 0.05 | 0.1 | 0.3 | — |
| Type of hardening retardant | — | — | — | — | — | — | — | — | — | — | a |
| Amount of hardening retardant added (mass %) | — | — | — | — | — | — | — | — | — | — | 0.01 |
| Type of hardening accelerator | — | — | — | — | — | — | — | — | — | — | — |
| Amount of hardening accelerator added (mass %) | — | — | — | — | — | — | — | — | — | — | — |
| 15 tap-flow value (mm) After mixing | 155 | 151 | 153 | 159 | 150 | 153 | 152 | 156 | 161 | 166 | 147 |
| After 2 hours | 127 | 121 | 124 | 120 | 121 | 125 | 122 | 124 | 128 | 131 | 126 |
| Bending strength after curing of 6 hours (MPa) | 1.3 | 1.4 | 1.4 | 1.3 | 1.3 | 1.2 | 1.2 | 1.3 | 1.3 | 1.2 | 1.3 |
| Bending strength after curing of 12 hours (MPa) | 1.8 | 1.8 | 1.7 | 1.6 | 1.6 | 1.7 | 1.7 | 1.8 | 1.7 | 1.7 | 1.6 |

TABLE 67-continued

|  | Example 402 | Example 403 | Example 404 | Example 405 | Example 406 | Example 407 | Example 408 | Example 409 | Example 410 | Example 411 | Example 412 |
|---|---|---|---|---|---|---|---|---|---|---|---|
| Bending strength after curing of 24 hours (MPa) | 2.5 | 2.6 | 2.4 | 2.4 | 2.3 | 2.4 | 2.4 | 2.5 | 2.6 | 2.4 | 2.5 |
| Wear amount in rotary corrosion test (mm) | 5.5 | 5.4 | 5.3 | 5.4 | 5.4 | 5.5 | 5.4 | 5.4 | 5.4 | 5.5 | 5.3 |

Note)
*[1] $Al_2O_3$ other than solid solution and $CaAl_2O_4$

TABLE 68

|  | Example 413 | Example 414 | Example 415 | Example 416 | Example 417 | Example 418 | Example 419 | Example 420 | Example 421 | Example 422 | Example 423 |
|---|---|---|---|---|---|---|---|---|---|---|---|
| X value of $Ca_xSr_{1-x}Al_2O_4$ | 0.05 | 0.05 | 0.05 | 0.05 | 0.05 | 0.05 | 0.05 | 0.05 | 0.05 | 0.05 | 0.05 |
| Crystallite diameter of solid solution obtained by dissolving Ca components in $\alpha$-$SrAl_2O_4$ (nm) | 59 | 59 | 59 | 59 | 59 | 59 | 59 | 59 | 59 | 59 | 59 |
| Blending ratio of solid solution obtained by dissolving Ca components in $\alpha$-$SrAl_2O_4$ (mass %) | 0 | 0 | 0 | 0 | 0 | 0 | 0 | 0 | 0 | 0 | 0 |
| X value of $Ca_xSr_{1-x}Al_2O_4$ | 0.3 | 0.3 | 0.3 | 0.3 | 0.3 | 03 | 0.3 | 0.3 | 0.3 | 0.3 | 0.3 |
| Crystallite diameter of solid solution obtained by dissolving Ca components in $\beta$-$SrAl_2O_4$ (nm) | 54 | 54 | 54 | 54 | 54 | 54 | 54 | 54 | 54 | 54 | 54 |
| Blending ratio of solid solution obtained by dissolving Ca components in $\beta$-$SrAl_2O_4$ (mass %) | 40 | 40 | 40 | 40 | 40 | 40 | 40 | 40 | 40 | 40 | 40 |
| X value of $Ca_xSr_{1-x}Al_2O_4$ | 0.95 | 0.95 | 0.95 | 0.95 | 0.95 | 0.95 | 0.95 | 0.95 | 0.95 | 0.95 | 0.95 |
| Crystallite diameter of solid solution obtained by dissolving Sr components in $CaAl_2O_4$ (nm) | 50 | 50 | 50 | 50 | 50 | 50 | 50 | 50 | 50 | 50 | 50 |
| Blending ratio of solid solution obtained by dissolving Sr components in $CaAl_2O_4$ (mass %) | 0 | 0 | 0 | 0 | 0 | 0 | 0 | 0 | 0 | 0 | 0 |
| Blending ratio of $CaAl_2O_4$ (mass %) | — | — | — | — | — | — | — | — | — | — | — |
| Blending ratio of $\alpha$-$Al_2O_3$ (mass %)*[1] | 60 | 60 | 60 | 60 | 60 | 60 | 60 | 60 | 60 | 60 | 60 |
| Type of dispersant | — | — | — | — | — | — | — | — | — | — | — |
| Amount of dispersant added (mass %) | — | — | — | — | — | — | — | — | — | — | — |
| Type of hardening retardant | a | a | b | b | b | — | — | — | — | — | — |
| Amount of hardening retardant added (mass %) | 0.05 | 0.2 | 0.01 | 0.05 | 0.2 | — | — | — | — | — | — |
| Type of hardening accelerator | — | — | — | — | — | $\alpha$ | $\alpha$ | $\alpha$ | $\beta$ | $\beta$ | $\beta$ |
| Amount of hardening accelerator added (mass %) | — | — | — | — | — | 0.01 | 0.05 | 0.2 | 0.01 | 0.05 | 0.2 |
| 15 tap-flow value (mm) After mixing | 153 | 152 | 143 | 140 | 142 | 166 | 172 | 174 | 173 | 176 | 175 |
| After 2 hours | 131 | 132 | 125 | 130 | 135 | 127 | 126 | 121 | 125 | 122 | 118 |
| Bending strength after curing of 6 hours (MPa) | 1.3 | 1.2 | 1.1 | 1 | 0.8 | 1.4 | 1.4 | 1.5 | 1.3 | 1.4 | 1.5 |
| Bending strength after curing of 12 hours (MPa) | 1.5 | 1.5 | 1.4 | 1.3 | 1.1 | 1.7 | 1.8 | 1.8 | 1.6 | 1.7 | 1.9 |
| Bending strength after curing of 24 hours (MPa) | 2.3 | 2.3 | 2.5 | 2.4 | 2.2 | 2.5 | 2.4 | 2.2 | 2.3 | 2.3 | 2.2 |
| Wear amount in rotary corrosion test (mm) | 5.4 | 5.4 | 5.4 | 5.5 | 5.3 | 5.9 | 6 | 5.8 | 5.9 | 6 | 5.9 |

Note)
*[1] $Al_2O_3$ other than solid solution and $CaAl_2O_4$

TABLE 69

|  | Example 424 | Example 425 | Example 426 | Example 427 | Example 428 | Example 429 | Example 430 | Example 431 | Example 432 | Example 433 | Example 434 |
|---|---|---|---|---|---|---|---|---|---|---|---|
| X value of $Ca_xSr_{1-x}Al_2O_4$ | 0.05 | 0.05 | 0.05 | 0.05 | 0.05 | 0.05 | 0.05 | 0.05 | 0.05 | 0.05 | 0.05 |
| Crystallite diameter of solid solution obtained by dissolving Ca components in $\alpha$-$SrAl_2O_4$ (nm) | 59 | 59 | 59 | 59 | 59 | 59 | 59 | 59 | 59 | 59 | 59 |
| Blending ratio of solid solution obtained by dissolving Ca components in $\alpha$-$SrAl_2O_4$ (mass %) | 0 | 0 | 0 | 0 | 0 | 0 | 0 | 0 | 0 | 0 | 0 |

TABLE 69-continued

|  | Example 424 | Example 425 | Example 426 | Example 427 | Example 428 | Example 429 | Example 430 | Example 431 | Example 432 | Example 433 | Example 434 |
|---|---|---|---|---|---|---|---|---|---|---|---|
| X value of $Ca_xSr_{1-x}Al_2O_4$ | 0.3 | 0.3 | 0.3 | 0.3 | 0.3 | 0.3 | 0.3 | 0.3 | 0.3 | 0.3 | 0.3 |
| Crystallite diameter of solid solution obtained by dissolving Ca components $\beta$-$SrAl_2O_4$ (nm) | 54 | 54 | 54 | 54 | 54 | 54 | 54 | 54 | 54 | 54 | 54 |
| Blending ratio of solid solution obtained by dissolving Ca components in $\beta$-$SrAl_2O_4$ (mass %) | 40 | 40 | 40 | 40 | 40 | 40 | 40 | 40 | 40 | 40 | 40 |
| X value of $Ca_xSr_{1-x}Al_2O_4$ | 0.95 | 0.95 | 0.95 | 0.95 | 0.95 | 0.95 | 0.95 | 0.95 | 0.95 | 0.95 | 0.95 |
| Crystallite diameter of solid solution obtained by dissolving Sr components in $CaAl_2O_4$ (nm) | 50 | 50 | 50 | 50 | 50 | 50 | 50 | 50 | 50 | 50 | 50 |
| Blending ratio of solid solution obtained by dissolving Sr components in $CaAl_2O_4$ (mass %) | 0 | 0 | 0 | 0 | 0 | 0 | 0 | 0 | 0 | 0 | 0 |
| Blending ratio of $CaAl_2O_4$ (mass %) |  |  |  |  |  |  |  |  |  |  |  |
| Blending ratio of $\alpha$-$Al_2O_3$ (mass %) *1 | 60 | 60 | 60 | 60 | 60 | 60 | 60 | 60 | 60 | 60 | 60 |
| Type of dispersant | A | A | A | A | A | A | A | A | A | A | A |
| Amount of dispersant added (mass %) | 0.1 | 0.1 | 0.1 | 0.1 | 0.1 | 0.1 | 0.1 | 0.1 | 0.1 | 0.1 | 0.1 |
| Type of hardening retardant | a | a | a | b | b | b |  |  |  |  |  |
| Amount of hardening retardant added (mass %) | 0.01 | 0.05 | 0.2 | 0.01 | 0.05 | 0.2 |  |  |  |  |  |
| Type of hardening accelerator |  |  |  |  |  |  | α | α | α | β | β |
| Amount of hardening accelerator added (mass %) |  |  |  |  |  |  | 0.01 | 0.05 | 0.2 | 0.01 | 0.05 |
| 15 tap-flow value (mm) After mixing | 169 | 167 | 162 | 163 | 160 | 163 | 170 | 172 | 166 | 173 | 175 |
| After 2 hours | 131 | 135 | 140 | 133 | 135 | 139 | 129 | 124 | 122 | 124 | 122 |
| Bending strength after curing of 6 hours (MPa) | 1.3 | 1.2 | 1.2 | 1.3 | 1.1 | 0.9 | 1.7 | 1.8 | 1.8 | 1.6 | 1.7 |
| Bending strength after curing of 12 hours (MPa) | 1.8 | 1.6 | 1.5 | 1.6 | 1.4 | 1.3 | 2 | 2.1 | 2.2 | 1.9 | 2 |
| Bending strength after curing of 24 hours (MPa) | 2.5 | 2.4 | 2.3 | 2.4 | 2.3 | 2.3 | 2.6 | 2.5 | 2.3 | 2.6 | 2.6 |
| Wear amount in rotary corrosion test (mm) | 5.3 | 5.3 | 5.4 | 5.3 | 5.3 | 5.3 | 5.4 | 5.3 | 5.5 | 5.4 | 5.3 |

Note)
*1 $Al_2O_3$ other than solid solution and $CaAl_2O_4$

TABLE 70

|  | Example 435 | Example 436 | Example 437 | Example 438 | Example 439 | Example 440 | Example 441 | Example 442 | Example 443 |
|---|---|---|---|---|---|---|---|---|---|
| X value of $Ca_xSr_{1-x}Al_2O_4$ | 0.05 | 0.05 | 0.05 | 0.05 | 0.05 | 0.05 | 0.05 | 0.05 | 0.05 |
| Crystallite diameter of solid solution obtained by dissolving Ca components in $\alpha$-$SrAl_2O_4$ (nm) | 59 | 59 | 59 | 59 | 59 | 59 | 59 | 59 | 59 |
| Blending ratio of solid solution obtained by dissolving Ca components in $\alpha$-$SrAl_2O_4$ (mass %) | 0 | 0 | 0 | 0 | 0 | 0 | 0 | 0 | 0 |
| X value of $Ca_xSr_{1-x}Al_2O_4$ | 0.3 | 0.3 | 0.3 | 0.3 | 0.3 | 0.3 | 0.3 | 0.3 | 0.3 |
| Crystallite diameter of solid solution obtained by dissolving Ca components in $\beta$-$SrAl_2O_4$ (nm) | 54 | 54 | 54 | 54 | 54 | 54 | 54 | 54 | 54 |
| Blending ratio of solid solution obtained by dissolving Ca components in $\beta$-$SrAl_2O_4$ (mass %) | 40 | 40 | 40 | 40 | 40 | 40 | 40 | 40 | 40 |
| X value of $Ca_xSr_{1-x}Al_2O_4$ | 0.95 | 0.95 | 0.95 | 0.95 | 0.95 | 0.95 | 0.95 | 0.95 | 0.95 |
| Crystallite diameter of solid solution obtained by dissolving Sr components $CaAl_2O_4$ (nm) | 50 | 50 | 50 | 50 | 50 | 50 | 50 | 50 | 50 |
| Blending ratio of solid solution obtained by dissolving Sr components in $CaAl_2O_4$ (mass %) | 0 | 0 | 0 | 0 | 0 | 0 | 0 | 0 | 0 |
| Blending ratio of $CaAl_2O_4$ (mass %) |  |  |  |  |  |  |  |  |  |
| Blending ratio of $\alpha$-$Al_2O_3$ (mass %) *1 | 60 | 60 | 60 | 60 | 60 | 60 | 60 | 60 | 60 |
| Type of dispersant | A |  |  |  |  |  |  | A | A |
| Amount of dispersant added (mass %) | 0.1 |  |  |  |  |  |  | 0.1 | 0.1 |
| Type of hardening retardant |  | a | a | a | a | a | a | a | a |
| Amount of hardening retardant added (mass %) |  | 0.05 | 0.05 | 0.05 | 0.05 | 0.05 | 0.05 | 0.05 | 0.05 |
| Type of hardening accelerator | β | α | α | α | β | β | β | α | β |
| Amount of hardening accelerator added (mass %) | 0.2 | 0.01 | 0.05 | 0.2 | 0.01 | 0.05 | 0.2 | 0.05 | 0.05 |
| 15 tap-flow value (mm) After mixing | 168 | 147 | 142 | 143 | 147 | 153 | 156 | 176 | 172 |
| After 2 hours | 118 | 137 | 131 | 125 | 134 | 127 | 121 | 141 | 138 |
| Bending strength after curing of 6 hours (MPa) | 1.7 | 1.4 | 1.5 | 1.7 | 1.5 | 1.6 | 1.7 | 1.7 | 1.8 |
| Bending strength after curing of 12 hours (MPa) | 2.1 | 1.8 | 1.8 | 2 | 1.8 | 1.8 | 2 | 2 | 2.1 |
| Bending strength after curing of 24 hours (MPa) | 2.5 | 2.6 | 2.6 | 2.5 | 2.5 | 2.5 | 2.6 | 2.7 | 2.6 |
| Wear amount in rotary corrosion test (mm) | 5.3 | 5.3 | 5.4 | 5.5 | 5.3 | 5.4 | 5.5 | 5.3 | 5.2 |

Note)
*1 $Al_2O_3$ other than solid solution and $CaAl_2O_4$

TABLE 71

|  | Example 444 | Example 445 | Example 446 | Example 447 | Example 448 | Example 449 | Example 450 | Example 451 | Example 452 |
|---|---|---|---|---|---|---|---|---|---|
| X value of $Ca_xSr_{1-x}Al_2O_4$ | 0.05 | 0.05 | 0.05 | 0.05 | 0.05 | 0.05 | 0.05 | 0.05 | 0.05 |
| Crystallite diameter of solid solution obtained by dissolving Ca components in $\alpha$-$SrAl_2O_4$ (nm) | 59 | 59 | 59 | 59 | 59 | 59 | 59 | 59 | 59 |
| Blending ratio of solid solution obtained by dissolving Ca components in $\alpha$-$SrAl_2O_4$ (mass %) | 20 | 20 | 20 | 20 | 20 | 20 | 20 | 20 | 20 |
| X value of $Ca_xSr_{1-x}Al_2O_4$ | 0.3 | 0.3 | 0.3 | 0.3 | 0.3 | 0.3 | 0.3 | 0.3 | 0.3 |
| Crystallite diameter of solid solution obtained by dissolving Ca components in $\beta$-$SrAl_2O_4$ (nm) | 54 | 54 | 54 | 54 | 54 | 54 | 54 | 54 | 54 |
| Blending ratio of solid solution obtained by dissolving Ca components in $\beta$-$SrAl_2O_4$ (mass %) | 0 | 0 | 0 | 0 | 0 | 0 | 0 | 0 | 0 |
| X value of $Ca_xSr_{1-x}Al_2O_4$ | 0.95 | 0.95 | 0.95 | 0.95 | 0.95 | 0.95 | 0.95 | 0.95 | 0.95 |
| Crystallite diameter of solid solution obtained by dissolving Sr components in $CaAl_2O_4$ (nm) | 50 | 50 | 50 | 50 | 50 | 50 | 50 | 50 | 50 |
| Blending ratio of solid solution obtained by dissolving Sr componentst in $CaAl_2O_4$ (mass %) | 20 | 20 | 20 | 20 | 20 | 20 | 20 | 20 | 20 |
| Blending ratio of $CaAl_2O_4$ (mass %) | — | — | — | — | — | — | — | — | — |
| Blending ratio of $\alpha$-$Al_2O_3$ (mass %)[*1] | 60 | 60 | 60 | 60 | 60 | 60 | 60 | 60 | 60 |
| Type of dispersant | A | B | C | D | E | F | G | — | — |
| Amount of dispersant added (mass %) | 0.1 | 0.1 | 0.1 | 0.1 | 0.1 | 0.1 | 0.1 | — | — |
| Type of hardening retardant | — | — | — | — | — | — | — | a | b |
| Amount of hardening retardant added (mass %) | — | — | — | — | — | — | — | 0.05 | 0.05 |
| Type of hardening accelerator | — | — | — | — | — | — | — | — | — |
| Amount of hardening accelerator added (mass %) | — | — | — | — | — | — | — | — | — |
| 15 tap-flow value (mm) After mixing | 170 | 179 | 157 | 152 | 152 | 159 | 160 | 148 | 148 |
| After 2 hours | 125 | 133 | 130 | 131 | 124 | 131 | 131 | 128 | 131 |
| Bending strength after curing of 6 hours (MPa) | 1.4 | 1.1 | 1.3 | 1.3 | 1.3 | 1.1 | 1.4 | 1.2 | 1 |
| Bending strength after curing of 12 hours (MPa) | 1.8 | 1.4 | 1.7 | 1.7 | 1.8 | 1.5 | 1.7 | 1.5 | 1.3 |
| Bending strength after curing of 24 hours (MPa) | 2.6 | 2.2 | 2.4 | 2.6 | 2.5 | 2.5 | 2.6 | 2.4 | 2.2 |
| Wear amount in rotary corrosion test (mm) | 5.4 | 5.3 | 5.3 | 5.4 | 5.4 | 5.3 | 5.3 | 5.3 | 5.2 |

Note)
[*1] $Al_2O_3$ other than solid solution and $CaAl_2O_4$

TABLE 72

|  | Example 453 | Example 454 | Example 455 | Example 456 | Example 457 | Example 458 | Example 459 | Example 460 | Example 461 |
|---|---|---|---|---|---|---|---|---|---|
| X value of $Ca_xSr_{1-x}Al_2O_4$ | 0.05 | 0.05 | 0.05 | 0.05 | 0.05 | 0.05 | 0.05 | 0.05 | 0.05 |
| Crystallite diameter of solid solution obtained by dissolving Ca components in $\alpha$-$SrAl_2O_4$ (nm) | 59 | 59 | 59 | 59 | 59 | 59 | 59 | 59 | 59 |
| Blending ratio of solid solution obtained by dissolving Ca components in $\alpha$-$SrAl_2O_4$ (mass %) | 20 | 20 | 20 | 20 | 20 | 20 | 20 | 20 | 20 |
| X value of $Ca_xSr_{1-x}Al_2O_4$ | 0.3 | 0.3 | 0.3 | 0.3 | 0.3 | 0.3 | 0.3 | 0.3 | 0.3 |
| Crystallite diameter of solid solution obtained by dissolving Ca components in $\beta$-$SrAl_2O_4$ (nm) | 54 | 54 | 54 | 54 | 54 | 54 | 54 | 54 | 54 |
| Blending ratio of solid solution obtained by dissolving Ca components in $\beta$-$SrAl_2O_4$ (mass %) | 0 | 0 | 0 | 0 | 0 | 0 | 0 | 0 | 0 |
| X value of $Ca_xSr_{1-x}Al_2O_4$ | 0.95 | 0.95 | 0.95 | 0.95 | 0.95 | 0.95 | 0.95 | 0.95 | 0.95 |
| Crystallite diameter of solid solution obtained by dissolving Sr components in $CaAl_2O_4$ (nm) | 50 | 50 | 50 | 50 | 50 | 50 | 50 | 50 | 50 |
| Blending ratio of solid solution obtained by dissolving Sr componentst in $CaAl_2O_4$ (mass %) | 20 | 20 | 20 | 20 | 20 | 20 | 20 | 20 | 20 |
| Blending ratio of $CaAl_2O_4$ (mass %) | — | — | — | — | — | — | — | — | — |
| Blending ratio of $\alpha$-$Al_2O_3$ (mass %)[*1] | 60 | 60 | 60 | 60 | 60 | 60 | 60 | 60 | 60 |
| Type of dispersant | — | — | A | A | A | A | — | — | A |
| Amount of dispersant added (mass %) | — | — | 0.1 | 0.1 | 0.1 | 0.1 | — | — | 0.1 |
| Type of hardening retardant | — | — | a | b | — | — | a | a | a |
| Amount of hardening retardant added (mass %) | — | — | 0.05 | 0.05 | — | — | 0.05 | 0.05 | 0.05 |
| Type of hardening accelerator | $\alpha$ | $\beta$ | — | — | $\alpha$ | $\beta$ | $\alpha$ | $\beta$ | $\alpha$ |
| Amount of hardening accelerator added (mass %) | 0.05 | 0.05 | — | — | 0.05 | 0.05 | 0.05 | 0.05 | 0.05 |
| 15 tap-flow value (mm) After mixing | 169 | 174 | 166 | 166 | 172 | 175 | 140 | 152 | 170 |
| After 2 hours | 129 | 130 | 132 | 134 | 126 | 125 | 123 | 130 | 135 |
| Bending strength after curing of 6 hours (MPa) | 1.5 | 1.5 | 1.3 | 1.1 | 1.7 | 1.7 | 1.6 | 1.8 | 1.5 |
| Bending strength after curing of 12 hours (MPa) | 1.8 | 1.9 | 1.6 | 1.5 | 2.1 | 2.1 | 1.9 | 2.1 | 2 |
| Bending strength after curing of 24 hours (MPa) | 2.3 | 2.3 | 2.5 | 2.5 | 2.6 | 2.7 | 2.6 | 2.6 | 2.5 |
| Wear amount in rotary corrosion test (mm) | 5.8 | 5.7 | 5.4 | 5.3 | 5.2 | 5.2 | 5.4 | 5.3 | 5.2 |

Note)
[*1] $Al_2O_3$ other than solid solution and $CaAl_2O_4$

TABLE 73

|  | Example 462 | Example 463 | Example 464 | Example 465 | Example 466 | Example 467 | Example 468 | Example 469 | Example 470 |
|---|---|---|---|---|---|---|---|---|---|
| X value of $Ca_xSr_{1-x}Al_2O_4$ | 0.05 | 0.05 | 0.05 | 0.05 | 0.05 | 0.05 | 0.05 | 0.05 | 0.05 |
| Crystallite diameter of solid solution obtained by dissolving Ca components in $\alpha$-$SrAl_2O_4$ (nm) | 59 | 59 | 59 | 59 | 59 | 59 | 59 | 59 | 59 |
| Blending ratio of solid solution obtained by dissolving Ca components in $\alpha$-$SrAl_2O_4$ (mass %) | 0 | 0 | 0 | 0 | 0 | 0 | 0 | 0 | 0 |
| X value of $Ca_xSr_{1-x}Al_2O_4$ | 0.3 | 0.3 | 0.3 | 0.3 | 0.3 | 0.3 | 0.3 | 0.3 | 0.3 |
| Crystallite diameter of solid solution obtained by dissolving Ca components in $\beta$-$SrAl_2O_4$ (nm) | 54 | 54 | 54 | 54 | 54 | 54 | 54 | 54 | 54 |
| Blending ratio of solid solution obtained by dissolving Ca components in $\beta$-$SrAl_2O_4$ (mass %) | 20 | 20 | 20 | 20 | 20 | 20 | 20 | 20 | 20 |
| X value of $Ca_xSr_{1-x}Al_2O_4$ | 0.95 | 0.95 | 0.95 | 0.95 | 0.95 | 0.95 | 0.95 | 0.95 | 0.95 |
| Crystallite diameter of solid solution obtained by dissolving Sr components in $CaAl_2O_4$ (nm) | 50 | 50 | 50 | 50 | 50 | 50 | 50 | 50 | 50 |
| Blending ratio of solid solution obtained by dissolving Sr componentst in $CaAl_2O_4$ (mass %) | 20 | 20 | 20 | 20 | 20 | 20 | 20 | 20 | 20 |
| Blending ratio of $CaAl_2O_4$ (mass %) | — | — | — | — | — | — | — | — | — |
| Blending ratio of $\alpha$-$Al_2O_3$ (mass %)[*1] | 60 | 60 | 60 | 60 | 60 | 60 | 60 | 60 | 60 |
| Type of dispersant | A | B | C | D | E | F | G | — | — |
| Amount of dispersant added (mass %) | 0.1 | 0.1 | 0.1 | 0.1 | 0.1 | 0.1 | 0.1 | — | — |
| Type of hardening retardant | — | — | — | — | — | — | — | a | b |
| Amount of hardening retardant added (mass %) | — | — | — | — | — | — | — | 0.05 | 0.05 |
| Type of hardening accelerator | — | — | — | — | — | — | — | — | — |
| Amount of hardening accelerator added (mass %) | — | — | — | — | — | — | — | — | — |
| 15 tap-flow value (mm) After mixing | 163 | 179 | 160 | 157 | 158 | 159 | 162 | 146 | 151 |
| After 2 hours | 128 | 136 | 130 | 132 | 132 | 125 | 131 | 126 | 131 |
| Bending strength after curing of 6 hours (MPa) | 1.1 | 0.9 | 1.1 | 1.1 | 1 | 1.2 | 1 | 1 | 0.9 |
| Bending strength after curing of 12 hours (MPa) | 1.6 | 1.3 | 1.5 | 1.5 | 1.4 | 1.5 | 1.4 | 1.3 | 1.2 |
| Bending strength after curing of 24 hours (MPa) | 2.7 | 2.3 | 2.6 | 2.7 | 2.5 | 2.7 | 2.6 | 2.5 | 2.5 |
| Wear amount in rotary corrosion test (mm) | 5.3 | 5.3 | 5.3 | 5.4 | 5.5 | 5.3 | 5.4 | 5.4 | 5.5 |

Note)
[*1] $Al_2O_3$ other than solid solution and $CaAl_2O_4$

TABLE 74

|  | Example 471 | Example 472 | Example 473 | Example 474 | Example 475 | Example 476 | Example 477 | Example 478 | Example 479 |
|---|---|---|---|---|---|---|---|---|---|
| X value of $Ca_xSr_{1-x}Al_2O_4$ | 0.05 | 0.05 | 0.05 | 0.05 | 0.05 | 0.05 | 0.05 | 0.05 | 0.05 |
| Crystallite diameter of solid solution obtained by dissolving Ca components in $\alpha$-$SrAl_2O_4$ (nm) | 59 | 59 | 59 | 59 | 59 | 59 | 59 | 59 | 59 |
| Blending ratio of solid solution obtained by dissolving Ca components in $\alpha$-$SrAl_2O_4$ (mass %) | 0 | 0 | 0 | 0 | 0 | 0 | 0 | 0 | 0 |
| X value of $Ca_xSr_{1-x}Al_2O_4$ | 0.3 | 0.3 | 0.3 | 0.3 | 0.3 | 0.3 | 0.3 | 0.3 | 0.3 |
| Crystallite diameter of solid solution obtained by dissolving Ca components in $\beta$-$SrAl_2O_4$ (nm) | 54 | 54 | 54 | 54 | 54 | 54 | 54 | 54 | 54 |
| Blending ratio of solid solution obtained by dissolving Ca components in $\beta$-$SrAl_2O_4$ (mass %) | 20 | 20 | 20 | 20 | 20 | 20 | 20 | 20 | 20 |
| X value of $Ca_xSr_{1-x}Al_2O_4$ | 0.95 | 0.95 | 0.95 | 0.95 | 0.95 | 0.95 | 0.95 | 0.95 | 0.95 |
| Crystallite diameter of solid solution obtained by dissolving Sr components in $CaAl_2O_4$ (nm) | 50 | 50 | 50 | 50 | 50 | 50 | 50 | 50 | 50 |
| Blending ratio of solid solution obtained by dissolving Sr componentst in $CaAl_2O_4$ (mass %) | 20 | 20 | 20 | 20 | 20 | 20 | 20 | 20 | 20 |
| Blending ratio of $CaAl_2O_4$ (mass %) | — | — | — | — | — | — | — | — | — |
| Blending ratio of $\alpha$-$Al_2O_3$ (mass %)[*1] | 60 | 60 | 60 | 60 | 60 | 60 | 60 | 60 | 60 |
| Type of dispersant | — | — | A | A | A | A | — | — | A |
| Amount of dispersant added (mass %) | — | — | 0.1 | 0.1 | 0.1 | 0.1 | — | — | 0.1 |
| Type of hardening retardant | — | — | a | b | — | — | a | a | a |
| Amount of hardening retardant added (mass %) | — | — | 0.05 | 0.05 | — | — | 0.01 | 0.01 | 0.01 |
| Type of hardening accelerator | $\alpha$ | $\beta$ | — | — | $\alpha$ | $\beta$ | $\alpha$ | $\beta$ | $\alpha$ |
| Amount of hardening accelerator added (mass %) | 0.05 | 0.05 | — | — | 0.05 | 0.05 | 0.05 | 0.05 | 0.05 |
| 15 tap-flow value (mm) After mixing | 160 | 164 | 166 | 160 | 171 | 171 | 146 | 153 | 162 |
| After 2 hours | 122 | 126 | 131 | 133 | 125 | 128 | 131 | 126 | 132 |
| Bending strength after curing of 6 hours (MPa) | 1.5 | 1.5 | 1.1 | 0.9 | 1.6 | 1.7 | 1.5 | 1.7 | 1.5 |
| Bending strength after curing of 12 hours (MPa) | 1.9 | 2 | 1.4 | 1.3 | 2 | 2 | 1.7 | 2.1 | 1.8 |
| Bending strength after curing of 24 hours (MPa) | 2.4 | 2.6 | 2.5 | 2.6 | 2.7 | 2.6 | 2.7 | 2.7 | 2.7 |
| Wear amount in rotary corrosion test (mm) | 5.9 | 5.7 | 5.2 | 5.3 | 5.3 | 5.2 | 5.5 | 5.3 | 5.2 |

Note)
[*1] $Al_2O_3$ other than solid solution and $CaAl_2O_4$

TABLE 75

| | Example 480 | Example 481 | Example 482 | Example 483 | Example 484 | Example 485 | Example 486 | Example 487 | Example 488 |
|---|---|---|---|---|---|---|---|---|---|
| X value of $Ca_xSr_{1-x}Al_2O_4$ | 0.05 | 0.05 | 0.05 | 0.05 | 0.05 | 0.05 | 0.05 | 0.05 | 0.05 |
| Crystallite diameter of solid solution obtained by dissolving Ca components in $\alpha$-$SrAl_2O_4$ (nm) | 59 | 59 | 59 | 59 | 59 | 59 | 59 | 59 | 59 |
| Blending ratio of solid solution obtained by dissolving Ca components in $\alpha$-$SrAl_2O_4$ (mass %) | 20 | 20 | 20 | 20 | 20 | 20 | 20 | 20 | 20 |
| X value of $Ca_xSr_{1-x}Al_2O_4$ | 0.3 | 0.3 | 0.3 | 0.3 | 0.3 | 0.3 | 0.3 | 0.3 | 0.3 |
| Crystallite diameter of solid solution obtained by dissolving Ca components in $\beta$-$SrAl_2O_4$ (nm) | 54 | 54 | 54 | 54 | 54 | 54 | 54 | 54 | 54 |
| Blending ratio of solid solution obtained by dissolving Ca components in $\beta$-$SrAl_2O_4$ (mass %) | 20 | 20 | 20 | 20 | 20 | 20 | 20 | 20 | 20 |
| X value of $Ca_xSr_{1-x}Al_2O_4$ | 0.95 | 0.95 | 0.95 | 0.95 | 0.95 | 0.95 | 0.95 | 0.95 | 0.95 |
| Crystallite diameter of solid solution obtained by dissolving Sr components in $CaAl_2O_4$ (nm) | 50 | 50 | 50 | 50 | 50 | 50 | 50 | 50 | 50 |
| Blending ratio of solid solution obtained by dissolving Sr componentst in $CaAl_2O_4$ (mass %) | 0 | 0 | 0 | 0 | 0 | 0 | 0 | 0 | 0 |
| Blending ratio of $CaAl_2O_4$ (mass %) | — | — | — | — | — | — | — | — | — |
| Blending ratio of $\alpha$-$Al_2O_3$ (mass %)[*1] | 60 | 60 | 60 | 60 | 60 | 60 | 60 | 60 | 60 |
| Type of dispersant | A | B | C | D | E | F | G | — | — |
| Amount of dispersant added (mass %) | 0.1 | 0.1 | 0.1 | 0.1 | 0.1 | 0.1 | 0.1 | — | — |
| Type of hardening retardant | — | — | — | — | — | — | — | a | b |
| Amount of hardening retardant added (mass %) | — | — | — | — | — | — | — | 0.05 | 0.05 |
| Type of hardening accelerator | — | — | — | — | — | — | — | — | — |
| Amount of hardening accelerator added (mass %) | — | — | — | — | — | — | — | — | — |
| 15 tap-flow value (mm)  After mixing | 168 | 174 | 161 | 159 | 162 | 157 | 162 | 147 | 146 |
| After 2 hours | 126 | 134 | 133 | 131 | 129 | 131 | 137 | 131 | 136 |
| Bending strength after curing of 6 hours (MPa) | 1.3 | 1.2 | 1.2 | 1.1 | 1.2 | 1 | 1.2 | 1.1 | 1 |
| Bending strength after curing of 12 hours (MPa) | 1.7 | 1.5 | 1.6 | 1.6 | 1.6 | 1.4 | 1.6 | 1.4 | 1.3 |
| Bending strength after curing of 24 hours (MPa) | 2.6 | 2.4 | 2.5 | 2.6 | 2.7 | 2.5 | 2.5 | 2.5 | 2.4 |
| Wear amount in rotary corrosion test (mm) | 5.5 | 5.3 | 5.4 | 5.6 | 5.4 | 5.5 | 5.5 | 5.3 | 5.4 |

Note)
[*1] $Al_2O_3$ other than solid solution and $CaAl_2O_4$

TABLE 76

| | Example 489 | Example 490 | Example 491 | Example 492 | Example 493 | Example 494 | Example 495 | Example 496 | Example 497 |
|---|---|---|---|---|---|---|---|---|---|
| X value of $Ca_xSr_{1-x}Al_2O_4$ | 0.05 | 0.05 | 0.05 | 0.05 | 0.05 | 0.05 | 0.05 | 0.05 | 0.05 |
| Crystallite diameter of solid solution obtained by dissolving Ca components in $\alpha$-$SrAl_2O_4$ (nm) | 59 | 59 | 59 | 59 | 59 | 59 | 59 | 59 | 59 |
| Blending ratio of solid solution obtained by dissolving Ca components in $\alpha$-$SrAl_2O_4$ (mass %) | 20 | 20 | 20 | 20 | 20 | 20 | 20 | 20 | 20 |
| X value of $Ca_xSr_{1-x}Al_2O_4$ | 0.3 | 0.3 | 0.3 | 0.3 | 0.3 | 0.3 | 0.3 | 0.3 | 0.3 |
| Crystallite diameter of solid solution obtained by dissolving Ca components in $\beta$-$SrAl_2O_4$ (nm) | 54 | 54 | 54 | 54 | 54 | 54 | 54 | 54 | 54 |
| Blending ratio of solid solution obtained by dissolving Ca components in $\beta$-$SrAl_2O_4$ (mass %) | 20 | 20 | 20 | 20 | 20 | 20 | 20 | 20 | 20 |
| X value of $Ca_xSr_{1-x}Al_2O_4$ | 0.95 | 0.95 | 0.95 | 0.95 | 0.95 | 0.95 | 0.95 | 0.95 | 0.95 |
| Crystallite diameter of solid solution obtained by dissolving Sr components in $CaAl_2O_4$ (nm) | 50 | 50 | 50 | 50 | 50 | 50 | 50 | 50 | 50 |
| Blending ratio of solid solution obtained by dissolving Sr componentst in $CaA_2O_4$ (mass %) | 0 | 0 | 0 | 0 | 0 | 0 | 0 | 0 | 0 |
| Blending ratio of $CaAl_2O_4$ (mass %) | — | — | — | — | — | — | — | — | — |
| Blending ratio of $\alpha$-$Al_2O_3$ (mass %)[*1] | 60 | 60 | 60 | 60 | 60 | 60 | 60 | 60 | 60 |
| Type of dispersant | — | — | A | A | A | A | — | — | A |
| Amount of dispersant added (mass %) | — | — | 0.1 | 0.1 | 0.1 | 0.1 | — | — | 0.1 |
| Type of hardening retardant | — | — | a | b | — | — | a | a | a |
| Amount of hardening retardant added (mass %) | — | — | 0.05 | 0.05 | — | — | 0.05 | 0.05 | 0.05 |
| Type of hardening accelerator | $\alpha$ | $\beta$ | — | — | $\alpha$ | $\beta$ | $\alpha$ | $\beta$ | $\alpha$ |
| Amount of hardening accelerator added (mass %) | 0.05 | 0.05 | — | — | 0.05 | 0.05 | 0.05 | 0.05 | 0.05 |
| 15 tap-flow value (mm)  After mixing | 169 | 169 | 172 | 169 | 174 | 172 | 148 | 155 | 173 |
| After 2 hours | 129 | 127 | 138 | 135 | 130 | 133 | 127 | 134 | 139 |
| Bending strength after curing of 6 hours (MPa) | 1.3 | 1.3 | 1.2 | 1.1 | 1.5 | 1.6 | 1.4 | 1.6 | 1.4 |
| Bending strength after curing of 12 hours (MPa) | 1.7 | 1.7 | 1.5 | 1.4 | 1.9 | 1.9 | 1.8 | 2 | 1.9 |
| Bending strength after curing of 24 hours (MPa) | 2.2 | 2.3 | 2.6 | 2.6 | 2.6 | 2.6 | 2.4 | 2.5 | 2.6 |
| Wear amount in rotary corrosion test (mm) | 5.9 | 5.8 | 5.3 | 5.5 | 5.3 | 5.4 | 5.6 | 5.5 | 5.3 |

Note)
[*1] $Al_2O_3$ other than solid solution and $CaAl_2O_4$

TABLE 77

|  | Example 498 | Example 499 | Example 500 | Example 501 | Example 502 | Example 503 | Example 504 | Example 505 | Example 506 |
|---|---|---|---|---|---|---|---|---|---|
| X value of $Ca_xSr_{1-x}Al_2O_4$ | 0.05 | 0.05 | 0.05 | 0.05 | 0.05 | 0.05 | 0.05 | 0.05 | 0.05 |
| Crystallite diameter of solid solution obtained by dissolving Ca components in $\alpha$-$SrAl_2O_4$ (nm) | 59 | 59 | 59 | 59 | 59 | 59 | 59 | 59 | 59 |
| Blending ratio of solid solution obtained by dissolving Ca components in $\alpha$-$SrAl_2O_4$ (mass %) | 14 | 14 | 14 | 14 | 14 | 14 | 14 | 14 | 14 |
| X value of $Ca_xSr_{1-x}Al_2O_4$ | 0.3 | 0.3 | 0.3 | 0.3 | 0.3 | 0.3 | 0.3 | 0.3 | 0.3 |
| Crystallite diameter of solid solution obtained by dissolving Ca components in $\beta$-$SrAl_2O_4$ (nm) | 54 | 54 | 54 | 54 | 54 | 54 | 54 | 54 | 54 |
| Blending ratio of solid solution obtained by dissolving Ca components in $\beta$-$SrAl_2O_4$ (mass %) | 14 | 14 | 14 | 14 | 14 | 14 | 14 | 14 | 14 |
| X value of $Ca_xSr_{1-x}Al_2O_4$ | 0.95 | 0.95 | 0.95 | 0.95 | 0.95 | 0.95 | 0.95 | 0.95 | 0.95 |
| Crystallite diameter of solid solution obtained by dissolving Sr components in $CaAl_2O_4$ (nm) | 50 | 50 | 50 | 50 | 50 | 50 | 50 | 50 | 50 |
| Blending ratio of solid solution obtained by dissolving Sr componentst in $CaAl_2O_4$ (mass %) | 12 | 12 | 12 | 12 | 12 | 12 | 12 | 12 | 12 |
| Blending ratio of $CaAl_2O_4$ (mass %) | — | — | — | — | — | — | — | — | — |
| Blending ratio of $\alpha$-$Al_2O_3$ (mass %)*[1] | 60 | 60 | 60 | 60 | 60 | 60 | 60 | 60 | 60 |
| Type of dispersant | A | B | C | D | E | F | G | — | — |
| Amount of dispersant added (mass %) | 0.1 | 0.1 | 0.1 | 0.1 | 0.1 | 0.1 | 0.1 | — | — |
| Type of hardening retardant | — | — | — | — | — | — | — | a | b |
| Amount of hardening retardant added (mass %) | — | — | — | — | — | — | — | 0.05 | 0.05 |
| Type of hardening accelerator | — | — | — | — | — | — | — | — | — |
| Amount of hardening accelerator added (mass %) | — | — | — | — | — | — | — | — | — |
| 15 tap-flow value (mm)  After mixing | 167 | 171 | 160 | 155 | 155 | 156 | 157 | 146 | 148 |
| After 2 hours | 129 | 135 | 132 | 134 | 130 | 128 | 128 | 129 | 131 |
| Bending strength after curing of 6 hours (MPa) | 1.3 | 1.1 | 1.3 | 1.2 | 1.1 | 1.3 | 1.1 | 1.1 | 0.8 |
| Bending strength after curing of 12 hours (MPa) | 1.7 | 1.4 | 1.6 | 1.6 | 1.5 | 1.7 | 1.6 | 1.5 | 1.2 |
| Bending strength after curing of 24 hours (MPa) | 2.6 | 2.4 | 2.6 | 2.6 | 2.4 | 2.6 | 2.6 | 2.5 | 2.1 |
| Wear amount in rotary corrosion test (mm) | 5.4 | 5.3 | 5.2 | 5.4 | 5.2 | 5.3 | 5.4 | 5.3 | 5.3 |

Note)
*[1] $Al_2O_3$ other than solid solution and $CaAl_2O_4$

TABLE 78

|  | Example 507 | Example 508 | Example 509 | Example 510 | Example 511 | Example 512 | Example 513 | Example 514 | Example 515 |
|---|---|---|---|---|---|---|---|---|---|
| X value of $Ca_xSr_{1-x}Al_2O_4$ | 0.05 | 0.05 | 0.05 | 0.05 | 0.05 | 0.05 | 0.05 | 0.05 | 0.05 |
| Crystallite diameter of solid solution obtained by dissolving Ca components in $\alpha$-$SrAl_2O_4$ (nm) | 59 | 59 | 59 | 59 | 59 | 59 | 59 | 59 | 59 |
| Blending ratio of solid solution obtained by dissolving Ca components in $\alpha$-$SrAl_2O_4$ (mass %) | 14 | 14 | 14 | 14 | 14 | 14 | 14 | 14 | 14 |
| X value of $Ca_xSr_{1-x}Al_2O_4$ | 0.3 | 0.3 | 0.3 | 0.3 | 0.3 | 0.3 | 0.3 | 0.3 | 0.3 |
| Crystallite diameter of solid solution obtained by dissolving Ca components in $\beta$-$SrAl_2O_4$ (nm) | 54 | 54 | 54 | 54 | 54 | 54 | 54 | 54 | 54 |
| Blending ratio of solid solution obtained by dissolving Ca components in $\beta$-$SrAl_2O_4$ (mass %) | 14 | 14 | 14 | 14 | 14 | 14 | 14 | 14 | 14 |
| X value of $Ca_xSr_{1-x}Al_2O_4$ | 0.95 | 0.95 | 0.95 | 0.95 | 0.95 | 0.95 | 0.95 | 0.95 | 0.95 |
| Crystallite diameter of solid solution obtained by dissolving Sr components in $CaAl_2O_4$ (nm) | 50 | 50 | 50 | 50 | 50 | 50 | 50 | 50 | 50 |
| Blending ratio of solid solution obtained by dissolving Sr componentst in $CaAl_2O_4$ (mass %) | 12 | 12 | 12 | 12 | 12 | 12 | 12 | 12 | 12 |
| Blending ratio of $CaAl_2O_4$ (mass %) | — | — | — | — | — | — | — | — | — |
| Blending ratio of $\alpha$-$Al_2O_3$ (mass %)*[1] | 60 | 60 | 60 | 60 | 60 | 60 | 60 | 60 | 60 |
| Type of dispersant | — | — | A | A | A | A | — | — | A |
| Amount of dispersant added (mass %) | — | — | 0.1 | 0.1 | 0.1 | 0.1 | — | — | 0.1 |
| Type of hardening retardant | — | — | a | b | — | — | a | a | a |
| Amount of hardening retardant added (mass %) | — | — | 0.05 | 0.05 | — | — | 0.01 | 0.01 | 0.01 |
| Type of hardening accelerator | $\alpha$ | $\beta$ | — | — | $\alpha$ | $\beta$ | $\alpha$ | $\beta$ | $\alpha$ |
| Amount of hardening accelerator added (mass %) | 0.05 | 0.05 | — | — | 0.05 | 0.05 | 0.05 | 0.05 | 0.05 |
| 15 tap-flow value (mm)  After mixing | 167 | 169 | 160 | 162 | 167 | 177 | 144 | 150 | 167 |
| After 2 hours | 129 | 126 | 133 | 136 | 128 | 134 | 133 | 126 | 134 |
| Bending strength after curing of 6 hours (MPa) | 1.5 | 1.4 | 1.1 | 0.9 | 1.6 | 1.8 | 1.5 | 1.7 | 1.5 |
| Bending strength after curing of 12 hours (MPa) | 1.7 | 1.9 | 1.4 | 1.3 | 2.1 | 2.1 | 1.8 | 2 | 1.9 |
| Bending strength after curing of 24 hours (MPa) | 2.6 | 2.5 | 2.6 | 2.4 | 2.7 | 2.6 | 2.5 | 2.5 | 2.6 |
| Wear amount in rotary corrosion test (mm) | 5.8 | 5.7 | 5.3 | 5.3 | 5.2 | 5.3 | 5.3 | 5.4 | 5.3 |

Note)
*[1] $Al_2O_3$ other than solid solution and $CaAl_2O_4$

The evaluation results are as shown in Tables 59 to 78. In the cases of Examples 338 to 364, 371 to 376, 391 to 417, 424 to 429, 444 to 452, 455, 456, 462 to 470, 473, 474, 480 to 488, 491, 492, 498 to 506, 505, and 506 in which a dispersant and/or a hardening retardant were used, regardless of the reduced amount of water added to monolithic refractories, the flow values of the monolithic refractories suitable for pouring were obtained 2 hours after the start of mixing. Therefore, it has been confirmed that Examples 338 to 364, 371 to 376, 391 to 417, 424 to 429, 444 to 452, 455, 456, 462 to 470, 473, 474, 480 to 488, 491, 492, 498 to 506, 505, and 506 can be applied to furnaces with a large volume or the like. Furthermore, Examples 338 to 364, 371 to 376, 391 to 417, 424 to 429, 444 to 452, 455, 456, 462 to 470, 473, 474, 480 to 488, 491, 492, 498 to 506, 505, and 506 show larger values than Comparative Examples 31 to 39, 42, and 43 in the flexural strength after curing of 6, 12, and 24 hours, and therefore it has been clarified that Examples 338 to 364, 371 to 376, 391 to 417, 424 to 429, 444 to 452, 455, 456, 462 to 470, 473, 474, 480 to 488, 491, 492, 498 to 506, 505, and 506 are excellent in terms of cured strength developing property. In particular, the flexural strength after curing of 6 hours is remarkably greater compared to those of the Comparative Examples, and therefore it has been confirmed that Examples 338 to 364, 371 to 376, 391 to 417, 424 to 429, 444 to 452, 455, 456, 462 to 470, 473, 474, 480 to 488, 491, 492, 498 to 506, 505, and 506 are excellent in terms of early strength developing property. Furthermore, it has been clarified that, compared to Comparative Examples, Examples 338 to 364, 371 to 376, 391 to 417, 424 to 429, 444 to 452, 455, 456, 462 to 470, 473, 474, 480 to 488, 491, 492, 498 to 506, 505, and 506 clearly show small wear amounts in the rotary corrosion test using slag and are excellent in terms of slag resistance at a high temperature.

In addition, by reducing the amount of water added, compared to Examples in which the same binder was used with the ordinary amount of water added, Examples 338 to 364, 371 to 376, 391 to 417, 424 to 429, 444 to 452, 455, 456, 462 to 470, 473, 474, 480 to 488, 491, 492, 498 to 506, 505, and 506 show an increase in the cured flexural strength and degradation in the wear amount in the rotary corrosion test using slag.

In Examples 365 to 370, 418 to 423, 453, 454, 471, 472, 489, 490, 507, and 508 using only a hardening accelerator, the flow values of the monolithic refractories suitable for pouring were obtained 2 hours after the start of mixing. Therefore, it has been confirmed that Examples 365 to 370, 418 to 423, 453, 454, 471, 472, 489, 490, 507, and 508 can be applied to furnaces with a large volume or the like. Furthermore, Examples 365 to 370, 418 to 423, 453, 454, 471, 472, 489, 490, 507, and 508 show larger values than Comparative Examples 40 and 41 in the flexural strength after curing of 6, 12, and 24 hours, and therefore it has been clarified that Examples 365 to 370, 418 to 423, 453, 454, 471, 472, 489, 490, 507, and 508 are excellent in terms of cured strength developing property. In particular, the flexural strength after curing of 6 hours is remarkably greater compared to those of the Comparative Examples, and therefore it has been confirmed that Examples 365 to 370, 418 to 423, 453, 454, 471, 472, 489, 490, 507, and 508 are excellent in terms of early strength developing property. Furthermore, it has been clarified that, compared to Comparative Examples, Examples 365 to 370, 418 to 423, 453, 454, 471, 472, 489, 490, 507, and 508 clearly show small wear amounts in the rotary corrosion test using slag and are excellent in terms of slag resistance at a high temperature.

In Examples 365 to 370, 418 to 423, 453, 454, 471, 472, 489, 490, 507, and 508 including a hardening accelerator added, the cured flexural strength was further increased after 6 hours and 12 hours compared to Examples including no hardening accelerator added, which clarified that Examples 365 to 370, 418 to 423, 453, 454, 471, 472, 489, 490, 507, and 508 are superior in terms of early strength developing property. In addition, the wear amount became almost the same as that of cases including no additive in the rotary corrosion test using slag, which clarified that Examples 365 to 370, 418 to 423, 453, 454, 471, 472, 489, 490, 507, and 508 are excellent in terms of slag resistance at a high temperature.

In Examples 377 to 390, 430 to 443, 457 to 461, 475 to 479, 493 to 497, and 511 to 515 using a hardening accelerator and furthermore at least either a dispersant or a hardening retardant, regardless of the reduced amount of water added to monolithic refractories, the flow values of the monolithic refractories suitable for pouring were obtained 2 hours after the start of mixing. Therefore, it has been confirmed that Examples 377 to 390, 430 to 443, 457 to 461, 475 to 479, 493 to 497, and 511 to 515 can be applied to furnaces with a large volume or the like. Furthermore, Examples 377 to 390, 430 to 443, 457 to 461, 475 to 479, 493 to 497, and 511 to 515 show larger values than Comparative Examples 44 to 47 in the flexural strength after curing of 6, 12, and 24 hours, and therefore it has been clarified that Examples 377 to 390, 430 to 443, 457 to 461, 475 to 479, 493 to 497, and 511 to 515 are excellent in terms of cured strength developing property. In particular, the flexural strength after curing of 6 hours is remarkably greater compared to those of the Comparative Examples, and therefore it has been confirmed that Examples 377 to 390, 430 to 443, 457 to 461, 475 to 479, 493 to 497, and 511 to 515 are excellent in terms of early strength developing property. Furthermore, it has been clarified that, compared to Comparative Examples, Examples 377 to 390, 430 to 443, 457 to 461, 475 to 479, 493 to 497, and 511 to 515 clearly show small wear amounts in the rotary corrosion test using slag and are excellent in terms of slag resistance at a high temperature.

In Examples 377 to 390, 430 to 443, 457 to 461, 475 to 479, 493 to 497, and 511 to 515, the cured flexural strength further increased after 6 hours and 12 hours compared to Examples including at least either a dispersant or a hardening retardant, and no hardening accelerator added, which clarified that Examples 377 to 390, 430 to 443, 457 to 461, 475 to 479, 493 to 497, and 511 to 515 are superior in terms of early strength developing property. In addition, the wear amount became almost the same in the rotary corrosion test using slag, which clarified that Examples 377 to 390, 430 to 443, 457 to 461, 475 to 479, 493 to 497, and 511 to 515 are excellent in terms of slag resistance at a high temperature.

As described above, the binders for monolithic refractories according to the present invention of all Examples obtained more satisfactory flow property suitable for pouring even after a long period of time has elapsed after mixing, were superior to Comparative Examples in terms of early strength developing property, thereby obtaining excellent construction performance. In addition, all Examples obtained more satisfactory slag resistance at 1600° C. than the Comparative Examples, which clarified that the tolerance at places that come into contact with molten iron or slag are improved.

INDUSTRIAL APPLICABILITY

According to the prevention, a binder for monolithic refractories having excellent corrosion resistance with respect to slag or molten iron and excellent characteristics in the early development of hardened strength and the stability thereof, compared to binders such as alumina cement in the conventional technology; a monolithic refractory using the binder; and a construction method of the monolithic refractory, can be provided.

REFERENCE SYMBOL LIST

1: REFRACTORY (TEST SPECIMEN)
2: PROTECTION PLATE
3: BURNER
4: SLAG
5: FILLING MATERIAL

The invention claimed is:

1. A binder for monolithic refractories comprising
a solid solution obtained by dissolving Ca components in $\alpha$-$SrAl_2O_4$ or $\beta$-$SrAl_2O_4$,
wherein when the Ca components are dissolved in the $\alpha$-$SrAl_2O_4$, a crystallite diameter of the solid solution is from 40 nm to 75 nm, and
when the Ca components are dissolved in the $\beta$-$SrAl_2O_4$, a crystallite diameter of the solid solution is from 35 nm to 70 nm.

2. The binder for monolithic refractories according to claim 1,
wherein an amount of the solid solution obtained by dissolving Ca components in the $\alpha$-$SrAl_2O_4$ or the $\beta$-$SrAl_2O_4$ is from 10 mass % to 60 mass %, and
40 mass % to 90 mass % of $Al_2O_3$ is blended thereinto.

3. The binder for monolithic refractories according to claim 1, further comprising, as a mixture,
a solid solution obtained by dissolving Sr components in $CaAl_2O_4$,
wherein a crystallite diameter of the solid solution is from 25 nm to 60 nm.

4. The binder for monolithic refractories according to claim 3,
wherein an amount of the solid solution obtained by dissolving Ca components in the $\alpha$-$SrAl_2O_4$ or the $\beta$-$SrAl_2O_4$ and the solid solution obtained by dissolving Sr components in the $CaAl_2O_4$ is from 10 mass % to 60 mass %, and
40 mass % to 90 mass % of $Al_2O_3$ is blended thereinto.

5. The binder for monolithic refractories according to claim 1,
wherein both of a solid solution obtained by dissolving Ca components in the $\alpha$-$SrAl_2O_4$ and a solid solution obtained by dissolving Ca components in the $\beta$-$SrAl_2O_4$ are included as a mixture.

6. The binder for monolithic refractories according to claim 5,
wherein a total amount of both of the solid solution obtained by dissolving Ca components in the $\alpha$-$SrAl_2O_4$ and the solid solution obtained by dissolving Ca components in the $\beta$-$SrAl_2O_4$ is from 10 mass % to 60 mass %, and
40 mass % to 90 mass % of $Al_2O_3$ is blended thereinto.

7. The binder for monolithic refractories according to claim 5, further comprising, as a mixture
the solid solution obtained by dissolving Sr components in the $CaAl_2O_4$.

8. The binder for monolithic refractories according to claim 7,
wherein a total amount of the solid solution obtained by dissolving Ca components in the $\alpha$-$SrAl_2O_4$, the solid solution obtained by dissolving Ca components in the $\beta$-$SrAl_2O_4$, and the solid solution obtained by dissolving Sr components in the $CaAl_2O_4$ is from 10 mass % to 60 mass %, and
40 mass % to 90 mass % of $Al_2O_3$ is blended thereinto.

9. The binder for monolithic refractories according to claim 1,
wherein at least one selected from a group consisting of $SiO_2$, $TiO_2$, $Fe_2O_3$, MgO, and BaO are included in the binder for monolithic refractories and an amount thereof is 12 mass % or less.

10. The binder for monolithic refractories according to claim 1,
wherein at least one of a dispersant and a hardening retardant is blended into the binder for monolithic refractories.

11. A monolithic refractory obtained by blending the binder for monolithic refractories according to any one of claims 1 to 10 into a refractory aggregate.

12. The monolithic refractory according to claim 11,
wherein the refractory aggregate includes an ultrafine alumina powder with a particle diameter of from 0.8 nm to 1 μm.

13. The monolithic refractory according to claim 11,
wherein an amount of the binder for monolithic refractories is from 0.3 mass % to 20 mass % with respect to 100 mass % of a total amount of the binder for monolithic refractories and the refractory aggregate.

14. The monolithic refractory according to claim 13,
wherein the amount of the binder for monolithic refractories is from 0.5 mass % to 12 mass % with respect to 100 mass % of the total amount of the binder for monolithic refractories and the refractory aggregate.

15. The monolithic refractory according to claim 11,
wherein further at least one of a dispersant, a hardening retardant, and a hardening accelerator is added.

16. The monolithic refractory according to claim 15,
wherein the dispersant is at least one selected from a group consisting of a polycarbonate-based dispersant, a phosphate-based dispersant, an oxycarboxylic acid, a melamine-based dispersant, a naphthalene-based dispersant, and a lignin sulfonic acid-based dispersant,
the hardening accelerator is at least one of an alkali metal salt and aluminate, and
the hardening retardant is at least one of boric acid group and silicofluoride.

17. A construction method of monolithic refractories comprising:
blending and mixing the binder for monolithic refractories according to any one of claims 1 to 10 and a refractory aggregate including an ultrafine alumina powder with a particle diameter of 1 μm or less to obtain a monolithic refractory; and
constructing the monolithic refractory.

* * * * *